(12) United States Patent
Mardikian

(10) Patent No.: US 10,596,577 B2
(45) Date of Patent: Mar. 24, 2020

(54) SYSTEMS FOR PROCESSING WASTE TO FORM USEABLE PRODUCTS AND METHODS THEREOF

(71) Applicant: Albert Mardikian, Corona Del Mar, CA (US)

(72) Inventor: Albert Mardikian, Corona Del Mar, CA (US)

(*) Notice: Subject to any disclaimer, the term of this patent is extended or adjusted under 35 U.S.C. 154(b) by 362 days.

(21) Appl. No.: 15/436,554

(22) Filed: Feb. 17, 2017

(65) Prior Publication Data

US 2017/0239669 A1    Aug. 24, 2017

Related U.S. Application Data

(60) Provisional application No. 62/297,742, filed on Feb. 19, 2016.

(51) Int. Cl.

| | |
|---|---|
| *F26B 20/00* | (2006.01) |
| *B02C 19/22* | (2006.01) |
| *B30B 9/26* | (2006.01) |
| *B30B 9/12* | (2006.01) |
| *B09B 3/00* | (2006.01) |
| *B30B 15/34* | (2006.01) |

(52) U.S. Cl.
CPC .............. *B02C 19/22* (2013.01); *B09B 3/00* (2013.01); *B30B 9/12* (2013.01); *B30B 9/121* (2013.01); *B30B 9/125* (2013.01); *B30B 9/26* (2013.01); *B30B 15/34* (2013.01); *B02C 2201/06* (2013.01)

(58) Field of Classification Search
CPC .. B30B 9/12; B30B 15/34; B02C 9/04; B02C 13/04; B02C 19/22; B02C 18/08; B02C 18/186; B02C 18/24; B02C 21/02; B02C 2201/06; F26B 20/00; F26B 17/18; F26B 3/00; F26B 3/02; F26B 3/04; F26B 3/18; F26B 3/20; F26B 3/22; F26B 3/24; F26B 3/32; F26B 3/36; F26B 5/00; F26B 5/14; F26B 7/00; F26B 15/00; F26B 15/26; F26B 23/00; F26B 23/10; F26B 25/04
See application file for complete search history.

(56) References Cited

U.S. PATENT DOCUMENTS

| | | |
|---|---|---|
| 1,625,554 A | 4/1927 | Leggett |
| 1,813,750 A | 7/1931 | Mackenzie |

(Continued)

FOREIGN PATENT DOCUMENTS

| | | |
|---|---|---|
| CA | 2082311 | 4/2001 |
| CN | 2279794 Y | 4/1998 |

(Continued)

OTHER PUBLICATIONS

Examination Report From Australian Patent Office Regrading Australian Patent Application 2017221474; dated May 16, 2019; (U.S. Appl. No. 15/436,554 to Albert Mardikian).

(Continued)

*Primary Examiner* — Adam J Eiseman
*Assistant Examiner* — Bobby Yeonjin Kim
(74) *Attorney, Agent, or Firm* — Peter Ganjian; Patent Law Agency, LLC

(57) ABSTRACT

The present invention discloses low cost, on-site, efficient, and compact (stationary or mobile) system for continuous (non-batch operation) conversion of waste to usable products such as sources of energy, fertilizer, etc.

61 Claims, 115 Drawing Sheets

(56) References Cited

U.S. PATENT DOCUMENTS

| | | |
|---|---|---|
| 2,171,949 A | 9/1939 | Roca |
| 2,609,993 A | 9/1952 | Planiol |
| 2,977,873 A | 4/1961 | Crane |
| 3,100,143 A | 8/1963 | Doggett |
| 3,407,510 A | 10/1968 | Lewis et al. |
| 3,473,494 A | 10/1969 | Siracusa |
| 3,506,414 A | 4/1970 | Skendrovic |
| 3,563,399 A | 2/1971 | Shivers |
| 3,707,070 A | 12/1972 | Chaplin |
| 3,777,680 A | 12/1973 | Eck |
| 3,817,259 A | 6/1974 | Strasser et al. |
| 3,845,220 A | 10/1974 | Suzuki |
| 3,945,575 A | 3/1976 | Marsh |
| 4,026,426 A | 5/1977 | Shivvers |
| 4,026,678 A | 5/1977 | Livingston |
| 4,046,325 A | 9/1977 | Tucsok |
| 4,063,903 A | 12/1977 | Beningson et al. |
| 4,151,959 A | 5/1979 | Deister |
| 4,192,746 A | 3/1980 | Arvanitakis |
| 4,217,061 A | 8/1980 | Eiland et al. |
| 4,458,428 A | 7/1984 | Saeman |
| 4,479,048 A | 10/1984 | Kinoshita |
| 4,559,720 A | 12/1985 | Marquardt |
| 4,565,124 A | 1/1986 | Stautland et al. |
| 4,644,664 A * | 2/1987 | Bradshaw .............. F26B 3/084 34/361 |
| 4,884,353 A | 7/1989 | Houle |
| 4,922,989 A | 5/1990 | Backlund |
| 5,001,975 A | 3/1991 | Finden |
| 5,105,555 A | 4/1992 | Nakagomi |
| 5,181,432 A | 1/1993 | Allen |
| 5,277,760 A | 1/1994 | Fongen |
| 5,387,267 A * | 2/1995 | Warf .................. B03B 9/06 210/511 |
| 5,454,521 A | 10/1995 | Frazier et al. |
| 5,570,517 A | 11/1996 | Lucker |
| 5,651,305 A | 7/1997 | Bushman |
| 5,743,178 A | 4/1998 | Babbini |
| 5,971,305 A | 10/1999 | Davenport |
| 6,089,169 A | 7/2000 | Comiskey |
| 6,692,544 B1 * | 2/2004 | Grillenzoni ............. C10L 5/361 428/2 |
| 7,252,691 B2 | 8/2007 | Philipson |
| 7,267,049 B2 | 9/2007 | Babbini |
| 7,520,457 B1 * | 4/2009 | Poitras ................ C05F 17/0223 241/101.2 |
| 7,521,076 B1 | 4/2009 | Wagner |
| D609,042 S | 2/2010 | Wilmsen |
| 7,993,048 B1 | 8/2011 | Collette et al. |
| 8,043,505 B2 | 10/2011 | Noguchi et al. |
| 8,043,558 B2 | 10/2011 | Chambe et al. |
| 8,714,467 B2 | 5/2014 | Lucas |
| 9,423,178 B2 | 8/2016 | Mardikian |
| 2005/0274035 A1 | 12/2005 | Beal et al. |
| 2006/0130353 A1 | 6/2006 | Eloo |
| 2006/0288884 A1 | 12/2006 | Babbini |
| 2007/0164139 A1 | 7/2007 | Lipowski et al. |
| 2007/0221362 A1 | 9/2007 | Stewart et al. |
| 2008/0233310 A1* | 9/2008 | Fujita .................... B29C 43/22 428/4.6 |
| 2009/0060779 A1 | 3/2009 | Chambe et al. |
| 2009/0090282 A1 | 4/2009 | Gold et al. |
| 2010/0043246 A1* | 2/2010 | Smith ................. B30B 11/225 34/147 |
| 2010/0179315 A1 | 7/2010 | Medoff |
| 2010/0281767 A1 | 11/2010 | Zeeck |
| 2010/0293846 A1 | 11/2010 | Shaffer |
| 2010/0300368 A1 | 12/2010 | Myers et al. |
| 2010/0304439 A1 | 12/2010 | Medoff |
| 2010/0304440 A1 | 12/2010 | Medoff |
| 2011/0041390 A1 | 2/2011 | Flick et al. |
| 2011/0248109 A1 | 10/2011 | Lesar et al. |
| 2012/0145815 A1* | 6/2012 | Koenig ............... B29B 17/0052 241/203 |
| 2012/0245257 A1 | 9/2012 | Fascio |
| 2013/0029394 A1 | 1/2013 | Toll et al. |
| 2013/0205613 A1* | 8/2013 | Mardikian ............ F26B 19/005 34/385 |
| 2013/0306763 A1 | 11/2013 | Carmell |
| 2014/0061340 A1 | 3/2014 | Castronovo |
| 2014/0076693 A1 | 3/2014 | Pankoke |
| 2014/0144042 A1* | 5/2014 | Wechsler ................ F26B 21/08 34/468 |
| 2014/0144823 A1 | 5/2014 | Marchesini |
| 2014/0166794 A1 | 6/2014 | Kaljunen |
| 2014/0183022 A1* | 7/2014 | Daugaard ................ C10B 7/10 201/2.5 |
| 2014/0217214 A1 | 8/2014 | Peterson |
| 2014/0223810 A1 | 8/2014 | Nordin |
| 2014/0224905 A1 | 8/2014 | McKee et al. |
| 2014/0231560 A1 | 8/2014 | Lucas et al. |
| 2014/0259895 A1 | 9/2014 | Mason |
| 2015/0276312 A1* | 10/2015 | Mardikian ............. F26B 20/00 34/385 |
| 2017/0107447 A1* | 4/2017 | Hewitt ..................... C11B 1/02 |

FOREIGN PATENT DOCUMENTS

| | | |
|---|---|---|
| CN | 101365548 A | 2/2009 |
| CN | 201350703 Y | 11/2009 |
| CN | 202037167 U | 11/2011 |
| CN | 202643524 U | 1/2013 |
| CN | 203095009 U | 7/2013 |
| CN | 10518148 | 11/2015 |
| DE | 3015523 A1 | 10/1981 |
| EP | 0 358 837 A1 | 3/1990 |
| EP | 0358837 B1 | 3/1994 |
| EP | 0722486 A1 | 7/1996 |
| EP | 1 331 442 A1 | 7/2003 |
| EP | 1 663 632 B1 | 6/2006 |
| JP | S50158970 A | 12/1974 |
| JP | 08-215669 | 8/1996 |
| WO | WO 91/06816 A1 | 5/1991 |
| WO | WO-9106816 A1 | 5/1991 |

OTHER PUBLICATIONS

Australian Patent Application Office Action for Australian Patent Application: 2016388325; dated Apr. 4, 2019.
Australian Patent Application Office Action for Australian Patent Application: 2016393244; dated Apr. 4, 2019.
EffEnergy; BTU Values Mar. 2006.
Jordan Reduction Solutions ; Twin Shaft Shredders; http://www.jordanreductionsolutions.com.
http://www.kunsheng.com.tw/equipments.html website.
"Pelletizing rather than refining"; Sun & Wind Energy, Sep. 2010; pp. 242 to 246.
WO 2004/080704 A1 ; Sep. 23, 2004; Atlas-Stord Denmark A/S.
Keyway-Keyseat; Nov. 29, 2014 ; Avneesh Khanna.
IAC Publishing, LLC; 2017 ; How Does Humidity Affect Static Electricity.
File Hisotry of U.S. Appl. No. 14/242,453, filed Apr. 1, 2014; Mardikian; Includes JP 550158970A.
PCT/US2016/047221 ; Filed: Aug 16, 2016; File History, ISR, and Opinion; WO 2017/127135—Jul. 27, 2017.
PCT/US2016/049311 ; Filed Aug. 29, 2016; File History, ISR, and Opinion; WO 2017/127137—Jul. 27, 2017.
PCT/US2016/051185 ; Fled Sep. 10, 2016 ; File History, ISR, and Opinion; WO 2017/142592—Aug. 24, 2017.
PCT/US2017/018513 ; Filed Feb. 17, 2017 ; File History, ISR, and Opinion ; WO2017/143293—Aug. 24, 2017.
WO 91/06816 A1 (AKT Consultants PTY Limited) May 16, 1991.
EPO Search Report; EPO Application: 16886766.1 Office Action Report dated Aug. 21, 2019.
EPO Search Reports; EPO Application: 17753997.0 Office Actions Report Dates (Final Date): dated Sep. 13, 2019.
Canada Search/Examiner Report for; Application No. 3,011,564; dated Jul. 5, 2019.

(56) References Cited

OTHER PUBLICATIONS

Canada Search/Examiner Report for; Application No: 3,011,571; dated Jul. 16, 2019.
Canada Search/Examiner Report; Application No. 3,011,621; dated Jul. 16, 2019.
EPO Office Action dated Sep. 18, 2019; for Case 16890868.9; Albert Mardikian EPO Version of the U.S. Appl. No. 158/048,513, filed Feb. 19, 2016.
China Case 201680079485.5 Office Action From China Patent Office for U.S. Appl. No. 15/001,091, filed Jan. 26, 2016, Now U.S. Pat. No. 10,071,405, dated Sep. 11, 2018.
China Case PA 201680081044.9 Office Action From China Patent Office for U.S. Appl. No. 15/048,513, filed Feb. 19, 2016.
European Patent Application EP 16 89 0868.9 Office Action dated Sep. 11, 2019; U.S. Appl. No. 15/048,513, filed Feb. 19, 2016.

* cited by examiner

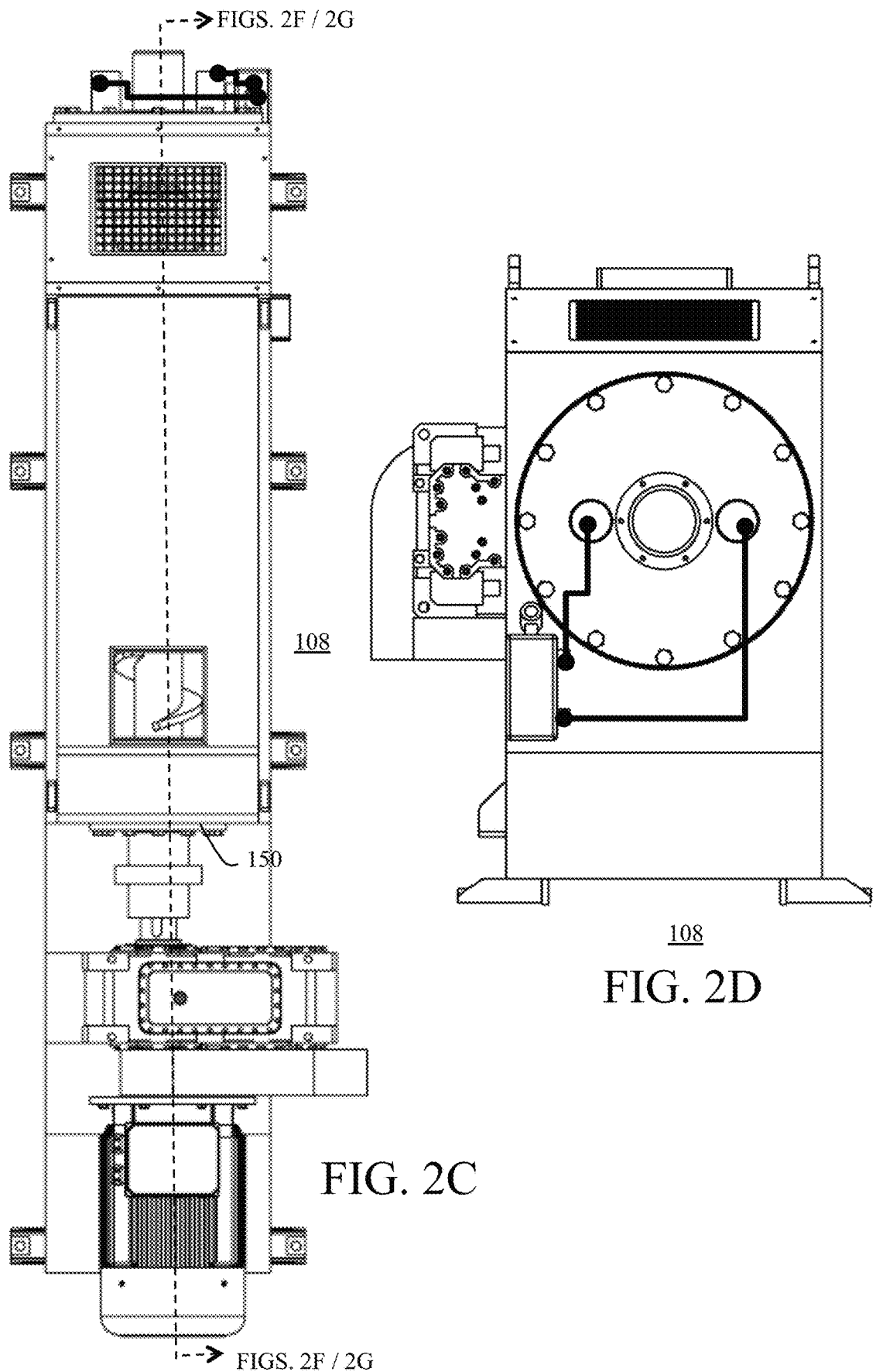

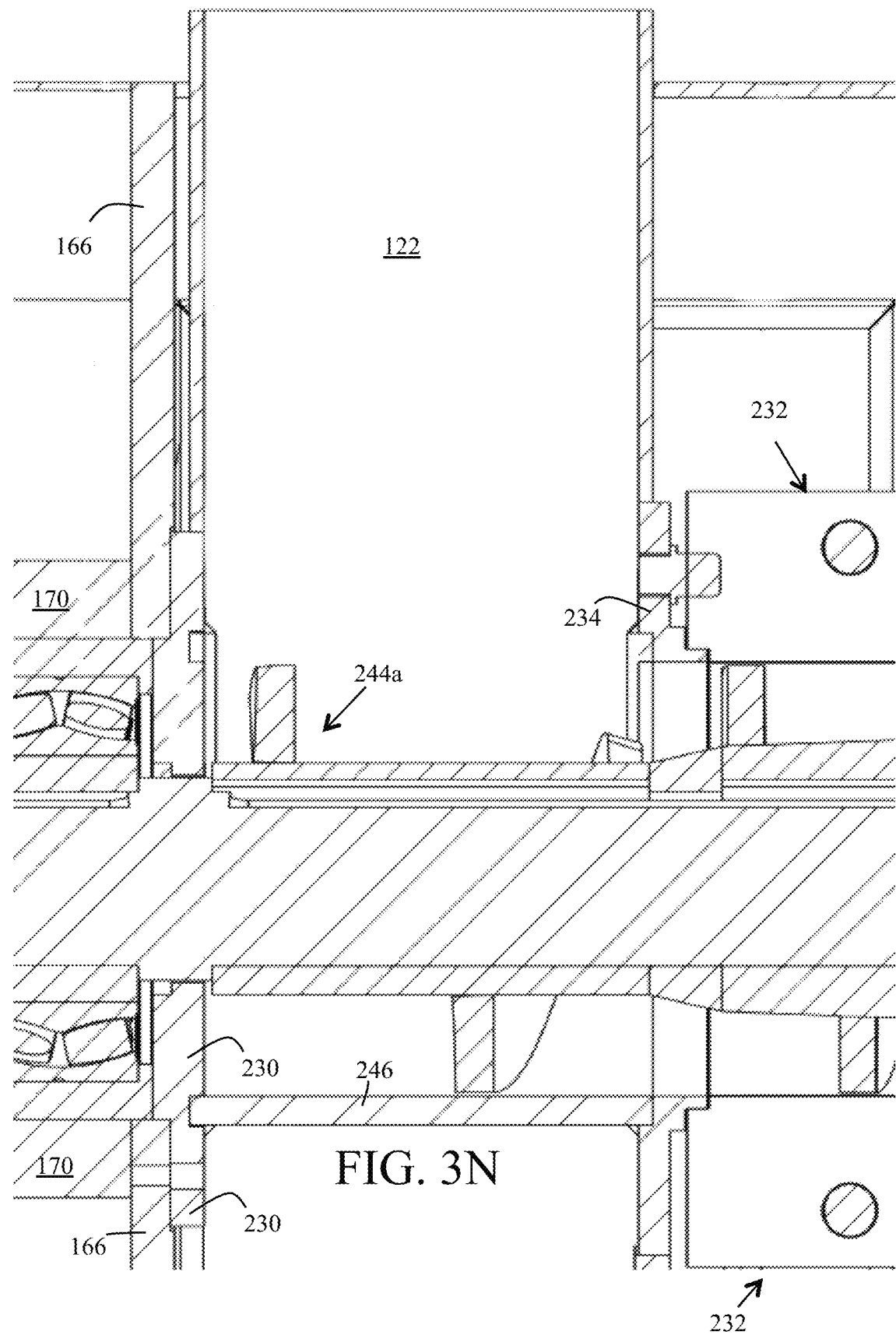

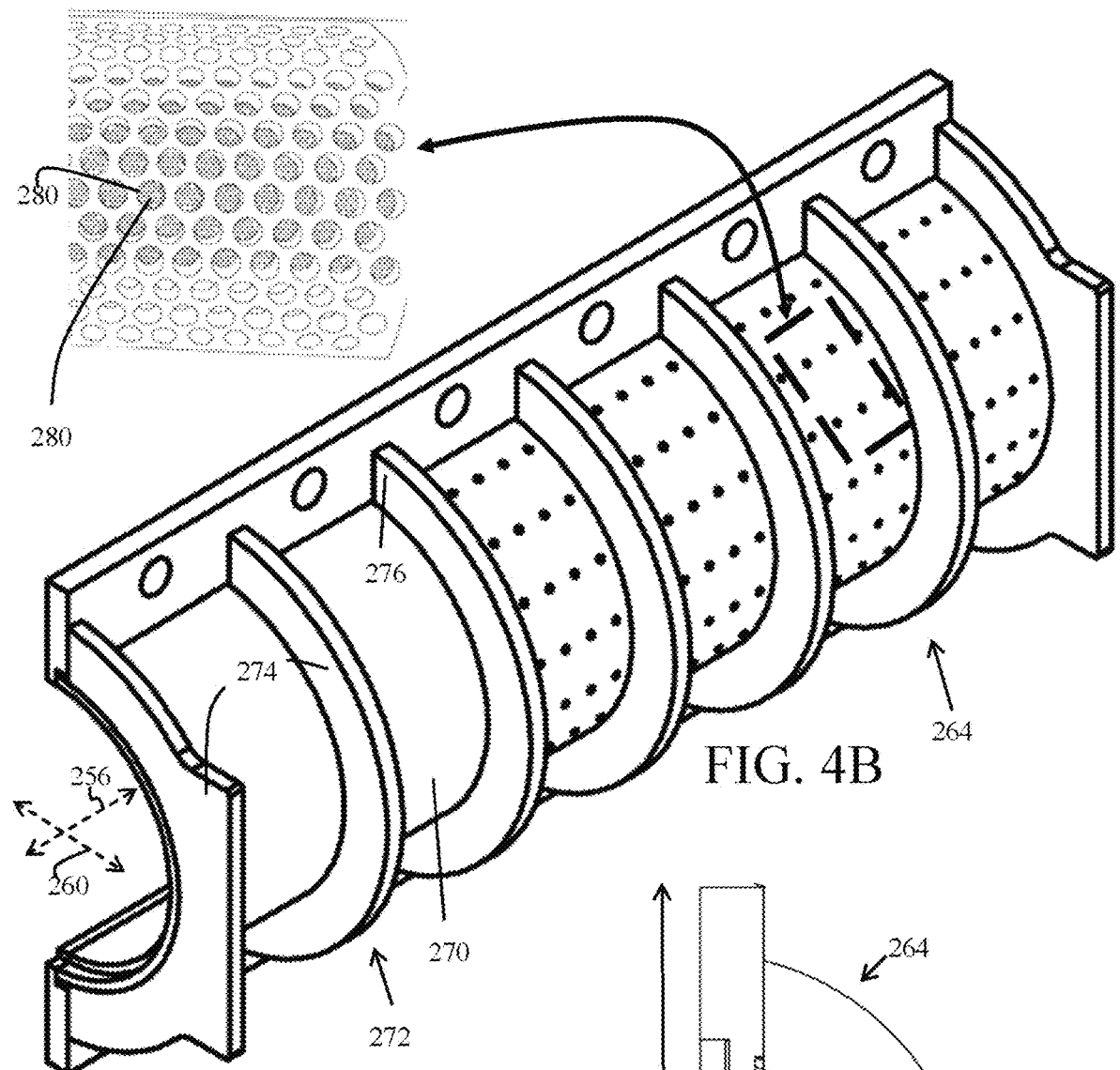
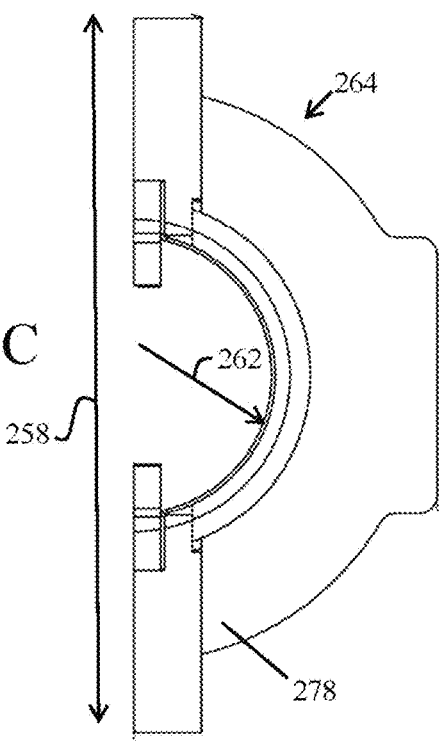
FIG. 4B
FIG. 4C

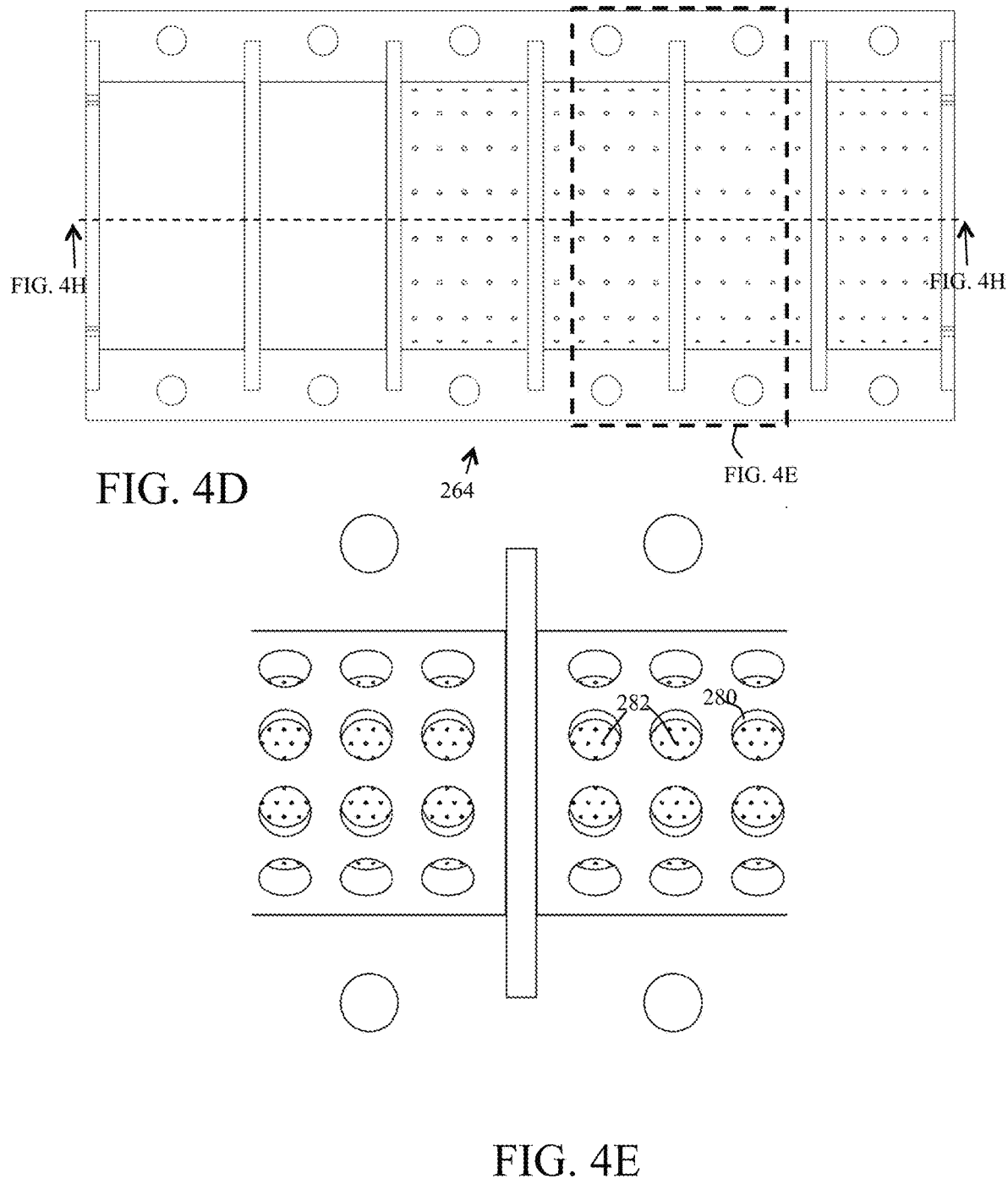

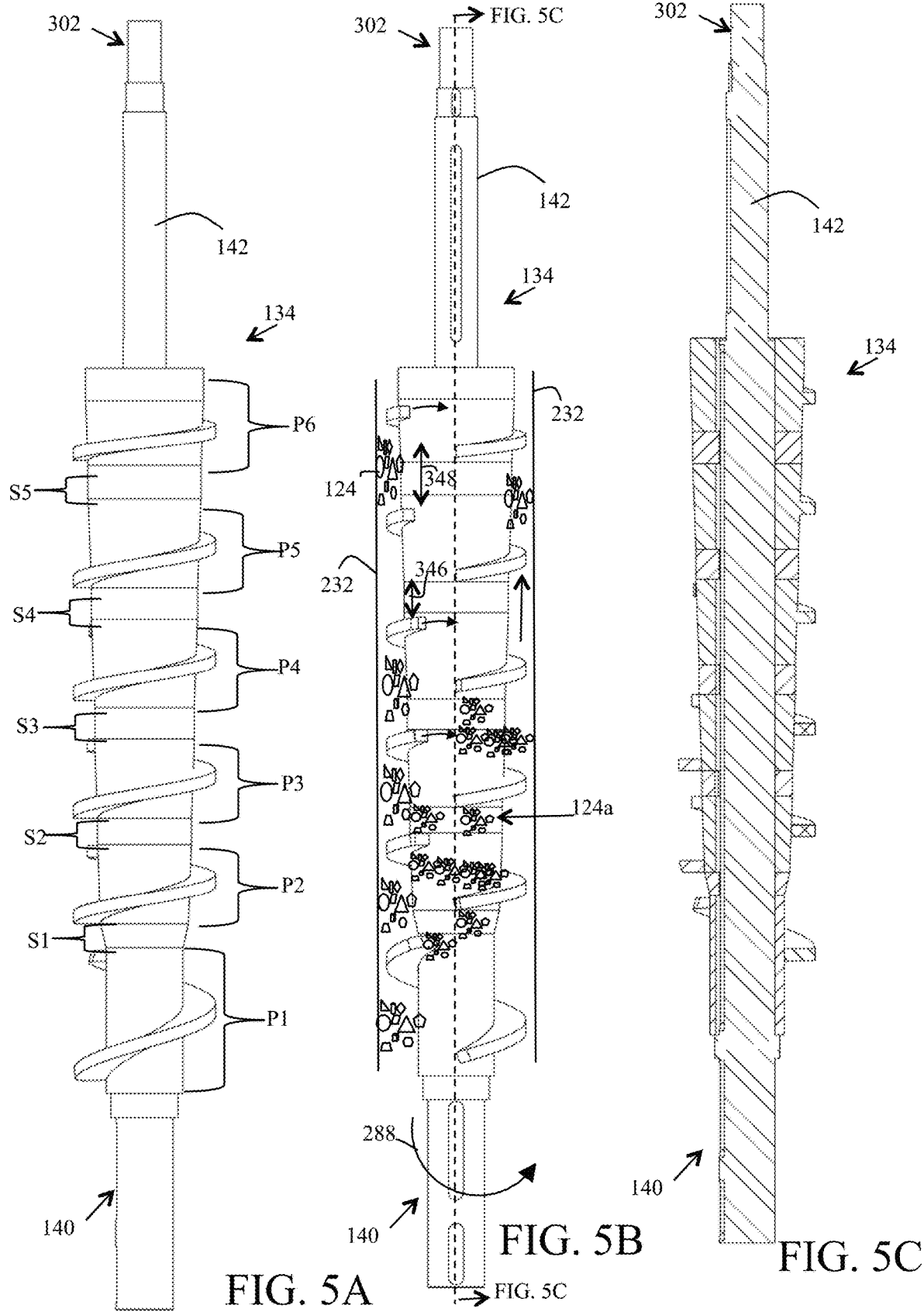

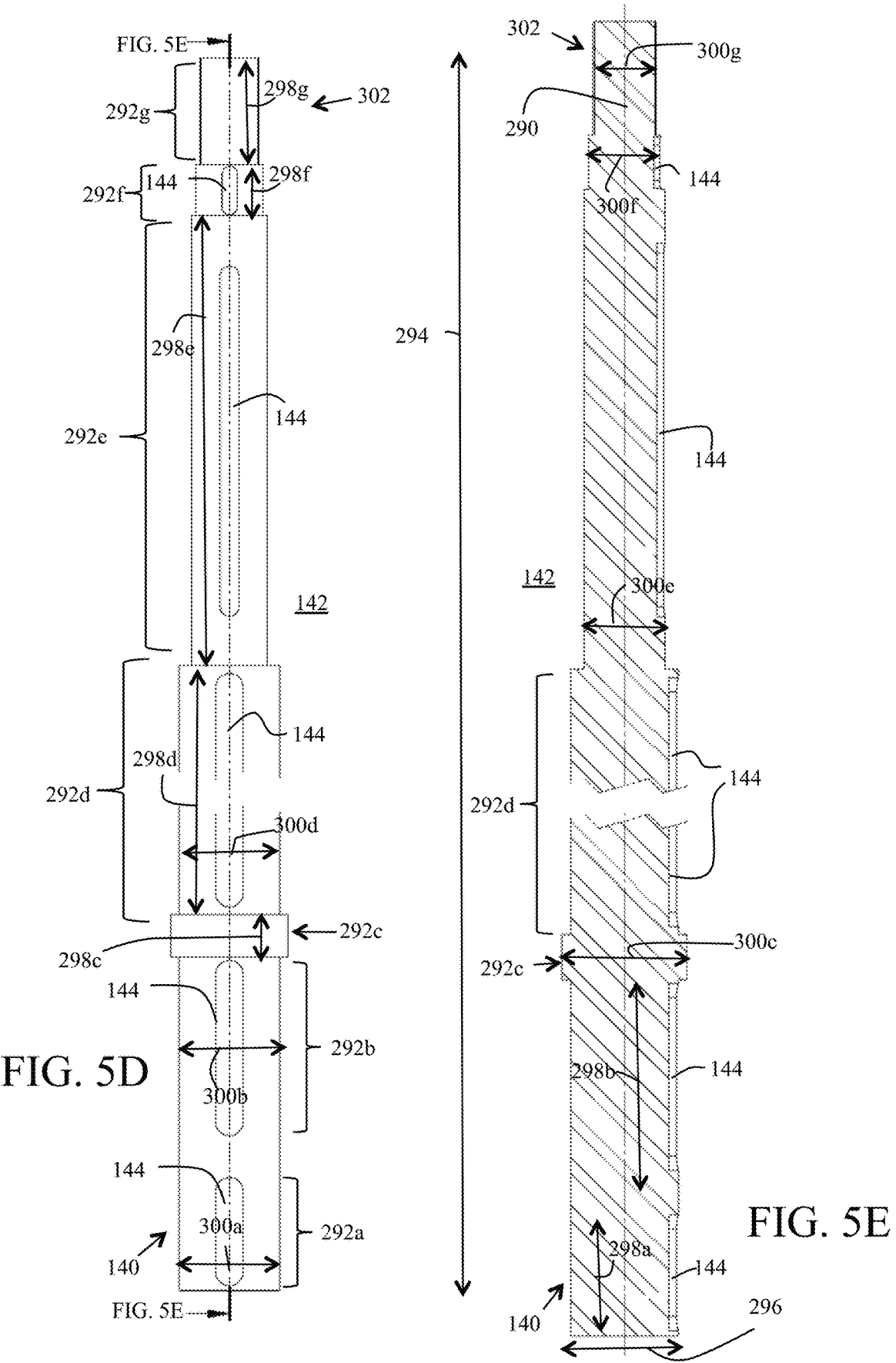

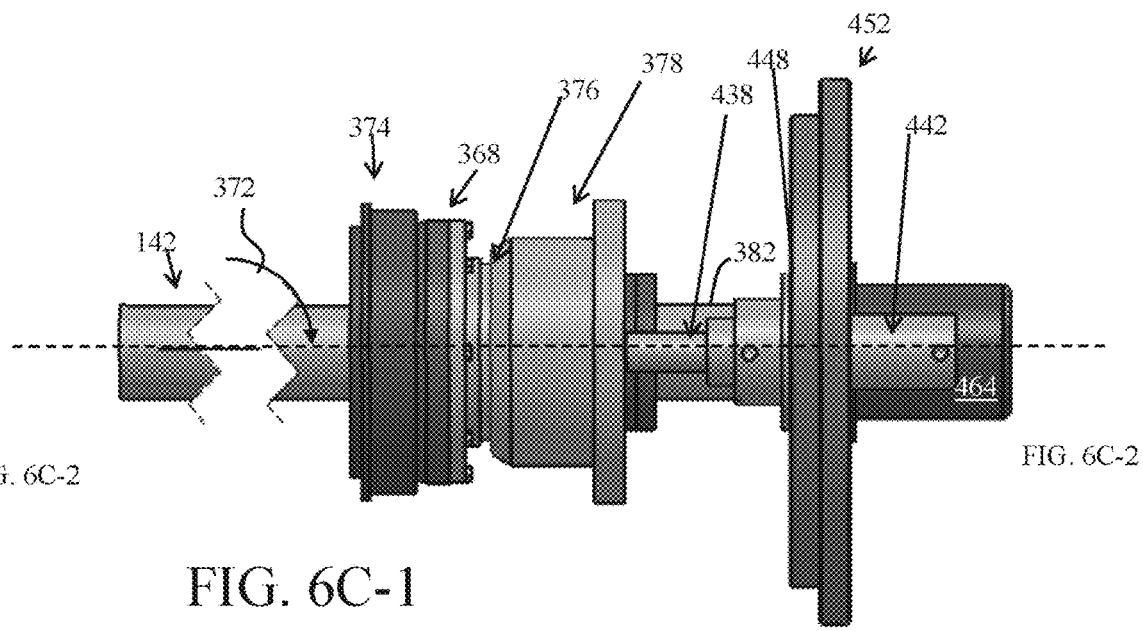
FIG. 6C-1
FIG. 6C-3
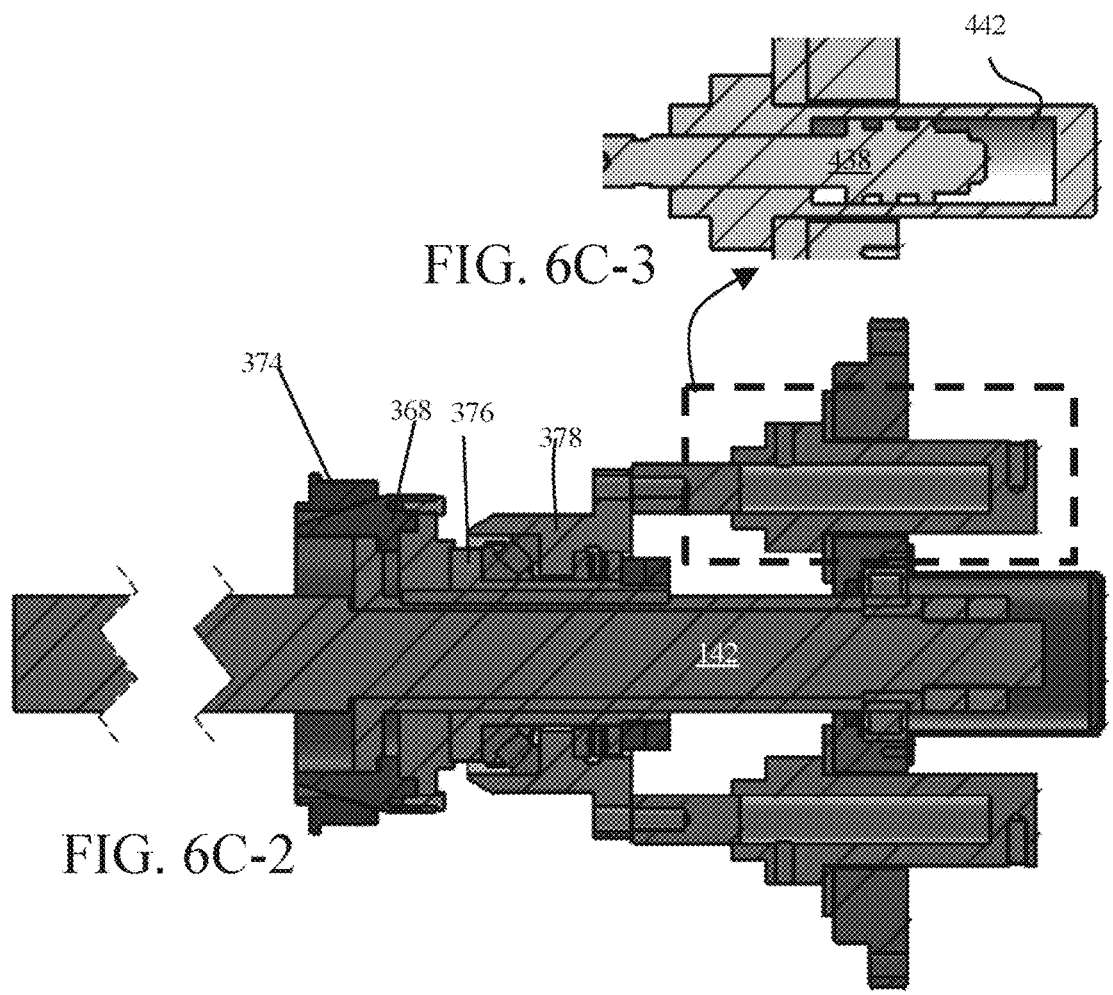
FIG. 6C-2

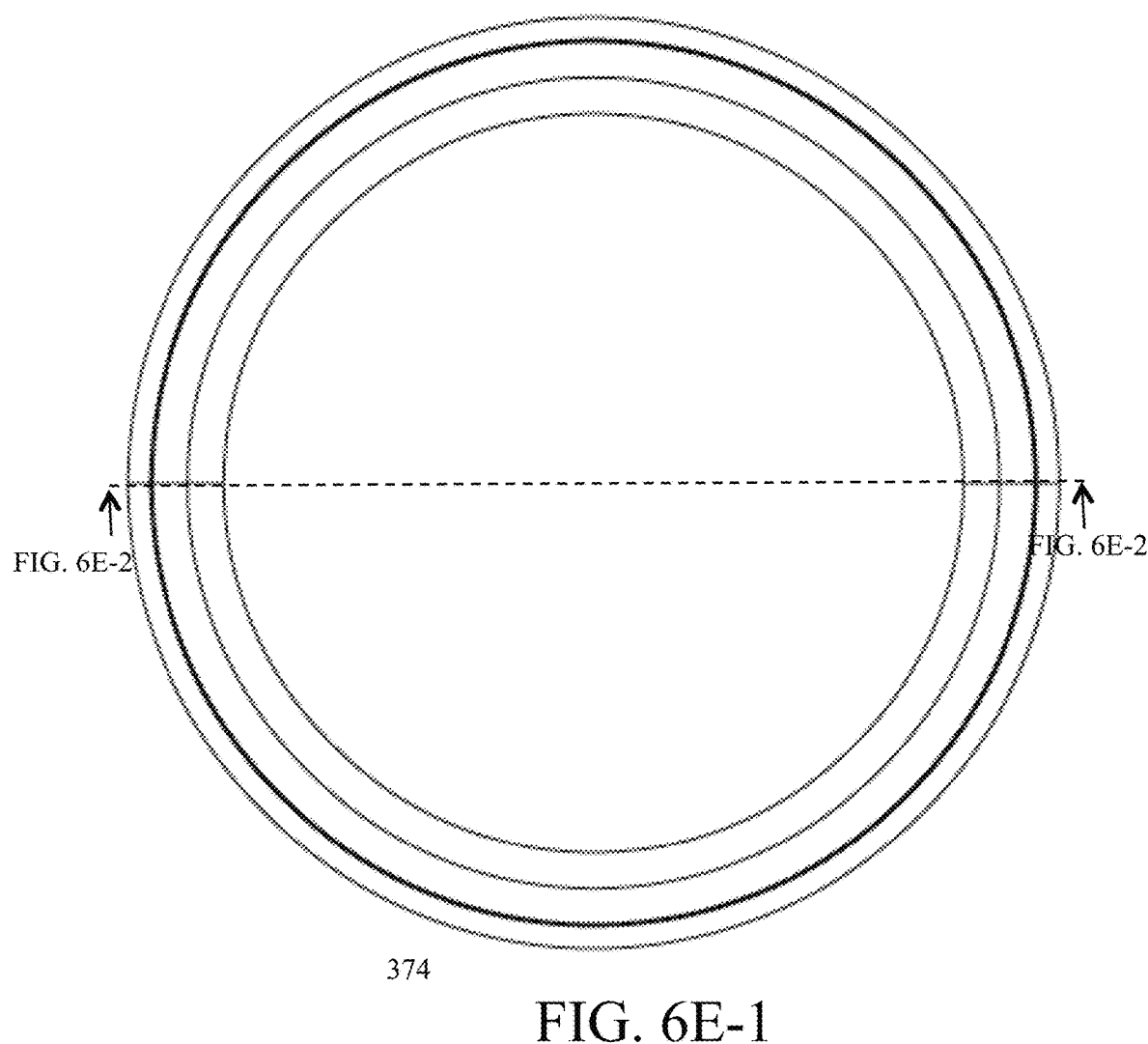
374
FIG. 6E-1
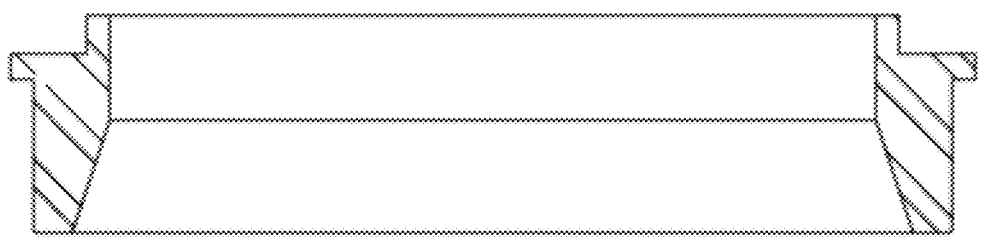
FIG. 6E-2    374

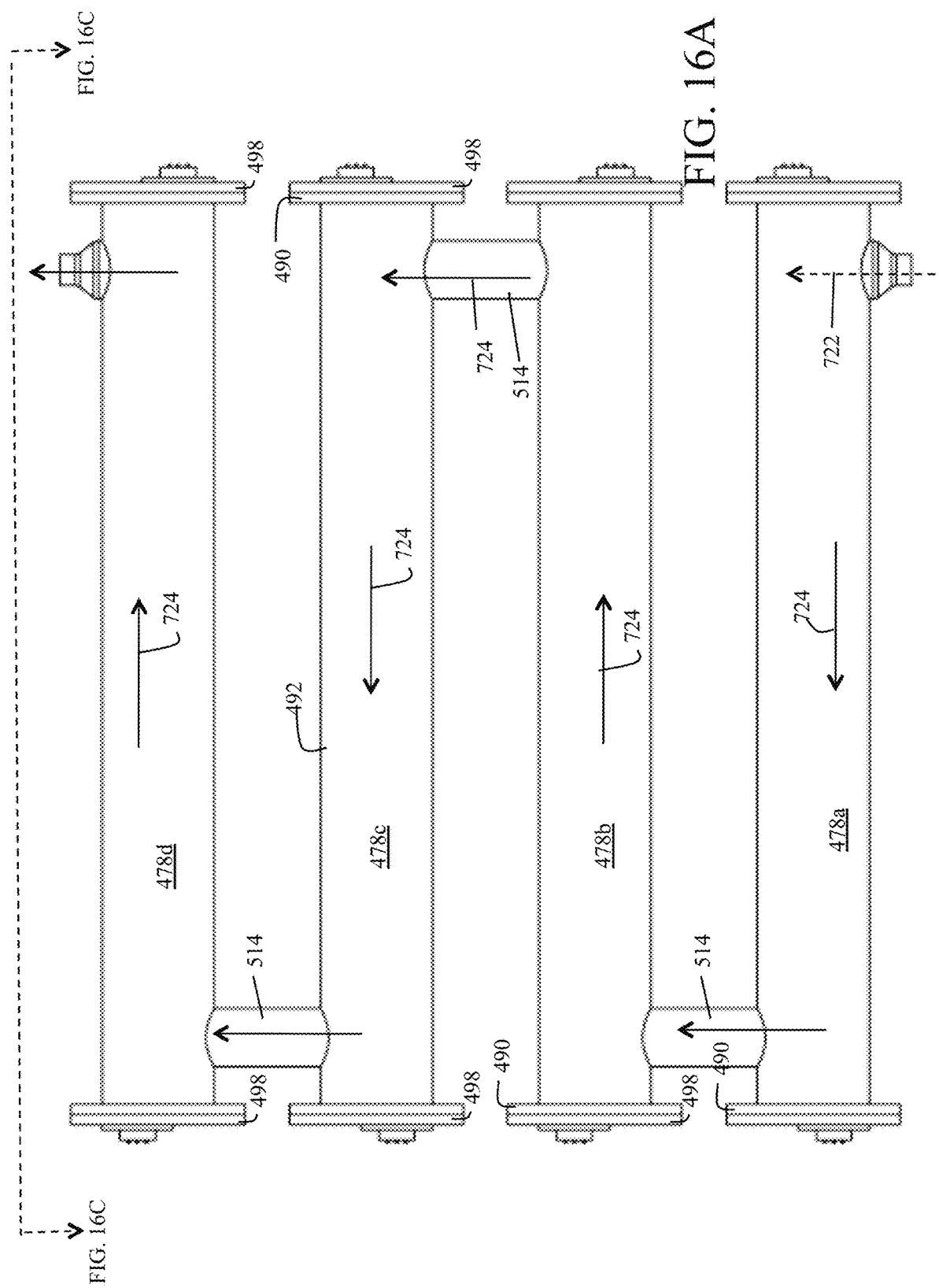

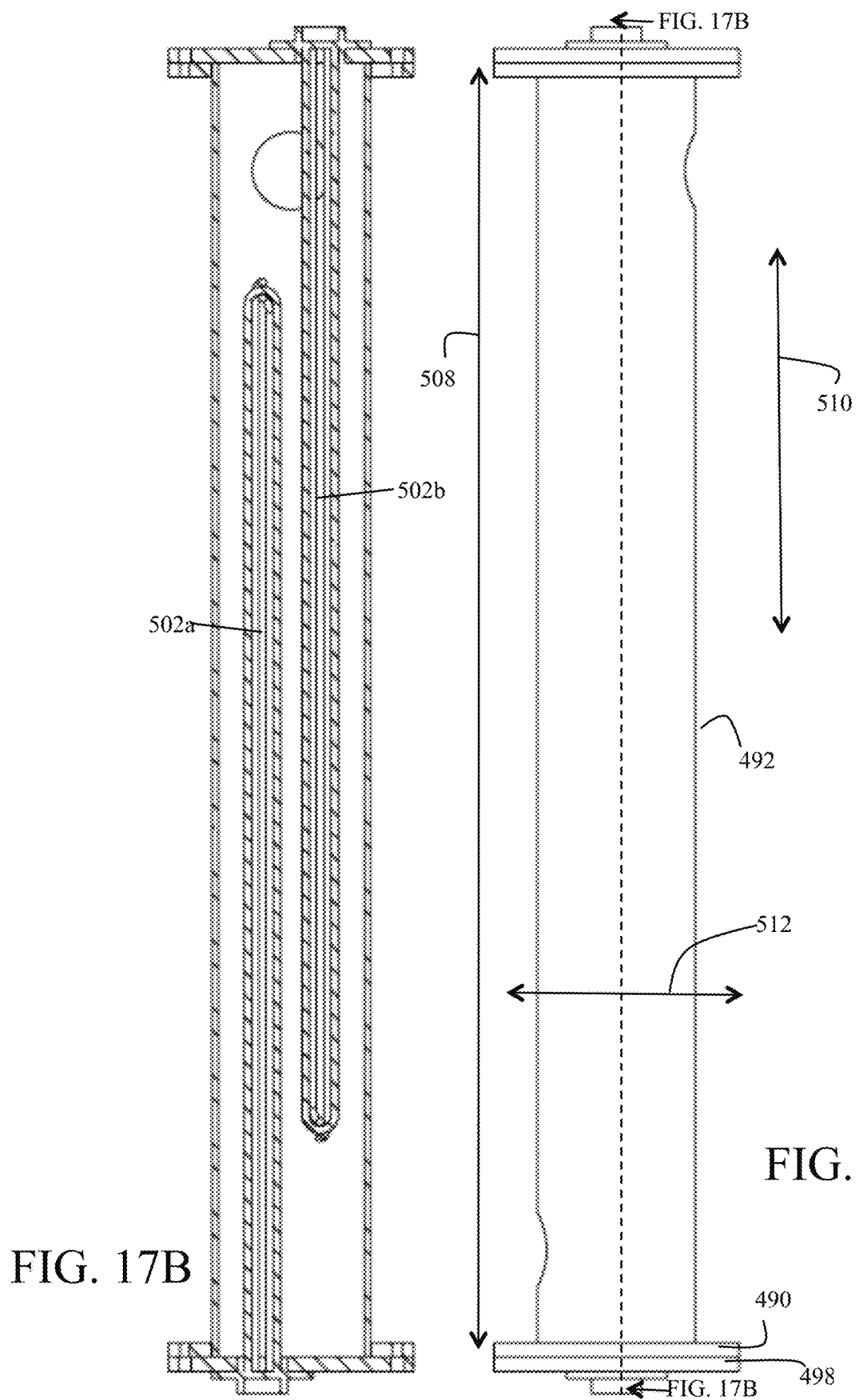

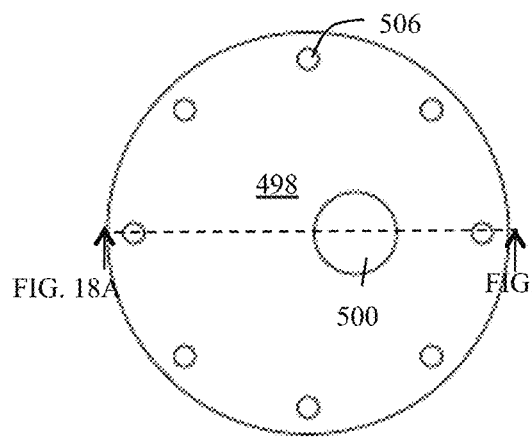
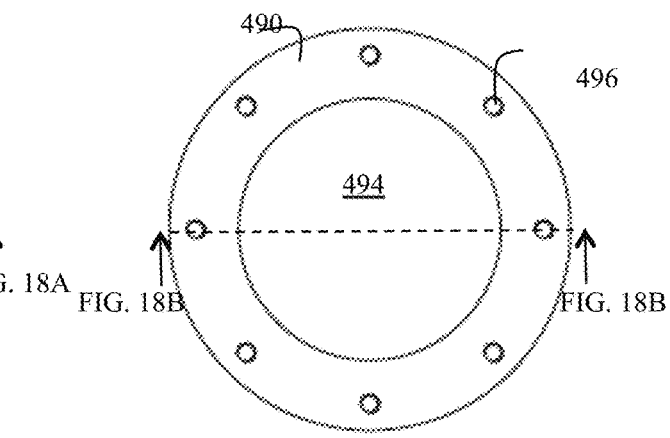
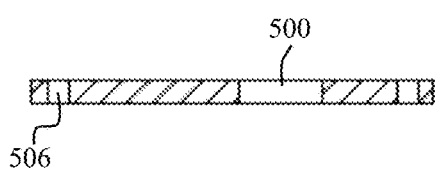
FIG. 18A
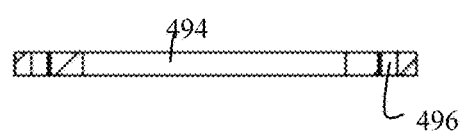
FIG. 18B
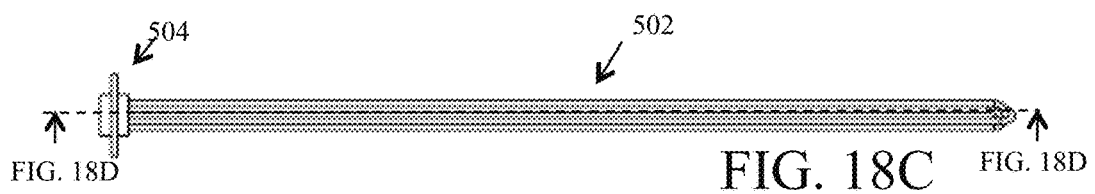
FIG. 18D

FLAP IS OPEN

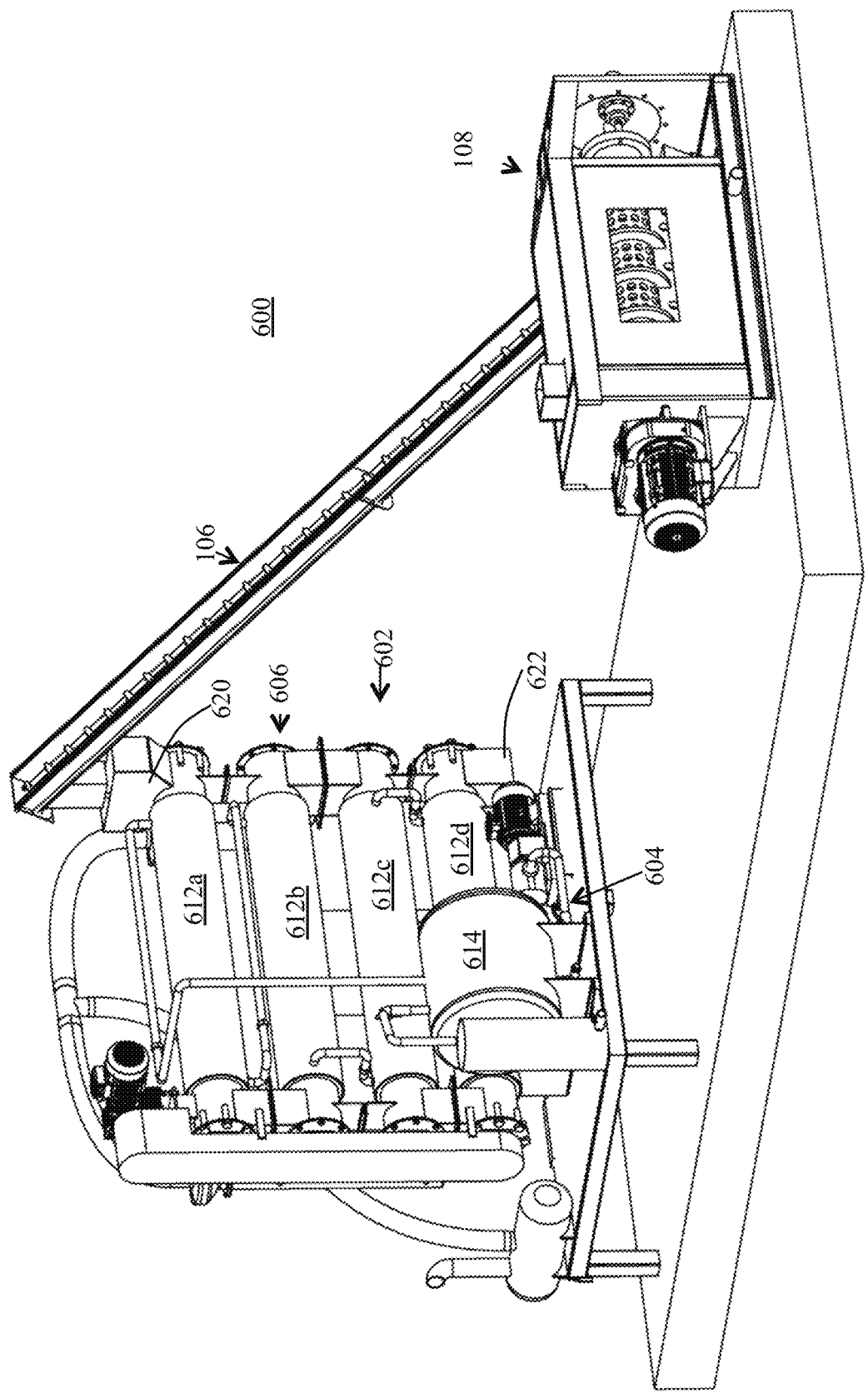

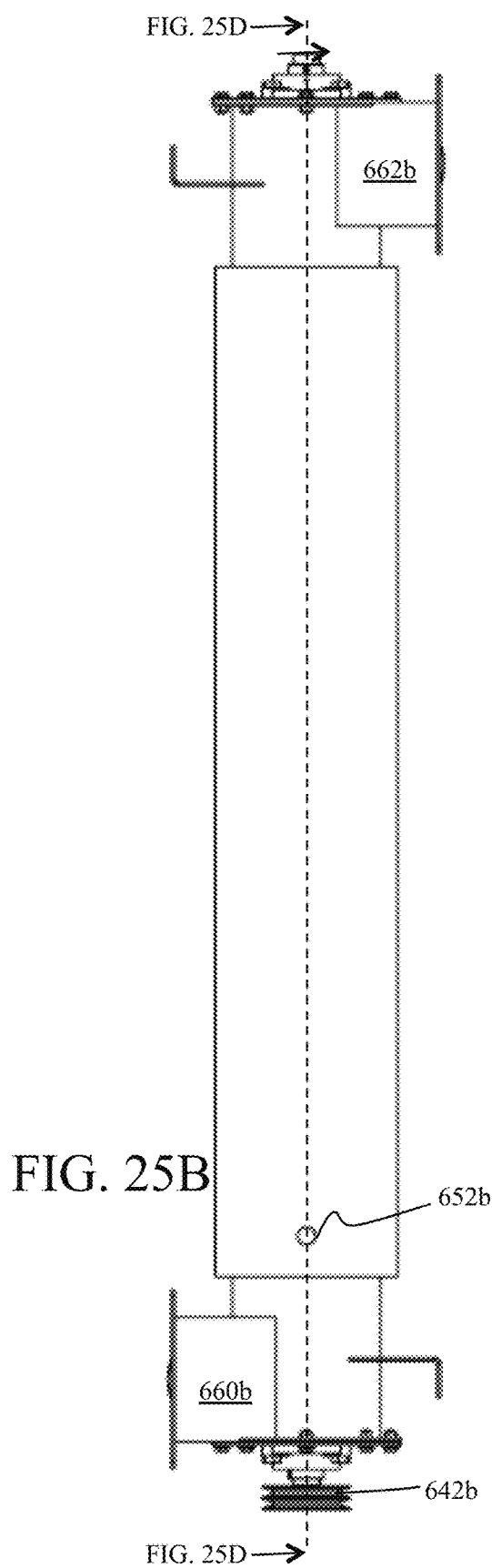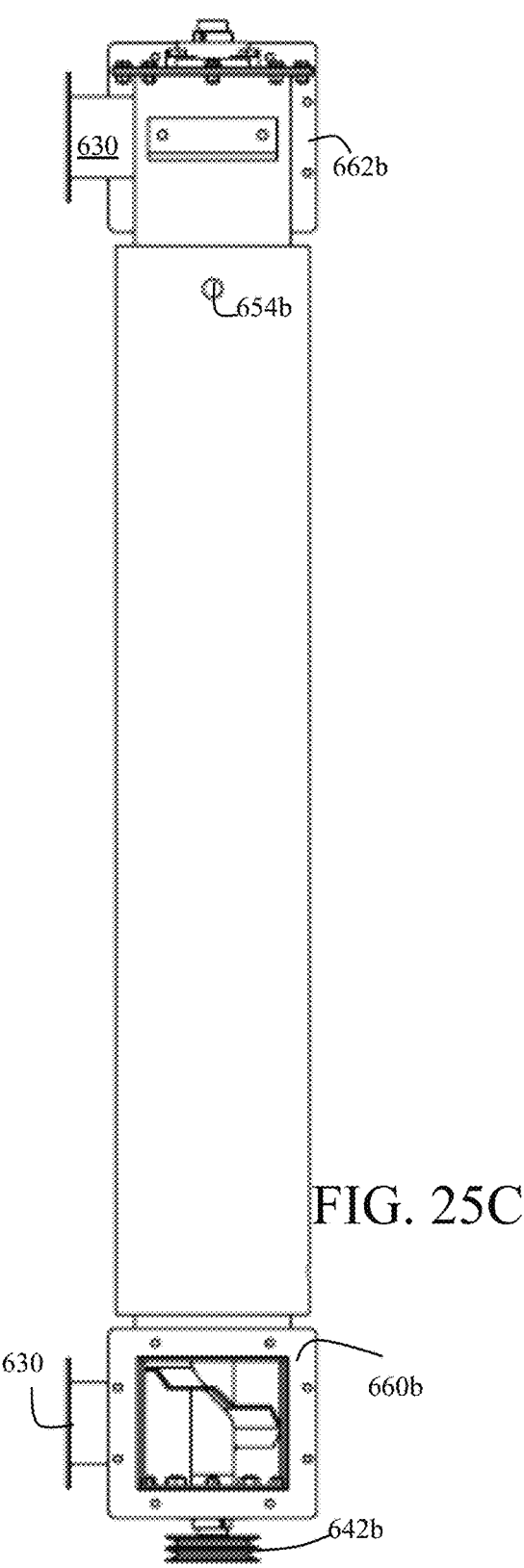

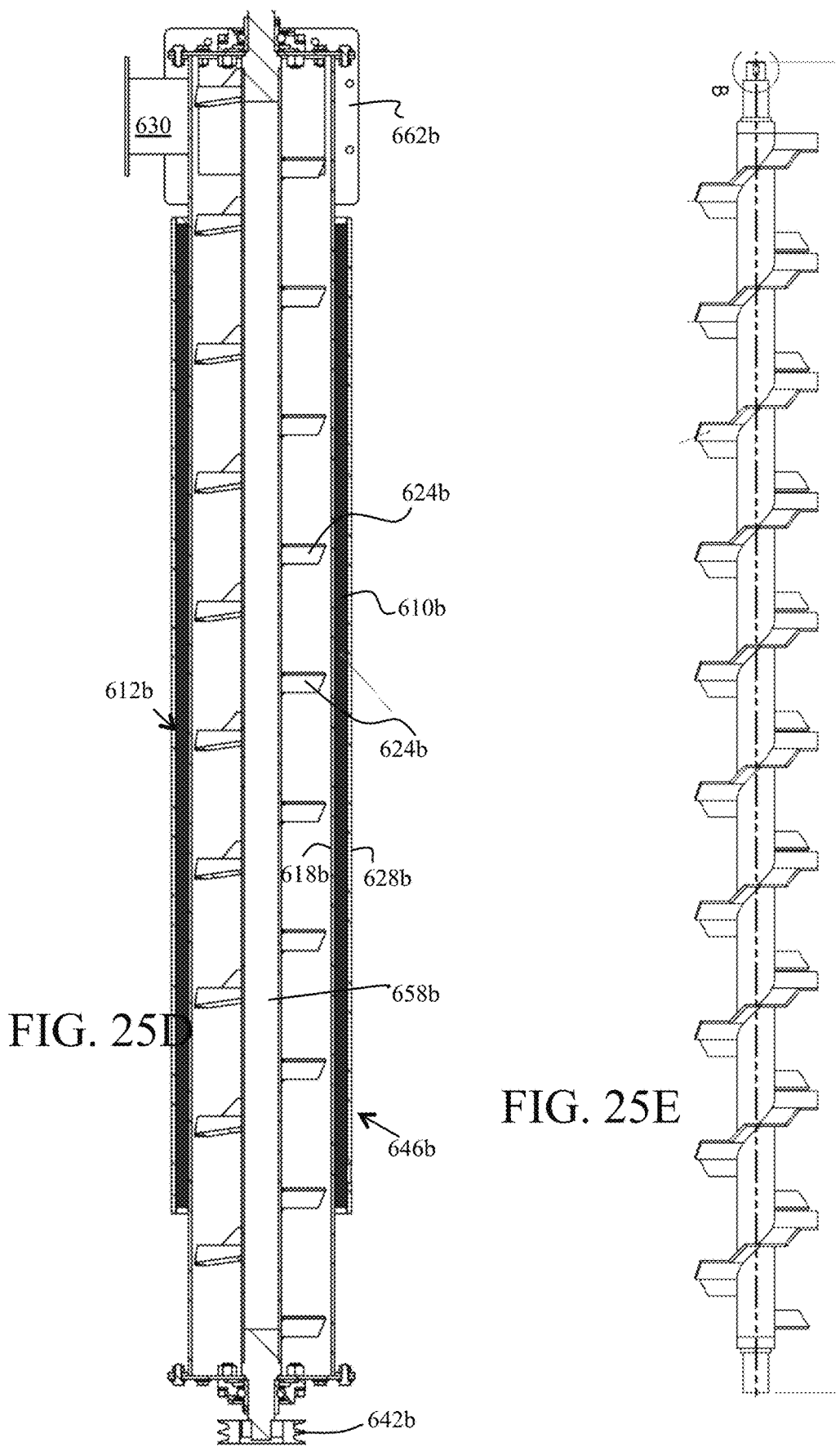

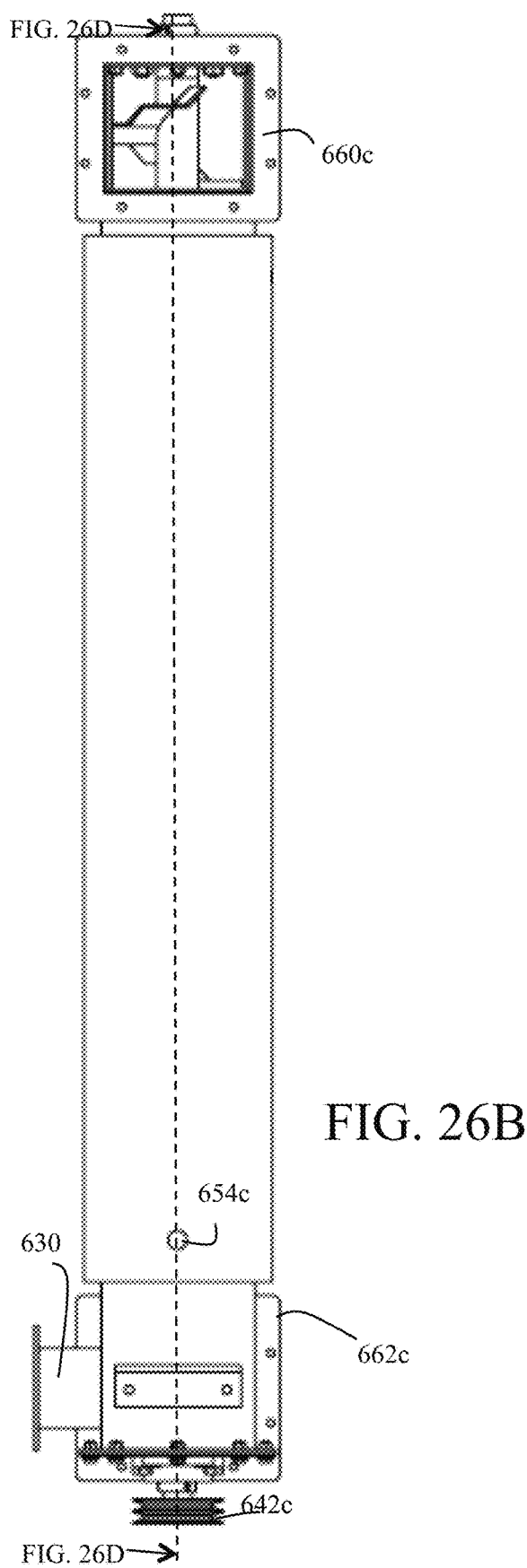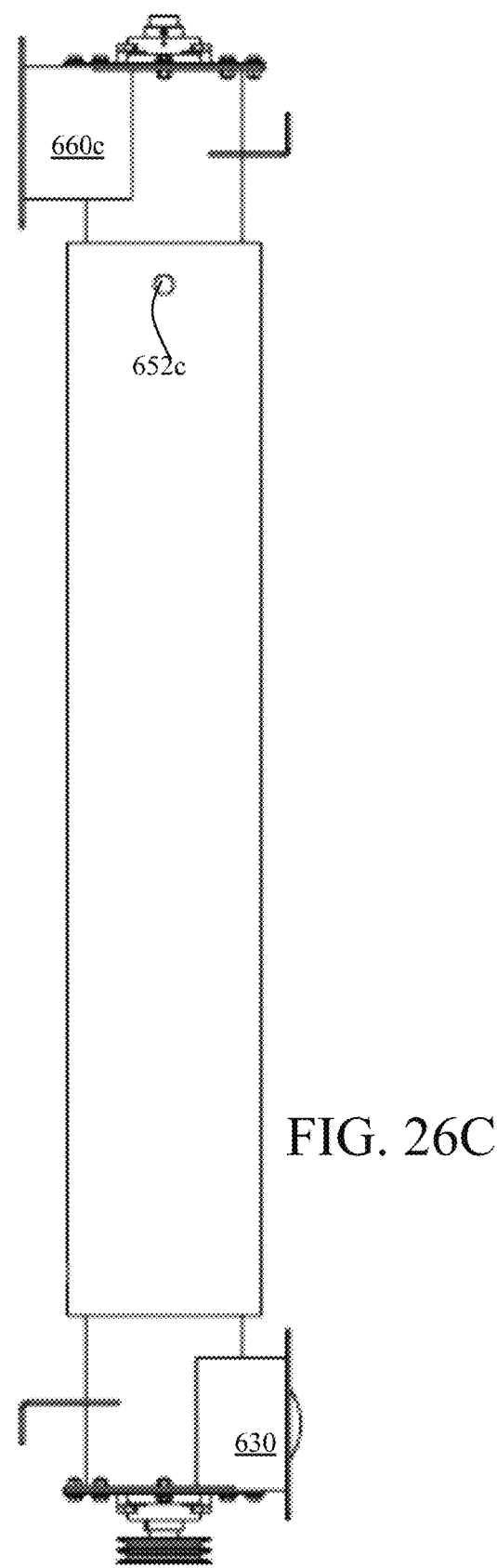
FIG. 26B
FIG. 26C

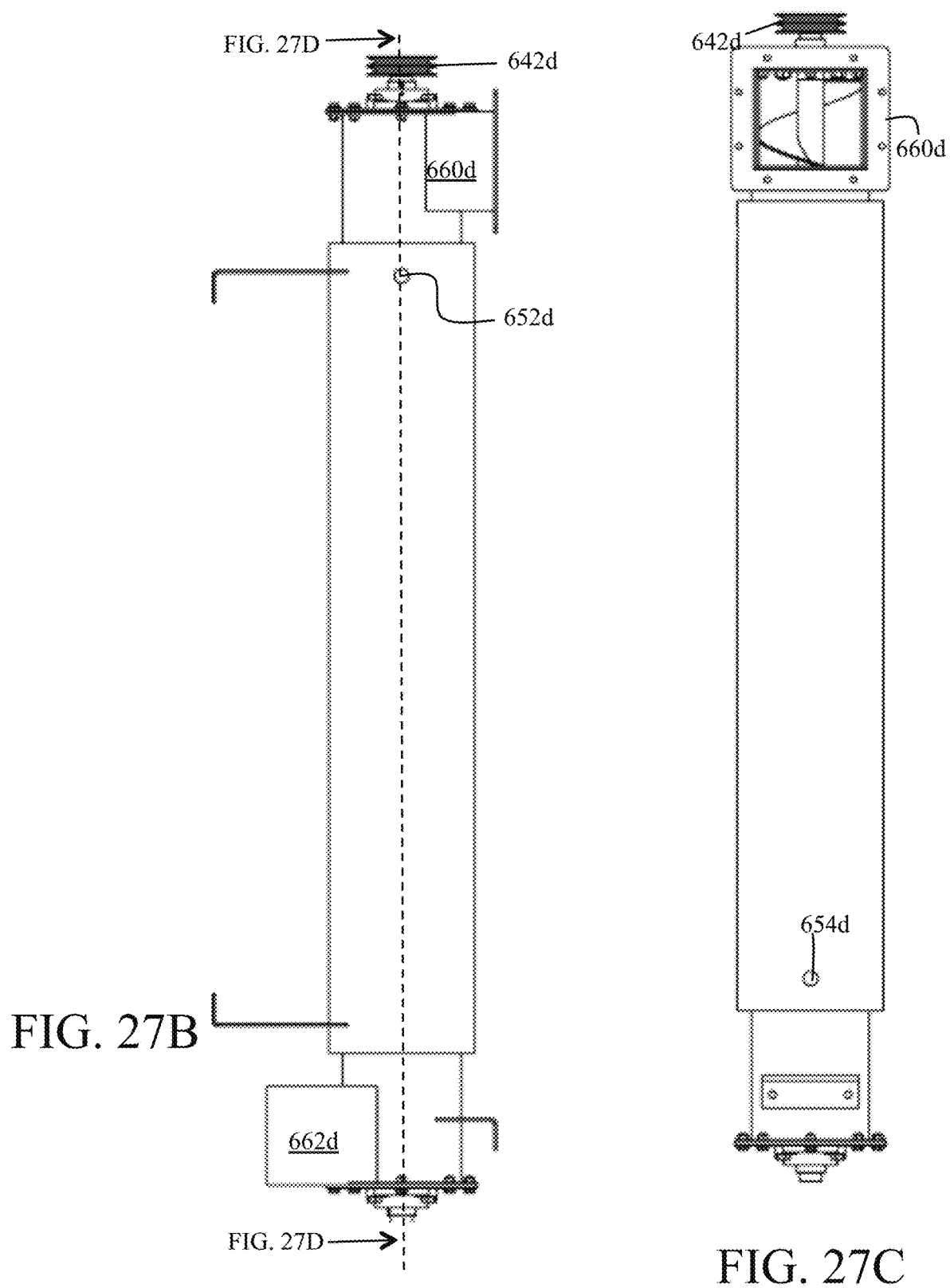

SYSTEMS FOR PROCESSING WASTE TO FORM USEABLE PRODUCTS AND METHODS THEREOF

CROSS-REFERENCE TO RELATED APPLICATIONS

This Application claims the benefit of priority of U.S. Utility Provisional Patent Application 62/297,742, filed 19 Feb. 2016, the entire disclosure of which is expressly incorporated by reference in its entirety herein.

All documents mentioned and referenced in this specification are herein incorporated by reference to the same extent as if each individual document was specifically and individually indicated to be incorporated by reference.

It should be noted that throughout the disclosure, where a definition or use of a term in any incorporated document(s) is inconsistent or contrary to the definition of that term provided herein, the definition of that term provided herein applies and the definition of that term in the incorporated document(s) does not apply.

BACKGROUND OF THE INVENTION

Field of the Invention

One or more embodiments of the present invention relates to a field of waste management. More specifically, one or more embodiments of the present invention relate to systems for processing waste to form usable products.

Description of Related Art

Conventional processing schemes for waste products are well known and have been in use for a number of years. Regrettably, most suffer from obvious disadvantages in that they are very costly, inefficient, complex, and fairly large systems that require a dedicated large facility for operation. Further, some are for recovery of salvageable components (e.g., sorting glass, metal, etc. from a salvageable component such as car) rather than recycling of waste to different products. Others are for recovery or conversion of specific types of waste such as wood products only.

Most conventional methods for processing waste have several additional disadvantages, including the processing of waste material at a very slow pace or only partial treatment of waste while allowing some untreated waste to remain as a byproduct. Further, conventional methods require a large area for installation of each of the equipment. The applicability of these methods on a long-term basis, with the attendant large-scale requirements is economically not feasible.

Accordingly, in light of the current state of the art and the drawbacks to current mechanisms for processing waste to form usable products mentioned above, a need exists for a low cost, on-site, efficient, and compact (stationary or mobile) system for continuous (non-batch operation) conversion of waste to usable products such as sources of energy or fertilizer.

BRIEF SUMMARY OF THE INVENTION

A non-limiting, exemplary aspect of an embodiment of the present invention provides a system for processing waste, comprising:

a receiver member to receive waste;

a first stage that includes a first module that comprises a first mechanism that reduces a size of received waste into smaller constituent parts;

a second stage that includes second module that comprises a second mechanism comprised of a single chamber, longitudinally extending multi-phase adjustable compressor;

the single chamber, longitudinally extending multi-phase adjustable compressor applies continuous, progressively increasing compressive force at each phase to increasingly compress the smaller constituent parts into partially dehydrated, dense, and heated material, with an adjustable egress phase enabling adjustment of compression force that is transferred to preceding phases;

the smaller constituent parts move from a phase to a next phase as greater mass of smaller constituent parts is introduced at an intake end, pushing existing smaller constituent parts to the next phase;

the smaller constituent parts move from the phase to the next phase at a progressively slower and slower rate, enabling the smaller constituent parts to remain at the next phase at a longer duration then at a preceding phase;

the slower rate of movement and longer duration of stay of the smaller constituent parts at the next phase cause accumulation of greater mass of smaller constituent parts at the next and subsequent phases as the smaller constituent parts egress from the preceding, faster moving phase and into the next phase;

the continuously accumulating smaller constituent parts at the next phase increasingly experience higher compressive and higher frictional forces as greater mass of smaller constituent parts are accumulated in a smaller and smaller volume, resulting in generated temperatures that further vaporize moisture, in addition to further compression and condensing of smaller constituent parts;

a third stage that includes a third module and a fourth module:

the third module of the third stage includes a third mechanism that generates heat for the fourth module;

the fourth module including a fourth mechanism that receives and further heats and aerates the partially dehydrated, dense, and heated material to generate dehydrated, dry material.

These and other features and aspects of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

FIGS. 15A to 19B are non-limiting, exemplary illustration of a heat generator in accordance with one or more embodiments of the present invention;

FIGS. 20A to 21F-3 are non-limiting, exemplary illustration of a radiant heat device in accordance with one or more embodiments of the present invention;

FIGS. 22A to 22E are non-limiting, exemplary general systems overview illustration of kitchen waste processing system (KWPS) in accordance with one or more embodiments of the present invention;

DETAILED DESCRIPTION OF THE INVENTION

Figure 1A:
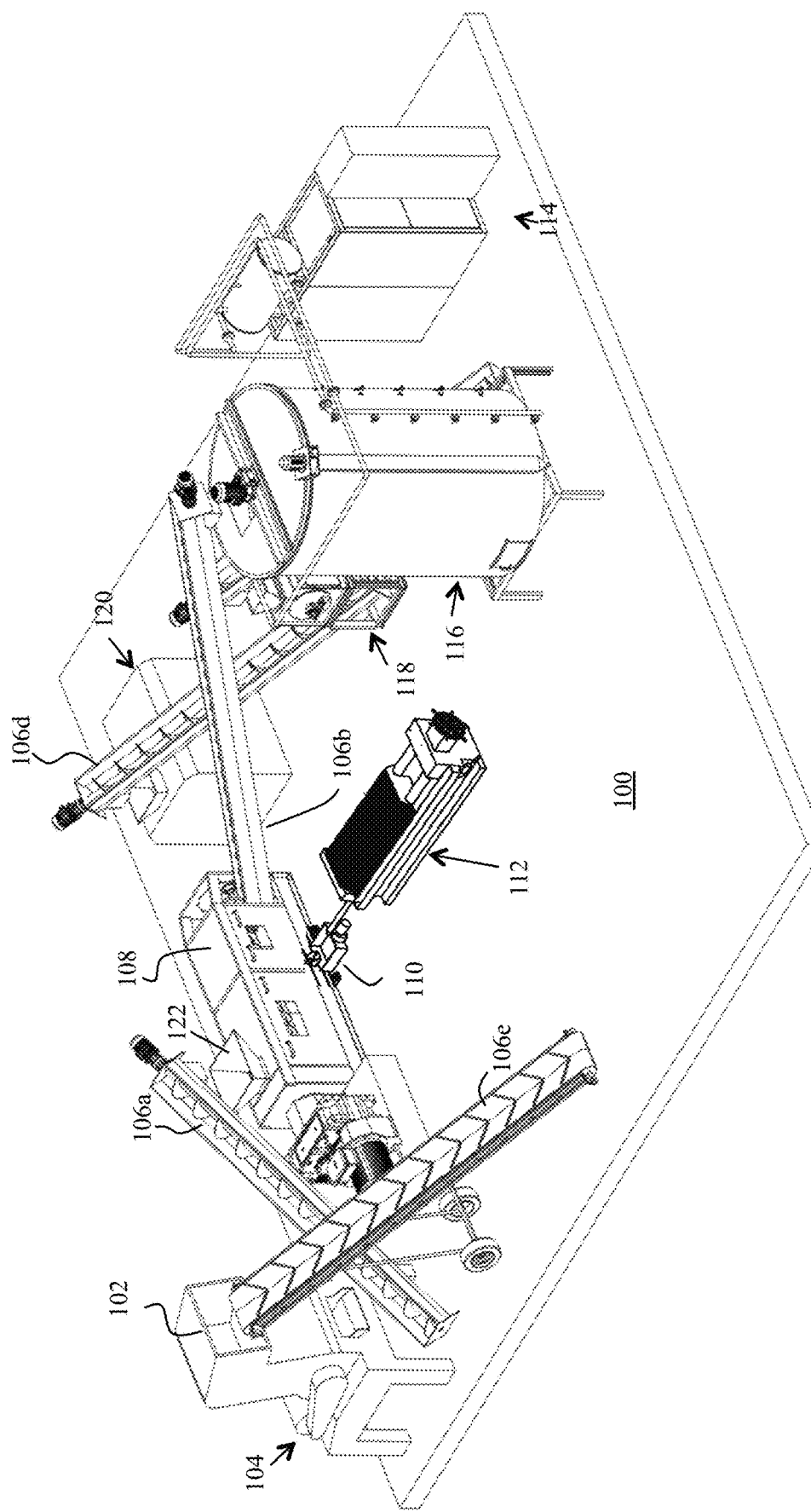
FIGS. 1A to 1D are non-limiting, exemplary general systems overview illustration of total waste processing system (TWPS) in accordance with one or more embodiments of the present invention.
Figure 1B:
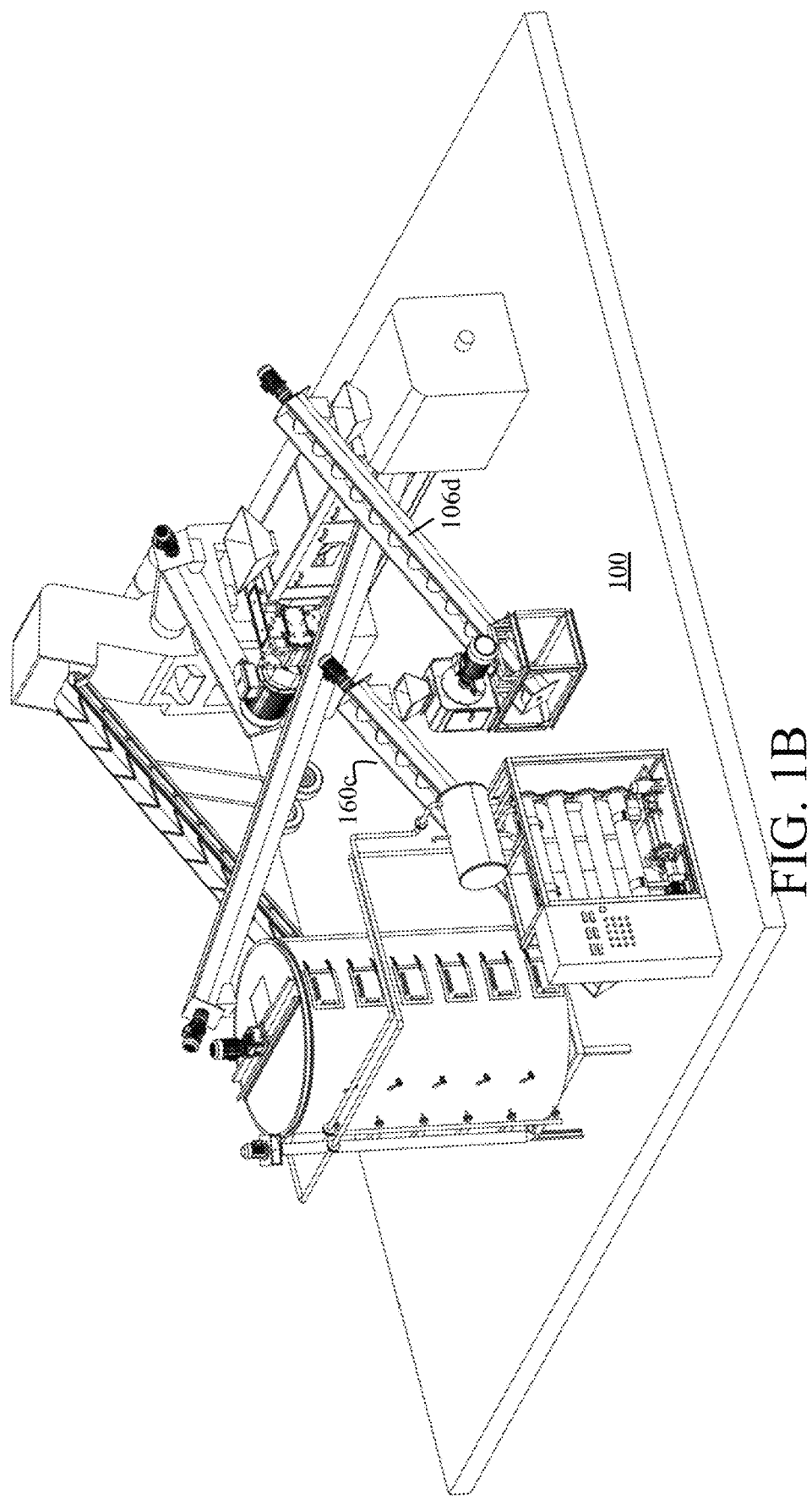
Figure 1C:
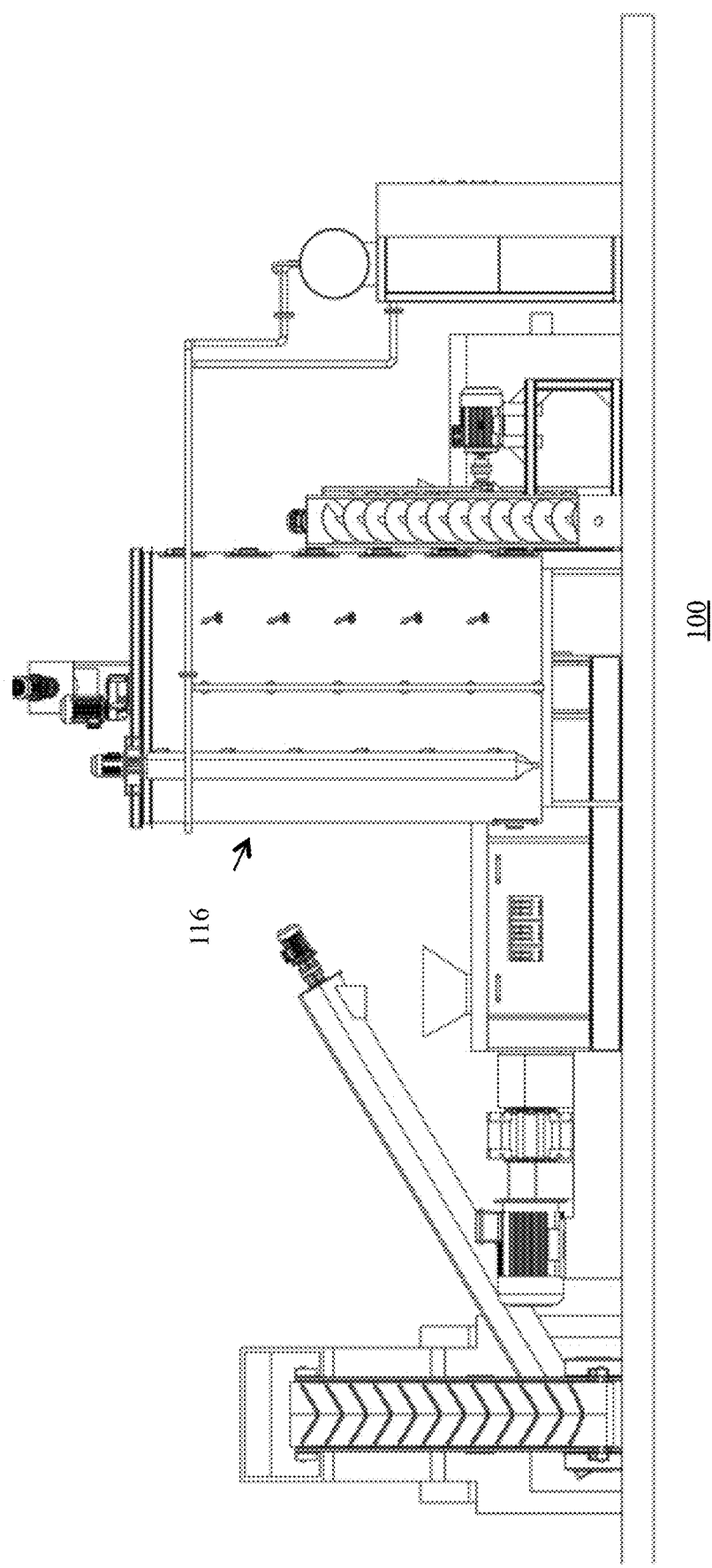
Figure 1D:
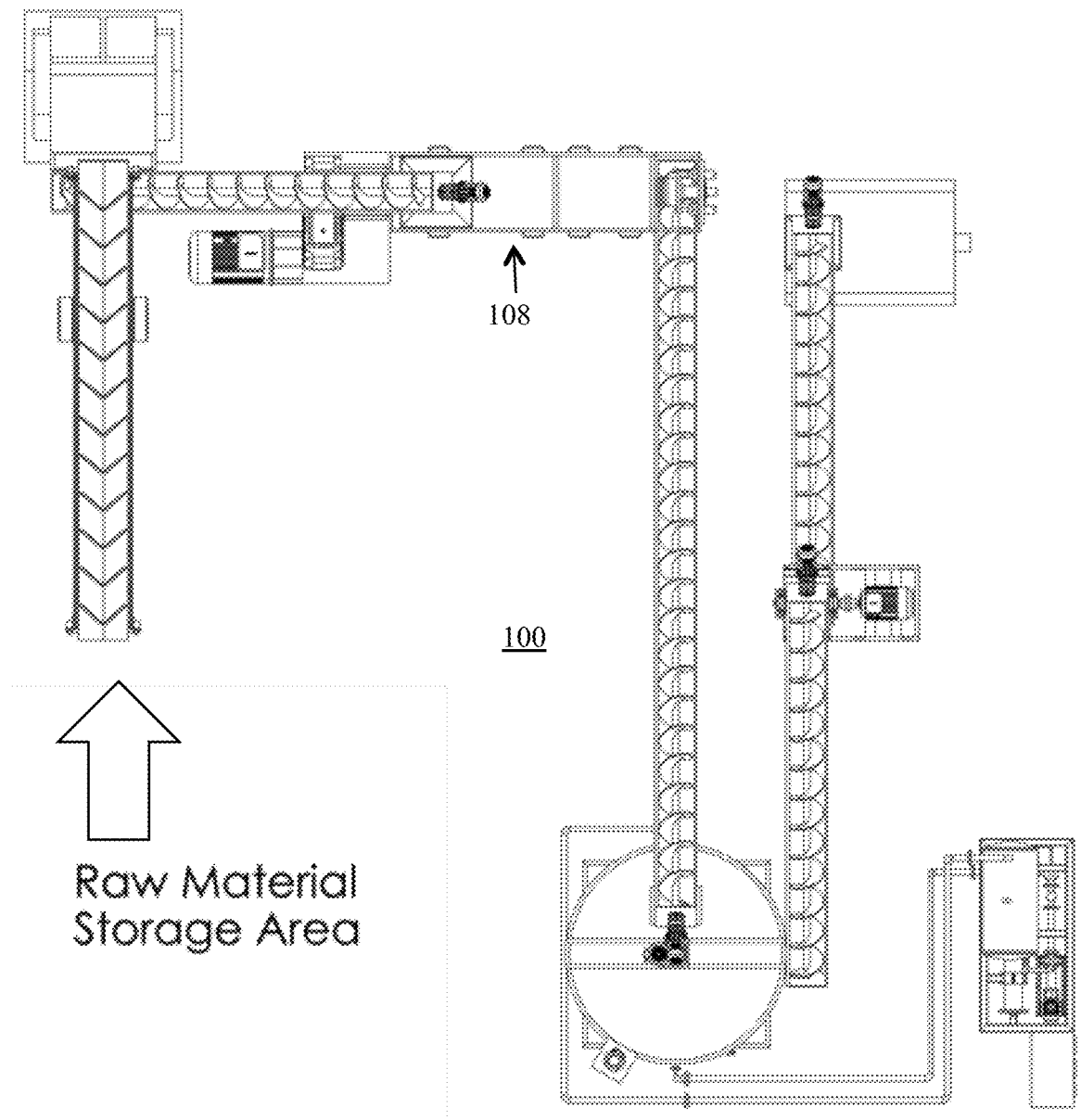

The detailed description set forth below in connection with the appended drawings is intended as a description of presently preferred embodiments of the invention and is not intended to represent the only forms in which the present invention may be constructed and or utilized.

It is to be appreciated that certain features of the invention, which are, for clarity, described in the context of separate embodiments, may also be provided in combination in a single embodiment. Conversely, various features of the invention that are, for brevity, described in the context of a single embodiment may also be provided separately or in any suitable sub-combination or as suitable in any other described embodiment of the invention. Stated otherwise, although the invention is described below in terms of various exemplary embodiments and implementations, it should be understood that the various features and aspects described in one or more of the individual embodiments are not limited in their applicability to the particular embodiment with which they are described, but instead can be applied, alone or in various combinations, to one or more of the other embodiments of the invention.

In the description given below and or the corresponding set of drawing figures, when it is necessary to distinguish the various members, elements, sections/portions, components, parts, or any other aspects (functional or otherwise) or features or concepts or operations of a device(s) or method(s) from each other, the description and or the corresponding drawing figures may follow reference numbers with a small alphabet character such as (for example) "spacer 102a, spacer 102b, and etc." If the description is common to all of the various members, elements, sections/portions, components, parts, or any other aspects (functional or otherwise) or features or concepts or operations of a device(s) or method(s) such as (for example) to all spacer 102a, spacer 102b, etc., then they may simply be referred to with reference number only and with no alphabet character such as (for example) "spacer 102."

One or more embodiments of the present invention provide a low cost, on-site, efficient, and compact (stationary or mobile) system for continuous (non-batch operation) conversion of waste to usable products such as sources of energy or fertilizer.

One or more embodiments of the present invention provide a waste to useable product conversion system that may be used with a mobile platform (positioned on a truck) or a platform that is stationary (installed within a restaurant, waste management facility, or other establishments) to convert waste into various forms of usable products. Non-limiting example of a mobile platform may be conventional utility waste collection vehicle such as garbage ship, boat, truck, or other mobile vehicles that carry waste to useable product conversion system.

In the non-limiting example of a garbage truck, the waste to useable product conversion system may be installed onto a truck bed, enabling trash or other waste to be dropped through a receiving member (in the form of a hopper) for further processing. The finally processed waste may then be moved and dumped into a conventional collection bin of the vehicle. U.S. Pat. No. 9,423,178 to Mardikian teaches the use of waste processing equipment stacked to fit on a mobile platform, and is expressly incorporated by reference in its entirety herein.

FIGS. 1A to 1D are non-limiting, exemplary general systems overview illustration of total waste processing system (TWPS) in accordance with one or more embodiments of the present invention. As further detailed below, TWPS 100 may be used to process a mixture of different combinations of types of waste together such as plastics, paper, glass, biomass, etc. to generate useable products such as energy. Alternatively, TWPS 100 may be used for processing biomass only to generate fertilizer or food products for farming and animal feed. As noted below, various components illustrated in FIG. 1A to 1D may or may not be required, depending on the type of waste being processed and the desired end product.

As illustrated in FIGS. 1A to 1D, TWPS 100 is comprised of a receiver member 102 (e.g., a hopper) to receive waste (in the case illustrated, from an optional conveyer 106e), and a first stage that includes a first module or unit that comprises a first mechanism such as a shredder 104 that reduces a size of received waste into smaller constituent parts, generally and preferably, less than about 1 inch. Non-limiting examples of shredder 104 that may be used with one or more embodiments of the present invention are disclosed in great detail in U.S. Pat. No. 9,423,178 and U.S. patent application Ser. No. 15/001,082, both to Mardikian, the entire disclosures of both of which documents are expressly incorporated by reference in their entirely herein.

The smaller constituent parts from shredded 104 are transported by a motorized conveyer belt 106a to a next stage of processing. It should be noted that for mobile platforms, a smaller shredder unit 104 may be used and stacked on top of an ingress end 122 of the next stage where smaller constituent parts exiting shredder 104 fall into next (second) stage by simple gravity.

As further illustrated, TWPS 100 further includes a second stage that includes second module or unit that comprises a second mechanism comprised of a single chamber, longitudinally extending multi-phase adjustable compressor 108. As further detailed below, single chamber, longitudinally extending multi-phase adjustable compressor 108 applies continuous, progressively increasing compressive force at each compressive phase to increasingly compress the smaller constituent parts received from shredder 104 into partially dehydrated (extracting liquid), dense, and heated material. As detailed below compressor 108 includes an adjustable egress phase, enabling adjustment of compression force that is transferred to preceding compressive phases.

The extract liquid from the smaller constituent parts at compressor 108 may be removed by a pump or simple gravity into a container 110, filtered 112 (shown only in FIG. 1A), and stored. In general, when waste exits compressor 108, the partially dehydrated, heated, and highly dense smaller constituent parts gain a high temperature of about 100° C. or higher, a higher density of about 700 to 750 Kg/m$^3$, and with less than 30% moisture content (about 20% to 26%).

It should be noted that the filtered, reclaimed water (depending on the waste used) may be used for irrigation, cleaning, or other onsite or offsite use. Further, filtration of extracted liquid is optional. For example, water extracted may be used without any filtration with various anaerobic systems to generate natural gas.

The partially dehydrated, heated, and highly dense smaller constituent parts from single chamber, longitudinally extending multi-phase adjustable compressor 108 may be transported by a well-known motorized conveyer belt 106b to a next (third) stage of processing. Again, for mobile platforms shorter conveyers 106 may be used or the equipment laterally stacked or appropriately rearranged to fit onto a mobile platform.

As further illustrated, TWPS 100 further includes a third stage that includes a third module or unit and a fourth module or unit, with the third module of the third stage including a third mechanism (heat generator 114) that generates heat for the fourth module. Fourth module including a fourth mechanism (radiant heat device 116) that receives the partially dehydrated, dense, and heated material from single chamber, longitudinally extending multi-phase adjustable compressor 108, and further heats and aerates material by mixing to generate dehydrated, dry material. It should be noted that the radiant heat within radiant heat device 116 kills bacteria to generate a generally bacteria free, dehydrated dry material.

As further illustrated, TWPS 100 may optionally further include well-known grinder 118, pelletizing device 120, and cooler bins (not shown). Conveyer 106c may be used to transport dry material to grinder 118, and conveyer 106d used to transported grinded material to pelletizing device 120. It should be noted that known pelletizing devices 120 may only be used with wood, plant (e.g., biomass) waste. Conventional pelletizing devices 120 cannot pelletize mixed waste (e.g., combination of metal, glass, wood, etc.). Accordingly, if pelletizing device 120 is used as one of the processing steps of TWPS 100, then waste processed by TWPS 100 must be biomass based and not mixed waste (e.g., glass, wood, metal, food, etc.)

Figure 2A:
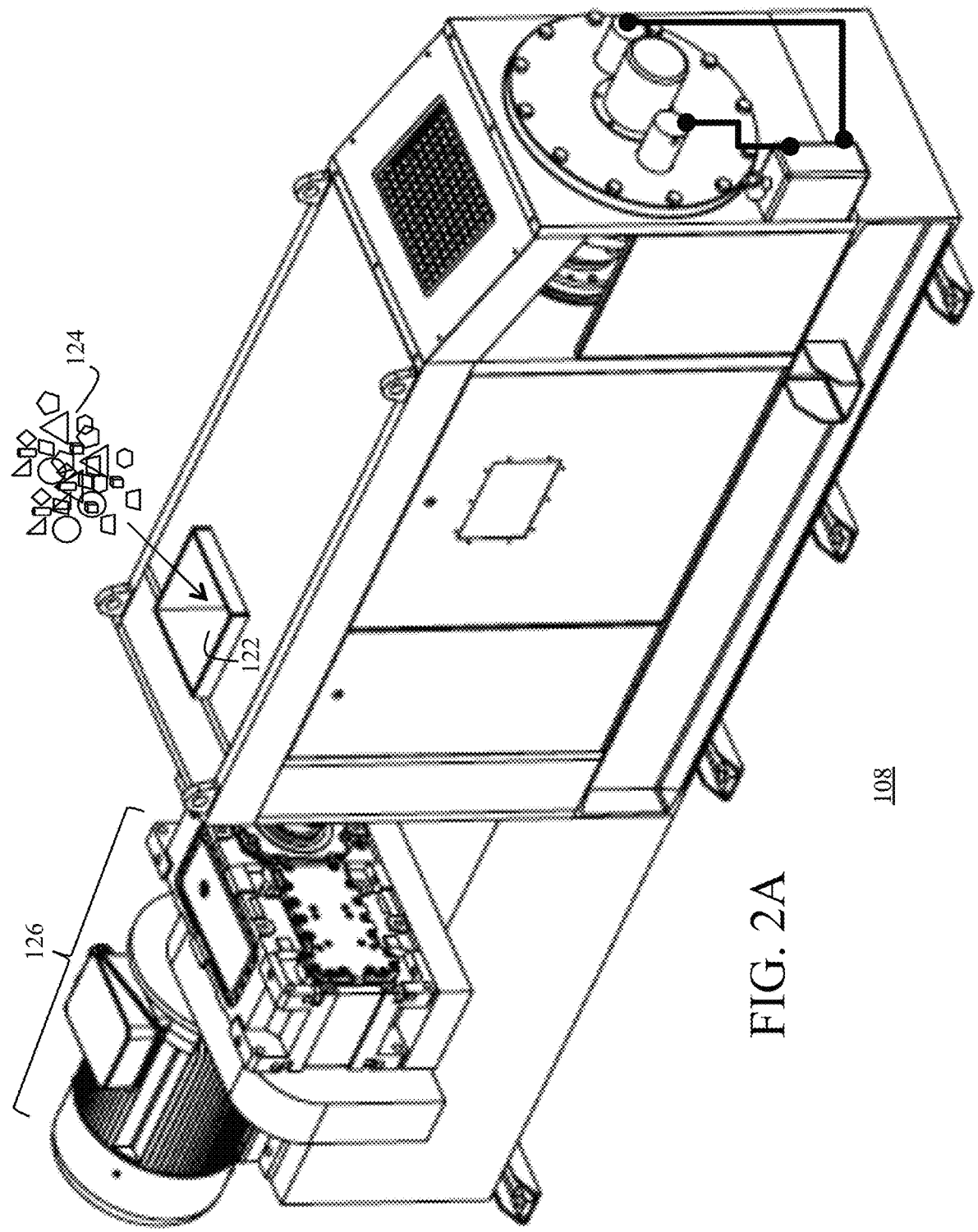
FIGS. 2A to 14B are non-limiting, exemplary illustration of a compressor in accordance with one or more embodiments of the present invention.
Figure 2B:
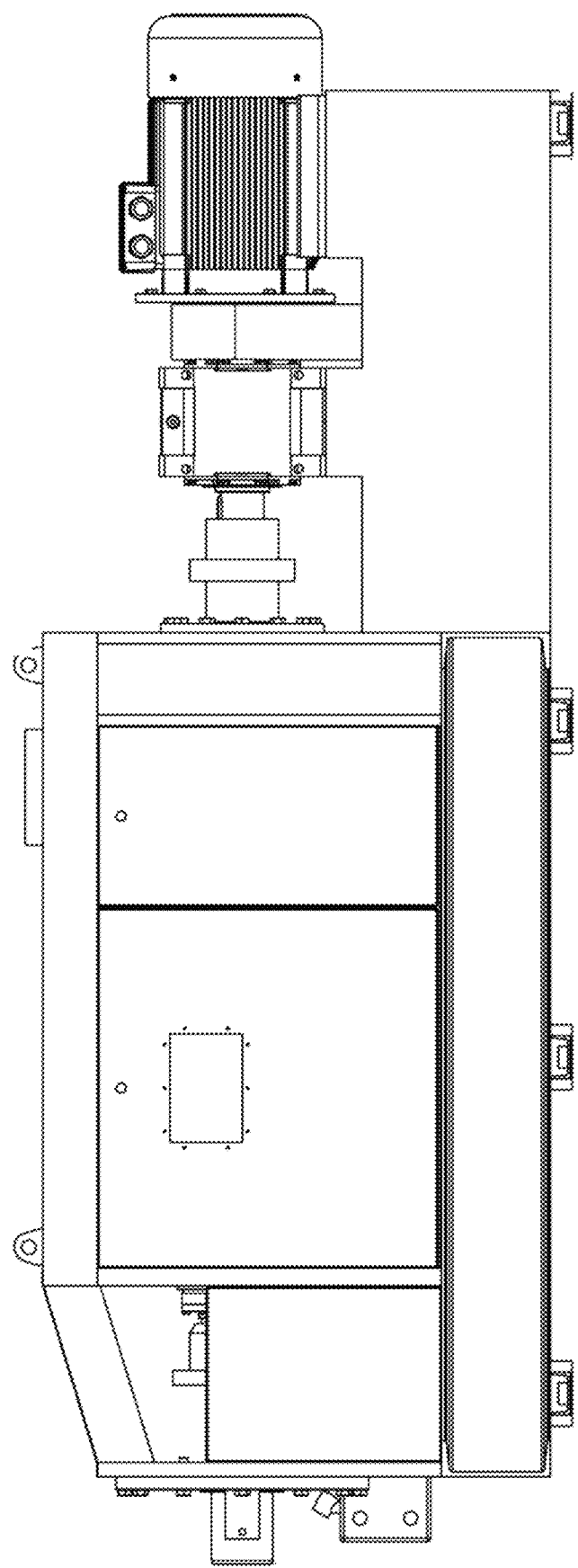
Figure 2E:
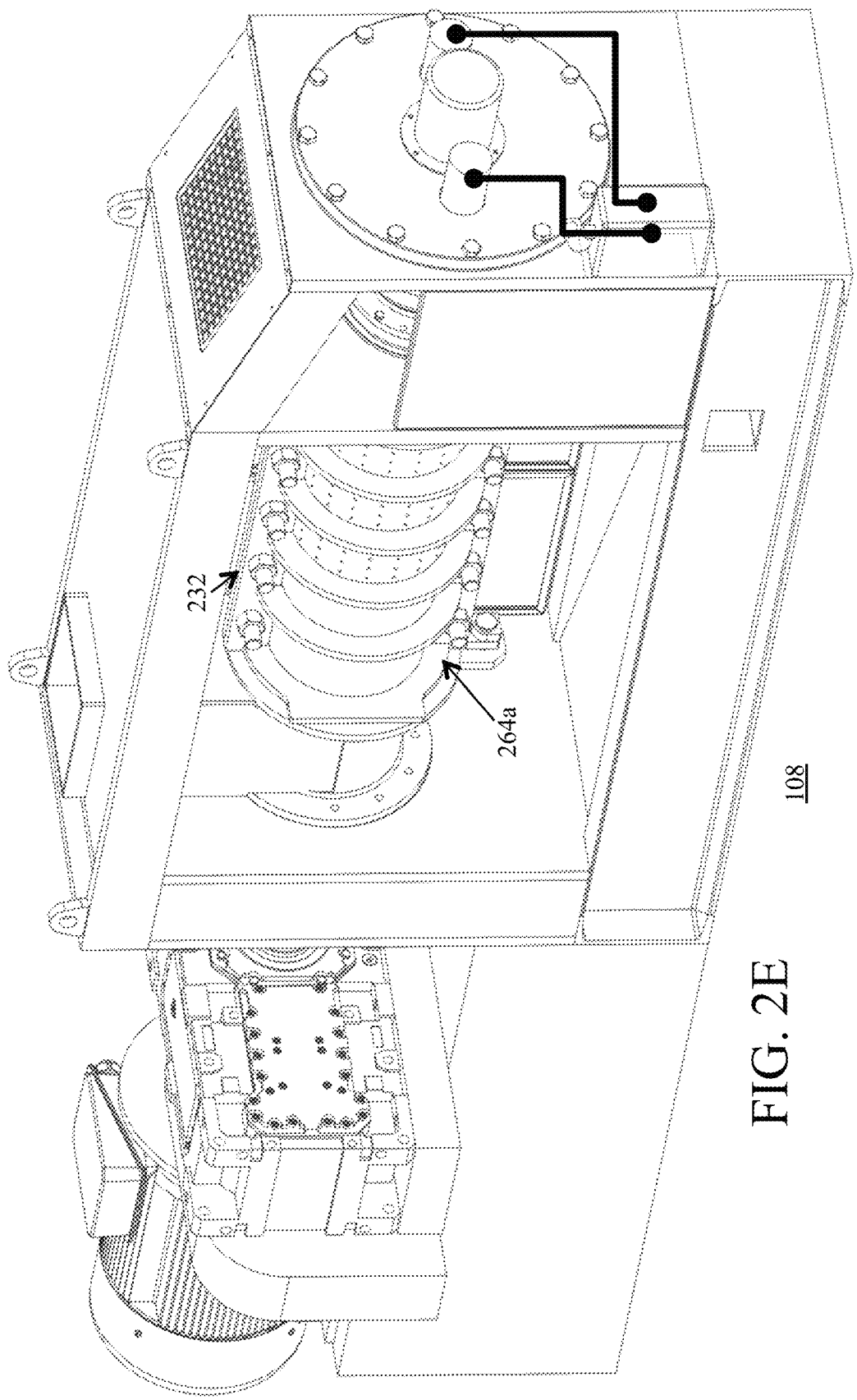
Figure 2F:
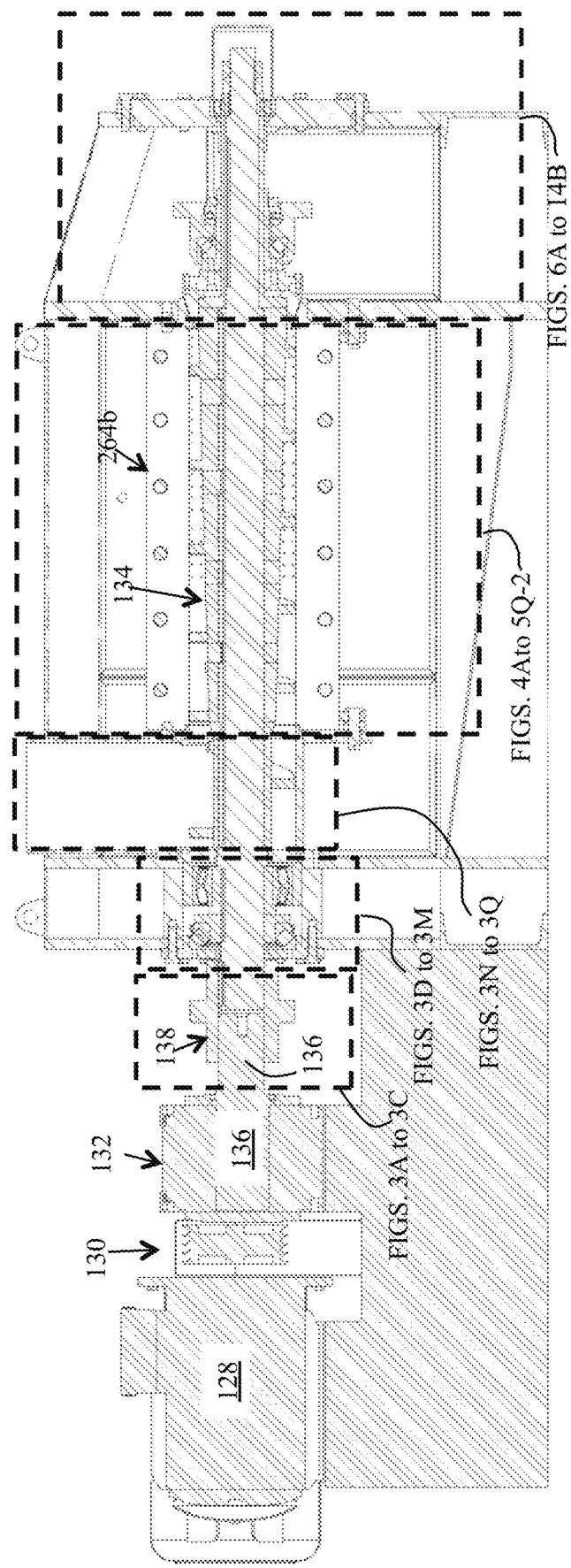
Figure 2G:
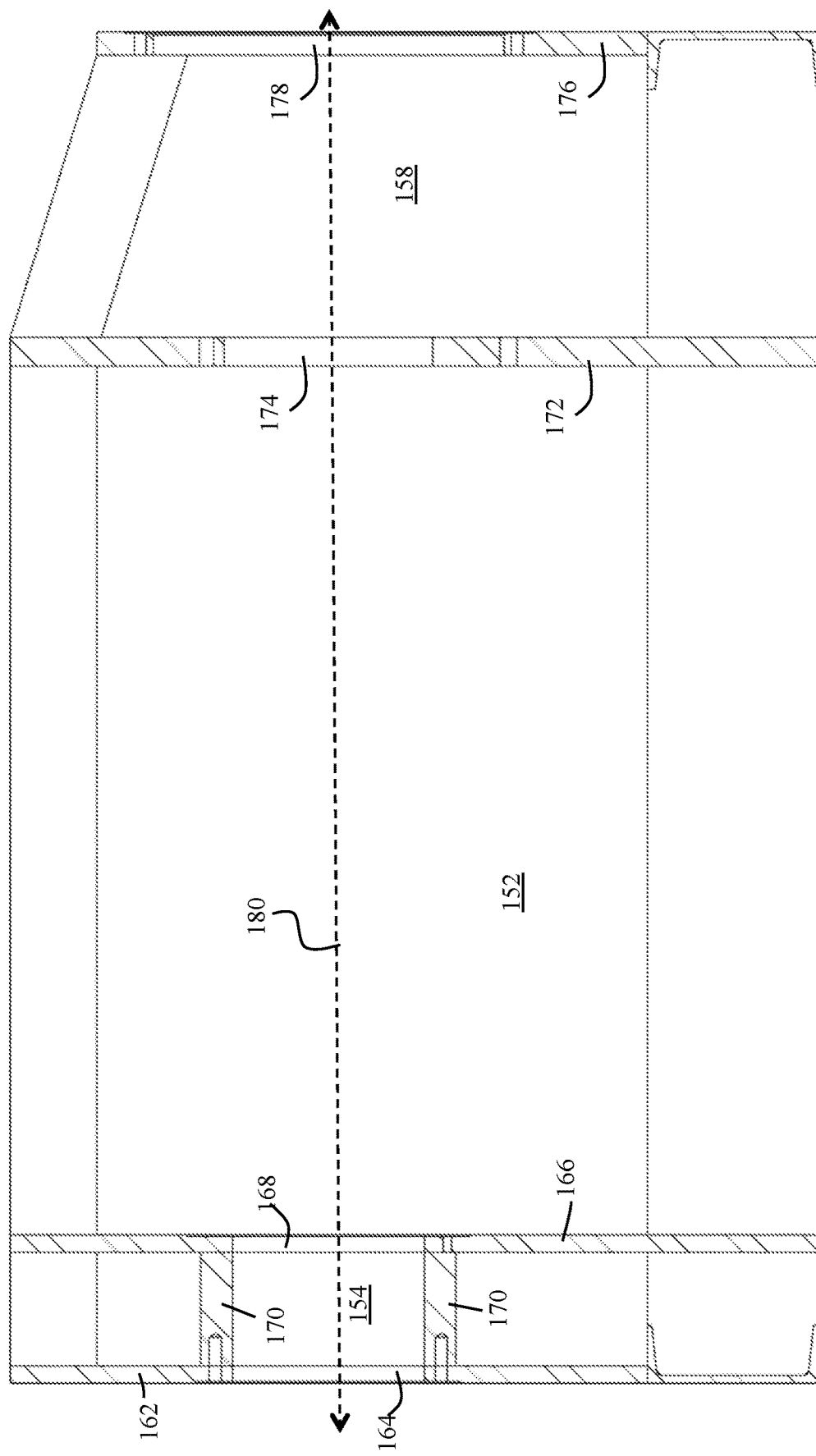

FIGS. 2A to 2E are non-limiting, exemplary general systems overview illustrations of a single chamber, longitudinally extending multi-phase adjustable compressor illustrated in FIGS. 1A to 1D in accordance with one or more embodiments of the present invention, with FIGS. 2F and 2G exemplary illustrating the cross-sectional views, but with FIG. 2G showing the cross-sectional view of the frame only.

As illustrated in FIGS. 1A to 2G, single chamber, longitudinally extending multi-phase adjustable compressor (hereinafter compressor 108) is comprised of a feeder unit 122 for receiving smaller constituent parts (waste) 124 from shredder 104. Compressor 108 further includes an intake side motive force system 126 comprised of a well-known AC motor 128, pulley (and belt mechanism) 130, and a main shaft gearbox 132 for rotating a longitudinally extending, multi-stage compression auger assembly 134 of the single chamber, multi-phase adjustable compressor 108 in well known manner. That is, motor 128 actuates gear set of a gearbox 132 via pulley mechanism 130 to generate a sufficient output torque for rotating a longitudinally extending, multi-stage compression auger assembly 134 (detailed below).

Figure 3A:
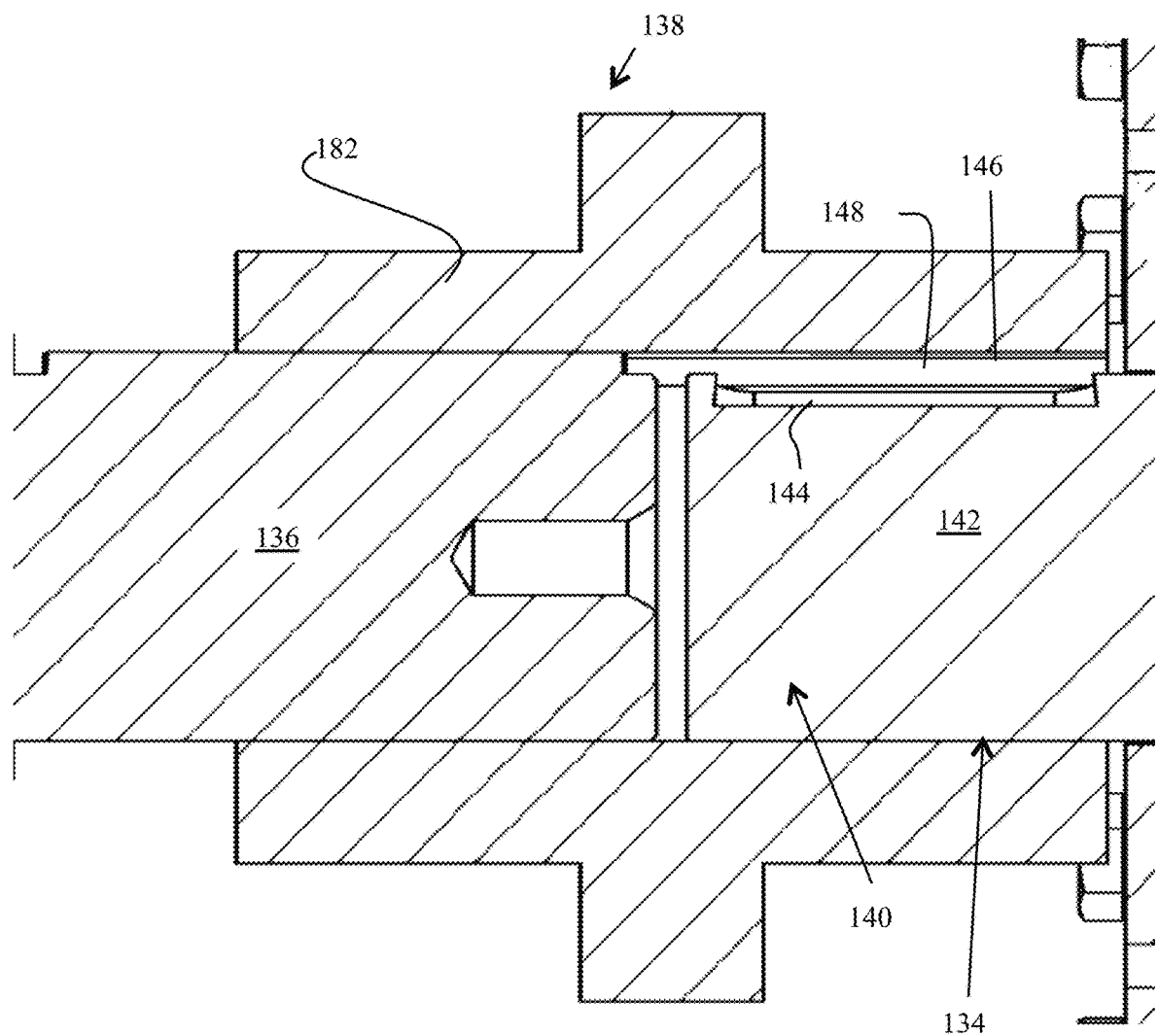
Figure 3B:
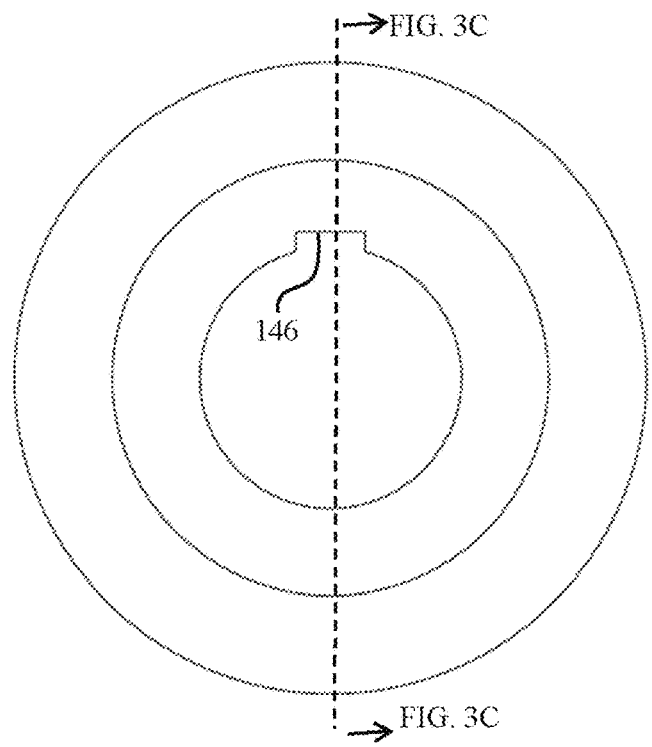
Figure 3C:
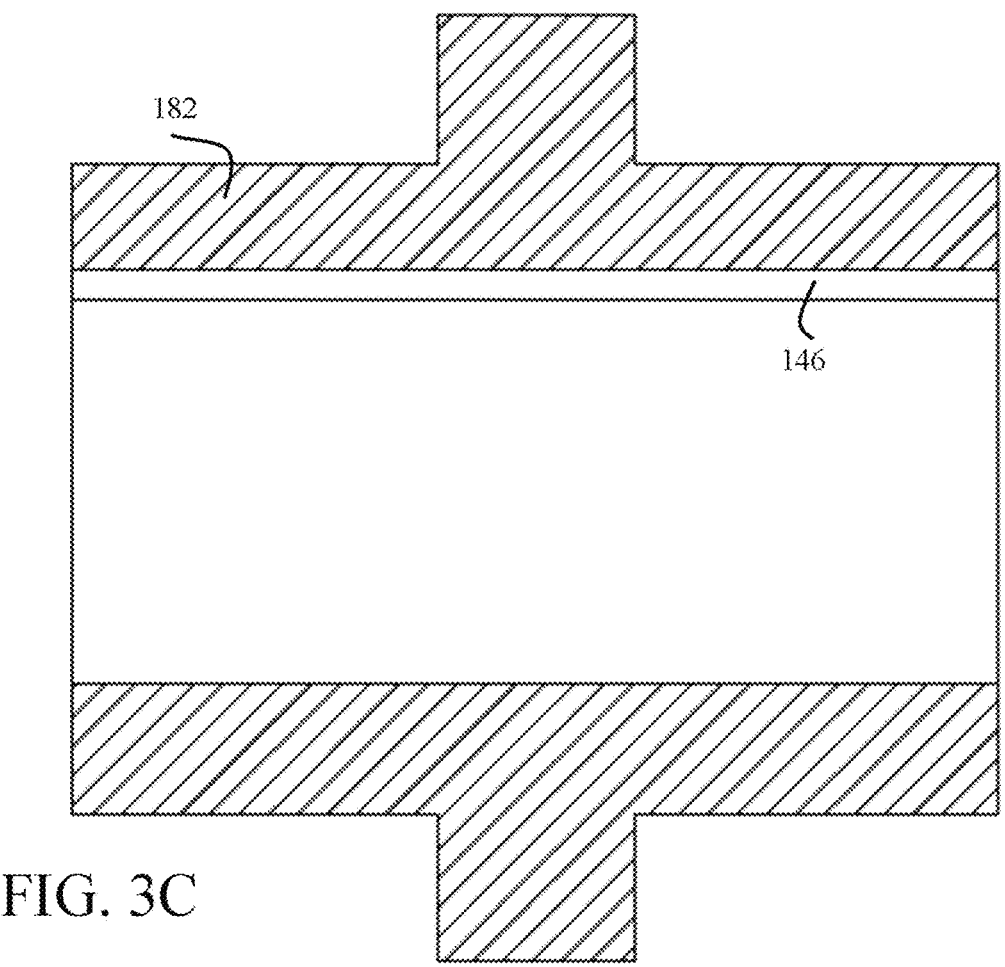

As illustrated in FIGS. 1A to 2G, motor output shaft 136 is coupled with the longitudinally extending, multi-stage compression auger assembly 134 by an intake side coupling member 138 (FIGS. 3A to 3C). More specifically, intake side coupling member 138 interlocks an intake side distal end 140 of an asymmetrical, longitudinally extending shaft (or shaft for short) 142 of the longitudinally extending, multi-stage compression auger assembly 134 with the motor shaft 136.

Shaft 142 include key-seats 144 (also best shown in FIGS. 5B to 5F) while the intake side shaft coupling member 138 includes a keyway 146, with a key-seats 144 and keyway 146 receiving a key 148a that interlocks shaft 142 and motor shaft 136 to each other via their connection with intake side shaft coupling member 138. It should be noted that the use of key-seat 144, keyway 146, and keys 148 for coupling is a very well known interlocking mechanism.

Intake-side distal end 140 of shaft 142 extends out of an intake-side cover 150 of frame 152 (FIG. 2G) of the single chamber, multi-phase adjustable compressor 108, enabling shaft 142 to connect with intake-side shaft coupling member 138. As illustrated in FIG. 2G, frame 152 is comprised of an intake side compartment 154 that sets intake side 156 of multi-stage compression auger assembly 134. Frame 152 is further comprised of a larger, egress side compartment 158 that houses and sets egress side 160 of multi-stage compression auger assembly 134.

Intake side compartment 154 of frame 152 is comprised of a first exterior wall 162 with a first opening 164 and a first internal wall 166 with a second opening 168. Intake side compartment 154 of frame 152 is further comprised of horizontally oriented support 170 that connect first exterior wall 162 with first internal wall 166.

The larger, egress side compartment 158 is comprised of a second internal wall 172 with a third opening 174 and a second exterior wall 176 with fourth opening 178. As best illustrated by central longitudinal axis 180 through the cross-sectional illustration shown in FIG. 2G, centers of all opening 164, 168, 174, and 178 are aligned along central longitudinal axis 180. Further, first exterior wall 162, first internal wall 166, second internal wall 172, and second exterior wall 176 are also connected together horizontally (not shown in detail) in a well known manner to provide a sturdy frame 152 for mounting various components of compressor 108.

FIGS. 3A to 3C are non-limiting, exemplary illustrations of the details of an intake side coupling member in accordance with one or more embodiments of the present invention, with FIG. 3A illustrating an enlarged view of the broken line boxed section shown in FIG. 2F, and FIGS. 3B and 3C illustrated respective side and cross-sectional views thereof. As illustrated in FIGS. 1A to 3C, intake side coupling member 138 is comprised of a hollow cylindrical body (a cylindrical bore) 182. Intake side coupling member 138 includes a keyway portion 146 of the interlock structure, while shaft 142 includes key-seat portion 144 (best shown in FIGS. 5B to 5F), with a key 148 seated inside the key-seat 144 of shaft 142 and inserted into keyway 146 of intake side coupling member 138 to thereby interlock intake side coupling member 138 with shaft 142, a combination of which is locked with motor shaft 136.

Figure 3D:
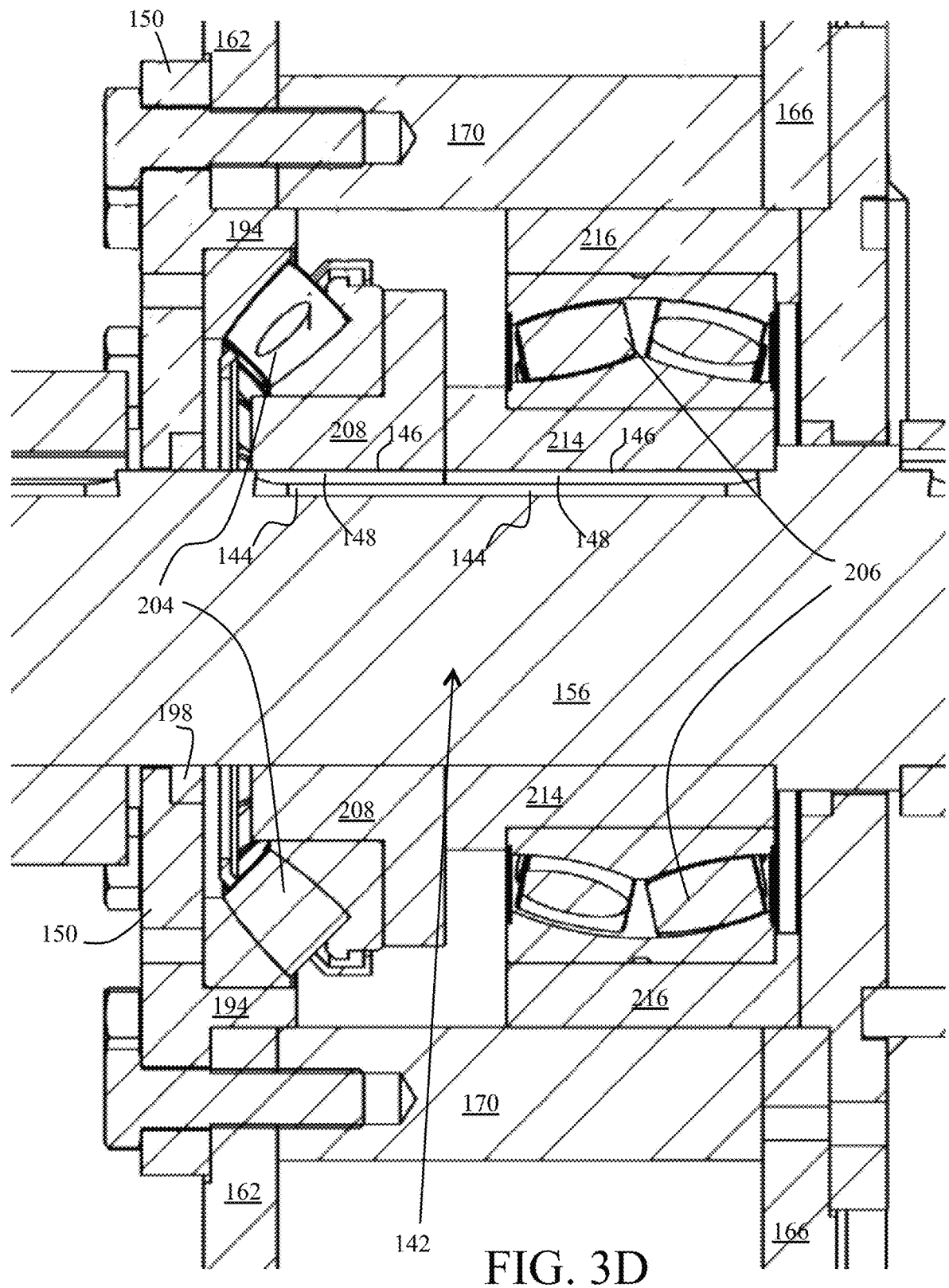
Figure 3E:
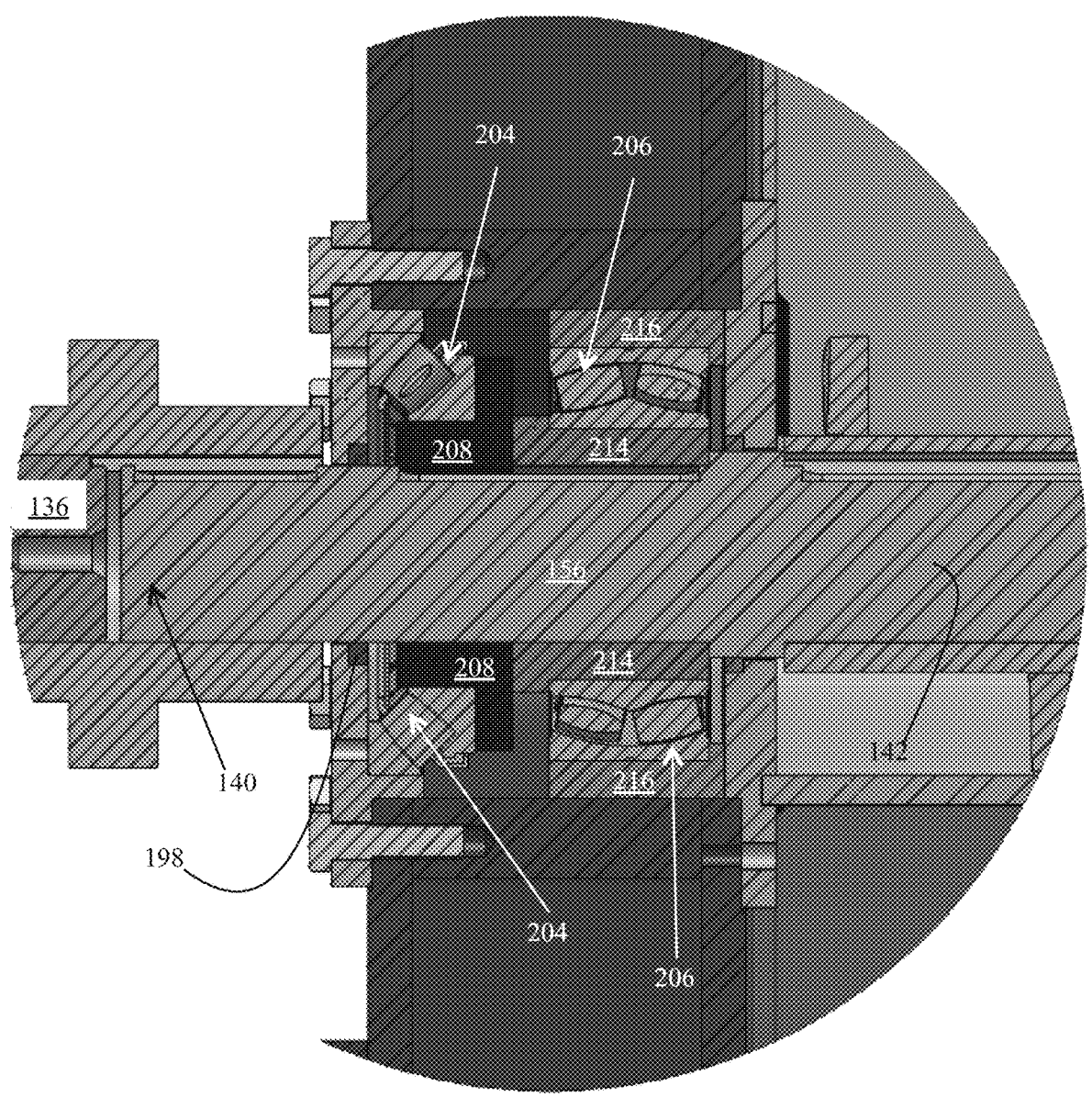
Figure 3F:
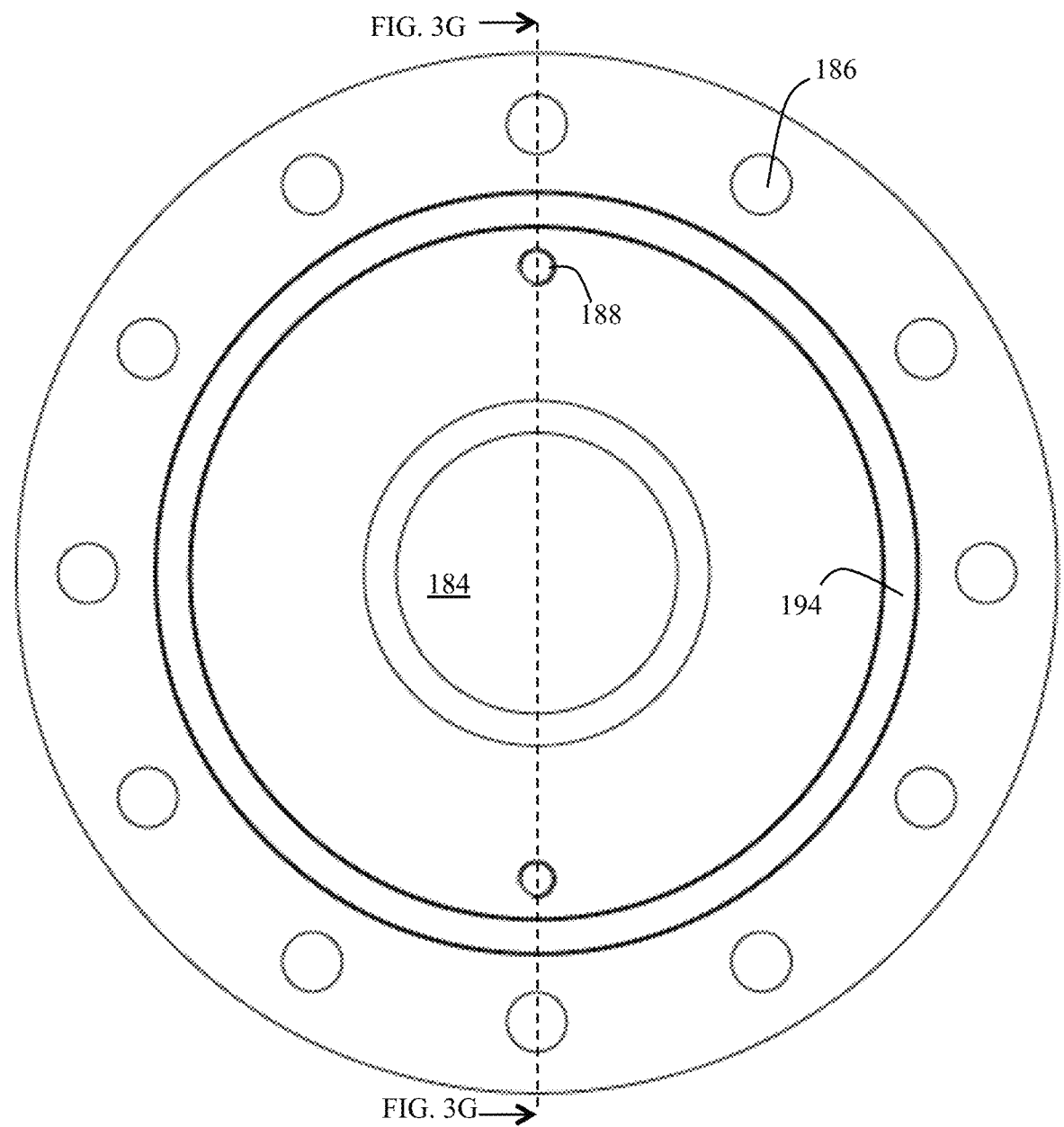
Figure 3G:
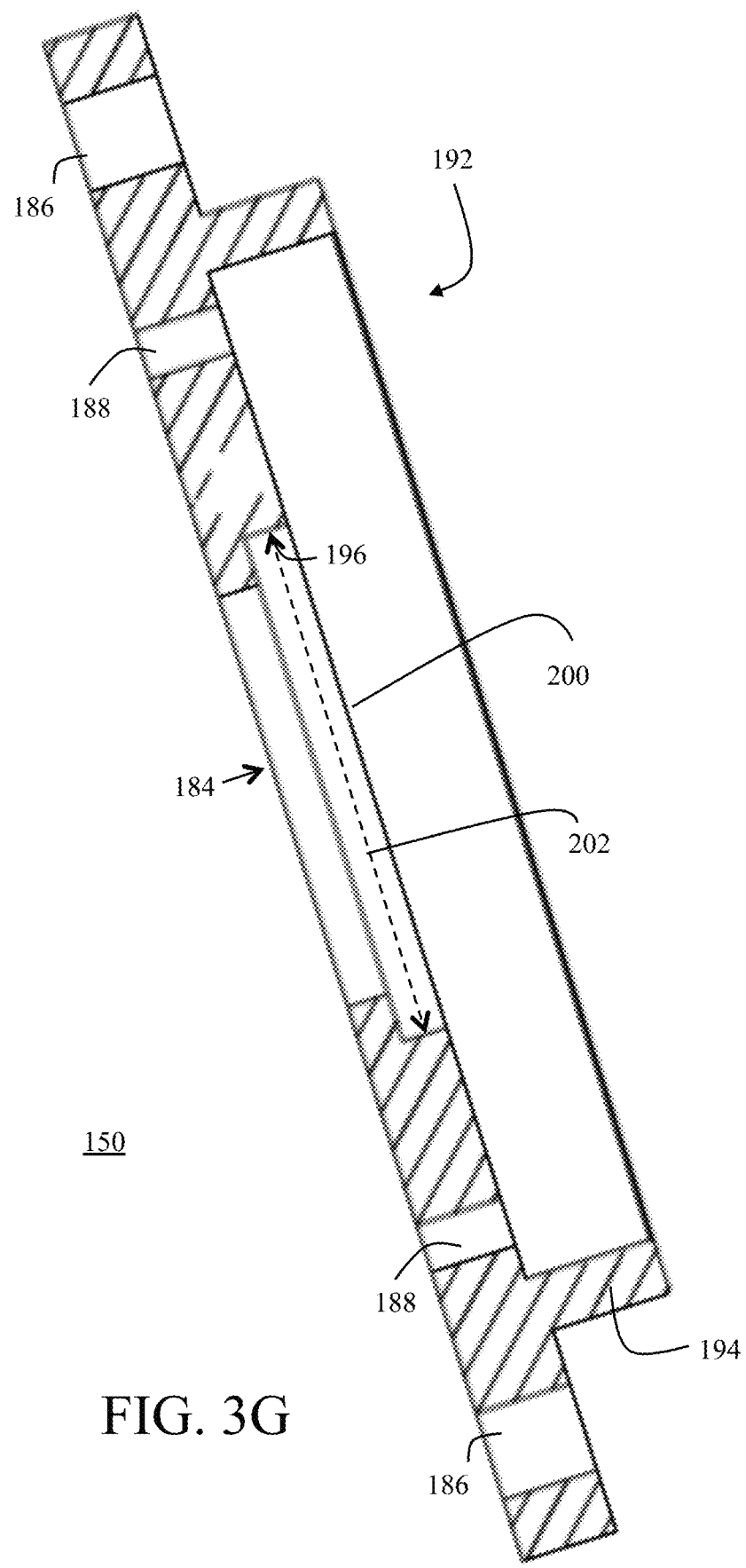

FIGS. 3D to 3M are non-limiting, exemplary illustrations of the details of an intake side cover and intake side bearing group in accordance with one or more embodiments of the present invention. FIGS. 3D and 3E illustrate an enlarged view of the broken line boxed section shown in FIG. 2F, and FIGS. 3F to 3M illustrated respective side and cross-sectional views of various parts that collectively comprise the intake side cover and bearing groups.

As illustrated in FIGS. 1A to 3M, intake-side cover 150 includes a central opening (a through-hole) 184 through which intake-side distal end 140 of shaft 142 extends out of frame 152 and is connected to motor shaft 136. Further included is a plurality of radial openings (through-holes) 186 that secure intake side cover 150 to frame 152 by a corresponding number of fasteners. Intake-side cover 150 further includes a pair of maintenance openings 188 to enable access to intake side bearing group 190 (e.g., to add lubricant, etc.).

An interior facing side 192 of intake-side cover 150 (best shown in FIG. 3G) includes a perpendicularly extending annular flange 194 and an annular step 196 that accommodates a shaft seal 198. Step 196 (from central opening 184) further defines an interior facing side opening 200 that is concentric with central opening 184, but with longer span diameter 202.

Referring back to FIGS. 3D and 3E in view of FIGS. 3F to 3M, the asymmetrical, longitudinally extending shaft 142 of the multi-stage compression auger assembly 134 is secured to frame 152 of single chamber, multi-phase adjustable compressor 108 at both intake-side and egress-side of frame 152 by bearings to set and to prevent shaft 142 from wobbling (prevent lateral motion away from longitudinal axis thereof) while enabling rotation thereof.

Frame 152 includes intake-side compartment 154 that housing two sets of intake-side bearings 204 and 206, which form the intake side bearing group. A first set of intake-side bearings 204 are secured in between a first bearing support 208 (FIGS. 3H and 3I) and annular flange 194 of intake side cover 150.

Figure 3H:
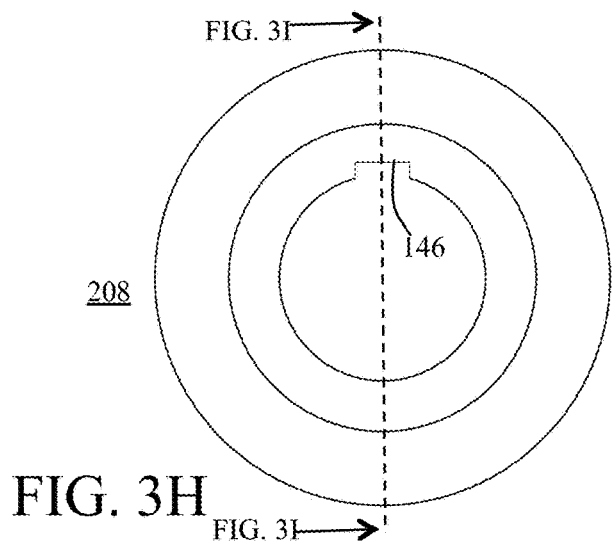
Figure 3I:
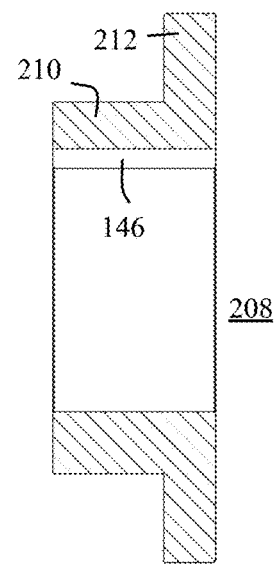

First bearing support 208 includes a cylindrical body 210 with bearing back support annular flange 212 as best illustrated in FIGS. 3H and 3I. First bearing support 208 further includes a keyway 146 that is used to interlock first bearing support 208 by a key 148 onto a key-seat 144 (best shown in FIGS. 5B to 5F) of shaft 142. Accordingly, first bearing support 208 rotates with shaft 142, rotating first set of intake-side bearings 204 in between first bearing support 208 and annular 194 flange of intake side cover 150.

Figure 3J:
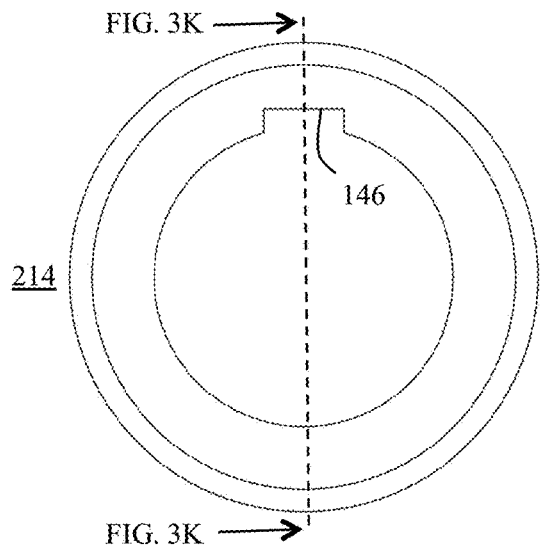
Figure 3K:
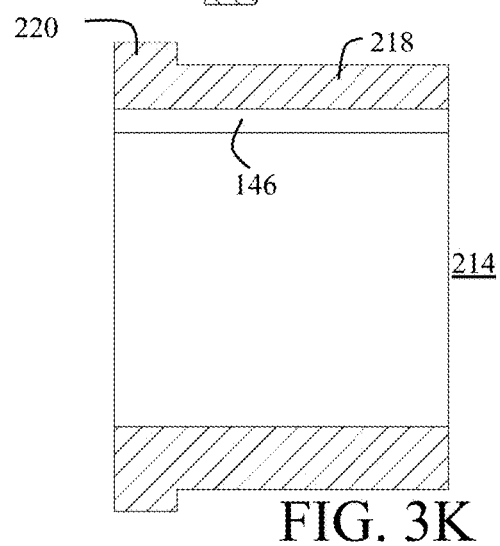
Figure 3M:
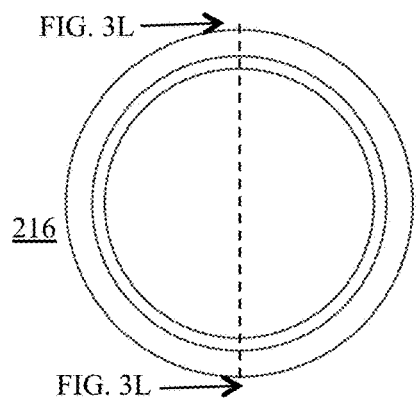
Figure 3L:
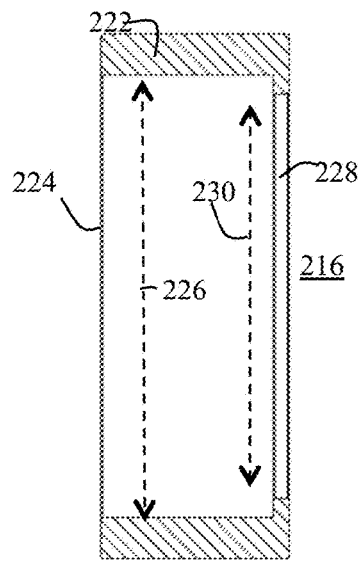
Figure 3O:
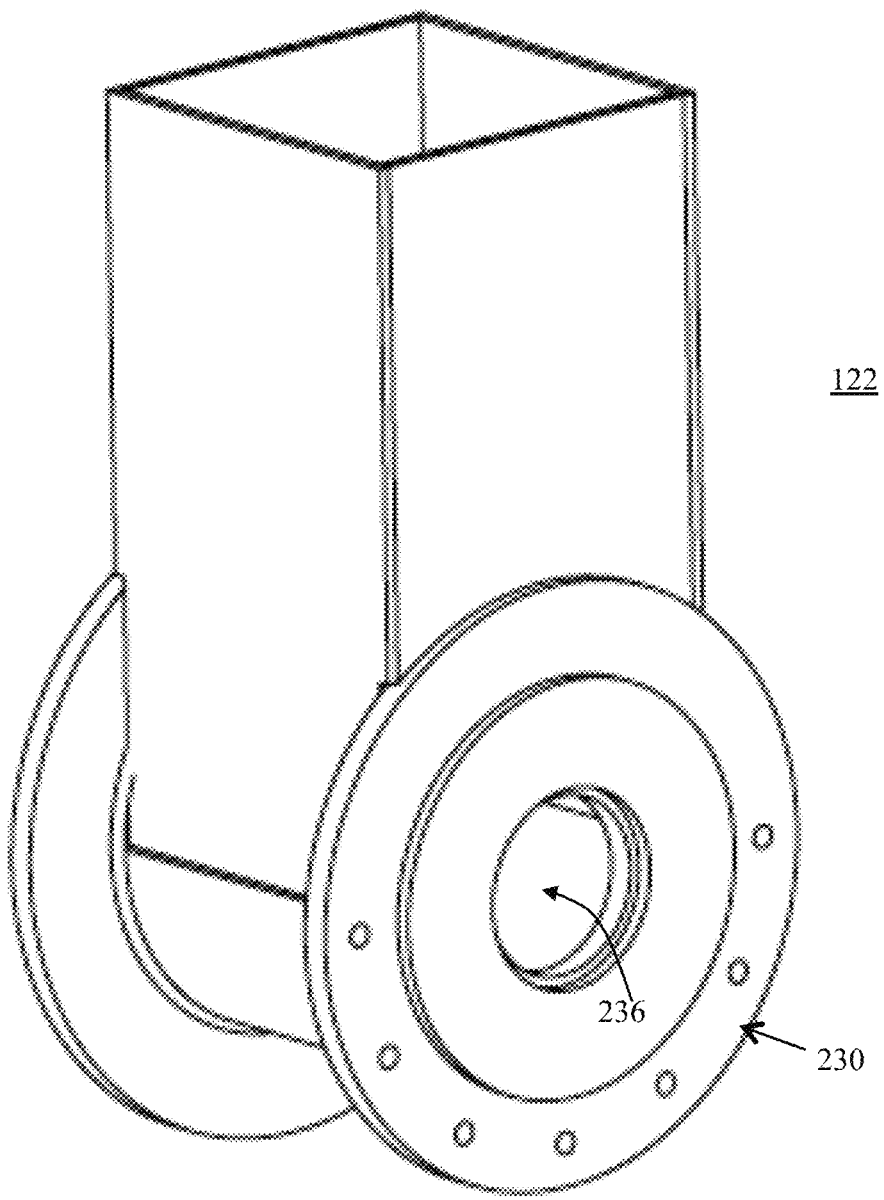

A second set of intake-side bearings 206 are secured in between a second bearing support 214 (FIGS. 3J and 3K) and third bearing support 216 (FIGS. 3L and 3M). Second bearing support 214 includes a cylindrical body 218 with bearing front support annular flange 220 as best illustrated in FIGS. 3J and 3K. Second bearing support 214 includes a keyway 146 that is used to interlock second bearing support 214 by a key 148 onto a key-seat 144 (best shown in FIGS. 5B to 5F) of shaft 142.

Third bearing support 216 includes a cylindrical body 222 with a first distal end central opening 224 having a first diameter 226, and a smaller, second central end distal opening 228 having a second diameter 230 as best illustrated in FIGS. 3L and 3M. Third bearing support 216 is mechanically secured onto horizontally oriented support 170 that connect first exterior wall 162 with first internal wall 166. Accordingly, second bearing support 214 rotates with shaft 142, rotating second set of intake-side bearings 206 in between second bearing support 214 and third bearing support 216.

The intake side bearing group setup enables securing of shaft 142 to frame 152 by intake-side cover 150 to prevent wobbling while allowing shaft 142 to rotate. Two sets of intake-side bearings 204 and 206 are used at the intake-side due to the strong motive force experienced at intake side 156 of shaft 142.

FIGS. 3N to 3Q are non-limiting, exemplary illustrations of the details of a feeder in accordance with one or more embodiments of the present invention. FIG. 3N illustrates an enlarged view of the broken line boxed section shown in FIG. 2F, and FIGS. 3O to 3Q illustrate perspective of two sides and cross-sectional view thereof.

As illustrated in FIGS. 1A to 3Q, single chamber, multi-phase adjustable compressor 108 further includes a feeder 122 that is connected to first internal wall 166 of frame 152 at a first side 230, and a cage assembly 232 ("single chamber") at a second side 234.

First side 230 includes a first through opening 236 through which shaft 142 extends out into intake side bearing compartment 154. First side 230 includes a set of radial positioned holes 238 away from axis center 240 of first opening 236 for fastening feeder 122 to frame 152. Feeder 122 includes a hopper section 242 that extends above frame 152 to receive and direct waste to a first flighting module 244a, positioned within a bottom portion (above hopper base 246) of the hopper section 242.

Second side 234 of feeder 122 includes an opening 249 to couple feeder 122 to cage assembly 232, and a second through opening 250 through which shaft 142 extends, enabling positioning of first flighting module 244a within feeder 122. Second through opening 250 has a larger diameter than first through opening 236, but with centers that are aligned along axis 240.

FIGS. 4A to 4J are non-limiting, exemplary illustrations of the details of cage assembly in accordance with one or more embodiments of the present invention. As illustrated in FIGS. 1A to 4J, single chamber, multi-phase compressor 108 further includes cage assembly 232. Cage assembly 232 has an interior cylindrical configuration with first and second opening ends 252 and 254.

Cage assembly 232 has a length 254 along a central longitude axis 256, and a width 258 along a transverse plane 260, including an inner diameter 262 that is generally uniform along length 254 of cage assembly 232. That is, inner diameter or (radius) 262 of cage assembly 232 is constant along its longitudinal axis 256.

Cage assembly 232 is comprised of a first cage member 264a (FIG. 2E) and a second cage member 264b (FIG. 4A) that when assembled, form cage assembly 232. First and second cage members 264a and 264b are identical and hence, they are referred to as "a cage member 264."

A cage member 264 includes a first and second identical connection portions 266a and 266b that extends along length 254 of cage member 264, with the first and second connection portions 266a and 266b including one or more connection openings 268 that receive fasteners to assembly first and second cage members 264a and 264b.

A cage member 264 has a semi-circular portion 270 between first and second connection portions 266a and 266b with a uniform radius along length 254 of cage member 264, with uniform radii of cage member 264 forming the uniform diameter 262 of the first and second openings 252 and 254 of the interior cylindrical configuration of cage assembly 232.

Exterior side 272 of cage member 264 includes reinforcement flanges 274 that form a set of stiffeners to strengthen the structural integrity of cage assembly 232. Reinforcement flanges 274 have first and second ends 276 and 278 that are connected to respective first and second connection portions 266a and 266b.

Reinforcement flanges 274 have a semi-annular configuration (e.g., crescent like) with a generally uniform height, protruding from exterior side 272. Reinforcement flanges 274 function to protect cage assembly 232 from being bent due to the large compression forces experienced by each cage member 264a and 264b of cage assembly 232.

Cage members 264 further include small drainage openings 280 that enable any accumulated liquid within cage assembly 232 to drain out via gravity into a liquid drainage 110, where it is then directed to optional filter mechanism 112 (FIG. 1A). Cage assembly 232 further includes first and second screen meshes 282 (only one is shown as both are identical) that cover over interior walls 284 of cage members 264, covering over the small drainage openings 280, functioning as a strainer to strain solids from liquids. Connection of a screen mesh 282 to cage members 264 is through fasteners 286 (best shown in FIG. 4G).

Figure 5F:
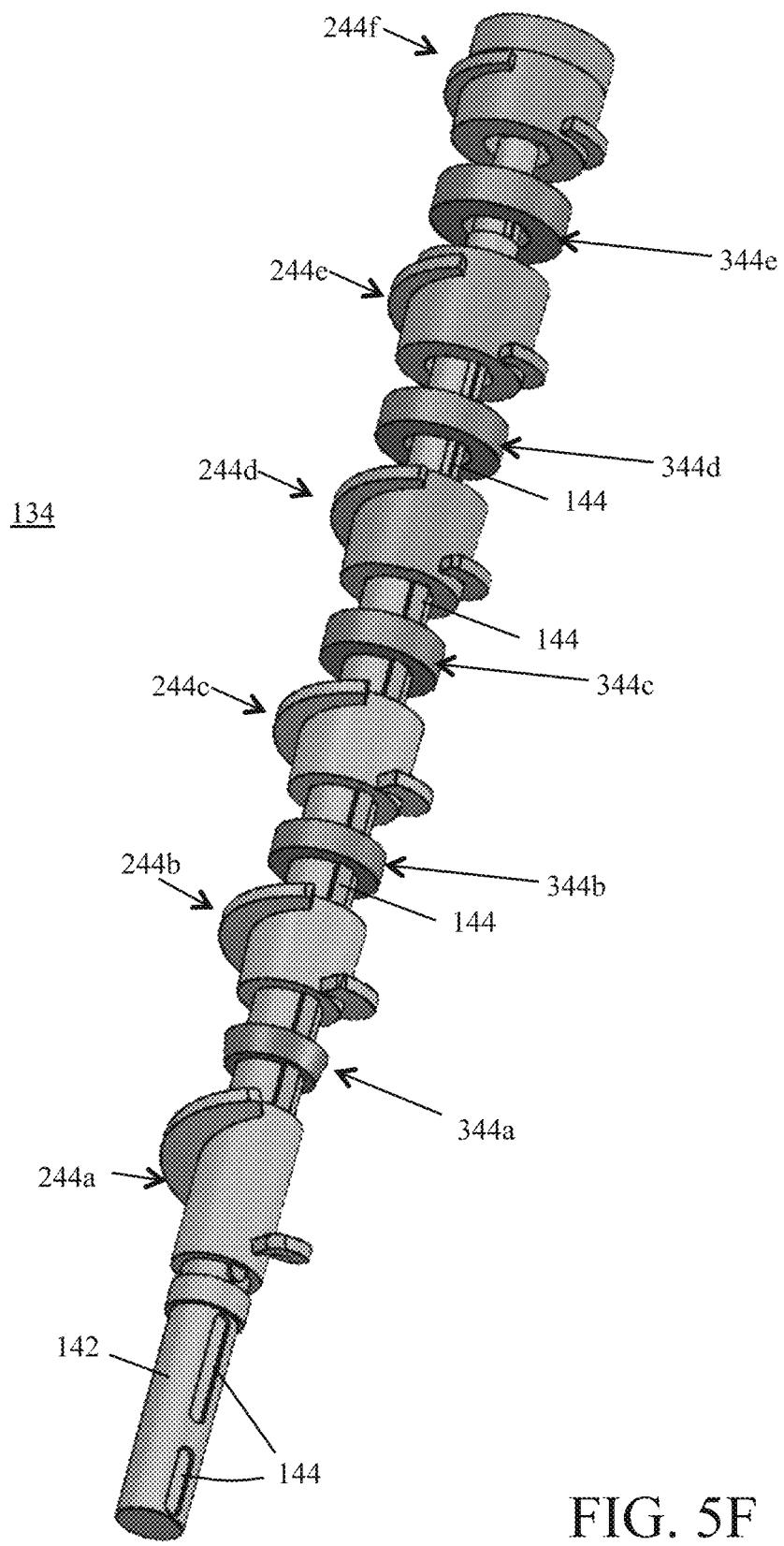
Figures 1, 5G:
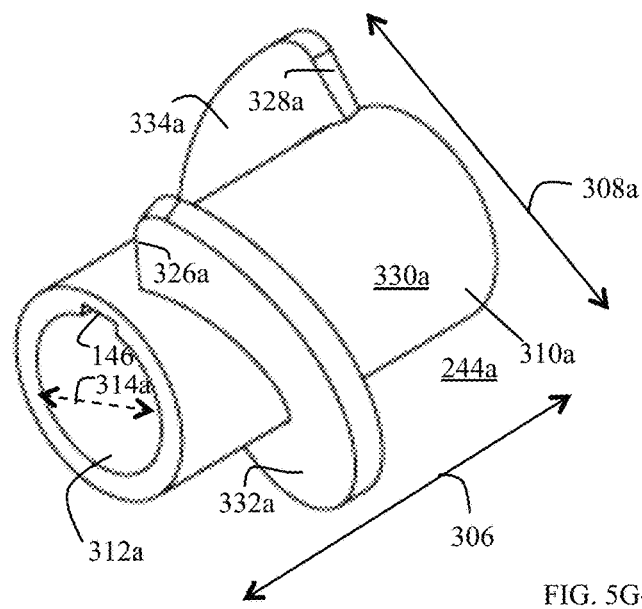
Figures 2, 5G:
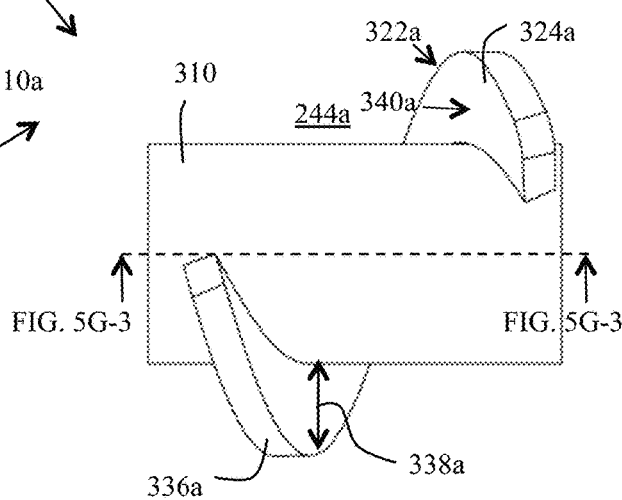
Figures 3, 5G:
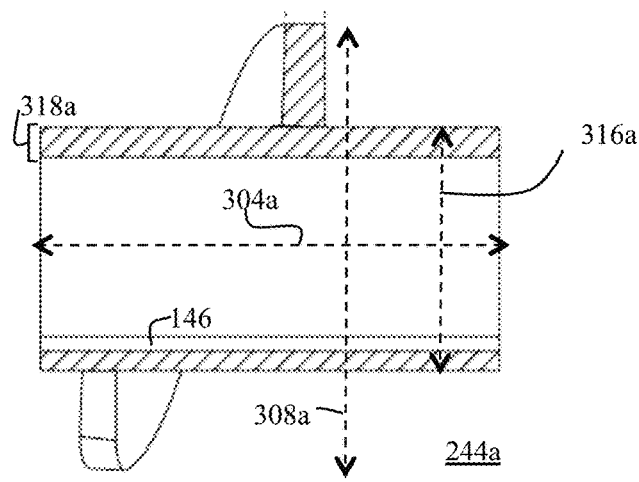
Figures 4, 5G:
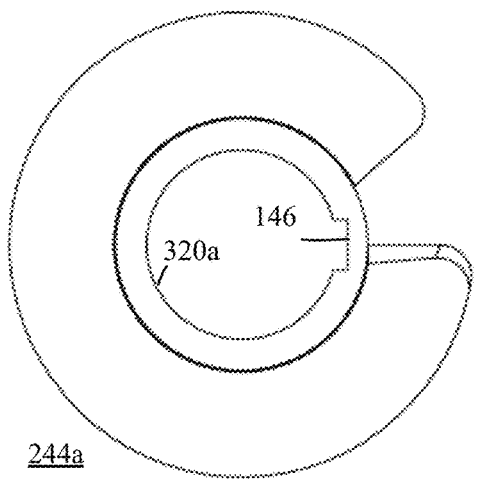
Figures 1, 5H:
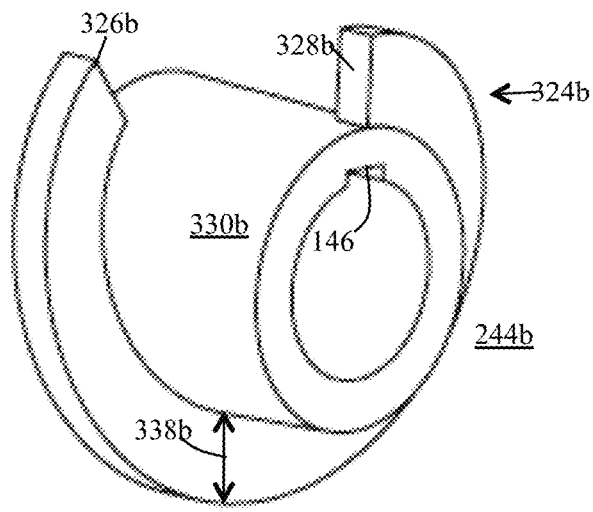
Figures 2, 5H:
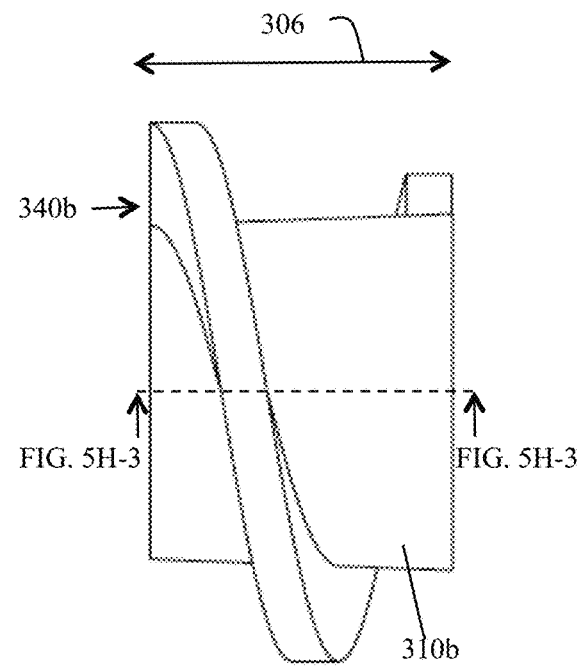
Figures 3, 5H:
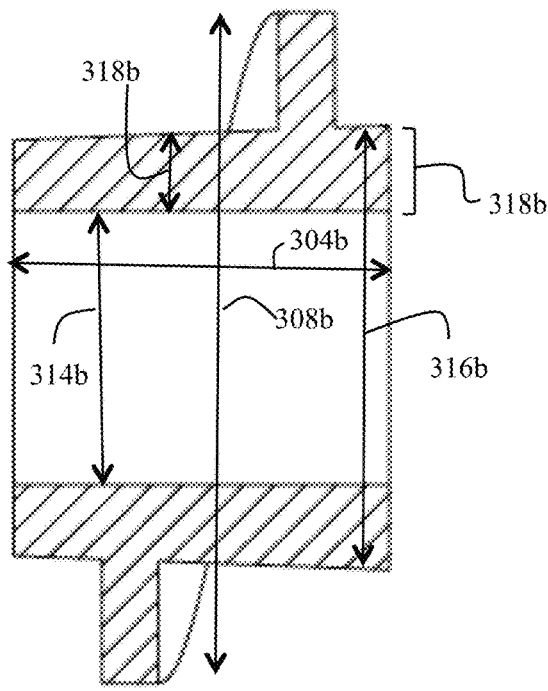
Figures 4, 5H:
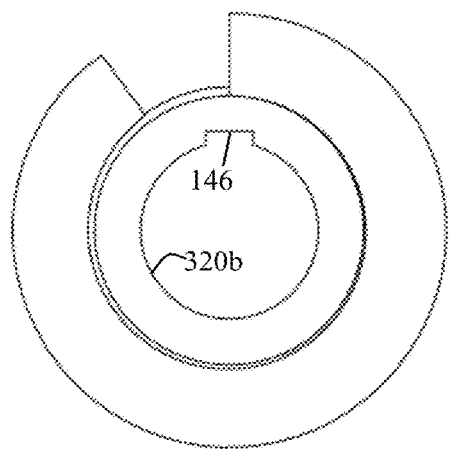
Figures 1, 5I:
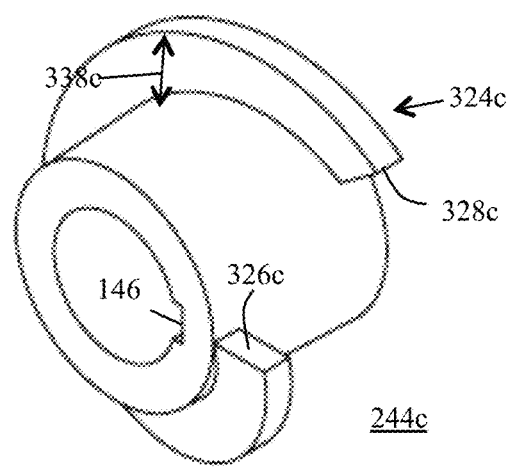
Figures 2, 5I:
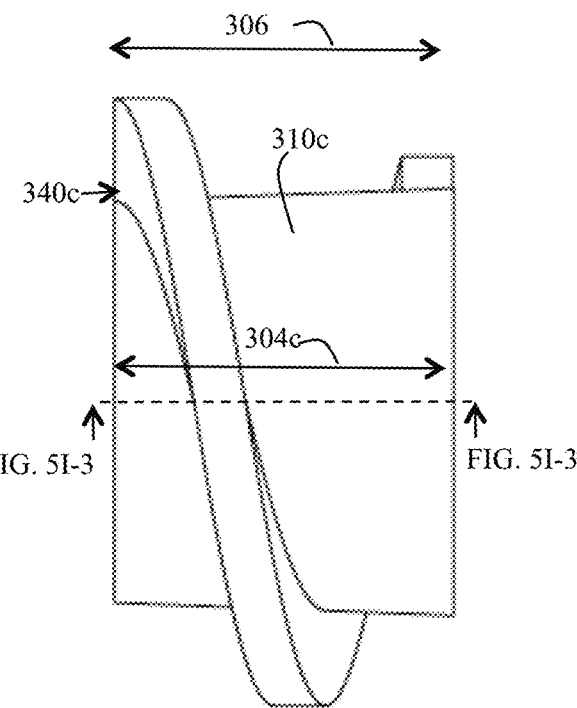
Figures 3, 5I:
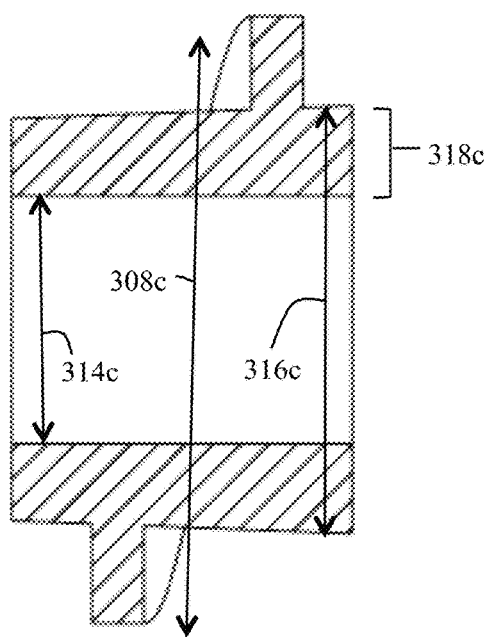
Figures 4, 5I:
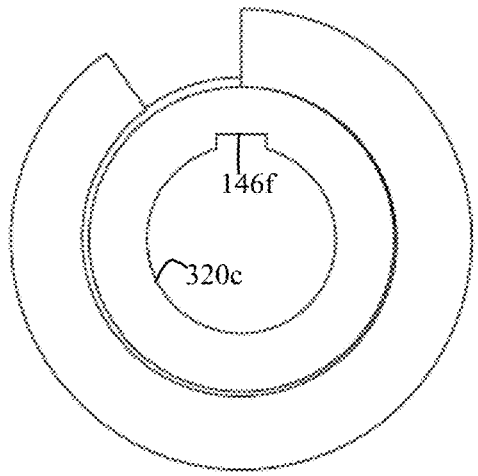
Figures 1, 5J:
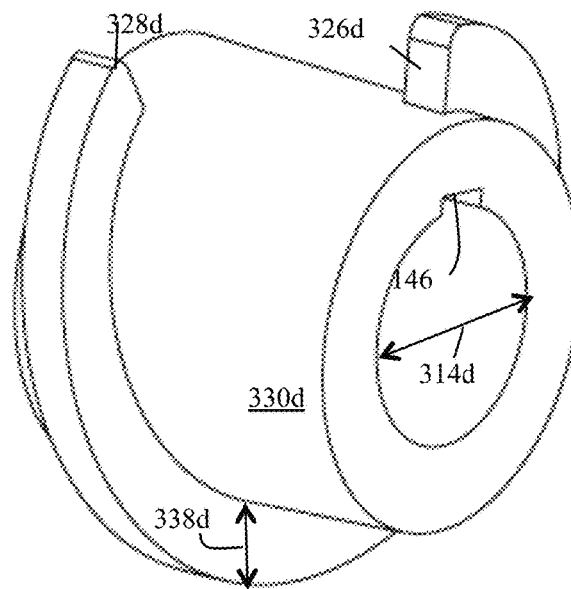
Figures 2, 5J:
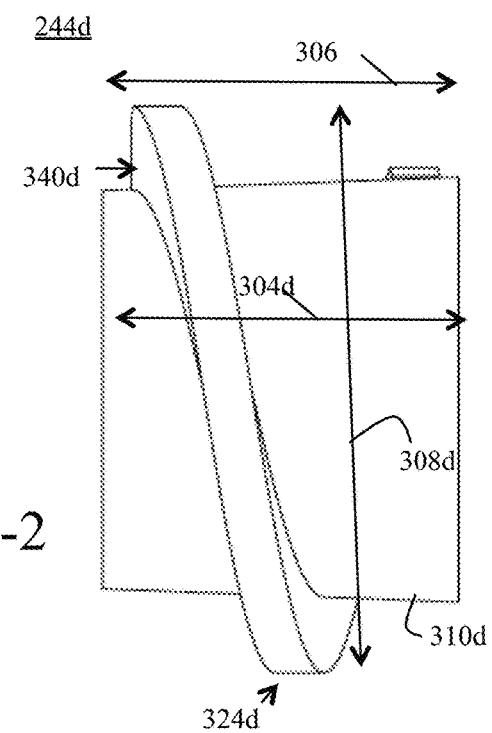
Figures 3, 5J:
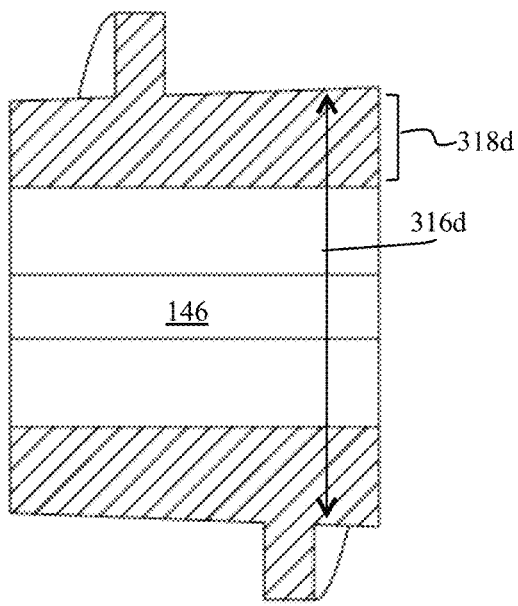
Figures 4, 5J:
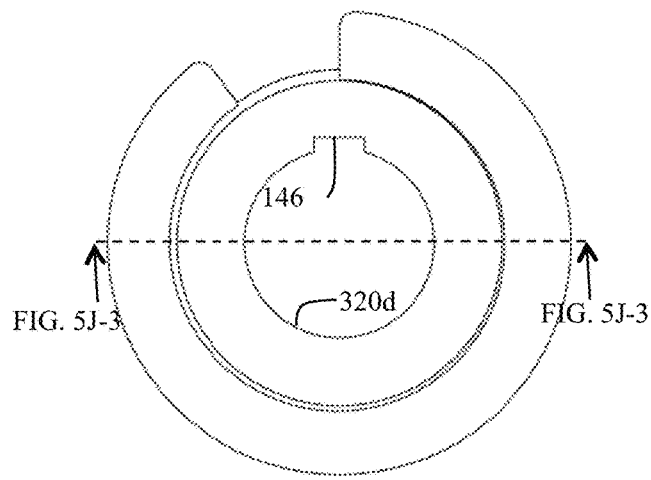
Figures 1, 5K:
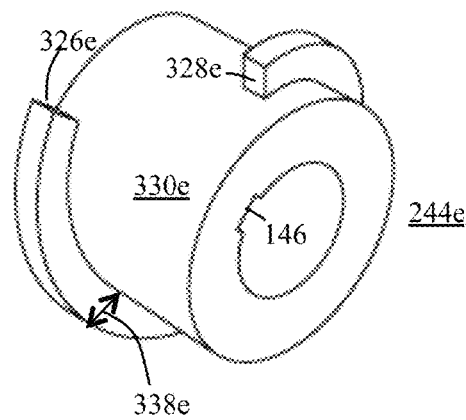
Figures 2, 5K:
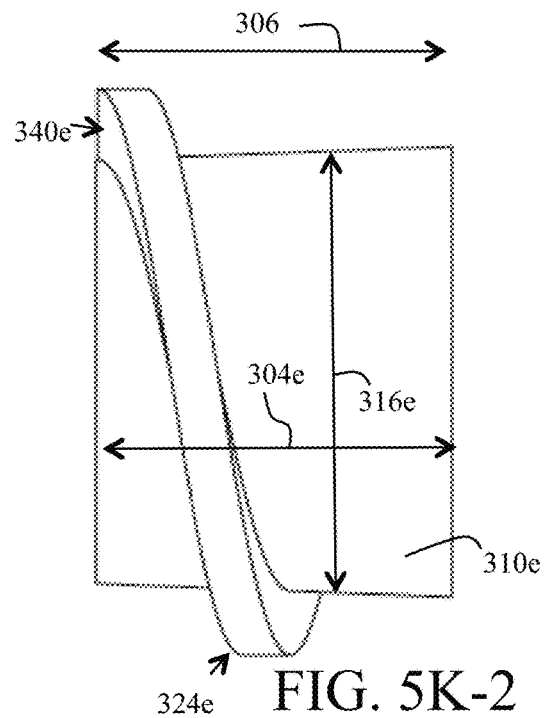
Figures 3, 5K:
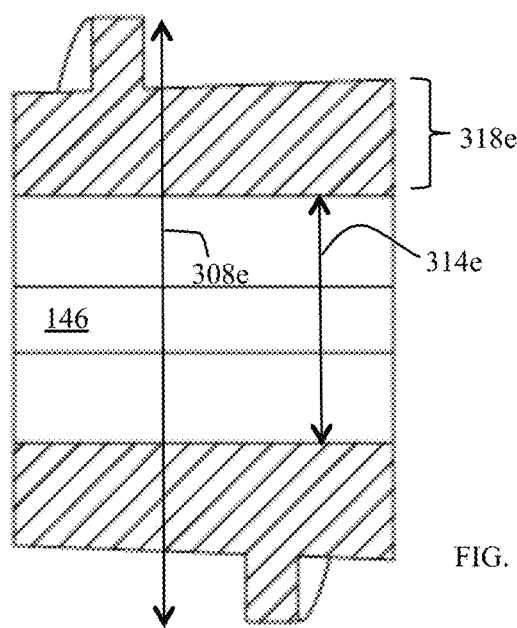
Figures 4, 5K:
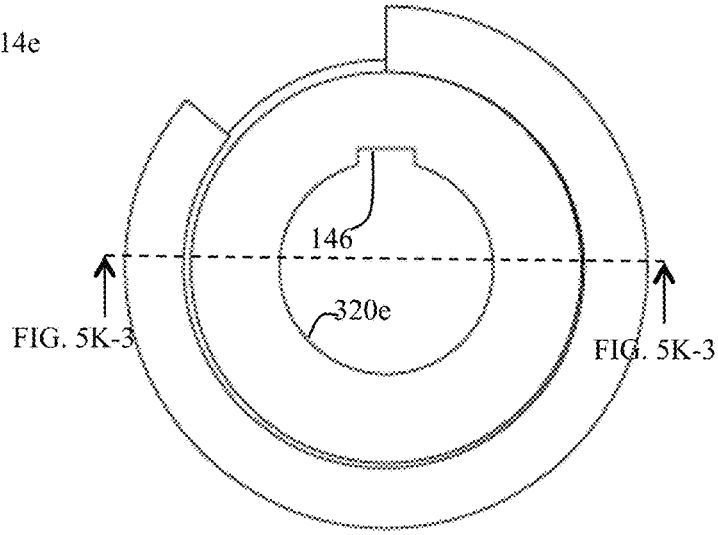
Figures 1, 5L:
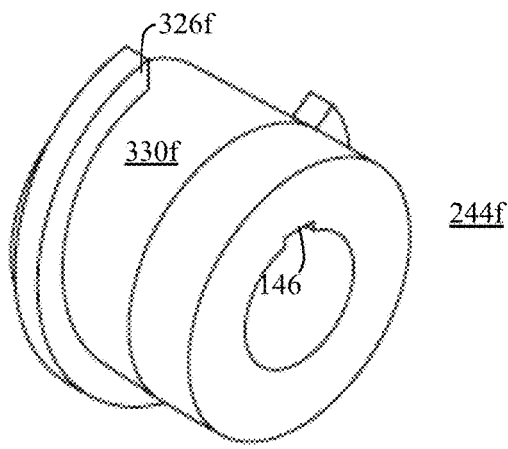
Figures 2, 5L:
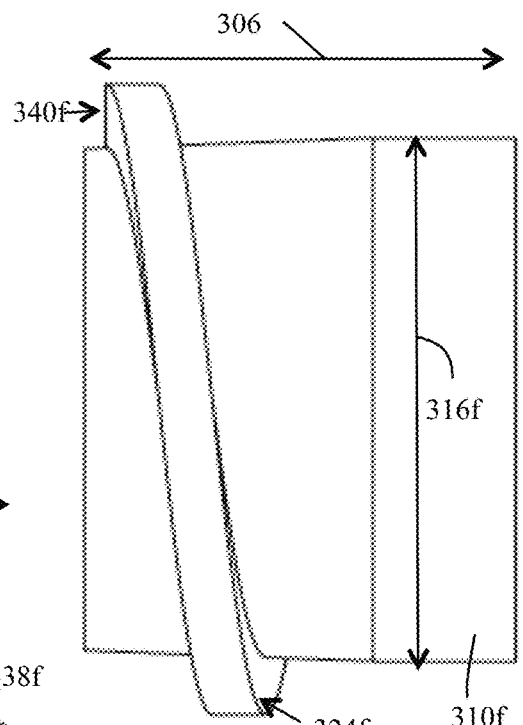
Figures 3, 5L:
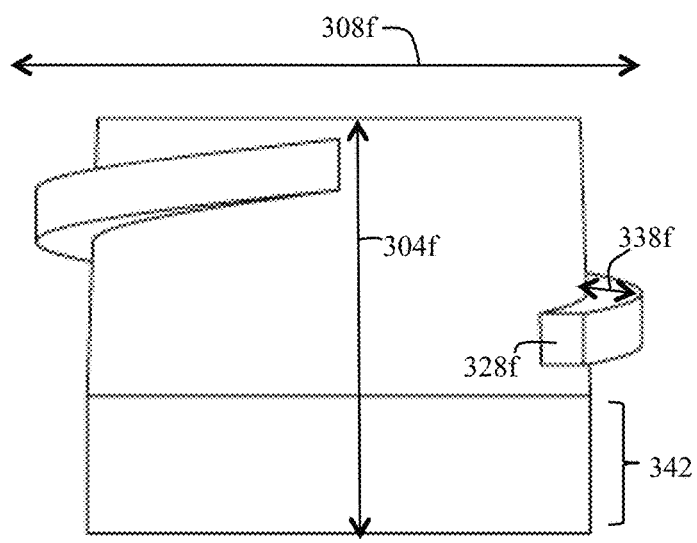
Figures 4, 5L:
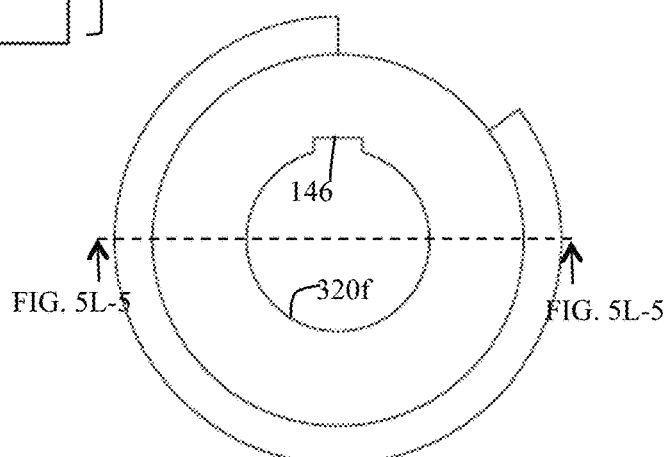
Figures 5, 5L:
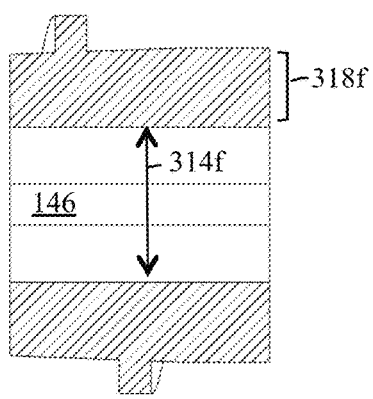
Figures 1, 5M:
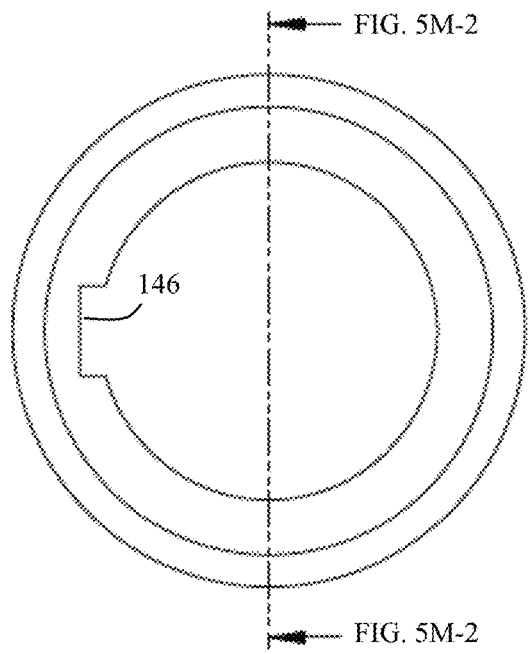
Figures 2, 5M:
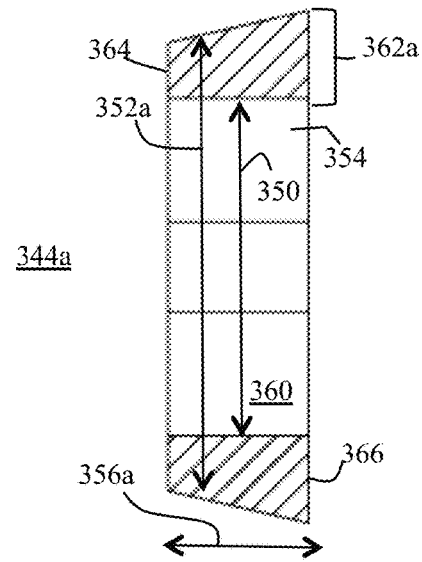
Figures 1, 5N:
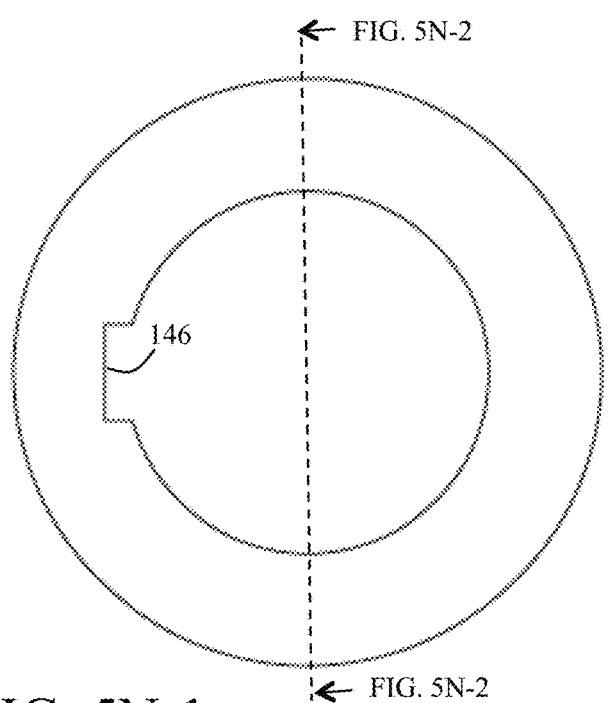
Figures 2, 5N:
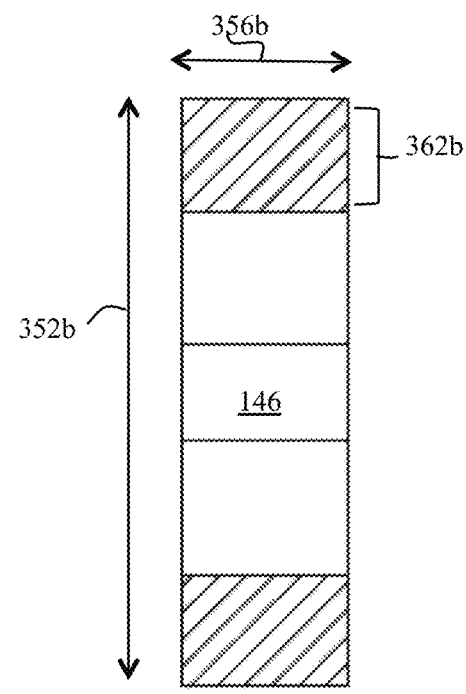
Figures 1, 5O:
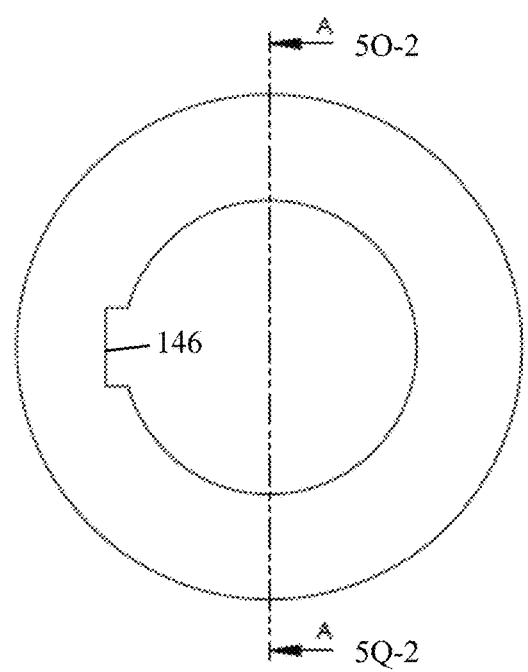
Figures 2, 5O:
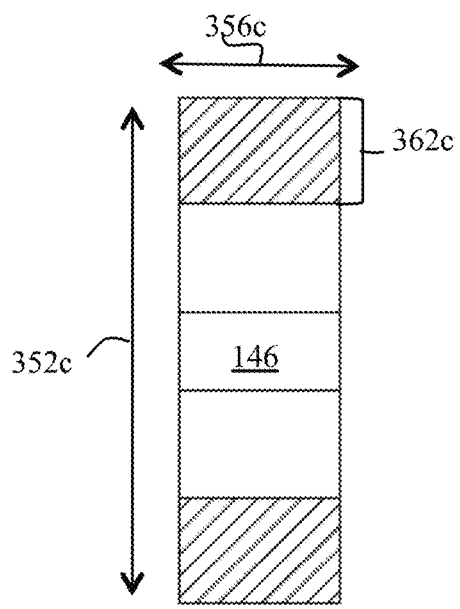
Figures 1, 5P:
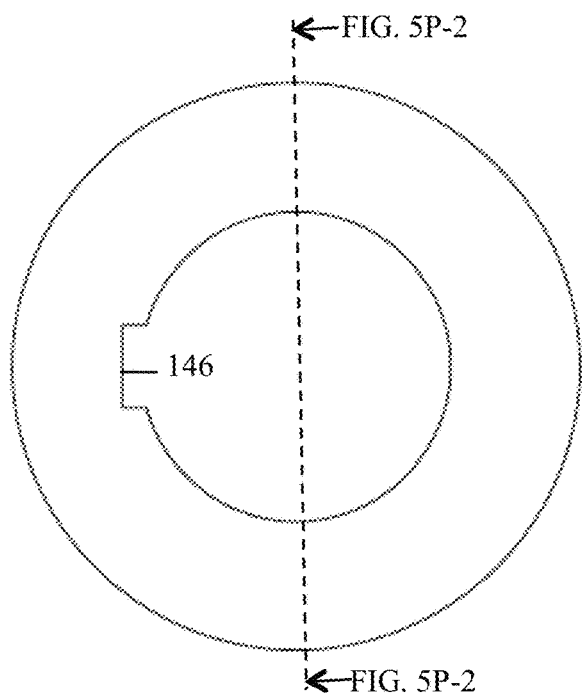
Figures 2, 5P:
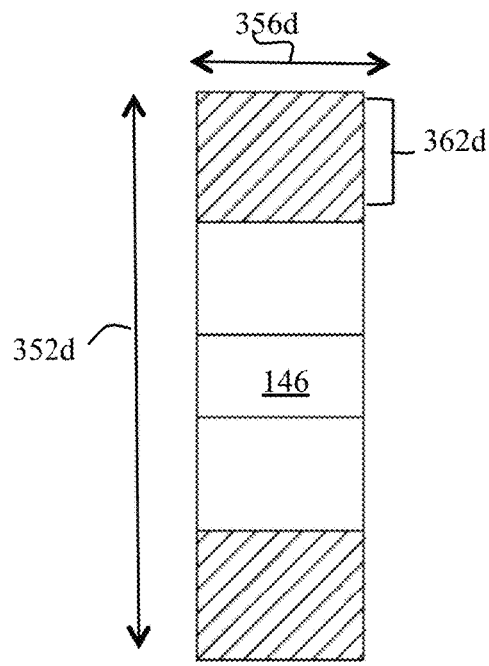
Figures 1, 5Q:
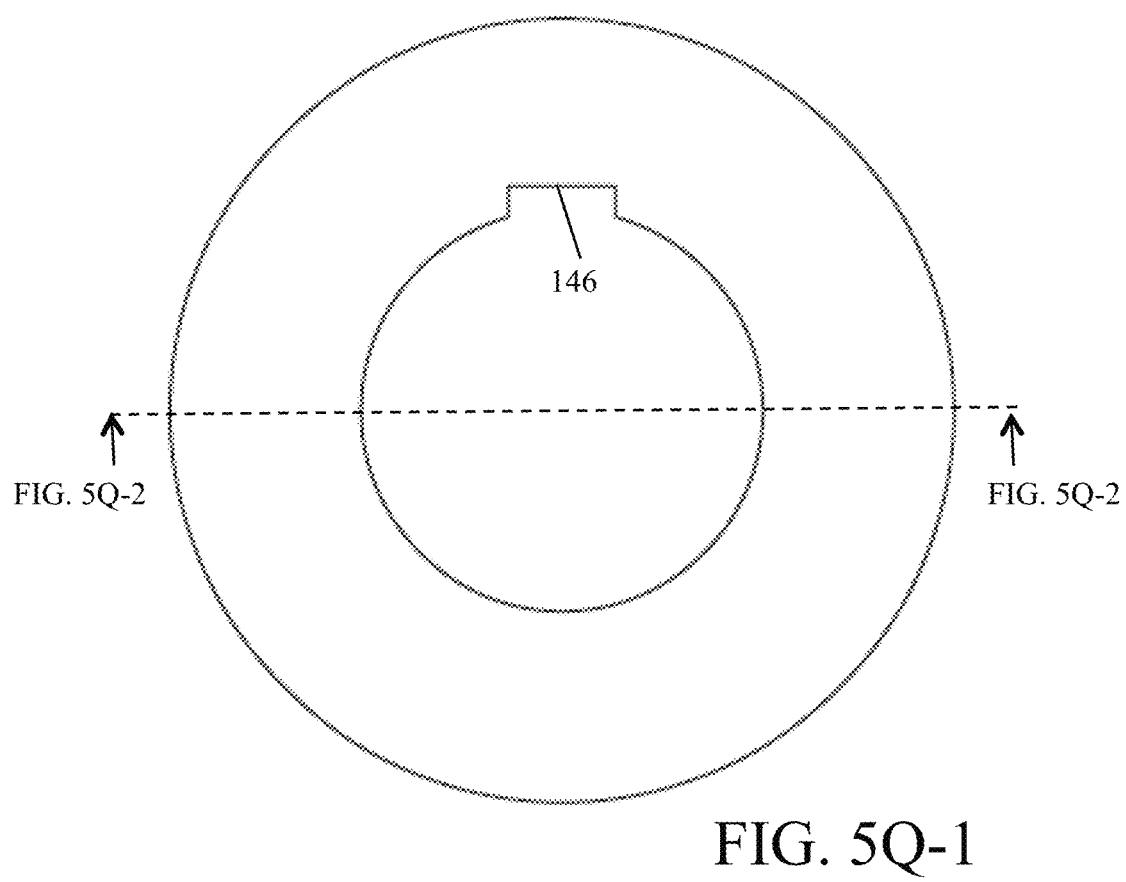
Figures 2, 5Q:
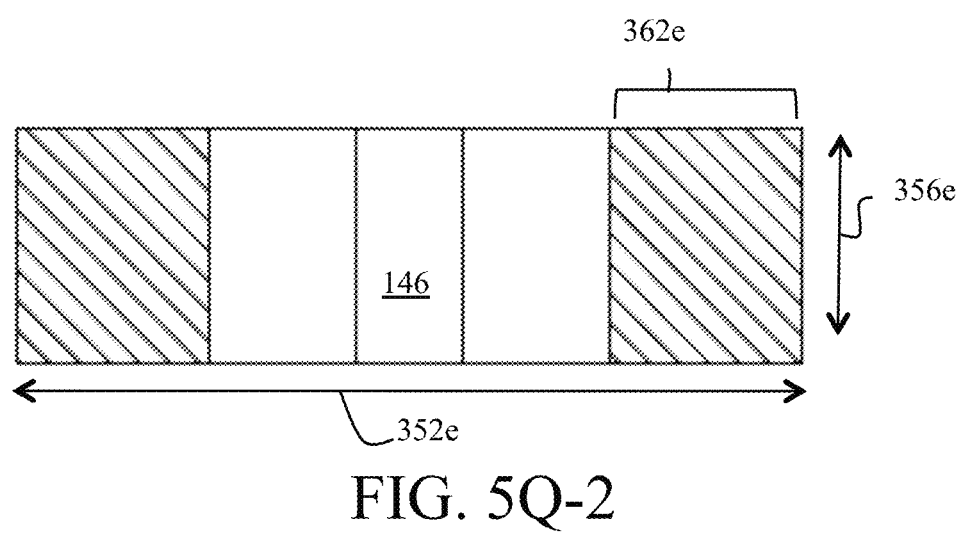

FIGS. 5A to 5Q-4 are non-limiting, exemplary illustrations of the details of a longitudinally extending, multi-stage compression auger assembly in accordance with one or more embodiments of the present invention. As illustrated in FIGS. 1A to 5Q-4, longitudinally extending, multi-stage compression auger assembly 134 is comprised of longitudinally extending shaft 142 that may rotate clockwise 288 (viewed from intake-side along shaft axis 290.

Longitudinally extending, multi-stage compression auger assembly 134 further includes a plurality of flighting modules 244 detachably mounted and secured along a flighting mount section 292d of shaft 142, and spacers 344 detachably mounted and secured in between flighting modules 244 along flighting mount section 292d of shaft 142.

Shaft 142 (best shown in FIGS. 5A to 5E) includes a shaft length 294 that extends along a shaft longitudinal axis 290 and a shaft diameter 296 that extends along a shaft transverse plane, perpendicular to shaft longitudinal axis 290 (defining varying shaft diameters 296 along length 294). Shaft 142 is comprised of a plurality of shaft sections 292 with each shaft section 292a to 292g having a shaft section length 298 and a shaft section diameter 300, with shaft section diameter 300 of shaft section 292 generally decreasing from intake-side 140 of shaft 142 to the egress side 302 of shaft 142.

Generally, the overall shaft diameter 296 decreases from intake-side 140 to the egress-side 302, providing a greater mass and hence, greater structural strength at the connection point with motive force system at intake side 140. In particular, a first shaft section 292a having a first length 298a and a first diameter 300a near intake-side 140 includes a first key-seat 144 (with its own depth and length) for mounting intake-side shaft coupling member 138 (detailed above).

A second shaft section 292b adjacent the first shaft section 292a includes a second length 298b and a second diameter 300b with a second key-seat 144 (with its own depth and length) for mounting the first and the second bearing supports 208 and 214 of the intake side bearing set 204 and 206 (detailed above). A third shaft section 292c adjacent second shaft section 292b includes a third length 298c and a third diameter 300c for added support to prevent axial movement of flighting modules and spacers.

A fourth shaft section 292d adjacent third shaft section 292c has a fourth length 298d and a fourth diameter 300d and includes a third key-seat 144 (with its own depth and length) for mounting one or more flithging modules 244 and one or more spacer 344 in between the one or more flighting modules 244.

A fifth shaft section 292e adjacent fourth shaft section 292d has fifth length 298e and a fifth diameter 300e and includes a fourth key-seat 144 (with its own depth and length) for adjustable egress mechanism of the adjustable egress phase (detailed below).

A sixth shaft section 292f adjacent fifth shaft section 292e has a sixth length 298f and a sixth diameter 300f and includes a fifth key-seat 144 (with its own depth and length) for the egress side bearing group (detailed below). A final shaft section 292g adjacent sixth shaft section 292f has a seventh length 298g and a seventh diameter 300g, defining an egress distal end section 302 of shaft 142. It should be noted that although constant, each length and each diameter within each shaft section 292 may have progressively varying sizes.

As further illustrated in FIGS. 1A to 5Q-4, plurality of fighting modules 244 are comprised of a general length 304 that spans along a fighting module longitudinal axis 306, and a general width 308 that spans along a fighting module transverse plane, perpendicular fighting module longitudinal axis 306. In the non-limiting, exemplary instance illustrated, general length 304 of each flighting module 244 may vary, but the general width 308 of each flighting module 244 are equal.

Plurality of fighting modules 244 include a hollow generally cylindrical body 310 forming a cylinder with a bore 312. Cylindrical body 310 includes an inner diameter 314 and an outer diameter 316, with the difference between inner and outer diameters 314 and 316 defining a thickness 318 of cylindrical body 310. Depending on flighting mount position on shaft 142 (along flight mount section 292d), one or both inner and/or outer diameters 314 and/or 316 of cylindrical body 310 may be constant or may vary along flighting module longitudinal axis 306. Inner diameter 314 generally corresponds to shaft diameter 300d at a fligthing mount position (along flight mount shaft 292d) for a particular flighting module 244.

Interior wall 320 of bore 312 includes a locking structure, forming a keyway 146 that may or may not extending an entire length 304 of a surface of the interior wall 320 flighting module 244. Keyway 146 receives a key to lock module 244 with shaft 142, with key 148 interlocking keyway 146 with key-seat 144d of shaft 144.

A flighting module 244 further include flightings that are comprised of a semi-helical screw blade 322 that includes a blade body 324 with first and second compression ends 326 and 328. Blade body 324 protrudes from an outer surface 330 of cylindrical body 310 at a first angle $\Omega$ at a first end 326 and second angle $\beta$ at a second end 328 to form the first and second compression ends, and extends at third angle $\Theta$, wrapping helically along cylindrical body 310 to define blade pitch 340 and blade height 338. Blade body 310 includes an outer blade body side 332, an inner blade body side 334, and a top blade body side 336. In general, thickness 318 of cylindrical body 310 a flighting module 244 increase from intake side to egress side of multi-stage compression auger assembly 134, with thickness 318 varied due to longer outer diameter 316 of flighting module 244.

Figures 1, 3P:
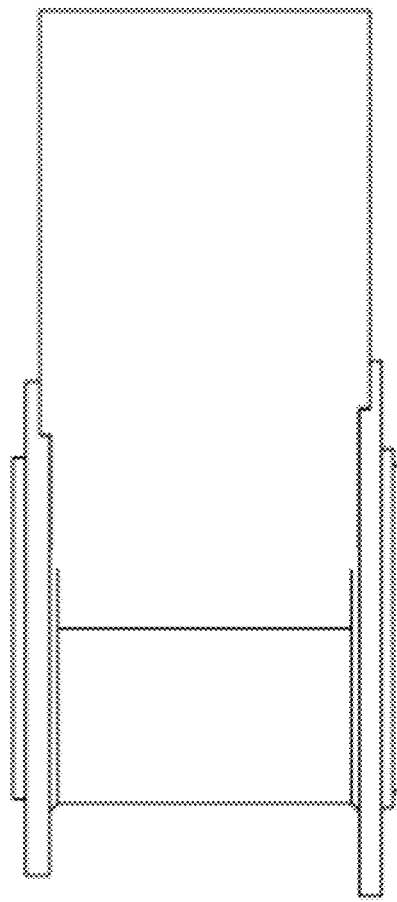
Figures 2, 3P:
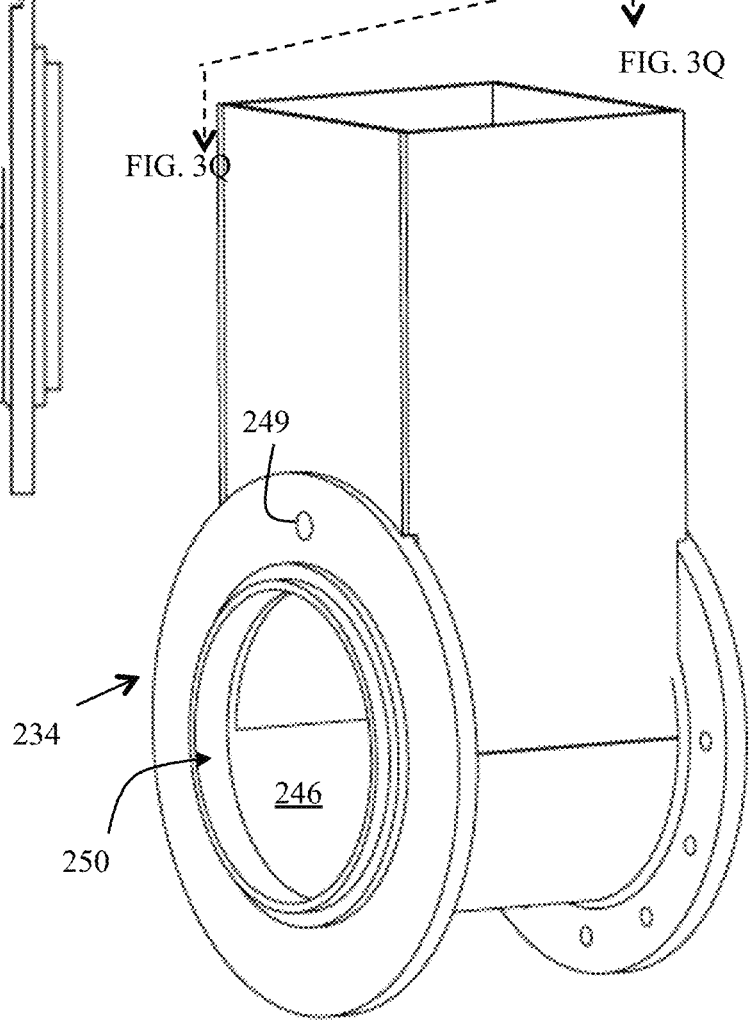
Figure 3Q:
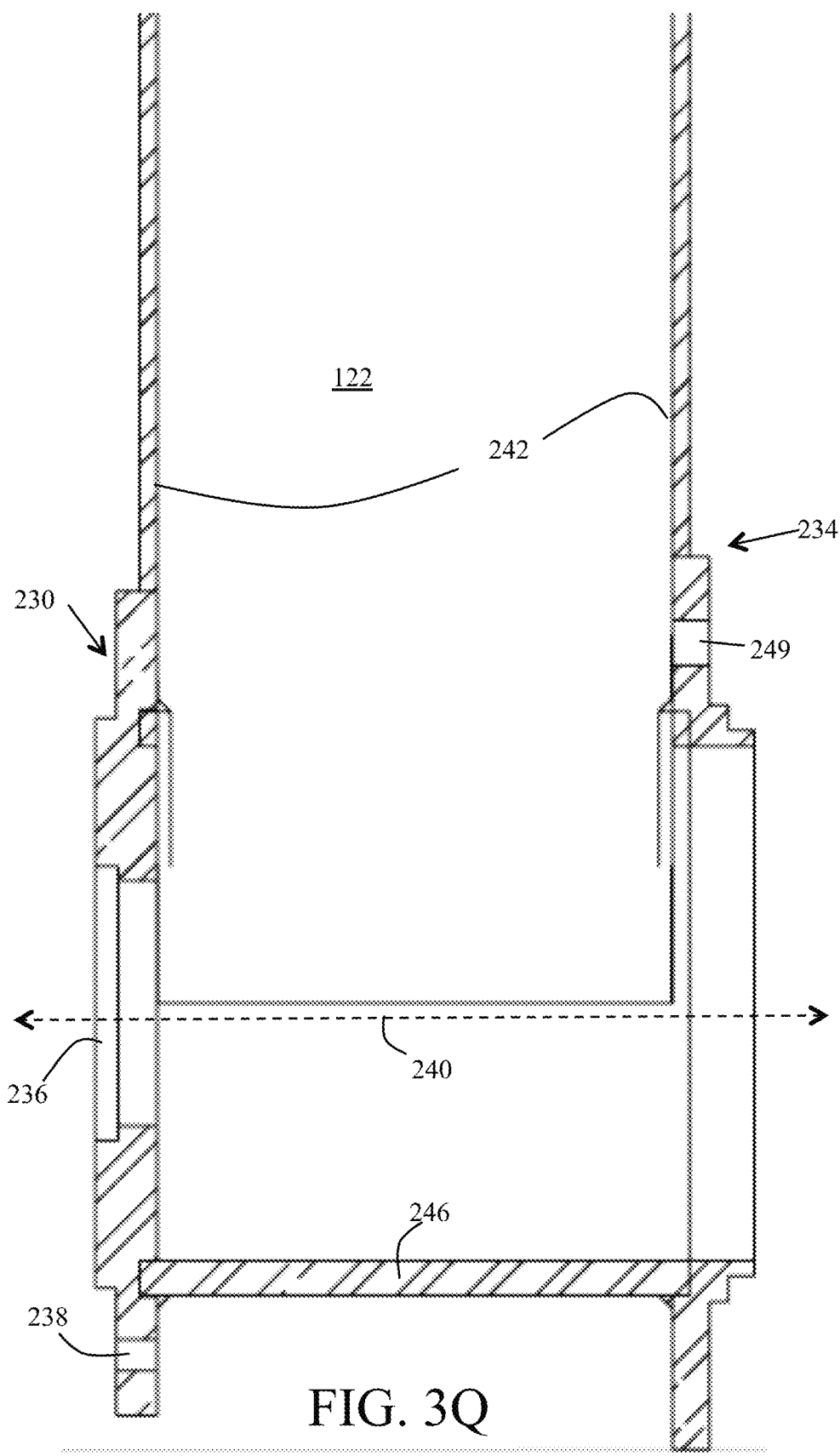

In particular and as illustrated in detail in FIGS. 5G-1 to 5G-4, a first cylindrical body 310a of the first flighting module 244a may have a first length 304a, a first width 308a, and a constant thickness 318a wherein inner and outer diameters 314a and 316a of first cylindrical body 310a is constant along first length 304a. First blade body 324a protrudes from a first outer surface 330a of first cylindrical body 310a at a first angle $\Omega$a at a first end 326a and a second angle $\beta$a at a second end 328a to form first and second compression ends 326a and 328a, and extends at a third angle Θa, wrapping helically along first cylindrical body 310a to define first blade pitch 340a and first blade height 338a. First flighting module 244a includes keyway 146 as shown.

As illustrated in FIGS. 5H-1 to 5H-4, second cylindrical body 310b of second flighting module 244b may have a second length 304b, a second width 308b, and a progressively varying thickness 318b that increases from intake-side to egress side of second cylindrical body 310b, wherein inner diameter 318b of second cylindrical body 310b is constant along second length 304b, but outer diameter 316b thereof varies along second length 304b, increasing in length from intake-side to egress side of second cylindrical body 310b. This results in a thicker (bulkier unit), reducing the overall volume or space within cage assembly 232. Second flighting module 244b includes keyway 146 as shown.

Second blade body 324b protrudes from a second outer surface 330b of the second cylindrical body 310b at a first angle Ωb at a first end 326b and a second angle βb at a second end 328b to form the second and third compression ends 326b and 328b, and extends at a third angle Θb, wrapping helically along the second cylindrical body 310b to define second blade pitch 340b and second blade height 338b, which is shorter in span proportional or commensurate with the added bulk (thicker cylindrical body 310b with thickness 318b). As indicated above, the general width 308 of each flighting module 244 are equal. This means that if cylindiral body 310 is thicker (or outer diameter 316 progressively increases to provide a thicker cyclindrcial body 310), then blade height 338 is commensurately made shorter to allow for equal general width 308 of each flighting module 244.

As illustrated in FIGS. 5I-1 to 5I-4, third cylindrical body 310c of third flighting module 244c may have a third length 304c, a third width 308c, and a progressively varying thickness 318c that increases from the intake-side to egress side of third cylindrical body 310c, wherein inner diameter 314c of third cylindrical body 310c is constant along third length 304c, but outer diameter 316c varies, increasing in length from intake-side to egress side. This results in a thicker (bulkier unit), thicker than first and second flighting modules 244a and 244b, further reducing the overall volume or space within cage assembly 232. Third flighting module 244c includes keyway 146 as shown.

Third blade body 324c protrudes from a third outer 330c surface of third cylindrical body 310c at a first angle Ωc at a first end 326c and a second angle βc at a second end 328c to form the second and third compression ends 326c and 328c, and extends at a third angle Θc, wrapping helically along the second cylindrical body 310c to define third blade pitch 340c and third blade height 338c, which is shorter in span proportional or commensurate with the added bulk (thicker cylindrical body 310c). Accordingly, as cylindrical bodies 310a, 310b, and 310c progessviely become thicker (bulkeir) with larger outer diameters 316a, 316b, and 316c, blade heights 338a, 338b, and 338c become commensurately shorter.

As illustrated in FIGS. 5J-1 to 5J-4, fourth cylindrical body 310d of fourth flighting module 244d may have a fourth length 304d, a fourth width 308d, and a progressively varying thickness 318d that increases from the intake-side to egress side of fourth cylindrical body 318d, wherein inner diameter 314d of fourth cylindrical body 310d is constant along fourth length 304d, but outer diameter 316d varies, increasing in length from intake-side to egress side of the fourth cylindrical body 310d, resulting in a thicker (bulkier unit), thicker than first, second, and third flighting modules 244a, 244b, 244c, further reducing the overall volume or space within cage assembly 232. Fourth flighting module 244d includes keyway 146 as shown.

Fourth blade body 324d protrudes from a fourth outer surface 330d of the fourth cylindrical body 310d at a first angle Ωd at a first end 326d and a second angle βd at a second end 328d to form the second and third compression ends 326d and 328d, and extends at a third angle Θd, wrapping helically along the second cylindrical body 310d to define fourth blade pitch 340d and fourth blade height 338d, which is shorter in span proportional or commensurate with the added bulk (thicker cylindrical body 310d).

As illustrated in FIGS. 5K-1 to 5K-4, fifth cylindrical body 310e of the fifth flighting module 244e may have a fifth length 304e, a fifth width 308e, and a progressively varying thickness 318e that increases from the intake-side to egress side of fifth cylindrical body 310e, wherein inner diameter 314e of fifth cylindrical body 310e is constant along fifth length 304e, but outer diameter 316e that varies, increasing in length from intake-side to egress side, resulting in a thicker (bulkier unit), thicker than first, second, third, and fourth flighting modules 244a, 244b, 244c, and 244d further reducing the overall volume or space within cage assembly 232. Fifth flighting module 244e includes keyway 146 as shown.

Fifth blade body 324e protrudes from a fifth outer surface 330e of fifth cylindrical body 310e at a first angle Ωe at a first end 326e and a second angle βe at a second end 328e to form the second and third compression ends 326e and 328e, and extends at a third angle Θe, wrapping helically along the second cylindrical body 310e to define fourth blade pitch 340e and fourth blade height 338e, which is shorter in span commensurate with the added bulk (thicker cylindrical body 310e).

As illustrated in FIGS. 5L-1 to 5L-4, sixth cylindrical body 310f of the sixth flighting module 244f may have a sixth length 304f, a sixth width 308f, and a progressively varying thickness 318f that increases from the intake-side to egress side of sixth cylindrical body 310f, wherein inner diameter 314f of sixth cylindrical body 310f is constant along sixth length 304f, but outer diameter 316f varies, increasing in length from intake side to egress side, resulting in a thicker (bulkier unit), thicker than first, second, third, fourth, and fifth flighting modules 244a, 244b, 244c, 244d, and 244e further reducing the overall volume or space within cage assembly 232. Sixth flighting module 244f includes keyway 146 as shown.

Sixth blade body 324f protrudes from a sixth outer surface 330f of sixth cylindrical body 310f at a first angle Ωf at a first end 326f and a second angle βf at a second end 328f to form the second and third compression ends 326f and 328f, and extends at a third angle Θf, wrapping helically along the second cylindrical body 310f to define fourth blade pitch 340f and fourth blade height 338f, which is shorter in span commensurate with the added bulk (thicker cylindrical body 310f). The sixth flighting module 244f further includes an addition extension 342 that as detailed below, accommodates for operations of the adjustable egress phase.

It should be noted that any one or more flighting modules may be identical. For example, fourth and fifth flighting module or third and fourth flighting modules or any other adjacent set may be identical. In other words, a flighting module and a next flighting module need not vary so long as overall, the flighting modules progressively become bulkier. Further, the number of flighting modules may vary and need not be limited to the illustrated six.

As further illustrated in FIGS. 1A to 5L-4 and in particular, FIGS. 2F, 5A to 5C, and best illustrated in FIGS. 5F and 5M-1 to 5Q-2, in addition to flighting modules 244, multi-stage compression auger assembly 134 further includes a plurality of spacers 344 positioned between a flighting module 244 and a next fighting module 244, providing a distance 346 (FIG. 5B) of separation between the second compression end 328 of flighting module 244 and first compression end 326 of next flighting module 244.

As further detailed below, a first critical and advantageous reason for use of spacers 344 is that a second compression end 328 of a flighting module 244 is not aligned with first compression end 326 of a next flighting module 244. This way, waste material is not caught between compression ends 326 and 328 of adjacent flighting modules 244, which would prevent compression of caught-up waste 124.

As also further detailed below, a second critical and advantageous reason for use of spacers 344 is that they also enable waste 124a (FIG. 5B) caught at egress-side of blade body 324 of a flighting module 244 and other materials caught at intake side of the blade body 324 of a next flighting module 244 to grind and be compressed, generating further friction as the egress side blade body 324a of flighting module pushes and compresses waste against waste at the intake side of the blade body 324 of next flighting module 244.

A third critical and advantageous reason for use of spacers 344 is that due to varying sizes (progressively increasing thickness and length), spacers gradually increase the travel distance 348 (FIG. 5B) of waste 124 from one phase to next while decreasing the volume of space within cage assembly 232 through which waste 124 travels. Increased travel distance 348 and reduced volume of space slows the rate at which waste 124 moves to a next phase. This generates a bottleneck effect as more and more waste 124 is added at preceding phases and continue to travel to next phases. Bottleneck effect generates large compressive and frictional forces to a point where temperatures become well over 100° C. where moisture is evaporated (turns to steam).

Figure 4A:
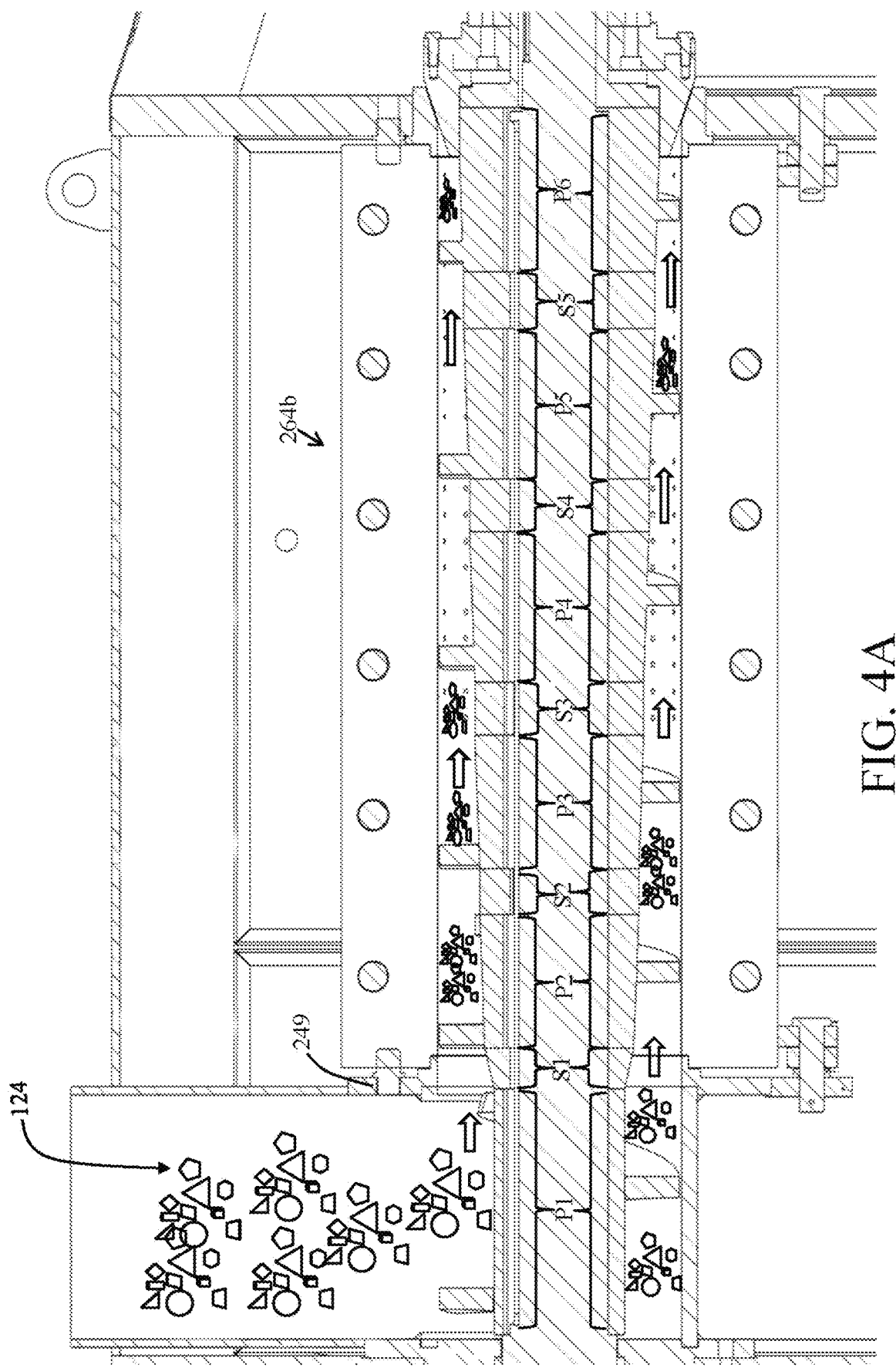
Figure 4F:
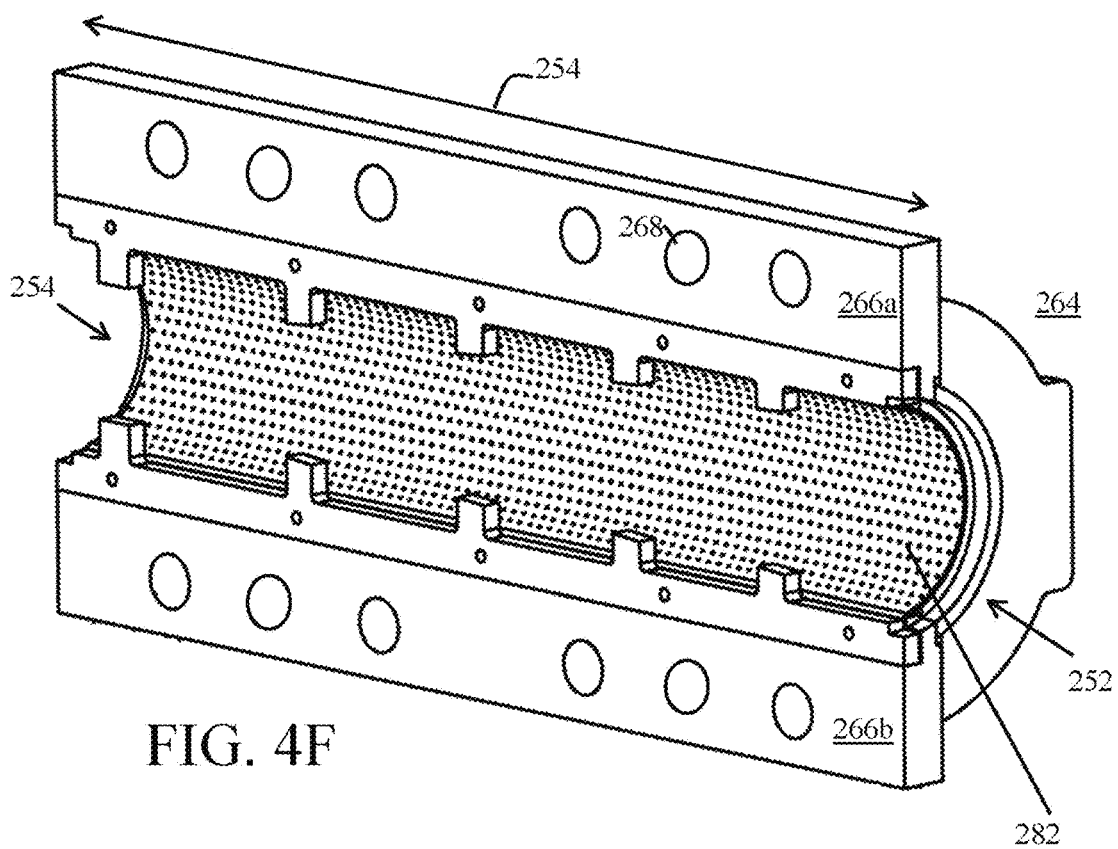
Figure 4G:
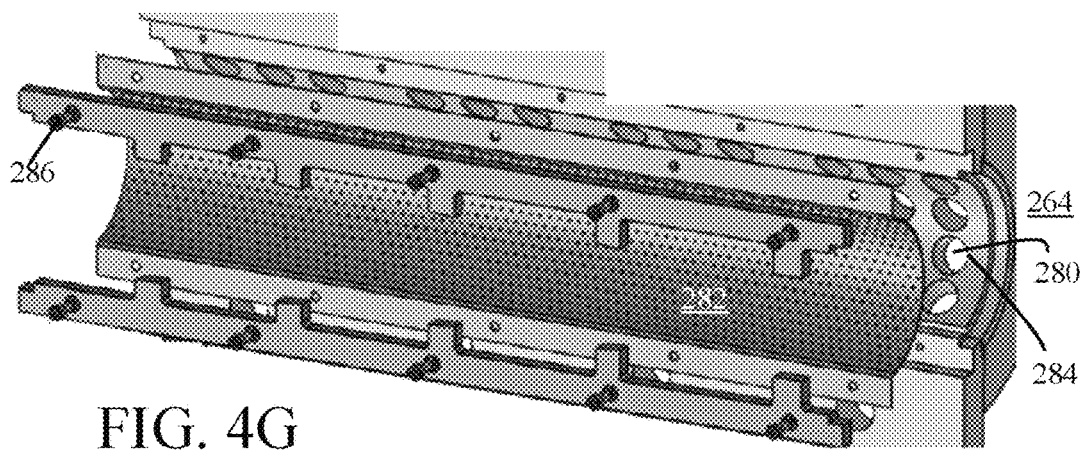
Figure 4H:
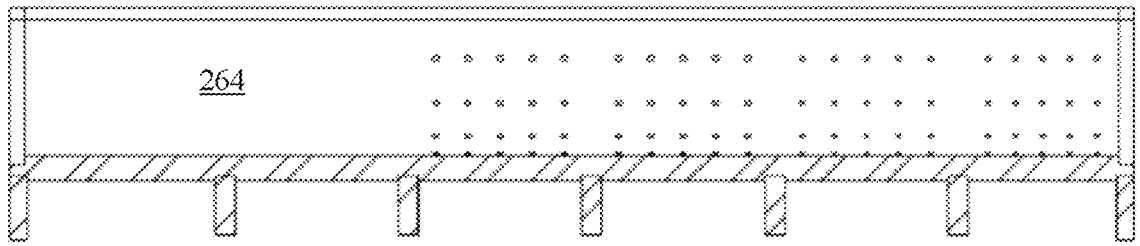
Figure 4I:
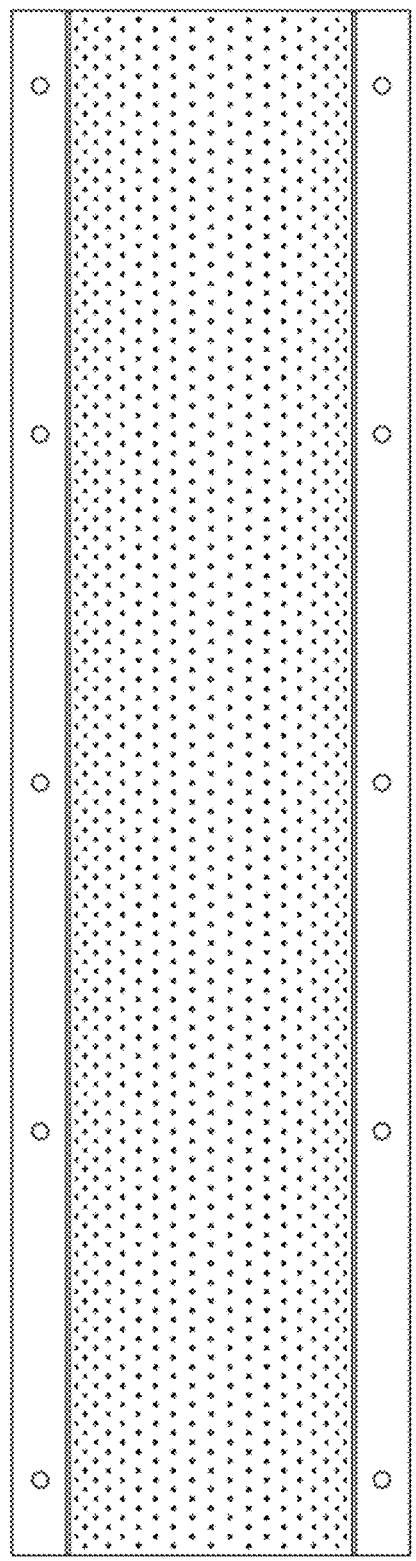
Figure 4J:
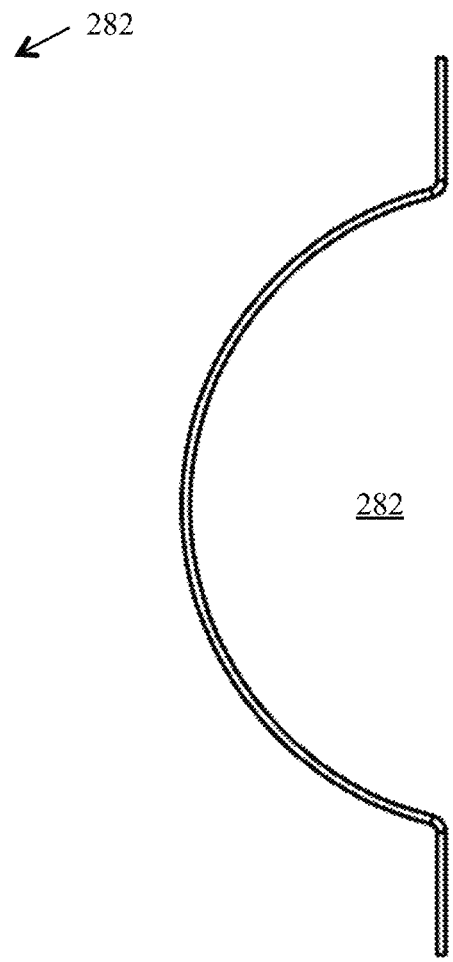

A fourth critical and advantageous reason for use of spacers 344 is that due to varying sizes (progressively increasing thickness and length), waste 124 continues to remain at a longer and longer duration within a preceding phase as more and more waste 124 is accumulated. In particular, duration of time (stay time) of waste 124 at a particular phase progressively increases from phase P1 to phase P6 (FIGS. 4A and 5A). In other words, waste traveling through phases P1 to P6 experience higher and higher compressive and frictional forces at longer and longer durations at each phase P1 to P6.

As illustrated in FIGS. 5M-1 to 5Q-2, a spacer 344 is comprised of a hollow, annular structure with an inner diameter 350 and an outer diameter 352, an interior wall 354 of spacer 344 includes a locking structure, forming a keyway 146 that may or may not extending an entire length 356 of an surface 360 of interior wall 354. In general, thickness 362 of spacers 344 increase from intake side to egress side of multi-stage compression auger assembly 134, with thickness 362 varied due to longer outer diameter 352 of spacers 344.

In particular and as illustrated in FIGS. 5M-1 to 5Q-2, a first spacer 344a is positioned at the intake side between first and second flighting modules 244a and 244b and is comprised of a hollow, annular frustum of right circular cone with a length 356a and an inner diameter 350a, and an outer diameter 352a that progressively varies from a first base 364 to a second base 366. An interior wall or side 354 of spacers 344 includes a locking structure, forming a keyway 146 that may or may not extending an entire length of a surface 360 of the interior wall or side 354.

The second to fifth spacers 344b, 344c, 344d, and 344e, illustrated in FIGS. 5N-1 to 5Q-2 are comprised of annular discs of varying lengths 356b, 356c, 356d, and 356e, and thicknesses 362b, 362c, 362d, 362e, with identical inner diameters 350 and progressively longer outer diameters 352b, 352c, 352d, and 352e. All have keyways 146. As with flighting modules 244, any two or more spacers 344 may be identical. Second spacer 344b is positioned in between second and third flighting modules 244b and 244c, third spacer 344c is positioned between third and fourth flighting modules 244c and 244d, fourth spacer 344d is positioned between fourth and fifth flighting modules 244d and 244e, and the fifth spacer 344e is positioned between fifth and sixth flighting modules 244e and 244f.

With arrangement described above and further detailed below, compression auger assembly allows material to move from intake end to egress end at varying rates and be compressed at varying rates. That is, compression auger assembly enable moving of material at a progressively slower and slower rate from intake end to egress end. For example, materials are moved more quickly from first flighting module 244a to second fligthing module 244b due to shorter travel distance 348 (FIG. 5B) between the first and second flighting modules 244a and 244b. However, the duration for movement of material between the final flighting modules (near the egress end) is longer due to longer travel distance 348 between the final flighting modules. This varying rate of movement of material along a length of the compression auger assembly causes build up of more and more material at the final flighting modules (near the egress end). Further, varying rate of movement of material along a length of the compression auger assembly causes the material to remain within final flighting modules (near the egress end) at a longer duration then first set of flighting modules (near the intake end). In other words, material remain longest at final flighting modules where they experience the highest friction and compression forces due to continuous buildup of material from earlier stage flighting modules (near intake end).

Material is moved from intake end of the flighting module to egress end of the flighting module due to rotating of the pitched semi-helical screw blade within each flighting module. However, once exiting a flighting module's "influence," the exited material are pushed by newly exiting material, generating large friction by contacting other material between flighting modules because the blade body of each flighting module 244 is not continuous but is open ended comprise of semi-helical screw blade. In other words, the movement of material is not an exclusive result of direct push by blades of the flighting modules, but also by push of other materials. The travel distance 348 between flightings is defined by spacers 244 and the time defined by rotational speed of the compression auger assembly in addition to the amount and rate at which material is continuously added to the system. The resulting compression of material generate friction between material as the material are compressed together and moved from intake end to egress end of compressor 108 while the entire compression auger assembly rotates, resulting in temperature of over 100° C. heat, generating steam.

Referring back to FIGS. 4A and 5A to 5C and in view of the above described multi-stage compression auger assembly 134, single chamber, longitudinally extending multi-phase adjustable compressor 108 applies continuous, progressively increasing compressive force at each phase of operation (which may be defined by a each unit of fighting module) to increasingly compress the smaller constituent parts 124 received from shredder 104 into partially dehydrated, dense, and heated material. As further detailed below, compressor 108 further includes an adjustable egress phase that enables adjustment of a final compression force that is transferred to preceding phases.

Smaller constituent parts 124 move from an operational phase to a next operational phase as greater mass of smaller constituent parts 124 is introduced at an intake end via feeder 122 into first operational phase P1 (defined by operations of first flighting module 244*a*), pushing existing smaller constituent parts 124 to the next operational phase 2 (operations of next flighting module 244*b*). That is, waste 124 is pushed by blade body while under the influence of a flighting module 244, but once they are pushed out of a particular operational phase of that flighting module and positioned within a space S1 between preceding and next flighting module, they are moved by being bumped by other material preceding them. When in between flighting modules 244 (at the spacers 244), waste 124 continues to churn within compressor 108 at that position of the spacer 244 until more waste 124 is added to push existing waste 124 further and into the next phase.

Smaller constituent parts 124 move from an operational phase to the next phase at a progressively slower and slower rate, enabling the smaller constituent parts 124 to remain at the next phase (next flighting module 244) at a longer and longer durations than at preceding phases (preceding flighting modules). The slower rate of movement and longer duration of stay of the smaller constituent parts 124 at the next operational phase cause accumulation of greater mass of smaller constituent parts at the next and subsequent phases as the smaller constituent parts egress from the preceding, faster moving phase and into the next phase.

The continuously accumulating smaller constituent parts 124 at the next phase increasingly experience higher compressive and higher frictional forces as greater mass of smaller constituent parts 124 are accumulated in a smaller and smaller volume within egress side of cage assembly 232 (creating greater and greater bottleneck effect), resulting in generated high temperatures due to compression and frictional forces that further vaporize moisture, in addition to further compression and condensing of smaller constituent parts 124.

In particular and in view of FIGS. 4A, and 5A to 5C, the uncompressed waste (smaller constituent parts) 124 continuously pours into the compression chamber via the feeder 122. First flighting module 244*a* has thinner and generally longer cylindrical body 310*a* to provide the maximum volume of space within cage assembly 232 for receiving the largest amount of uncompressed waste 124 for this first phase P1 operations. It should be noted that as indicated above, the overall flighting transverse axis 308 is the same for all flighting modules 244.

At first phase P1, waste 124 is received and compressed, but is moved and quickly transferred to second operational phase P2 (due to use of a shorter length spacer 344*a* (space S1) between first and second flighting modules 244*a* and 244*b* (or first and second phases P1 and P2). Given that the flightings (for all flighting modules) are comprised of semi-helical screw blades rather than continuous helical screw blades, the smaller constituent parts 124 are moved within a phase by the push of the semi-helical screw blades of that flighting module. However, smaller constituent parts 124 are push from space S1 when additional smaller constituent parts 124 are continuously added to compressor 108. Advantage of this type of movement is that greater and greater friction is generated due to grinding of waste material at subsequent spaces 5I to S5.

The shorter spacer 344*a* allow quicker transfer of waste 124 between flighting modules as the waste has a shorter axial distance 348 to travel to reach the phase P2 operations (flighing module 344*b*). An advantage of having shorter spacing S (and hence, shorter distance 348 through which waste 124 travels) is that waste from phase P1 operations move more quickly to second phase P2 operations, leaving more room (volume of space) in phase P1 to receive more smaller constituent parts (waste) 124 from shredder 104.

At space S1 (at first spacer 244*a*), waste 124 does not move axial until more and more waste egress phase P1 operations to axially push existing waste 124 at space S1 into next phase of operations, which is phase P2. Waste may continue to move angularly as the auger assembly 134 rotates. In other words, first blade body 324*a* of first flighting module 244*a* moves waste 124 through first phase P1, while waste 124 exiting phase P1 accumulates at space S1 units sufficient mass of waste 124 has accumulated to pushes existing waste 124 from space S1 and into phase 2 operations. As indicated above, continually accumulating waste materials at space S1 caught at between blades at egress-side of first flighting module 244*a* and at intake side of a second flighting module 244*b* are further grinded and compressed, generating further friction as the egress side blade body 324*a* of first flithging module 244*a* pushes and compresses waste against intake side of the blade body 324*b* of second flighting module 244*b* at space S1 defined by spacer 344*a*.

Second flighting module 244*b* has shorter overall length, but a thicker second cylindrical body 310*b* (with shorter blade height to compensate for the thicker cylindrical body so that the overall width along transverse axis of the second flighting module 244*b* is the same as others). Since diameter of cage assembly 232 is uniform and constant, a thicker second cylindrical body 310*b* reduces the overall volume or space available at second phase P2 operations. Reduced volume in combination with faster moving waste from phase P1 operations generates a bottleneck effect at phase P2, which increases overall compressive and frictional forces experienced by material within phase P2.

Waste is pushed out of phase P2 and is moved into space S2 (defined by second spacer 344*b*). Again, given that the flightings (for all flighting modules) are comprised of semi-helical screw blades rather than continuous helical screw blades, the smaller constituent parts are moved within phase 2 by the push of second semi-helical screw blades 324*b* of second flighting module 244*b*. However, smaller constituent parts are push or moved within space S2 towards phase P3 when additional smaller constituent parts continuously exit out of phase 2 and are accumulated into space S2.

Waste remains at space S2 at a longer duration due to use of a longer length spacer 344*b* between second and third flighting modules 244*b* and 244*c* (or second and third phases P2 and P3). The longer spacer 344*b* allow slower transfer of waste between flighting modules as the waste has a longer axial distance to travel to reach the phase P3 operations (third flighing module 244*c*). An advantage of having longer spacing 344*b* (and hence, longer distance through which waste travels between phases P2 and P3) is that waste from phase P2 operations move more slowly to third phase P3 operations, while more quicker traveling waste from phase P1 operations are continually moved and are continually accumulated into phase P2 operations, generating a greater bottleneck effect. In particular, duration of time (stay time) of waste at phase 2 is longer compared to phase P1. In other words, waste traveling through the phases P2 experience higher compressive and frictional forces at longer durations compared to phase P1.

At space S2 (at second spacer 344*b*), waste does not move until more and more waste egress phase P2 operations to push existing waste at space S2 into next phase of operations, which is phase P3. In other words, second blade body 324*b* of second flighting module 244*b* moves waste through second phase P2, while waste existing phase P2 accumulates at space S2 units sufficient mass of waste has accumulated to push existing waste from space S2 and into phase 3 operations. As indicated above, continually accumulating waste materials at spacer S2 caught at egress-side of blade body 324*b* of second flighting module 244*b* and at intake side of the blade body 324*c* of a third flighting module 244*c* are further grinded and compressed, generating further friction as the egress side blade body 324*b* of second flithging module 244*b* pushes and compresses waste against intake side of the blade body of third flighting module 244*c* at space S2.

As noted above, second spacer 344*b* is thicker and longer than first spacer 344*a* and hence, providing an increased travel distance for waste from phase P2 to phase P3 while decreasing the volume of space at S2 within cage assembly 232 through which waste travels. Increased travel distance and reduced volume of space slows the rate at which waste moves through S2 and into phase P3. This generates a greater bottleneck effect as more and more waste is added at preceding phases (phases P1 and P2) and continue to travel to next phases. As indicated above, bottleneck effect at egress side of phase P3 generates large compressive and frictional forces to a point where temperatures within cage assembly 232 exceed well over 100° C. evaporated moisture (turns to steam).

Third flighting module 244*c* may have a shorter overall length, but have a thicker third cylindrical body 310*c* (with shorter blade height to compensate for the thicker cylindrical body so that the overall width along transverse axis of the third flighting module 244*c* is the same as others). Since diameter 262 of cage assembly 232 is uniform and constant, a thicker third cylindrical body 310*c* reduces the overall volume or space available at third phase P3 operations. Reduced volume in combination with faster moving waste from phases P1 and P2 operations generates a greater bottleneck effect at phase P3, which increases overall compressive and frictional forces experienced by material within phase P3 by operations of third flighting module 244*c*.

Waste is pushed out of phase P3 and is moved into space S3 (defined by third spacer 344*c*), with smaller constituent parts pushed or moved within space S3 when additional smaller constituent parts continuously exist out of phase 3 and are accumulated at space S3. Waste remains at space S3 at a longer duration due to use of a longer length third spacer 344*c* between third and fourth flighting modules 244*c* and 244*d* (or third and fourth phases P3 and P4). The longer third spacer 344*c* allow slower transfer of waste between flighting modules as the waste has a longer axial distance to travel to reach the phase P4 operations (fourth flighing module 244*d*). An advantage of having longer fourth spacing 244*d* (and hence, longer distance through which waste travels between phases P3 and P4) is that waste from phase P3 operations move more slowly to fourth phase P4 operations, while more quicker traveling waste from phases P1, P2, and P3 operations are continually moved and are continually accumulated into phase P4 operations, generating even a greater bottleneck effect. In particular, duration of time (stay time) of waste at phase 3 is longer compared to phases P1 and P2. In other words, waste traveling through the phases P3 experience higher compressive and frictional forces at longer durations compared to phases P1 and P2.

At space S3 (at third spacer 244*c*), waste does not move until more and more waste egress phase P3 operations to push existing waste at space S3 into next phase of operations, which is phase P4. In other words, third blade body 324*c* of third flighting module 244*c* moves waste through third phase P3, while waste existing phase P3 accumulates at space S3 until sufficient mass of waste has accumulated to push existing waste from space S3 and into phase 4 operations. As indicated above, continually accumulating waste materials at spacer S3 caught at egress-side of blade body 324*c* of third flighting module 244*c* and at intake side of the blade body 324*d* of a fourth flighting module 244*d* are further grinded and compressed, generating further friction as the egress side blade body 324*c* of third flithging module 244*c* pushes and compresses waste against intake side of the blade body of fourth flighting module 244*c* at space S3.

As noted above, third spacer 344*c* may be thicker and longer than second or first spacers 344*a* and 344*b* and hence, providing an increased travel distance for waste from phase P3 to phase P4 while decreasing the volume of space at S3 within cage assembly 232 through which waste travels. Increased travel distance and reduced volume of space further slows the rate at which waste moves through S3 and into phase P4. This also enables waste to continue to remain within each phase at a longer duration. This generates a greater bottleneck effect as more and more waste is added at preceding phases (phases P1, P2, P3) and continue to travel to next phases. As indicated above, bottleneck effect generates large compressive and frictional forces to a point where temperatures within cage assembly 232 exceed well over 100° C. evaporated moisture (turns to steam).

Fourth flighting module 244*d* may have a shorter overall length, but have a thicker fourth cylindrical body 310*d* (with shorter blade height to compensate for the thicker cylindrical body so that the overall width along transverse axis of the fourth flighting module 244*d* is the same as others). Since diameter 262 of cage assembly 232 is uniform and constant, a thicker fourth cylindrical body 324*d* reduces the overall volume or space available at fourth phase P4 operations. Reduced volume in combination with faster moving waste from phases P1, P2, and P3 operations generates a greater bottleneck effect at phase P4, which increases overall compressive and frictional forces experienced by material within phase P4 by operations of fourth flighting module 244*d*.

Waste is pushed out of phase P4 and is moved into space S4 (defined by fourth spacer 344*d*), with smaller constituent parts pushed or moved within space S4 when additional smaller constituent parts continuously exist out of phase 4 and are accumulated at space S4. Waste remains at space S4 at a longer duration due to use of a longer length fourth spacer 344*d* between fourth and fifth flighting modules 244*d* and 244*e* (or fourth and fifth phases P4 and P5). The longer fourth spacer 344*d* allow slower transfer of waste between flighting modules as the waste has a longer axial distance to travel to reach the phase P5 operations (fourth flighting module 244*d*). An advantage of having longer fourth spacing 344*d* (and hence, longer distance through which waste travels between phases P4 and P5) is that waste from phase P4 operations move more slowly to fifth phase P5 operations, while more quicker traveling waste from phases P1, P2, P3, and P4 operations are continually moved and are continually accumulated into phase P5 operations, generating even a greater bottleneck effect. In particular, duration of time (stay time) of waste at phase 4 is longer compared to phases P1, P2, P3. In other words, waste traveling through the phases P4 experience higher compressive and frictional forces at longer durations compared to phases P1, P2, and P3.

At space S4 (at fourth spacer 344d), waste does not move until more and more waste egress phase P4 operations to push existing waste at space S4 into next phase of operations, which is phase P5. In other words, fourth blade body 324d of fourth flighting module 244d moves waste through fourth phase P4, while waste existing phase P4 accumulates at space S4 until sufficient mass of waste has accumulated to push existing waste from space S4 and into phase 5 operations. As indicated above, continually accumulating waste materials at spacer S4 caught at egress-side of blade body 324d of fourth flighting module 244d and at intake side of the blade body 324e of a fifth flighting module 244e are further grinded and compressed, generating further friction as the egress side blade body 324d of fourth flighting module 244d pushes and compresses waste against intake side of the blade body of fifth flighting module 244e at space S4.

As noted above, fourth spacer 244d may be thicker and longer than preceding spacers and hence, providing an increased travel distance for waste from phase P4 to phase P5 while decreasing the volume of space at S4 within cage assembly 232 through which waste travels. Increased travel distance and reduced volume of space further slows the rate at which waste moves through S4 and into phase P5. This also enables waste to continue to remain within each phase at a longer duration. This generates a greater bottleneck effect as more and more waste is added at preceding phases and continue to travel to next phases. As indicated above, bottleneck effect generates large compressive and frictional forces to a point where temperatures within cage assembly 232 exceed well over 100° C. evaporated moisture (turns to steam).

Fifth flighting module 244e may have a shorter overall length, but have a thicker fifth cylindrical body 310e (with shorter blade height to compensate for the thicker cylindrical body so that the overall width along transverse axis of the fifth flighting module 244e is the same as others). Since diameter 262 of cage assembly 232 is uniform and constant, a thicker fourth cylindrical body 310e reduces the overall volume or space available at fifth phase P5 operations. Reduced volume in combination with faster moving waste from preceding phase operations generates a greater bottleneck effect at phase P5, which increases overall compressive and frictional forces experienced by material within phase P5 by operations of fifth flighting module 244e.

Waste is pushed out of phase P5 and is moved into space S5 (defined by fifth spacer 344e) with smaller constituent parts pushed or moved within space S5 when additional smaller constituent parts continuously exist out of phase 5 and are accumulated at space S5. Waste remains at space S5 at a longer duration due to use of a longer length fifth spacer 344e between fifth and sixth flighting modules 244e and 244f (or fifth and sixth phases P5 and P6). The longer fifth spacer 344e allow slower transfer of waste between flighting modules as the waste has a longer axial distance to travel to reach the phase P6 operations (sixth flighing module 244f). An advantage of having longer fifth spacing 344e (and hence, longer distance through which waste travels between phases P6 and P6) is that waste from phase P5 operations move more slowly to sixth phase P6 operations, while more quicker traveling waste from preceding phase operations are continually moved and are continually accumulated into phase P5 operations, generating even a greater bottleneck effect. In particular, duration of time (stay time) of waste at phase 5 is longer compared to preceding phases. In other words, waste traveling through the phases P5 experience higher compressive and frictional forces at longer durations compared to preceding phases.

At space S5 (at fifth spacer 344e), waste does not move until more and more waste egress phase P5 operations to push existing waste at space S5 into next phase of operations, which is phase P6. In other words, fifth blade body 324e of fifth flighting module 344e moves waste through fifth phase P5 while waste existing phase P5 accumulates at space S5 until sufficient mass of waste has accumulated to push existing waste from space S5 and into phase 6 operations. As indicated above, continually accumulating waste materials at spacer S5 caught at egress-side of blade body 324e of fifth flighting module 244e and at intake side of the blade body 324f of a sixth flighting module 244f are further grinded and compressed, generating further friction as the egress side blade body 324e of fifth flighting module 244e pushes and compresses waste against intake side of the blade body of sixth flighting module 244f at space S5.

As noted above, fifth spacer 244e is thicker and longer than preceding spacers and hence, providing an increased travel distance for waste from phase P5 to phase P6 while decreasing the volume of space at S5 within cage assembly 232 through which waste travels. Increased travel distance and reduced volume of space further slows the rate at which waste moves through S5 and into phase P6. This also enables waste to continue to remain within each phase at a longer duration. This generates a greater bottleneck effect as more and more waste is added at preceding phases and continue to travel to next phases. As indicated above, bottleneck effect generates large compressive and frictional forces to a point where temperatures within cage assembly 232 exceed well over 100° C. evaporated moisture (turns to steam).

Sixth flighting module 244f may have a thicker sixth cylindrical body 310f (with shorter blade height to compensate for the thicker cylindrical body so that the overall width along transverse axis of the sixth flighting module 244f is the same as others). Since diameter 262 of cage assembly 232 is uniform and constant, a thicker sixth cylindrical body 310f reduces the overall volume or space available at sixth phase P6 operations. Reduced volume in combination with faster moving waste from preceding phase operations generates a greater bottleneck effect at phase P6, which increases overall compressive and frictional forces experienced by material within phase P6 by operations of sixth flighting module 244f.

Waste is moved at a progressively slower and slower rate towards the egress side, with rate of travel dictated by the accumulated waste, volume of space available for travel, travel distance, and so on. Further, the density of the waste becomes higher and higher as waste is moved from intake side to the egress side. Faster moving waste at the intake side and slower moving, more dense waste at the egress side create a bottleneck effect, which increases the friction and grinding between waste, in addition to compression forces by larger and larger flighting modules of the multi-stage compression auger assembly 134.

Therefore, a preceding phase has a larger volume of space then a next adjacent phase; and a phase and a next phase have a smaller distance of separation than the next phase and a next, subsequent phase. This enables waste to remain at a preceding phase at a longer duration and hence, longer time for compression of waste. The waste remaining at a phase is also continuously compacted by addition of new waste ingress into the phase until sufficient build up of new waste gradually pushes compressed and compacted waste into the next phase (with smaller volume of space and hence, generating a greater and greater bottleneck effect at every subsequent phase).

Accordingly, at least two processes occur simultaneously within the compressor 108, waste is moved axially and angularly at varying rates (slower and slower) through the phases and in between phases and also compressed at varying rates (higher and higher compression rate) per phrase and in between phases. The compression occurs at each phase at compression ends 326 and 328 of a flighing 322, including compression against cage assembly 232, and all sides of flighting blades 324, including compression of waste against each other due to the above described bottleneck effect, which generates high temperatures (e.g., over 100° C.).

FIGS. 6A to 14B are non-limiting, exemplary illustrations of the details of an adjustable egress phase in accordance with one or more embodiments of the present invention. An important factor for having the adjustable egress phase is to provide added compressive force to discharge of waste from compressor 108, which increases compression force and hence, friction, which generate further heat that converts liquid into gas (steam).

As indicated above, single chamber, longitudinally extending multi-phase adjustable compressor 108 applies continuous, progressively increasing compressive force at each phase to increasingly compress the smaller constituent parts into partially dehydrated, dense, and heated material, with the adjustable egress phase enabling adjustment of compression force that is transferred to preceding phases. As illustrated in FIGS. 1A to 14B, the adjustable egress phase is comprised of an adjustable discharge module 368 with a linear as well as angular motion (as shown by respective arrows 370 and 372). With linear motion, adjustable discharge module 368 moves towards the stationary discharge member 374 of compressor 108 to further close off a stationary discharge member 374, thus increasing pressure as more and more waste is accumulated at phase P6 to egress out of compressor 108. Adjustable discharge module 368 may also linearly move in the opposite direction to further open stationary discharge member 374, thus reducing pressure.

The adjustable egress phase further includes an intermediate assembly 376 with a linear and an angular motion that as detailed below, enables adjustable discharge module 368 to move linearly while still rotating with shaft 142. Further included is an actuator module 378 that has a linear motion that is coupled with intermediate assembly 376. An egress-side motive force generator 380 (FIGS. 11A and 11B) is associated with actuator module 378, which moves actuator module 378 along a reciprocating linear path 370. The reciprocating linear motion 370 of actuator module 378 actuates the intermediate assembly 376 along a commensurately reciprocating linear path 370, which, in turn, linearly moves adjustable discharge module 368.

As a side note, an elongated bushing 382 is used and coupled with the shaft 142, enabling one or more components of the adjustable egress phase to have a linear motion 370 on shaft 142 while protecting shaft structure. Elongated bushing 382 includes an annular flange 384 at intake-side thereof and a first set of interlock structure (keyway 146) that secure elongated bushing 382 with shaft 142 and hence, enable elongated bushing 382 to rotate with shaft 142. Elongated bushing 382 further includes a second set of interlock structure (key-seat 144) that enable securing of one or more adjustable egress phase components, enabling their rotation with shaft 142 and elongated bushing 382 as well as a linear motion (independent of the elongated bushing 382 or shaft 142).

Adjustable discharge module 368 rotates with shaft 142 and is comprised of an outer member 386 of a generally annular conical configuration and an inner member 388 of a generally annular configuration with an interlock structure 146 that couples adjustable discharge module 368 with shaft 142 via elongated bushing 382. An interior side 390 of an intake-side base 392 of outer member 386 is moveably associated with section 342 of sixth flighting module 244f, and an egress-side base 394 of outer member 386 is associated with inner member 388.

An outer side surface 396 of outer member 386 at intake side has a conical configuration that operates in relation to an annular conically configured stationary discharge member (a stationary component) 374 to adjustably vary discharge rate, compression rate, and friction of processed waste as discharged from the compressor stationary discharge member 374. Intake-side base 392 of outer member 386 includes an opening 398 that moveable receives distal end portion 342 (egress-side) of sixth cylindrical body 310f of sixth flighting module 244f. Outer member 386 moves linearly over section 342 of sixth flighting module 244f, but also rotates with shaft 142 (due to inner member 388).

An egress-side of outer member 386 of adjustable discharge module 368 include one or more blind-holes 400 that aligned with first set of openings 403 of the inner member 388 to secure outer and inner members 386 and 388 via one or more fastener. Blind holes 400 are arranged in a circle, near periphery edge of the egress-side of outer member 386, and first set of openings 403 are arranged near periphery edge of inner member 388, away from center opening 402.

Outer and inner member 386 and 388 include central openings 404 and 402 that are concentrically arranged, with an inner wall 406 of central opening 402 of inner member 388 including an interlock structure (keyway 146) that enables the adjustable discharge module 368 to rotate with shaft 142. Central opening 404 of outer member 386 at intake side accommodates cylindrical body 310f of sixth flighitng module 244f (as well as annular flange 384 of the elongated bushing 382). Opening 404 at the egress-side accommodates bulk of inner member 388, with central opening 402 of the inner member 388 accommodating shaft 142. Interlock structure 146 allows the adjustable discharge module 368 to lock in with elongated bushing 382. Inner member 388 further includes circularly arranged second set of openings 408 near inner central opening 402 for securing intermediate assembly 376.

Intermediate assembly 376 is comprised of a hollow, cylindrical body 410 (FIGS. 8A-1 and 8A-2) with a bore 412 with an annular flange 414 at intake-side thereof that includes openings 416 that align with second set of openings 408 of inner member 388 of adjustable discharge module 368 for receiving fasteners to secure intermediate assembly 376 with adjustable discharge module 368. Annular flange 414 further functions as an enclosure at intake side for intake-side set of bearing 418 positioned between outer surface 420 of intermediate assembly 376 and actuator module 378 and also, operates to move with actuator member 378.

Cylindrical body 410 of intermediate assembly 376 includes an inner interlock structure (keyway 146) that enables intermediate assembly 376 to mount onto elongated busing 382 and to rotate with shaft 142. An outer surface 420 of the cylindrical body 410 at egress-side includes a threaded section 422 that secures a nut 424 (FIGS. 8B-1 and 8B-2) to enclose egress-side set of bearings group 426 associated with outer surface 420 of intermediate assembly 376 and actuator module 378 so that the bearings 426 do not slip out, with the bearings 418/426 prevent actuator member 378 from rotating with shaft 142.

Figure 6A:
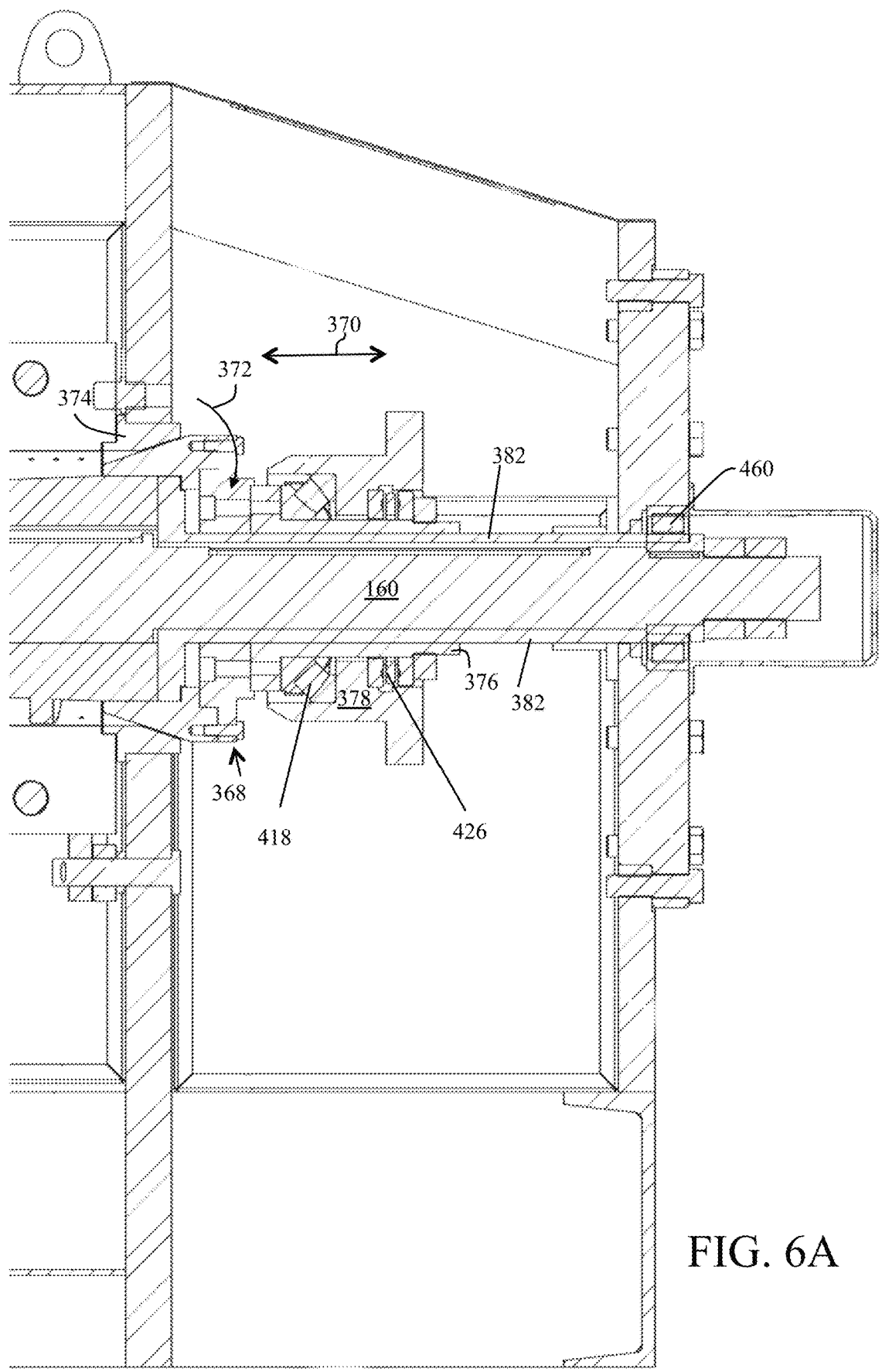
Figures 1, 6B:
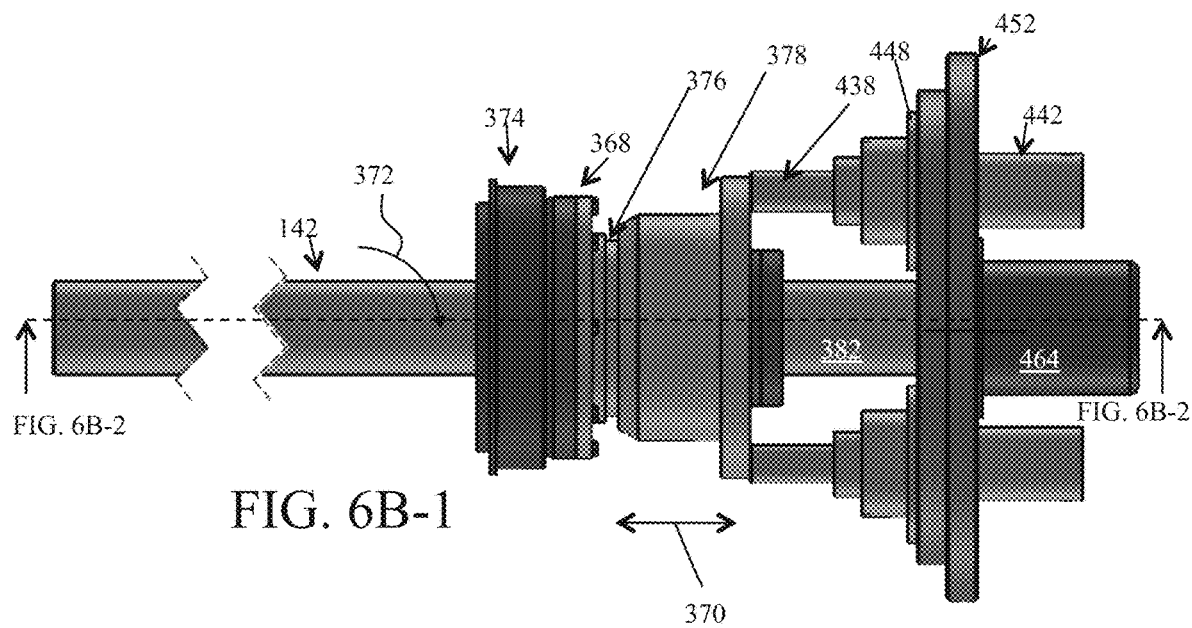
Figures 2, 6B:
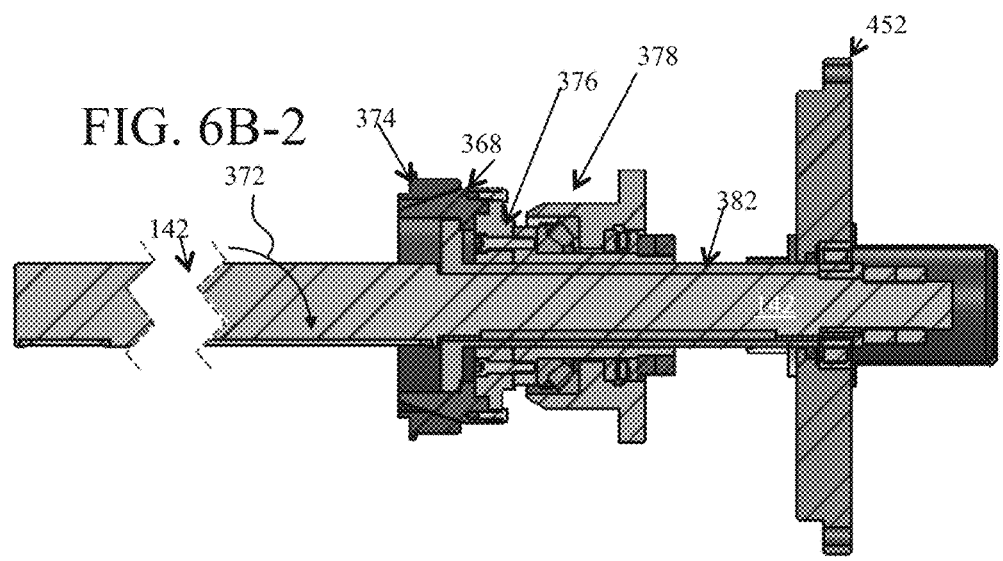
Figures 1, 6D:
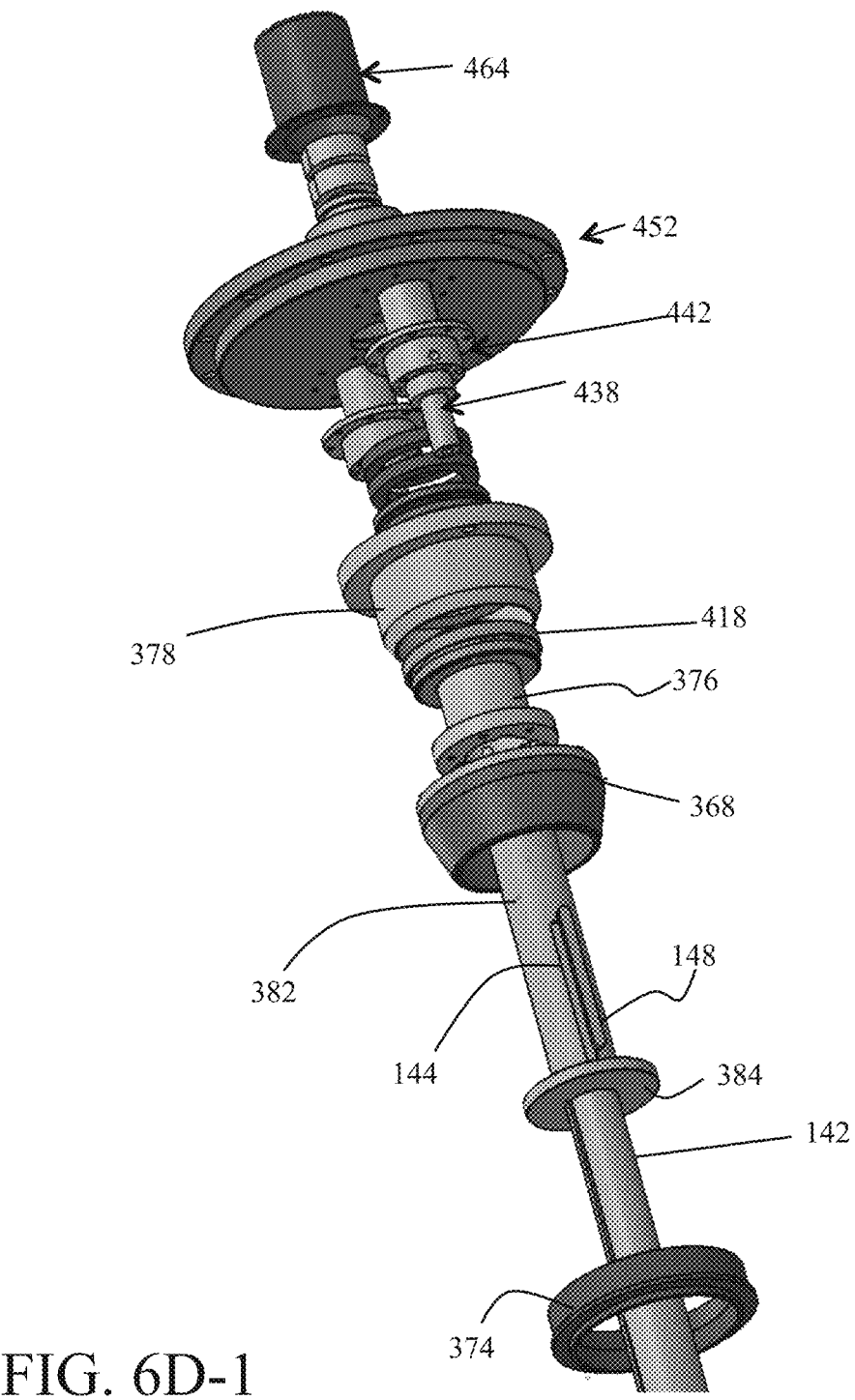
Figures 2, 6D:
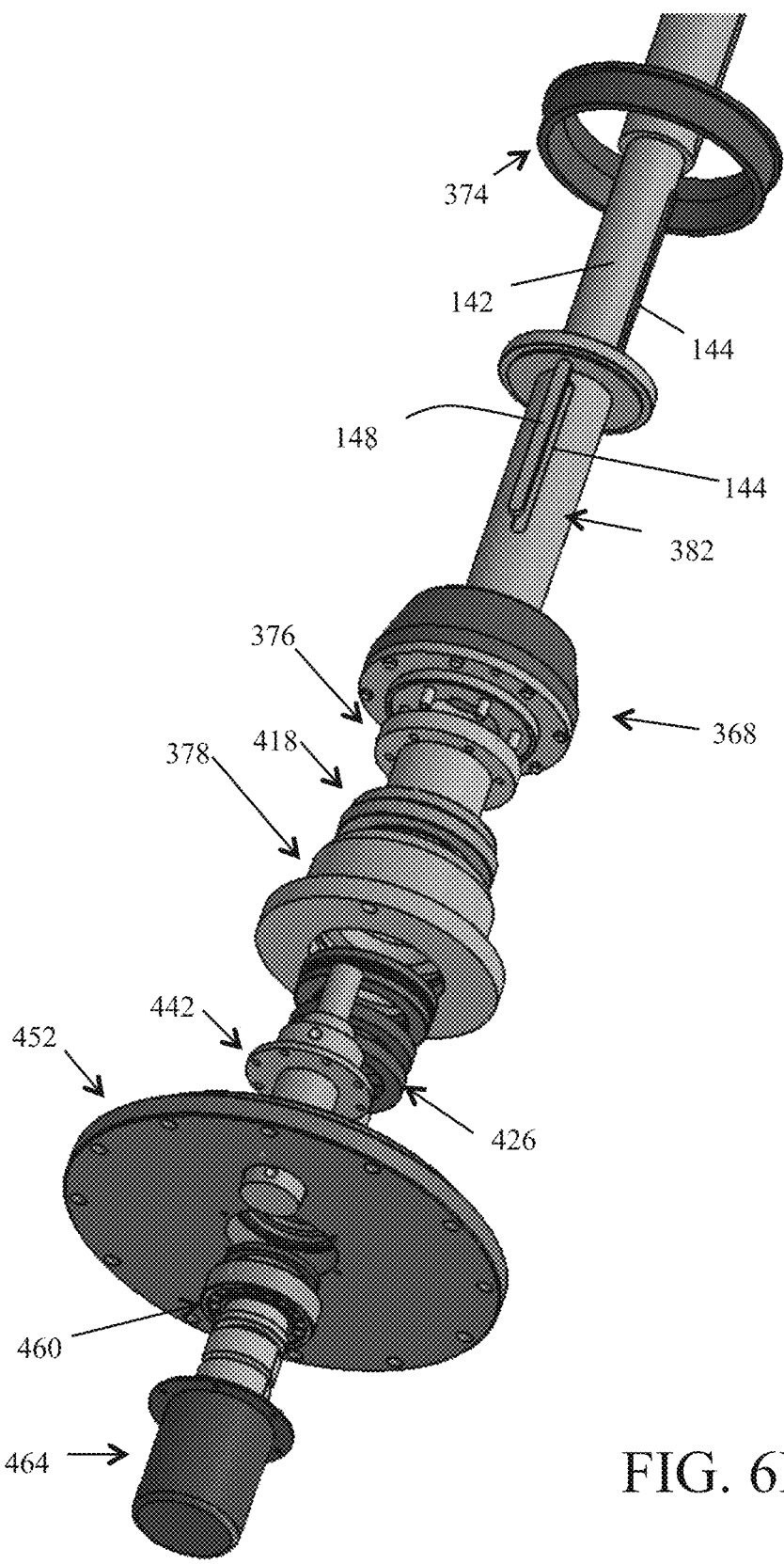
Figures 1, 6F:
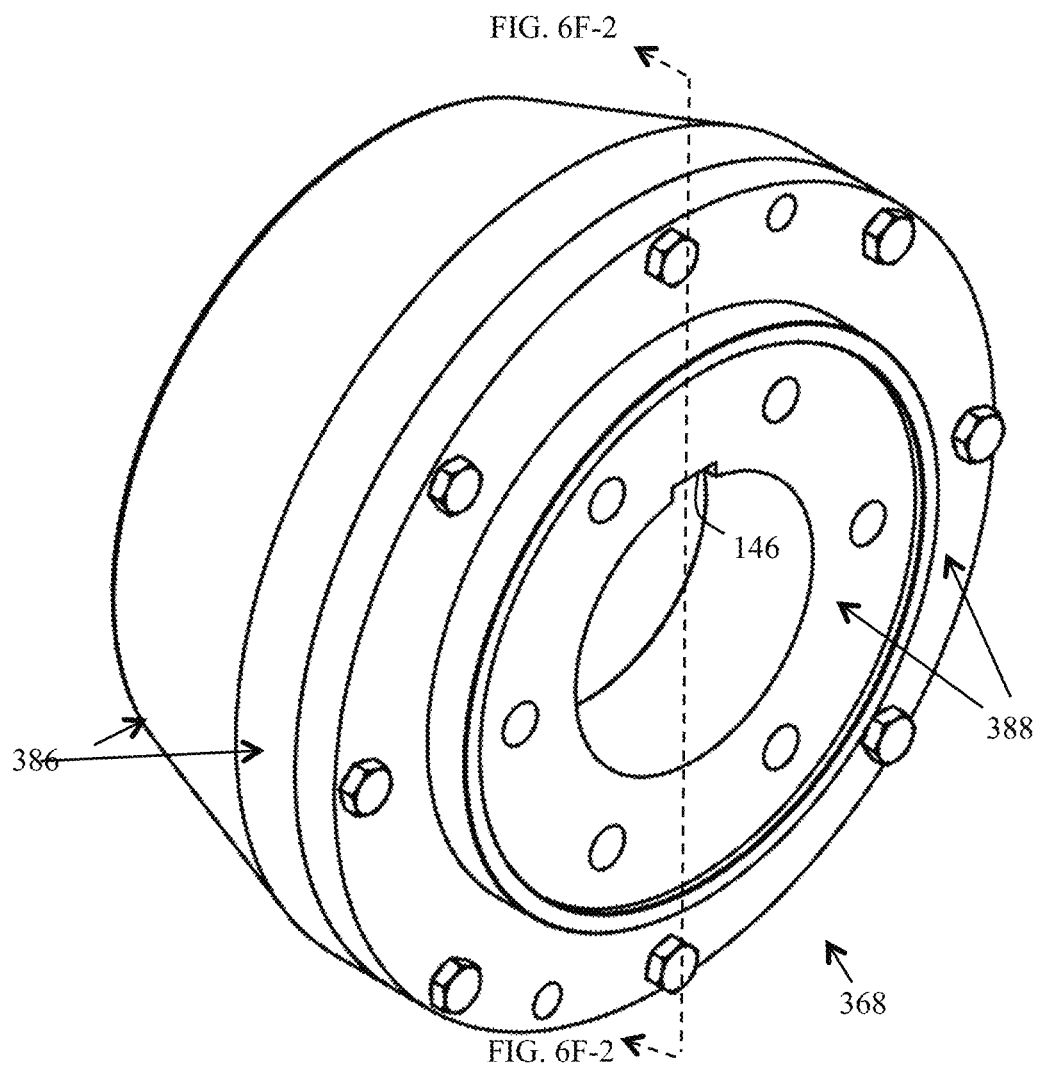
Figures 2, 6F:
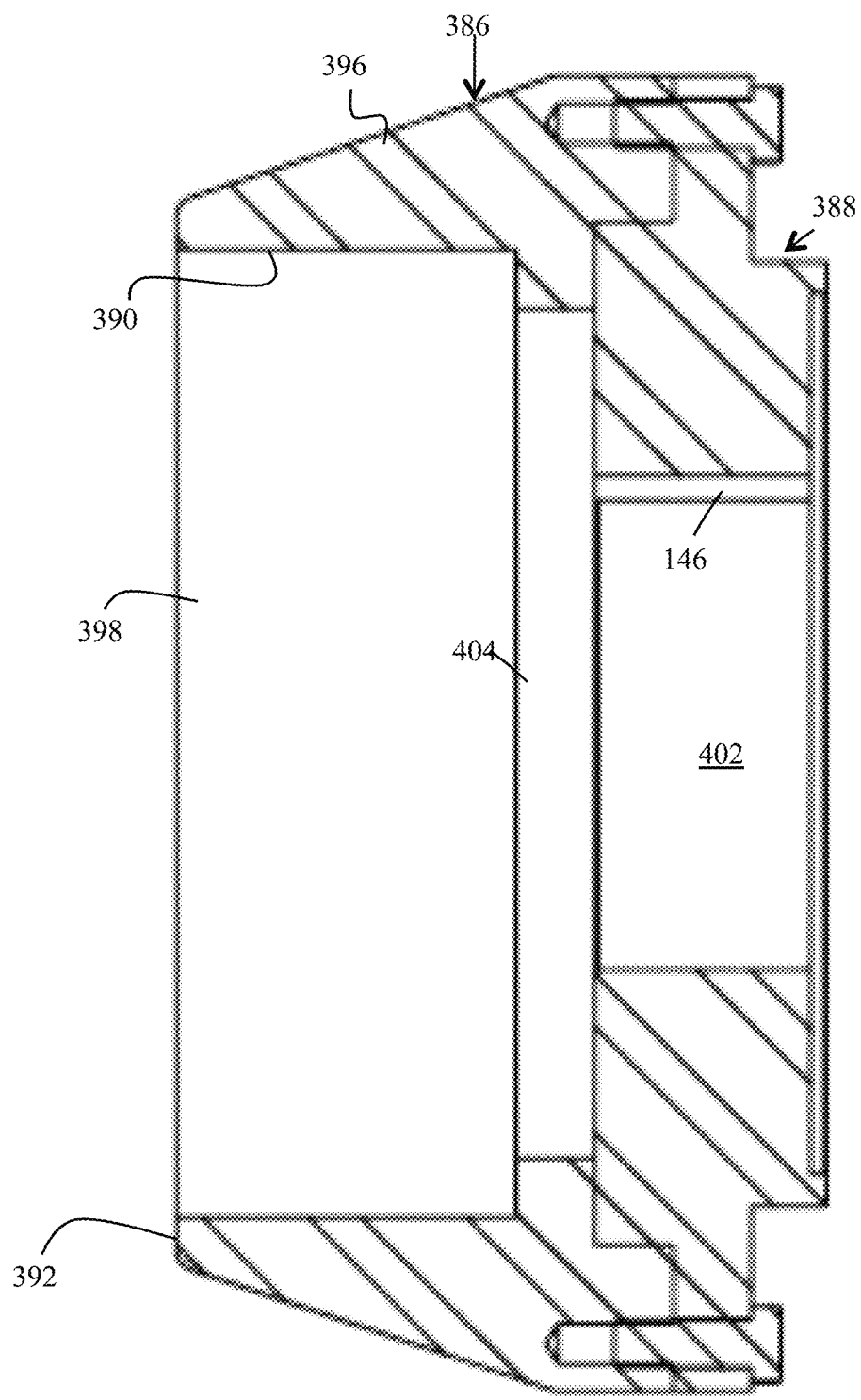
Figures 3, 6F:
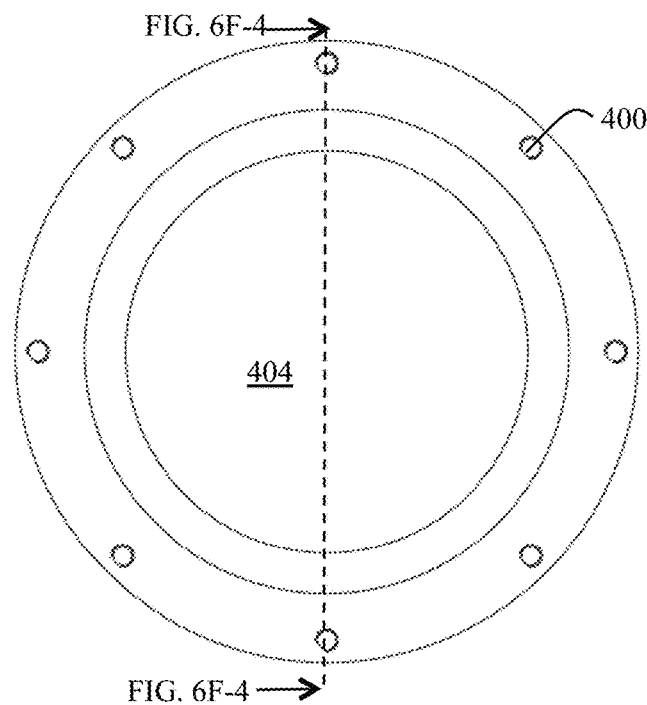
Figures 4, 6F:
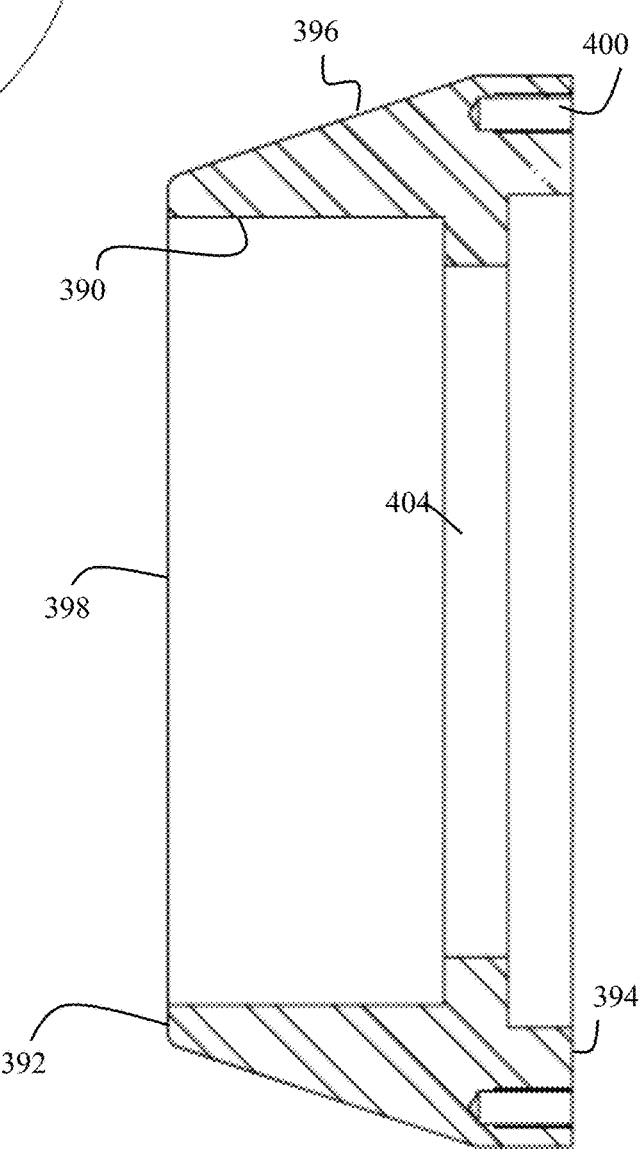
Figures 5, 6F:
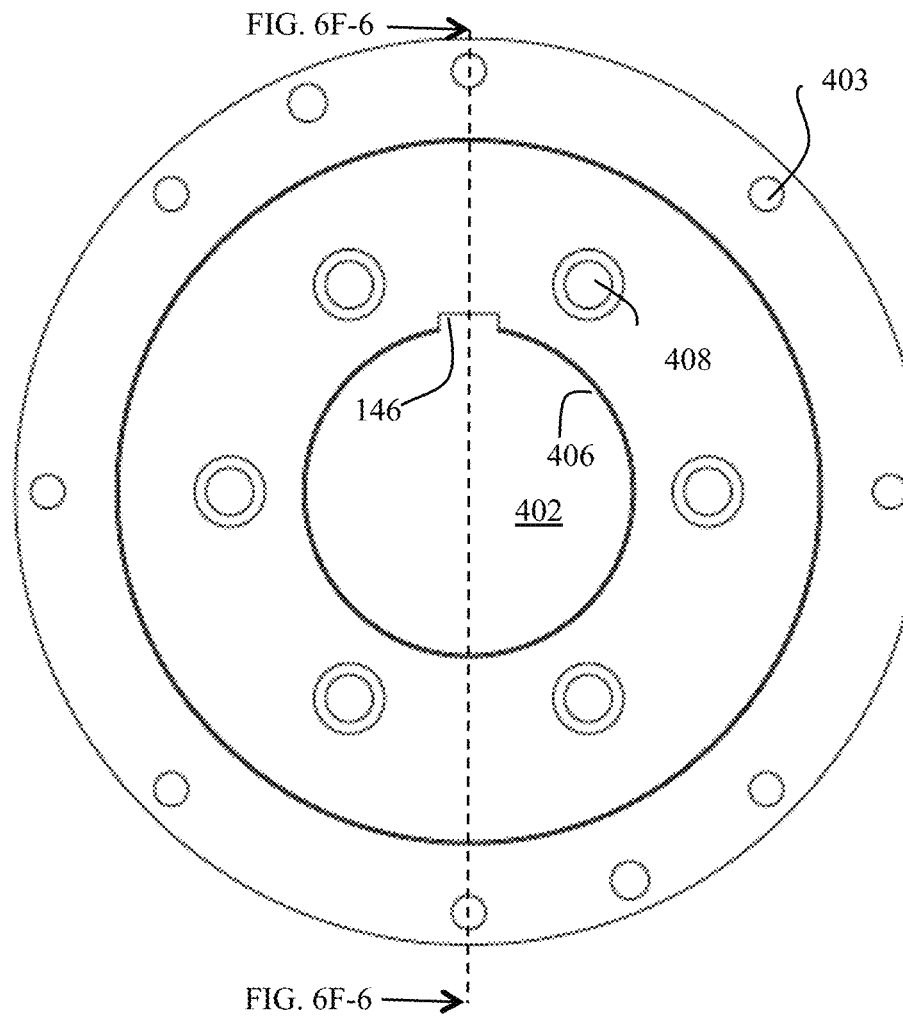
Figures 6, 6F:
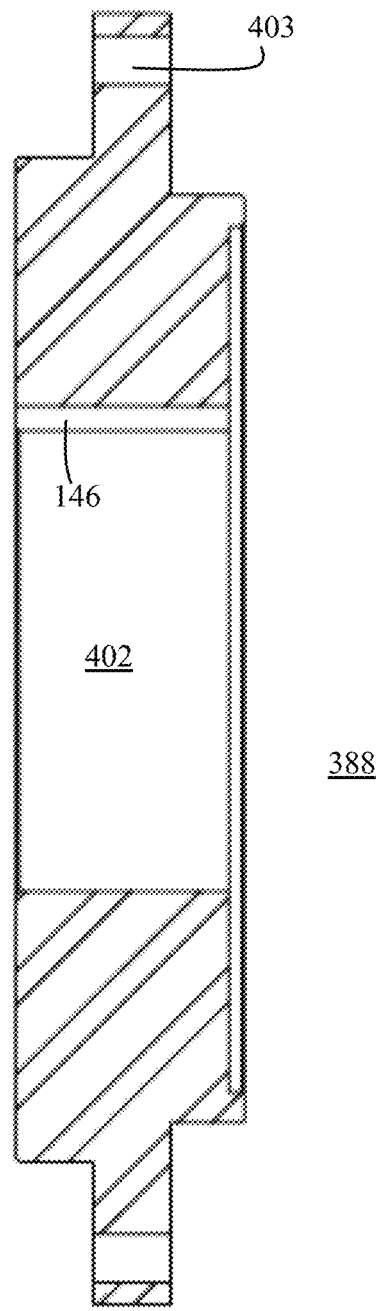
Figures 1, 7A:
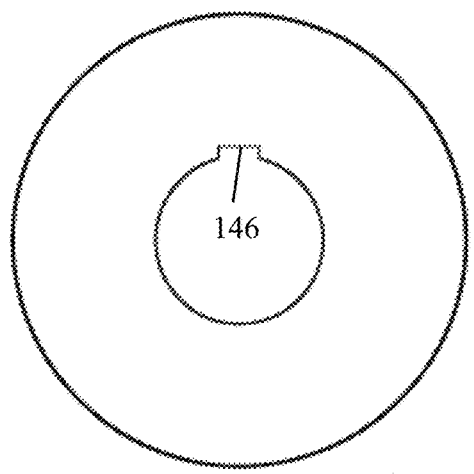
Figures 2, 7A:
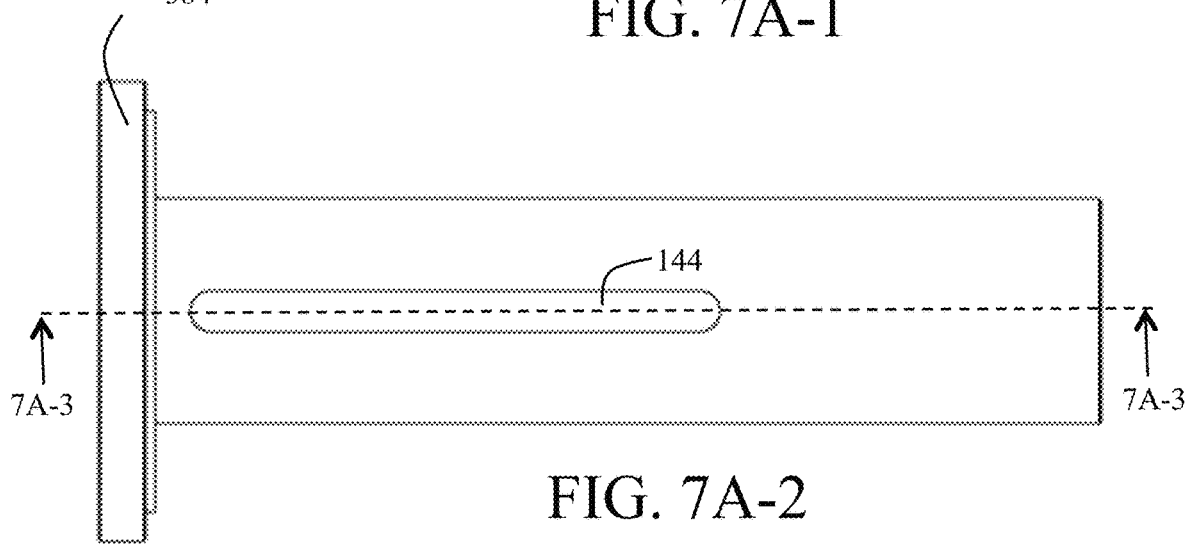
Figures 3, 7A:
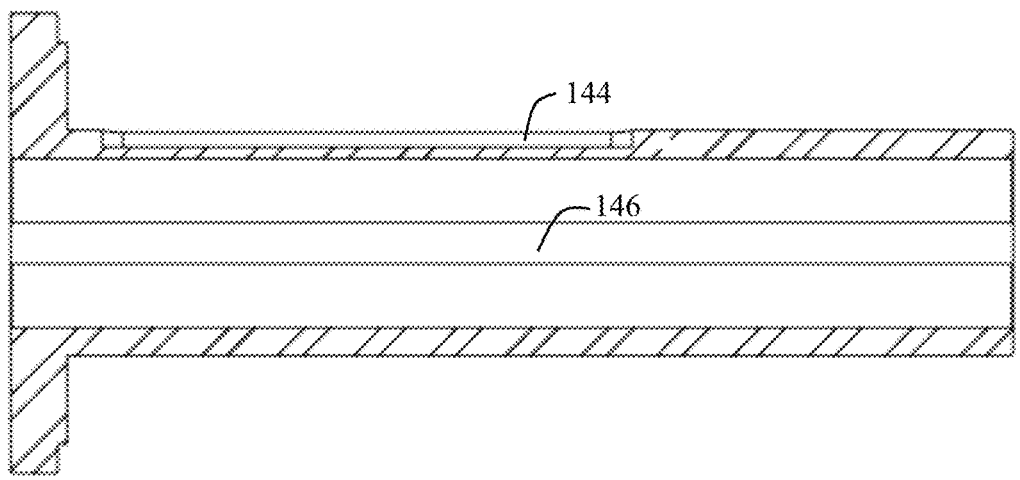
Figures 1, 8A:
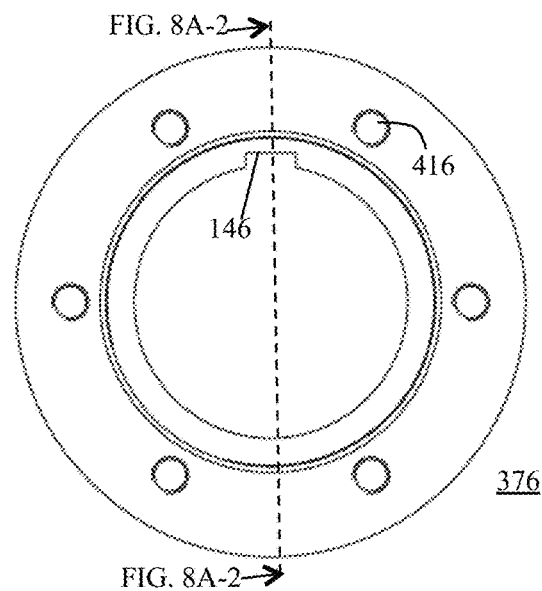
Figures 2, 8A:
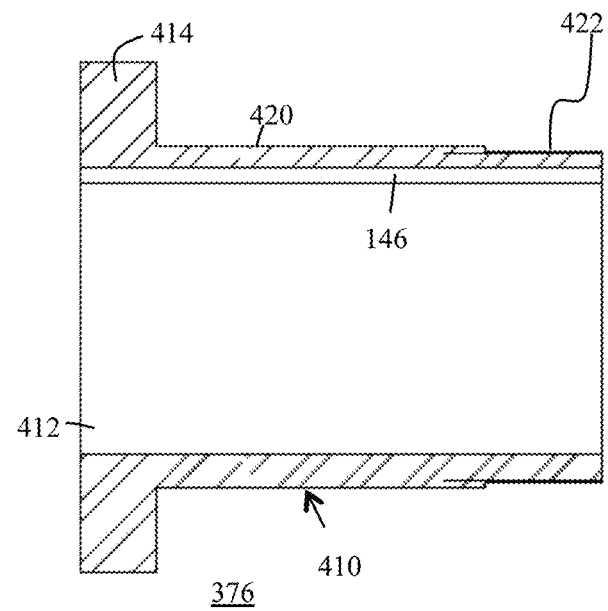
Figures 1, 8B:
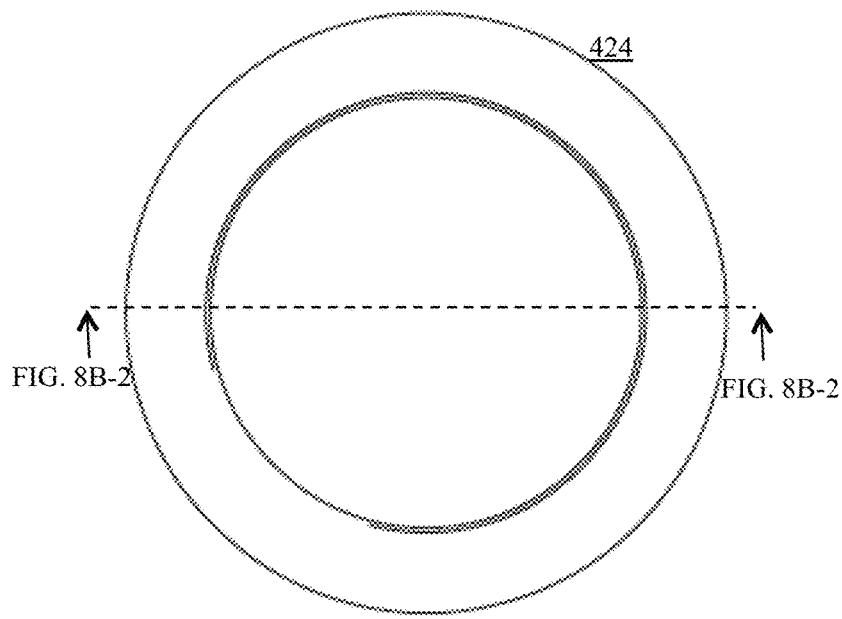
Figures 2, 8B:
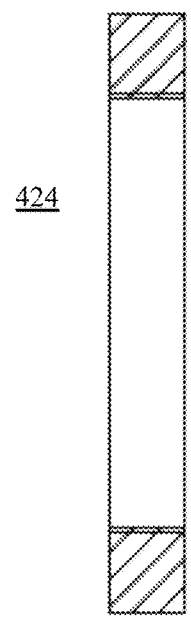
Figures 1, 9A:
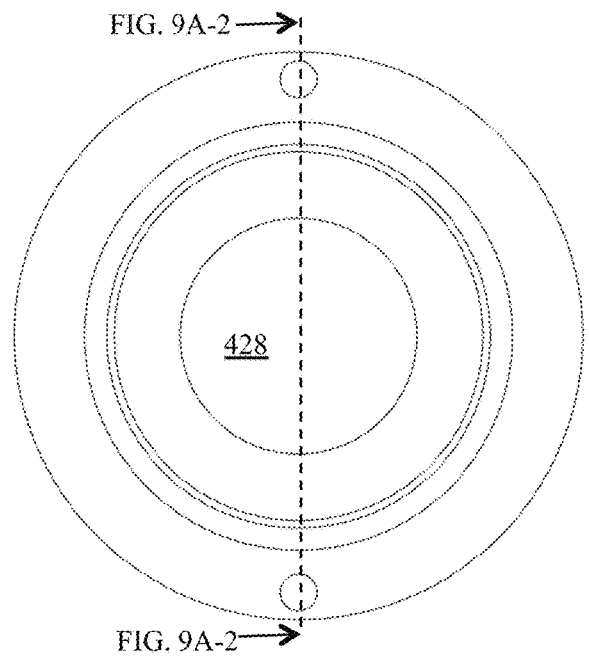
Figures 2, 9A:
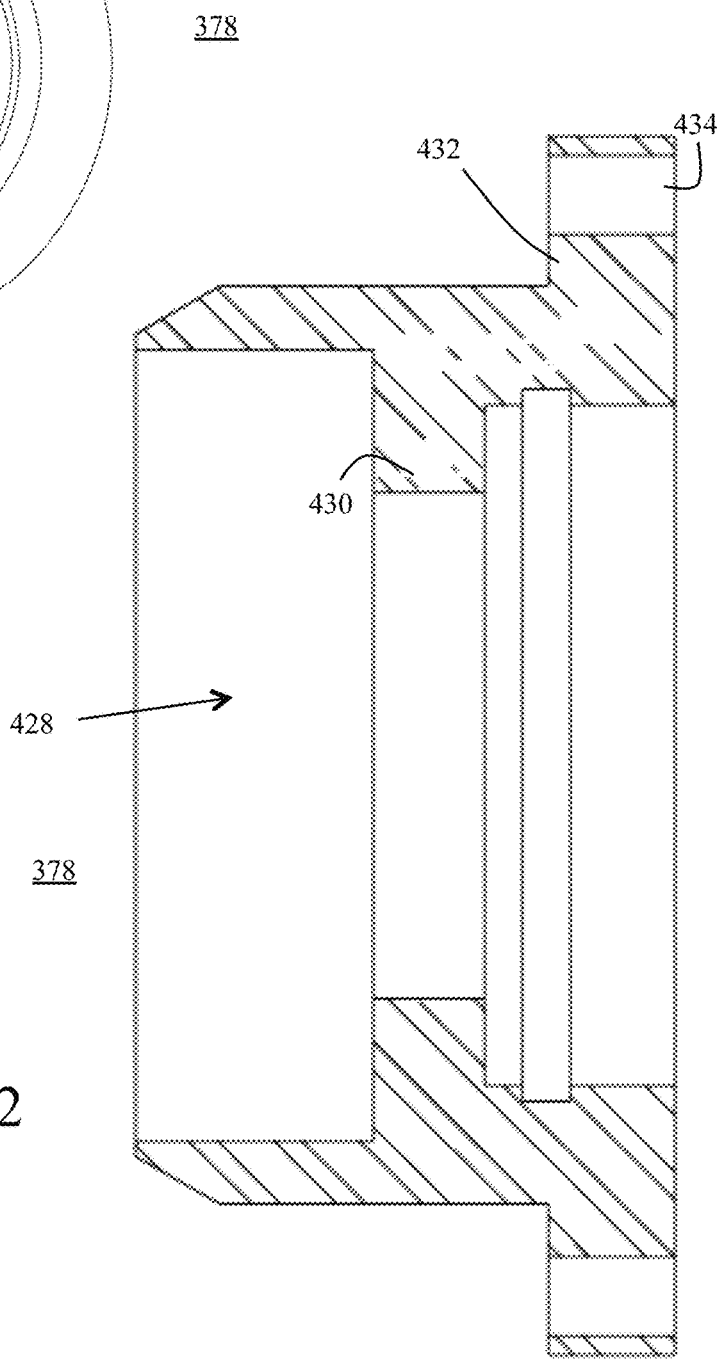
Figure 10A:
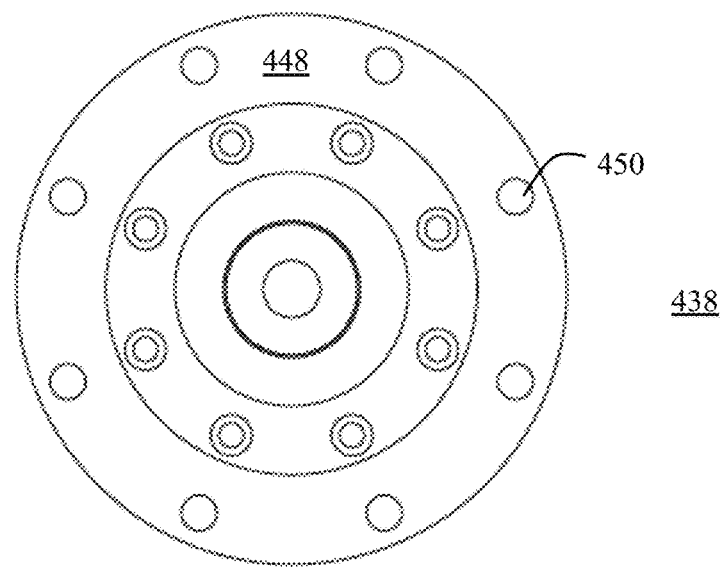
Figure 10C:
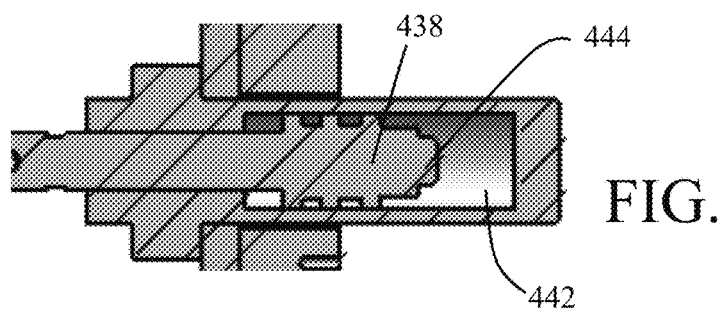
Figure 10B:
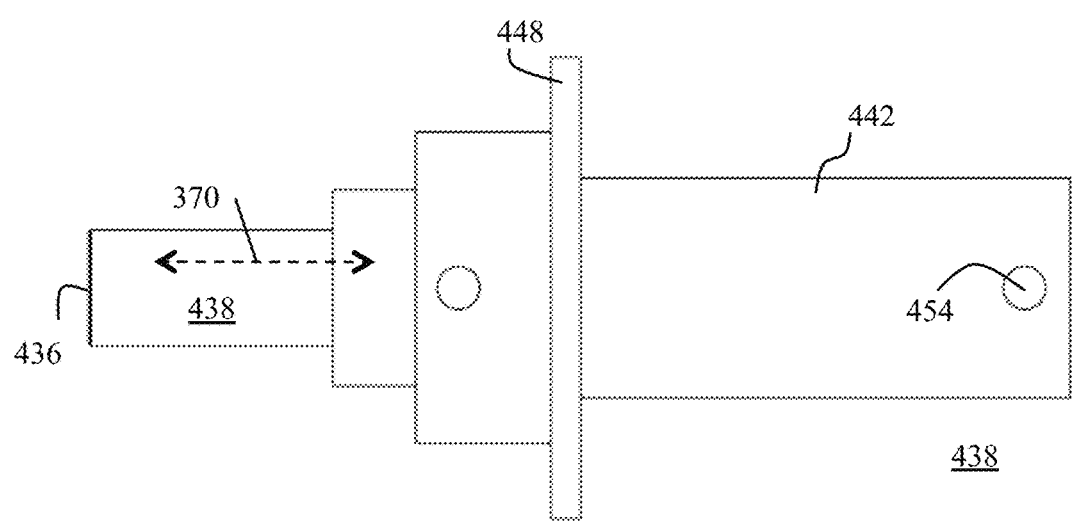
Figure 11A:
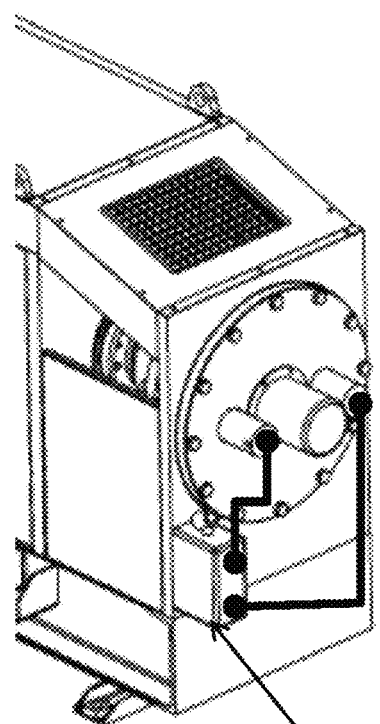
Figure 11B:
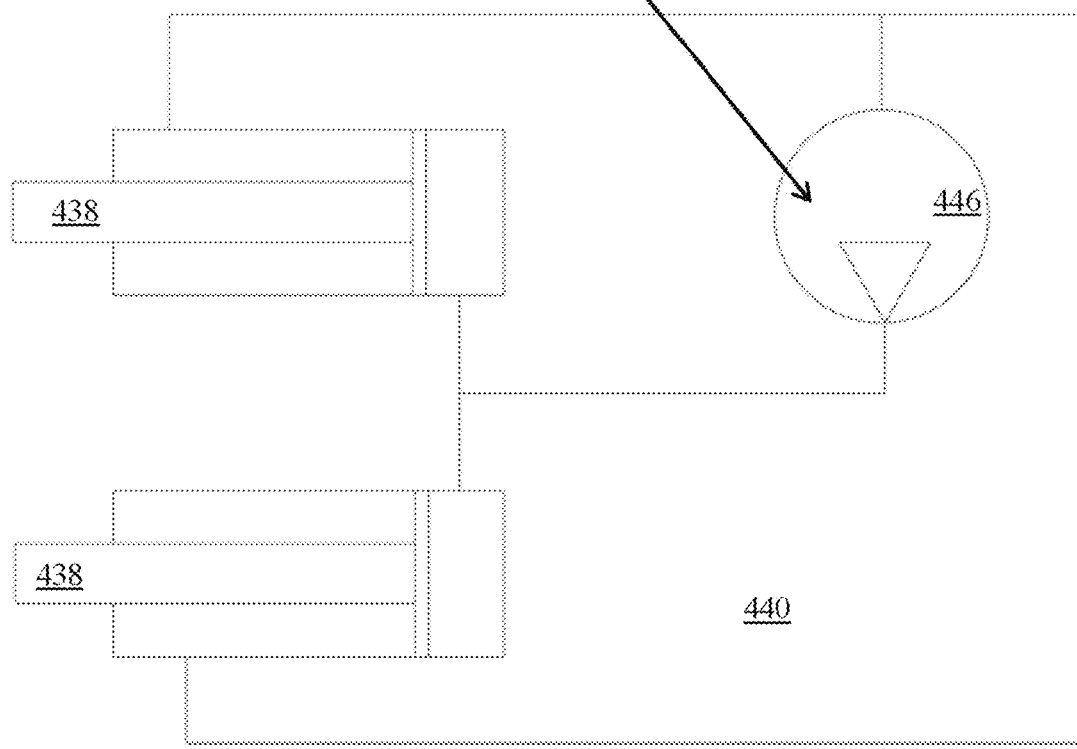
Figure 12A:
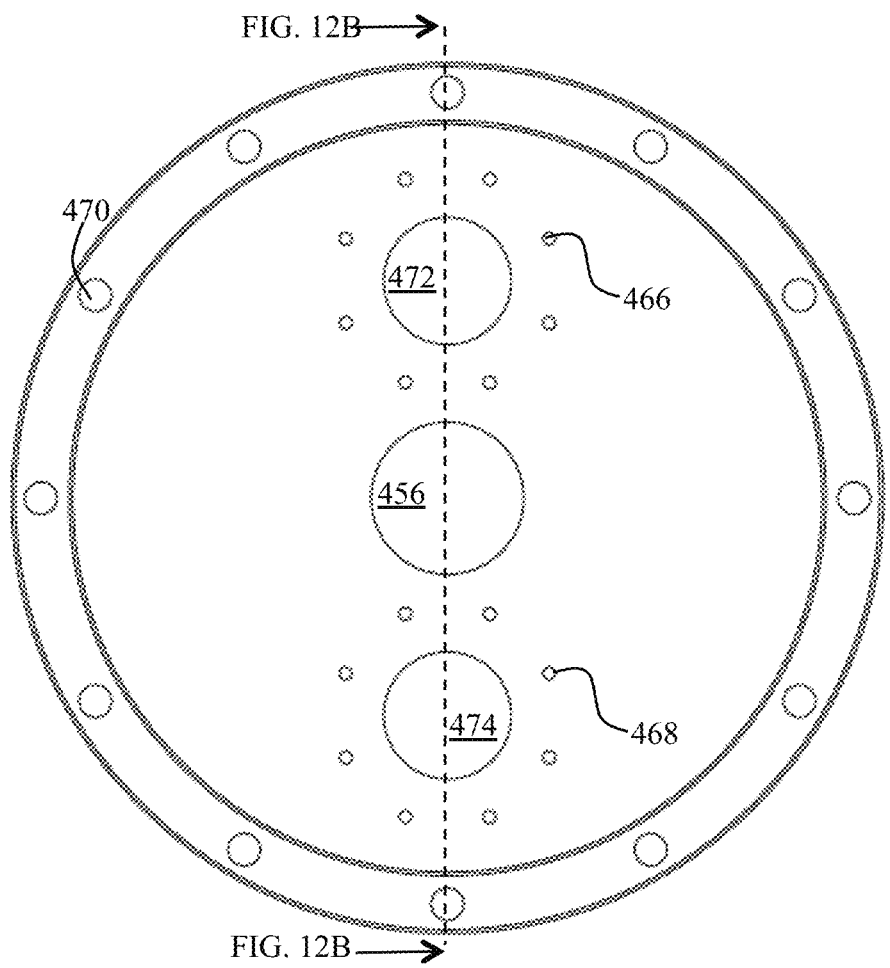
Figure 12B:
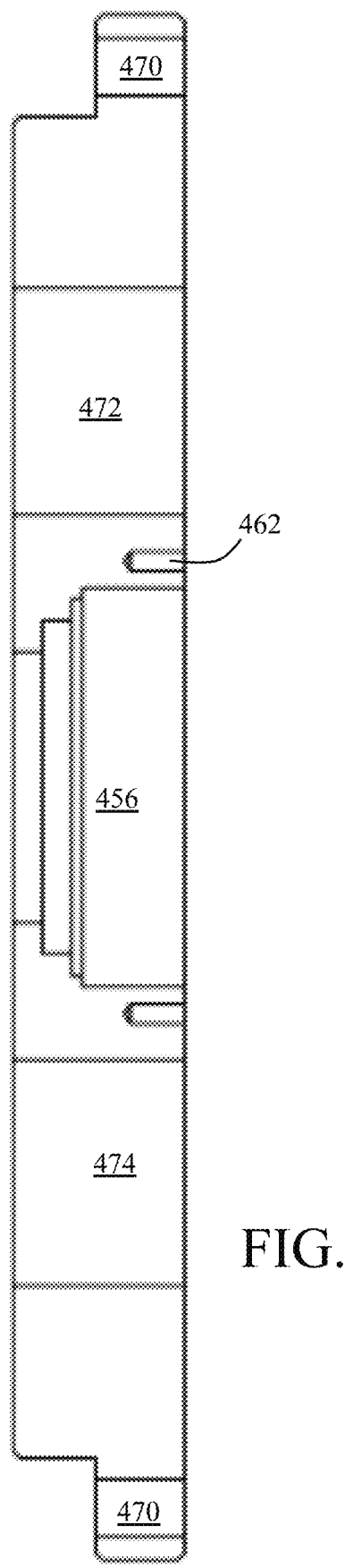
Figure 13A:
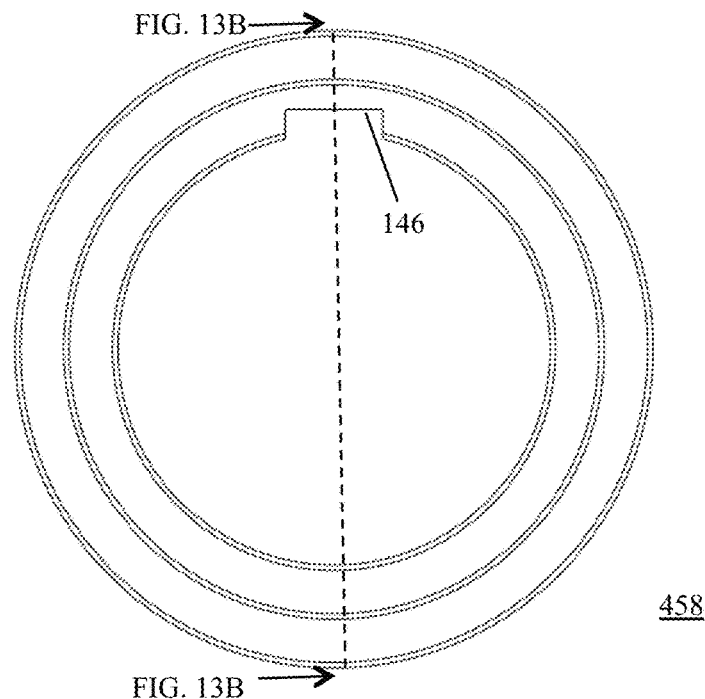
Figure 13B:
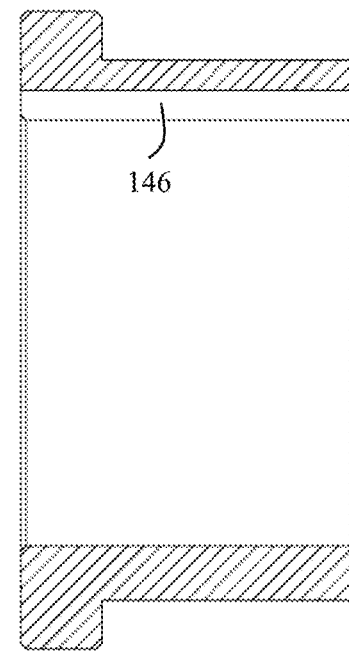
Figure 14A:
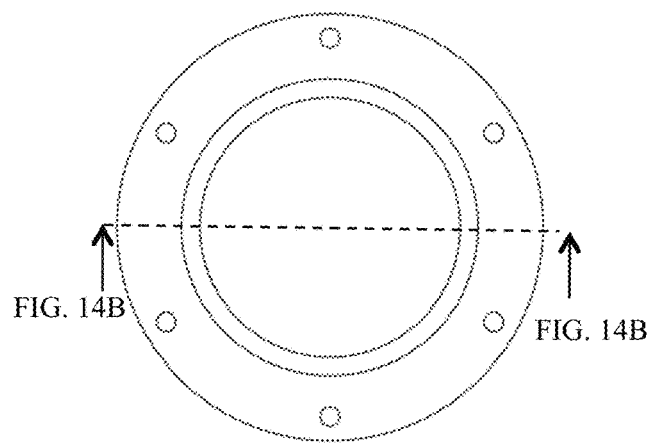
Figure 14B:
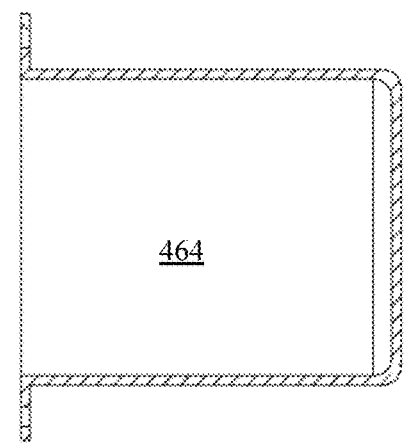
Figure 15A:
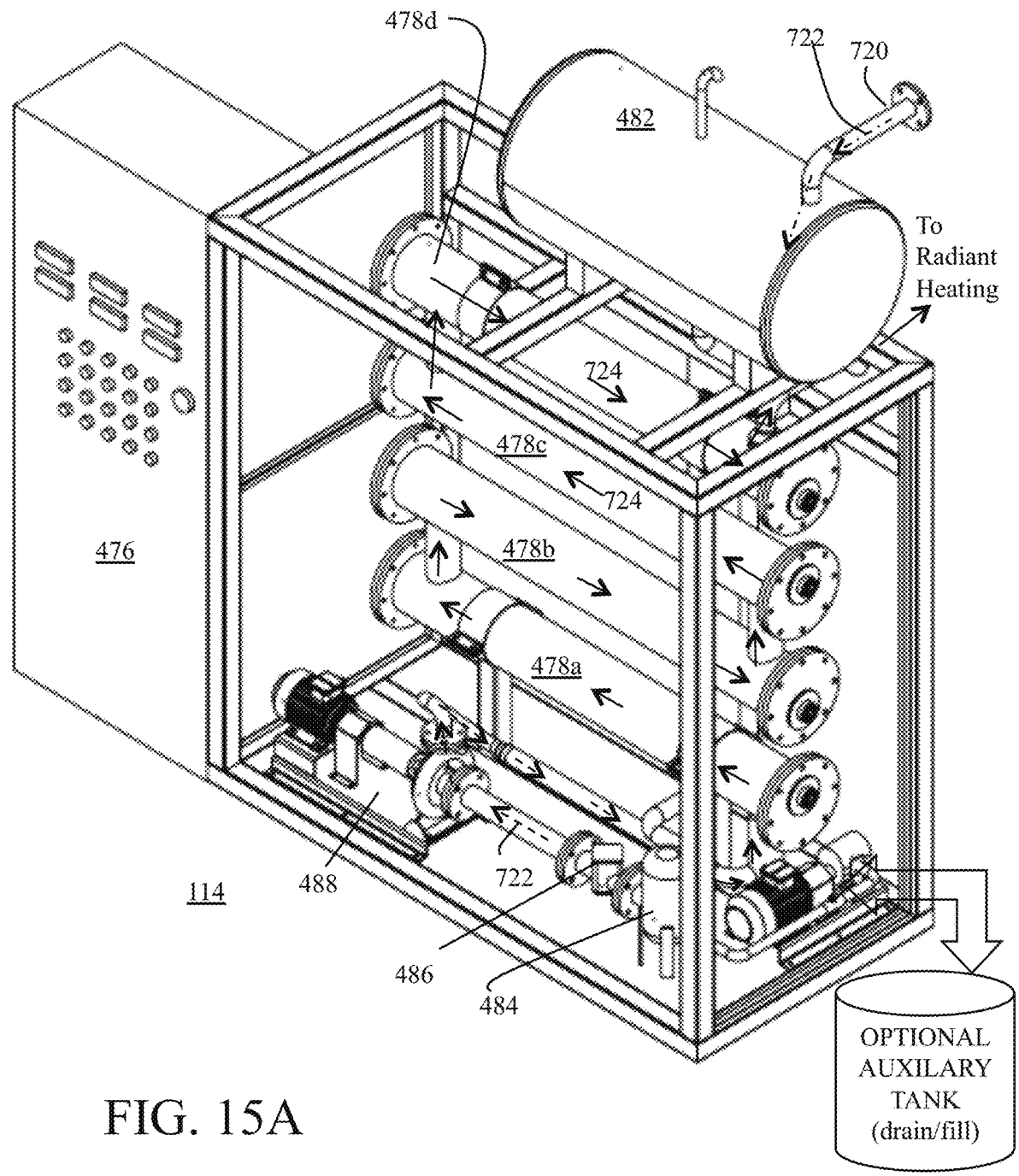
Figure 15B:
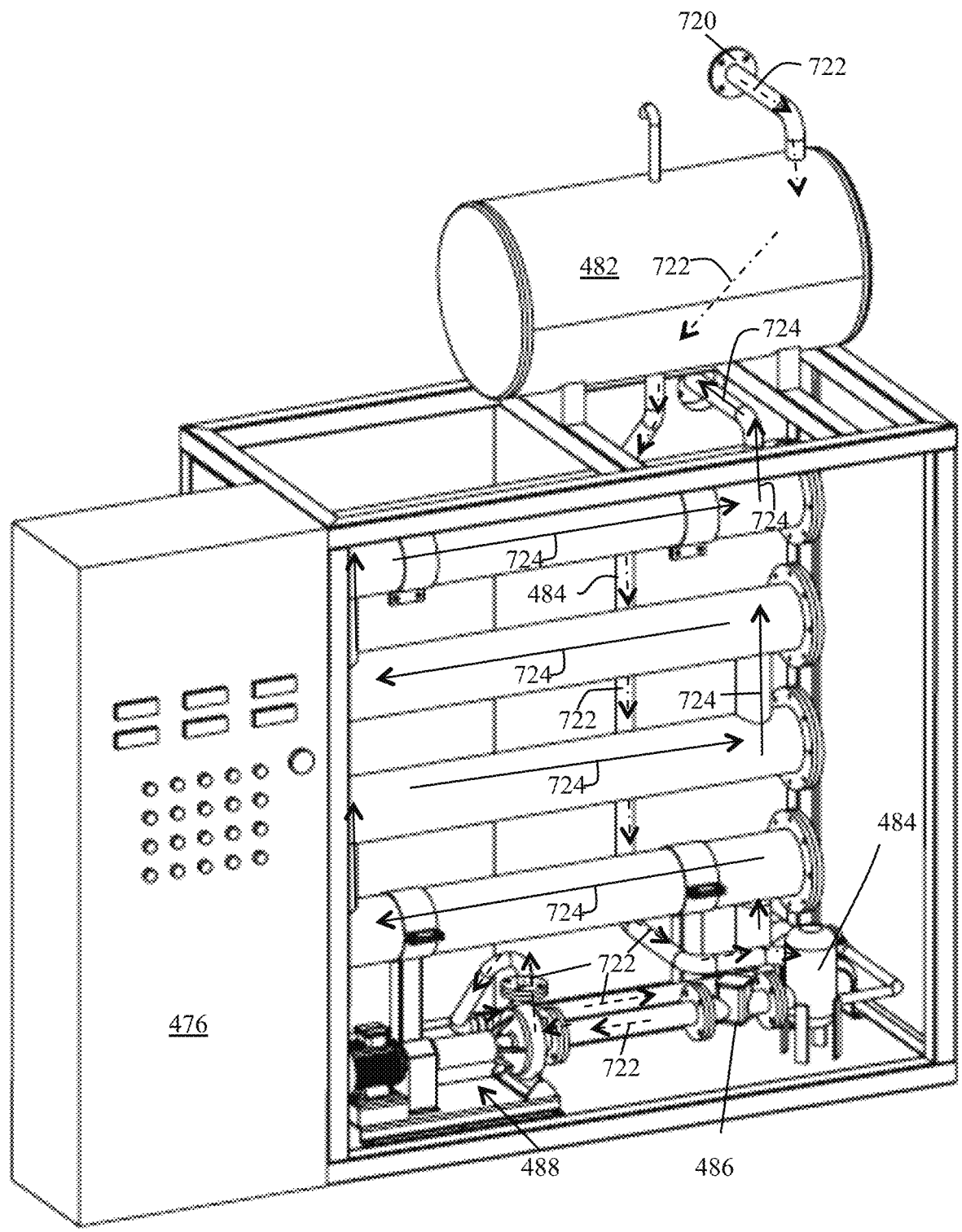
Figure 15C:
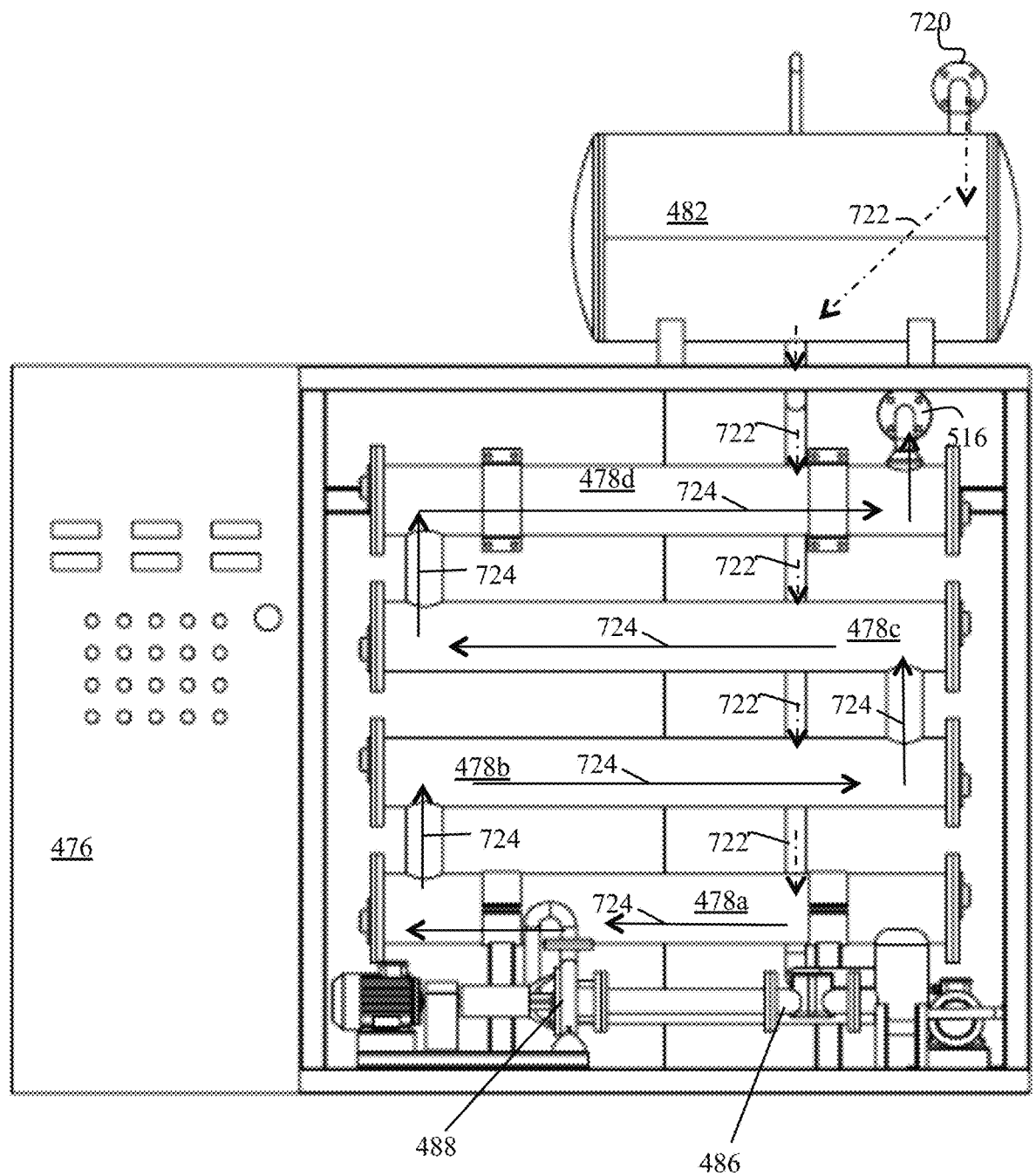
Figure 15D:
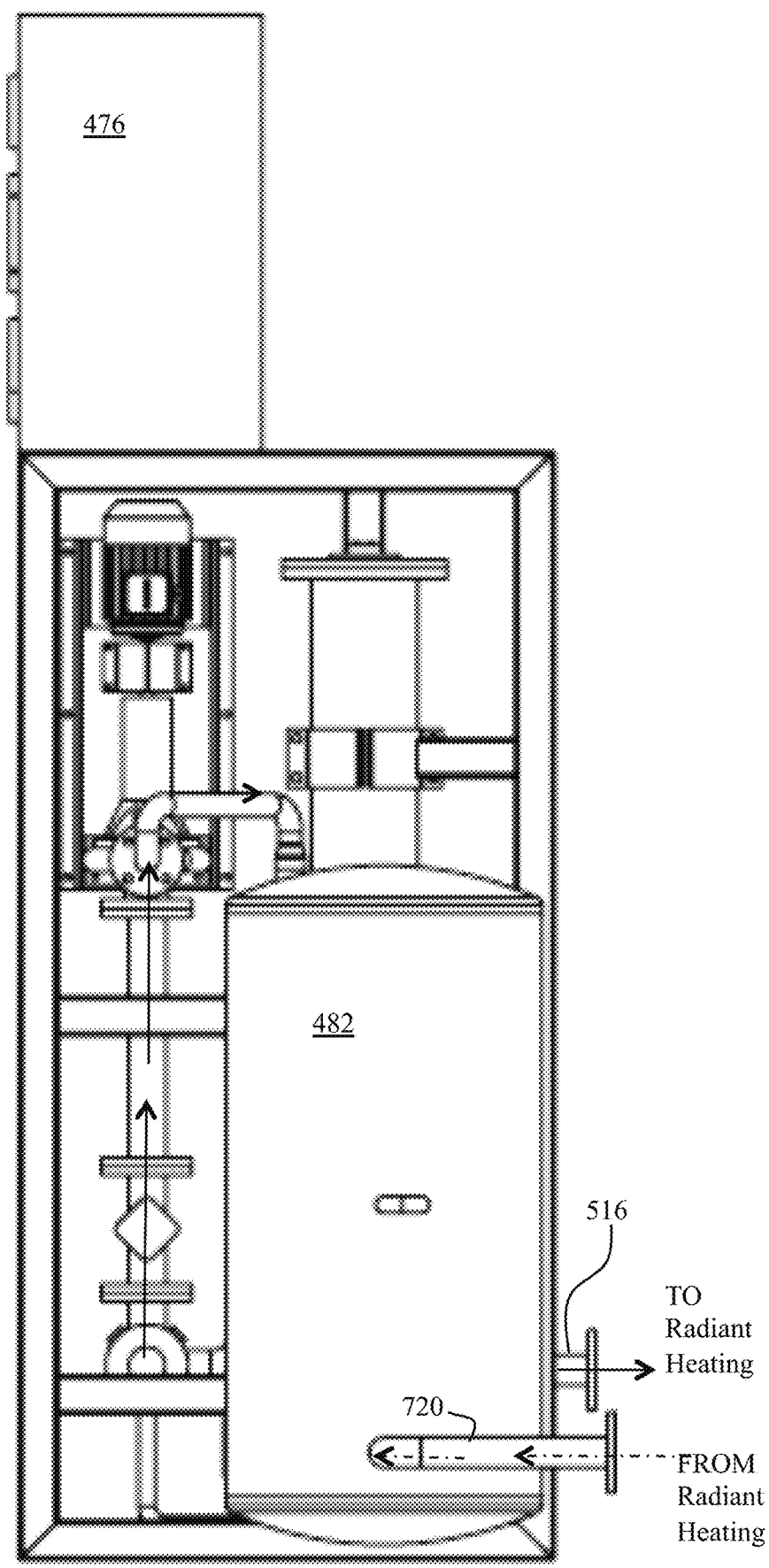
Figure 15E:
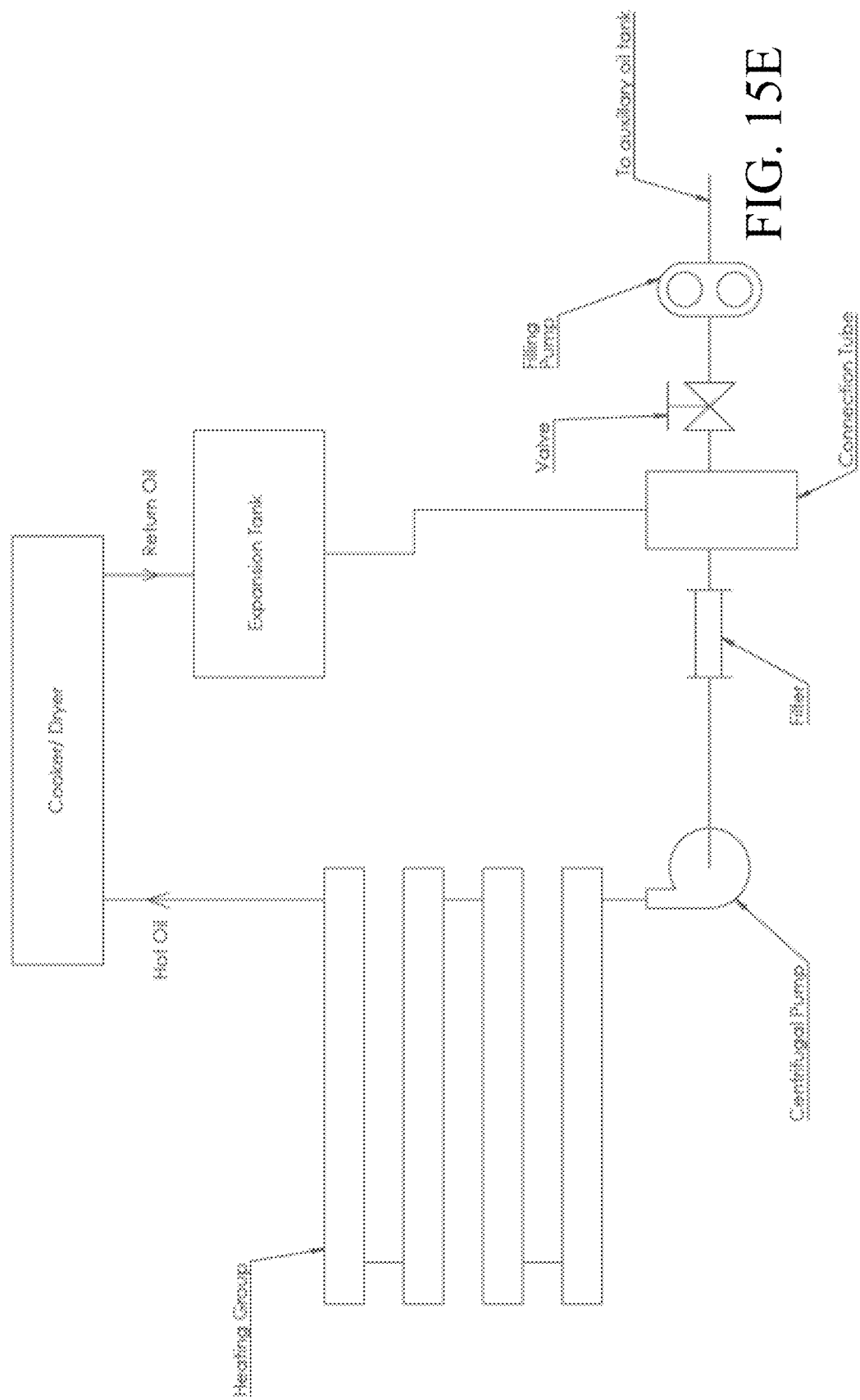
Figure 16B:
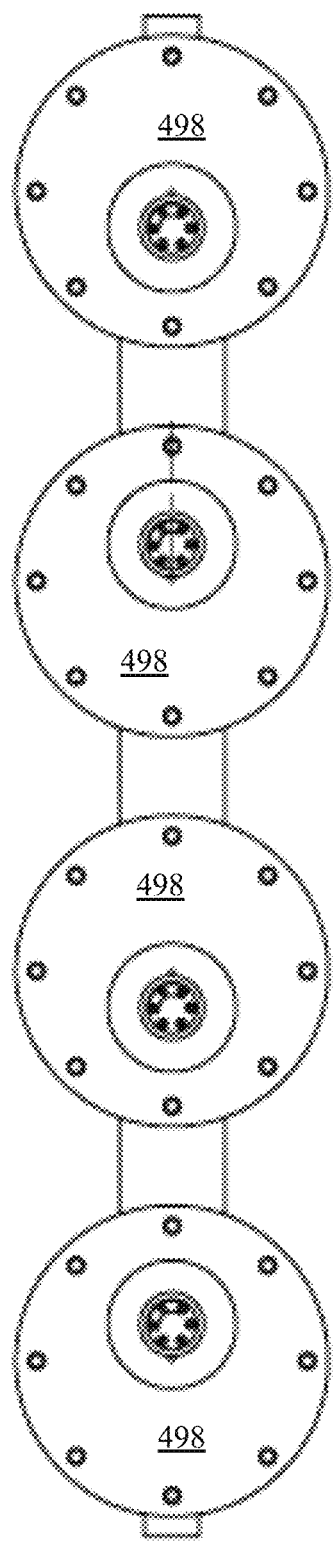
Figure 16C:
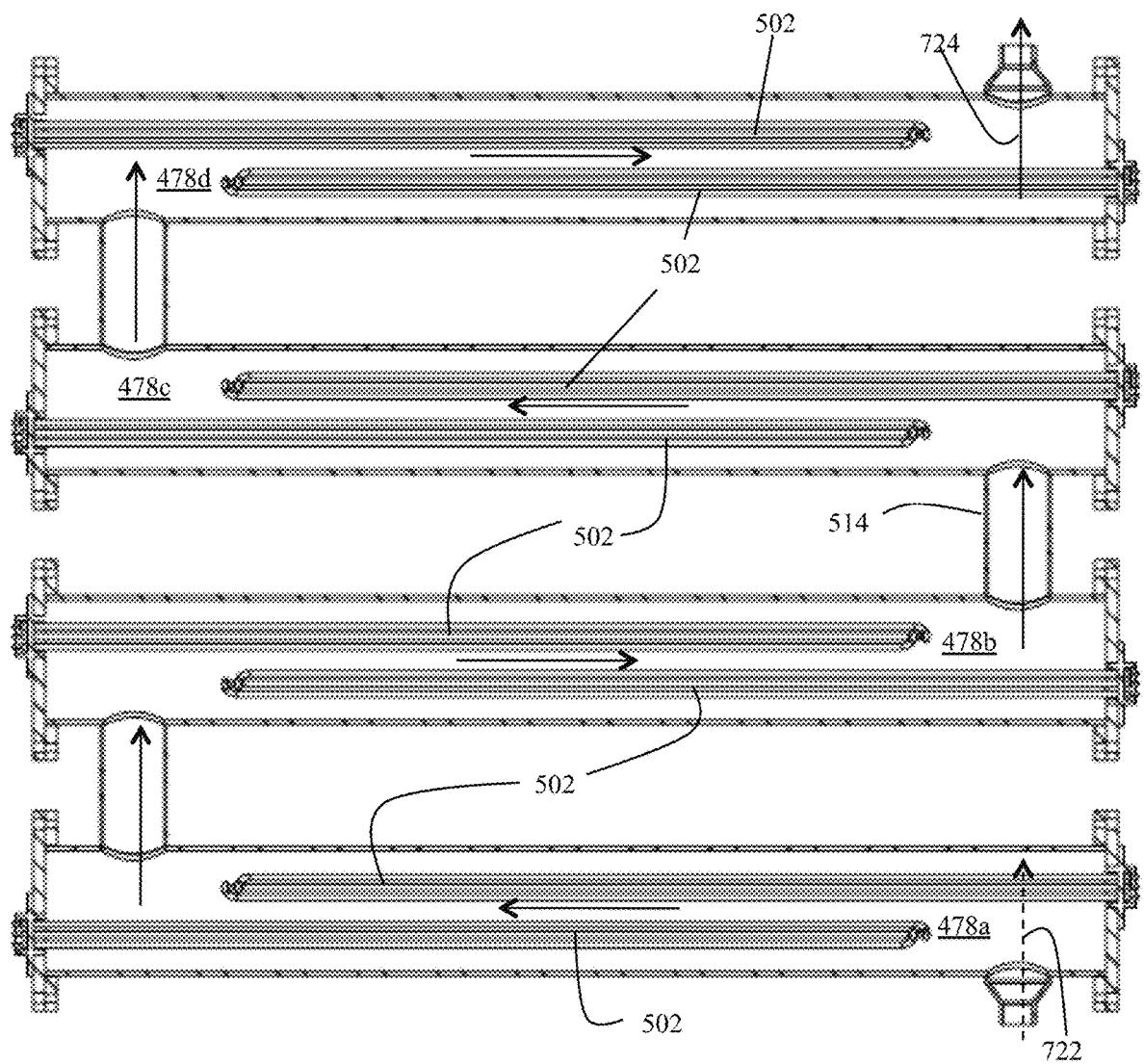

Actuator module 378 is comprised of an opening 428 (FIGS. 9A-1 and 9A-2) that accommodates shaft 142, elongated bushing 382, and cylindrical body 410 of intermediate assembly 376, including egress side bearing group 418 and 426 (FIG. 6A). An inner flange 430 that functions as divider wall and support for the first and second bearing set 418 and 426, and an externally extending annular flange 432 with two openings 434 that receive connecting ends 436 of drive pistons 438 of the egress-side motive force generator 440 to move actuator module 378 along a reciprocating linear path 370.

It should be noted that actuator member 378 is associated with intermediate assembly 376 by the egress bearings group 418 and 426 and hence, it does not rotate with intermediate assembly 376 but merely moves linearly. As actuator member 378 is moved linearly, it also moves intermediate assembly 376 linearly through the physical contact of bearings 418 with annular flange 414 of intermediate assembly 376 and inner flange 430 of actuator module 378 and the physical contact of the egress-side bearing 426 with nut 424 of intermediate assembly 376 and inner flange 430 of actuator module 378.

Egress-side motive force generator 440 (FIGS. 10A to 11B) is comprised of pistons 438 within cylindrical housing 442. Pistons 438 have an intake-side end 436 that connect with actuator module 378, and a free egress-side end 444 that resides within cylinder housing 442, with pistons 438 moving linearly as fluid is pumped or removed from cylinder housing 442 by a hydraulic pump 446 to push or retract pistons 438 in well known manner. As pistons 438 are made to move linearly, they push/pull actuator member 378, which in turn, push/pull intermediate assembly 376 to push/pull the adjustable discharge assembly 368.

Cylinder housing 442 further include an annular flange 448 extending from egress side cylinder housing 442. Annular flange 448 of cylinder housing 442 includes a set of circularly arranged openings 450 for connection with intake side of egress side cover 452. Egress-side distal end of the cylinder housing 442 extend out of the egress side cover 452 as shown, and includes an opening 454 to receive fluid pump.

The egress-side cover 452 (FIGS. 12A and 12B) includes a central opening (a through-hole) 456 through which egress-side distal end 302 of shaft 142 extends out of frame 152. Central opening 456 further houses bushing 458 of the bearings 460 (with bushing 458 shown in FIGS. 13A and 13B, with the busing 458 having a cylindrical body with a bore having an interlock structure (keyway 146). This way, bushing 458 rotates while bearing 460 protect the walls of central opening 456.

A first set of circularly arranged openings (through-holes) 462 near around central opening 456 (at egress side of cover 452) that secure cap 464 (FIGS. 14A and 14B) to cover 452 for covering or capping of egress-side end 302 of shaft 142. Further included are a second and third set of circularly arranged openings 466 and 468 (at intake side of cover 452) positioned laterally in relation to central opening 456 for securing cylindrical housing 442 of the pistons 438 to intake side of cover 452. A fourth set of circularly arranged opening 470 around central opening 456, near periphery edge of egress-side cover 452 for securing cover 452 to frame 152 by a corresponding number of fasteners. The openings 472 and 474 are for receiving piston housings 442.

As further indicated above in relation to FIGS. 1A to 1D, TWPS 100 further includes a third stage that includes a third module or unit and a fourth module or unit, with the third module of the third stage including a third mechanism (heat generator) 114 that generates heat for the fourth module. Fourth module including a fourth mechanism (radiant heat device 116) that receives the partially dehydrated, dense, and heated material from single chamber, longitudinally extending multi-phase adjustable compressor 108, and further heats and aerates material by mixing to generate dehydrated, dry material.

FIGS. 15A to 19B are non-limiting, exemplary illustrations that detail a heat generator in accordance with one or more embodiments of the present invention. As illustrated in FIGS. 1A to 19B, the third mechanism is a heat generator 114 comprising a well-known electronic module (enclosed within cabinet 476) that control power to well-known motors and pumps for circulating heated medium (heat delivery medium such as heated oil, steam, etc.) through one or more heater chambers 478 in addition to a radiant heat device 116.

Heat generator 114 includes an expansion tank 482 that includes cooled-off medium returned from radiant heating device 116 (via tube 720). The cooled-off medium (illustrated by broken arrows 722) is re-circulated from expansion tank 482 into a connection tube 484 into a filter 486 to generate a filtered, but still cooled-off medium 722.

The filtered medium 722 is pumped via a motor-pump module 488 into one or more heater chambers 478 (shown by solid arrows 724) and reheated, and returned to radiant heating device 116 (via outlet tube 516 shown in FIG. 15D) from the final heater chamber 478d of the one or more heater chambers 478. One or more heater chambers 478 are hollow and cylindrical (shown in FIGS. 16A to 17B), allowing free flow of medium therein. Distal ends of the one or more heater chambers 478 are comprised of an annular flange 490 that extends from outer surface 492 of each one or more the heater chambers 478 and has a central opening 494 that includes a first set of one or more fastener opening 496 arranged in circle around the central opening 494.

An enclosure 498 that is detachably coupled with annular flange 490 includes an eccentric opening 500 for receiving a connecting end 504 of an elongated heating element 502. The eccentric opening 502 is to allow room for elongated heating elements 502 so that they do not contact one another. One or more second set of fastener opening 506 arranged in circle near a periphery edge that are used to fasten the enclosure 498 with annular flange 490.

One or more heater chambers 478 includes a length 508 that extends along the heater chamber longitudinal axis 510, and width 512 that extends along heater chamber 478 transverse plane. Heater chamber 478 is associated with a next heater chamber by a connecting chamber 514 that connects egress opening of a heater chamber to an ingress opening of the next heater chamber.

Figure 19A:
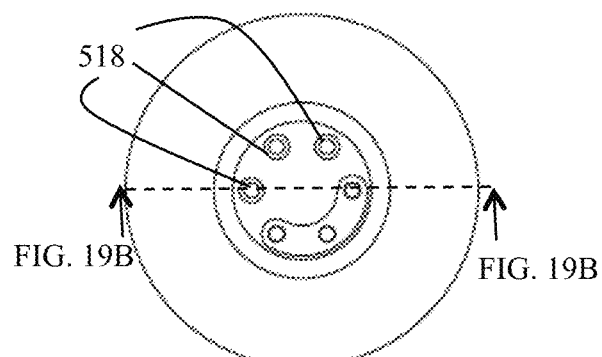
Figure 19B:
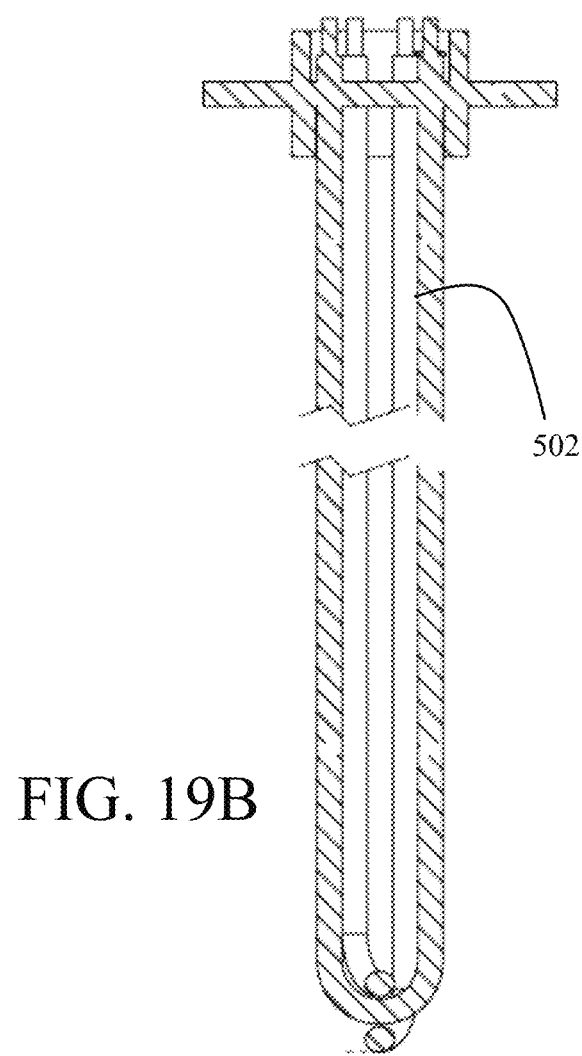
Figure 20A:
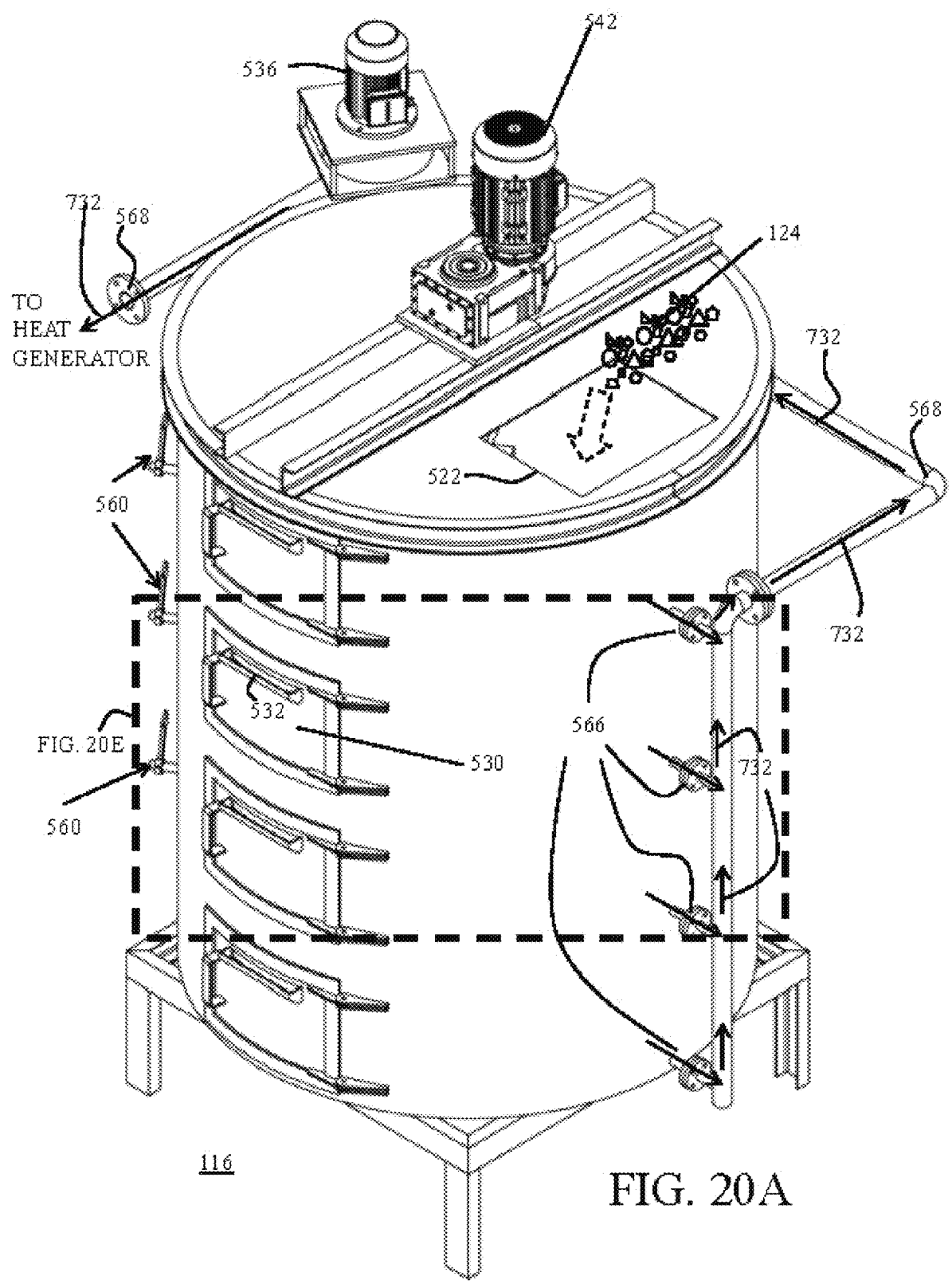
Figure 20B:
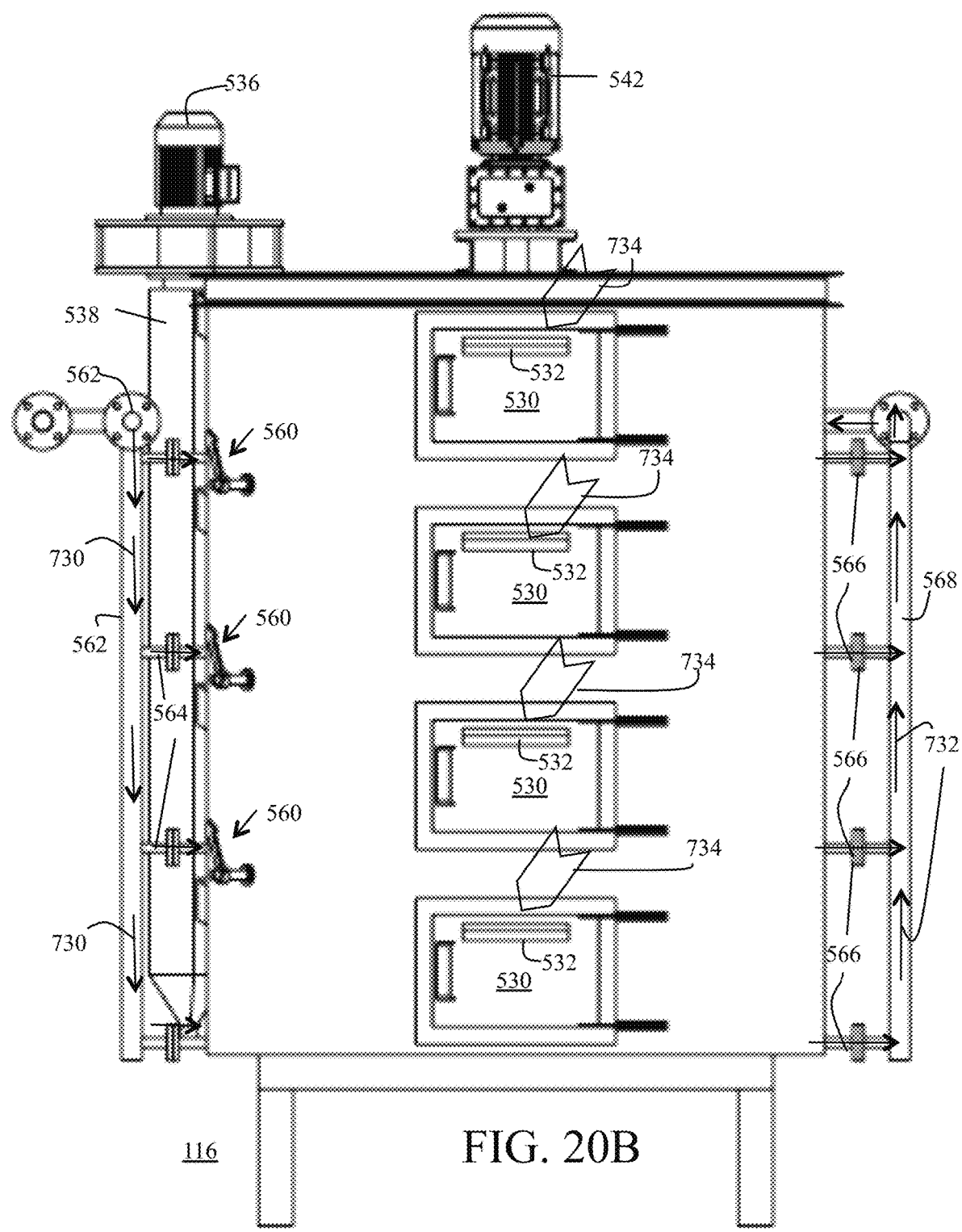
Figure 20C:
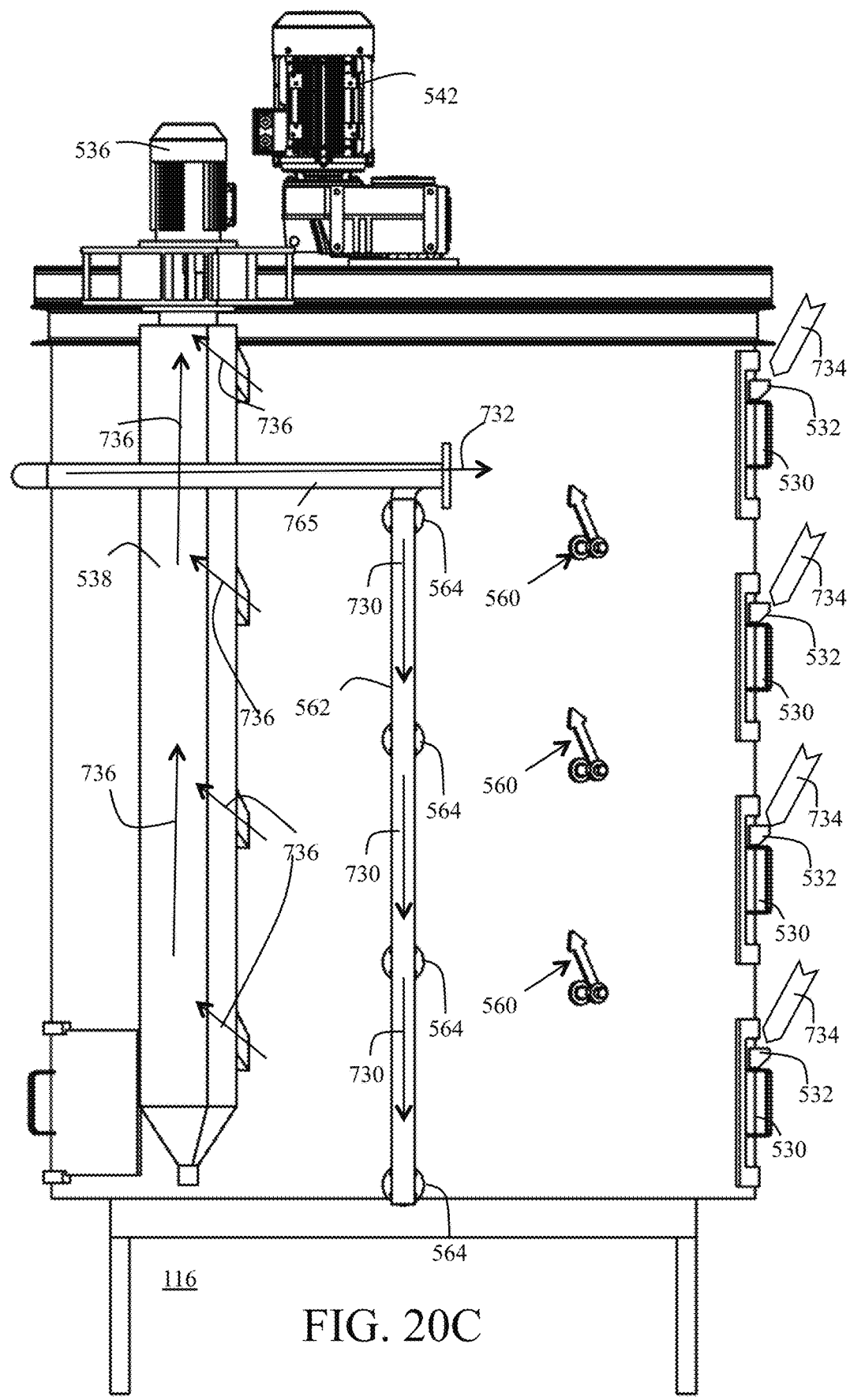
Figure 20D:
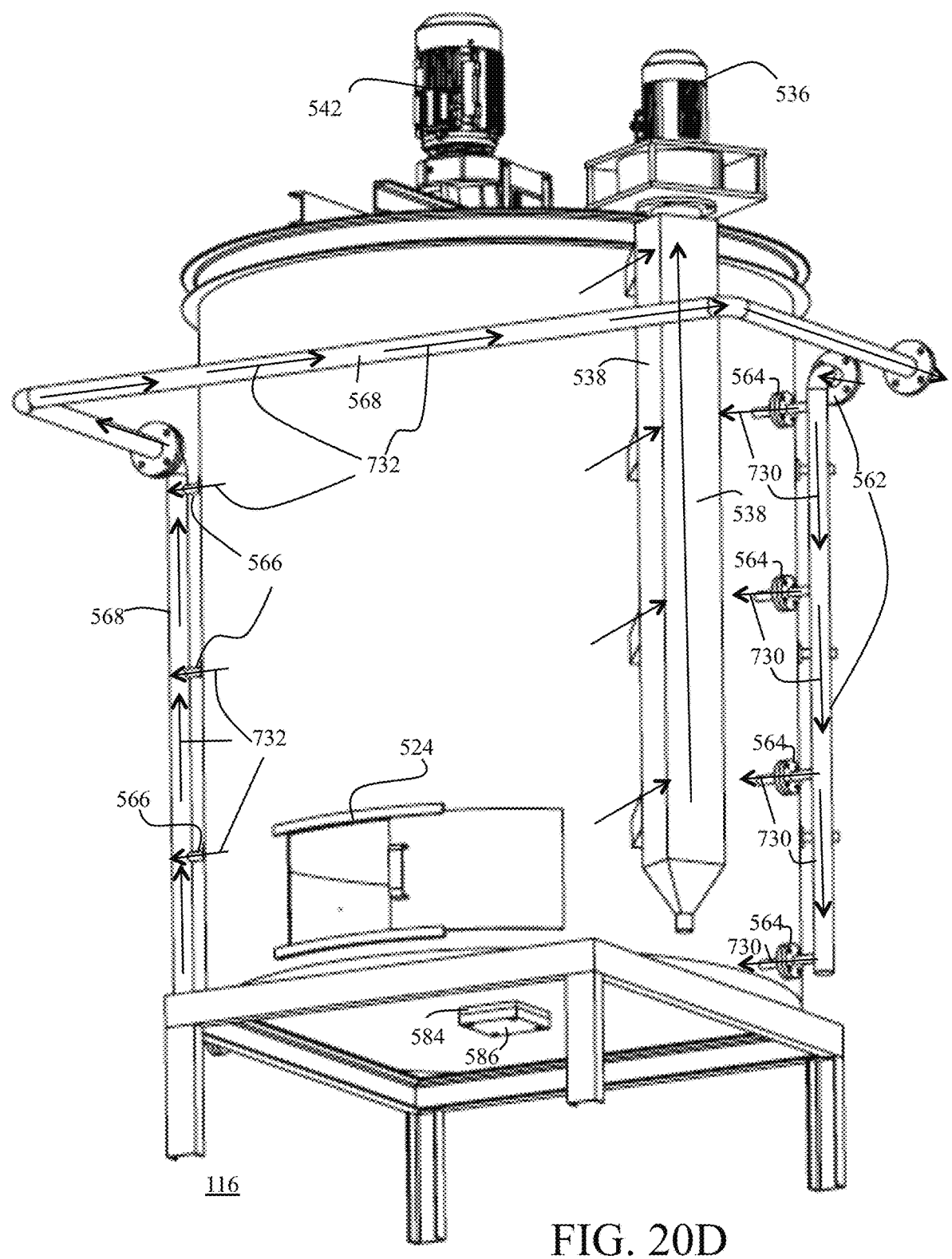
Figure 20E:
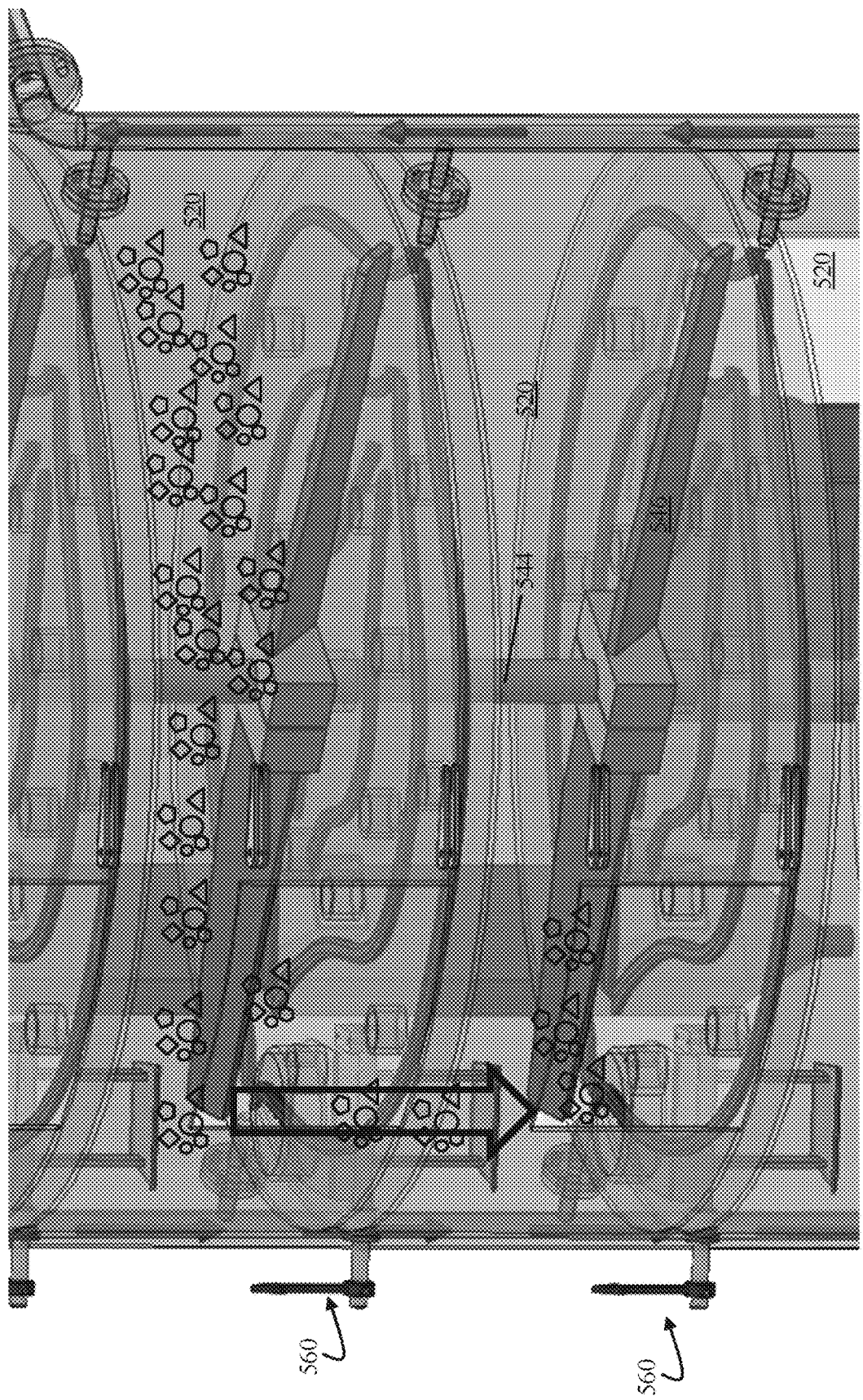
Figures 1, 20F:
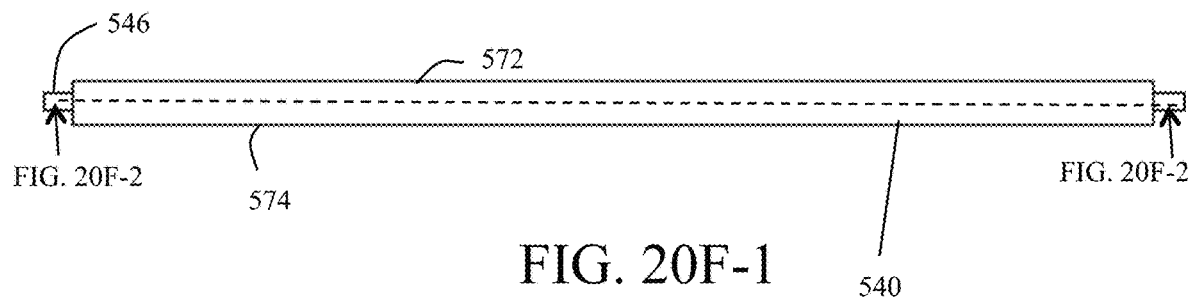
Figures 2, 20F:
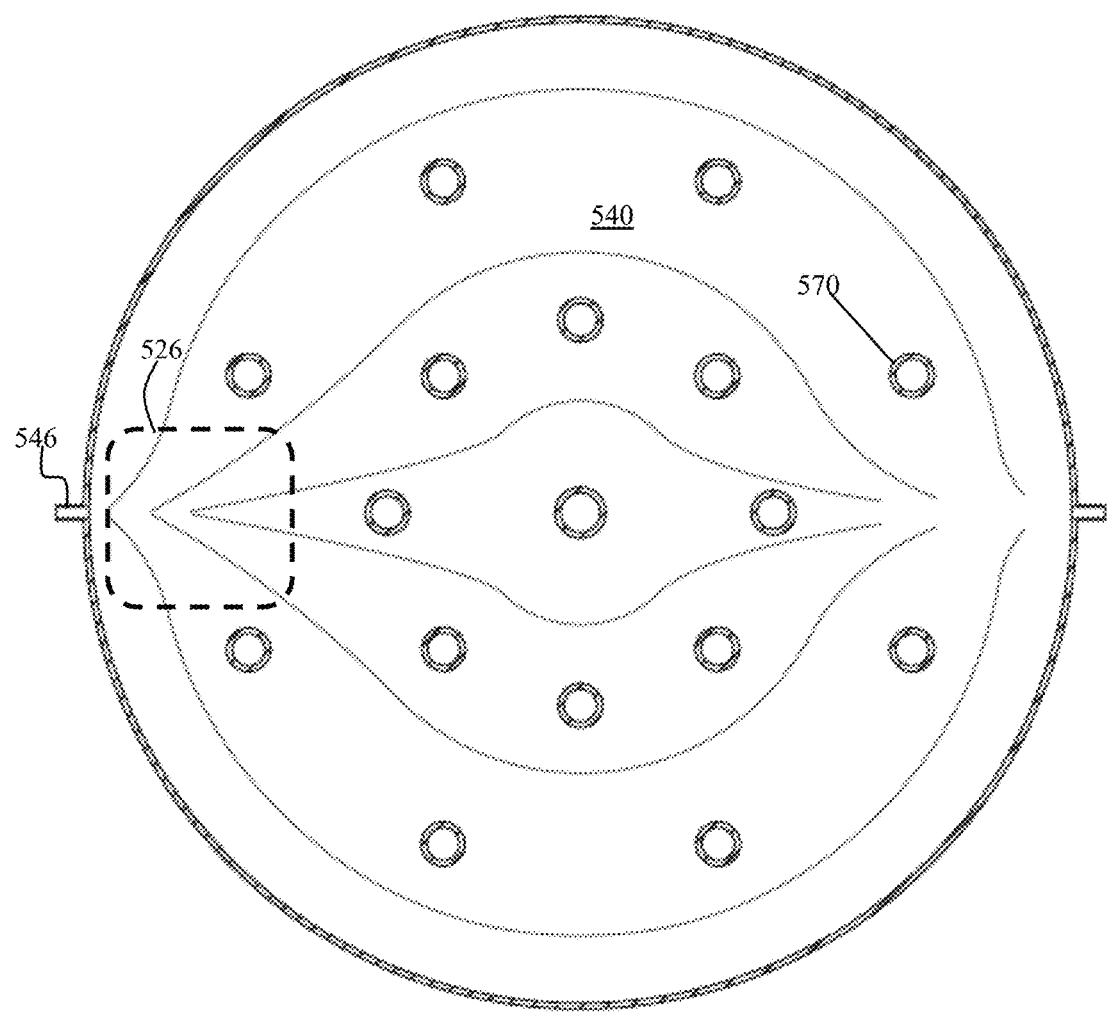
Figures 1, 20G:
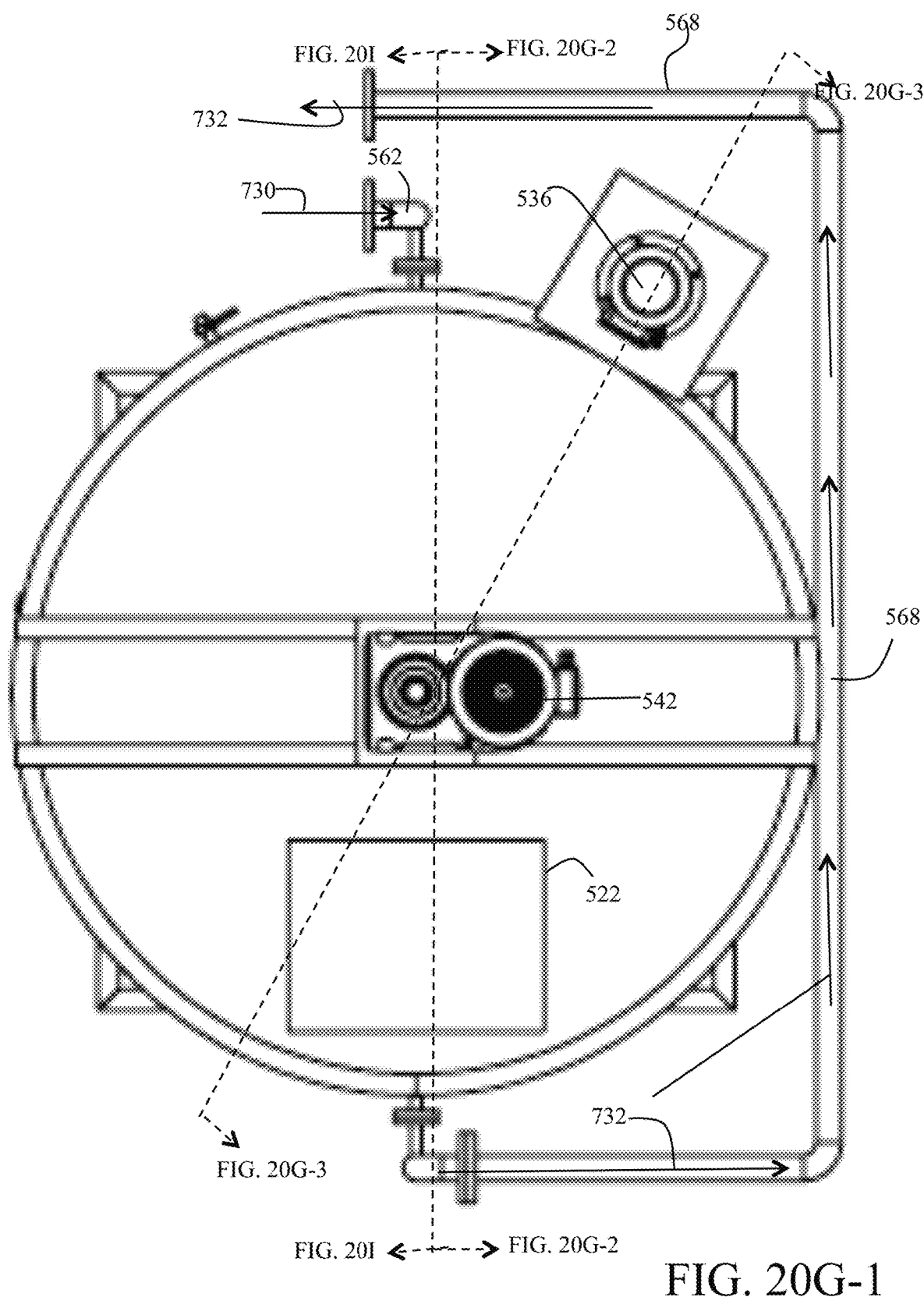
Figures 2, 20G:
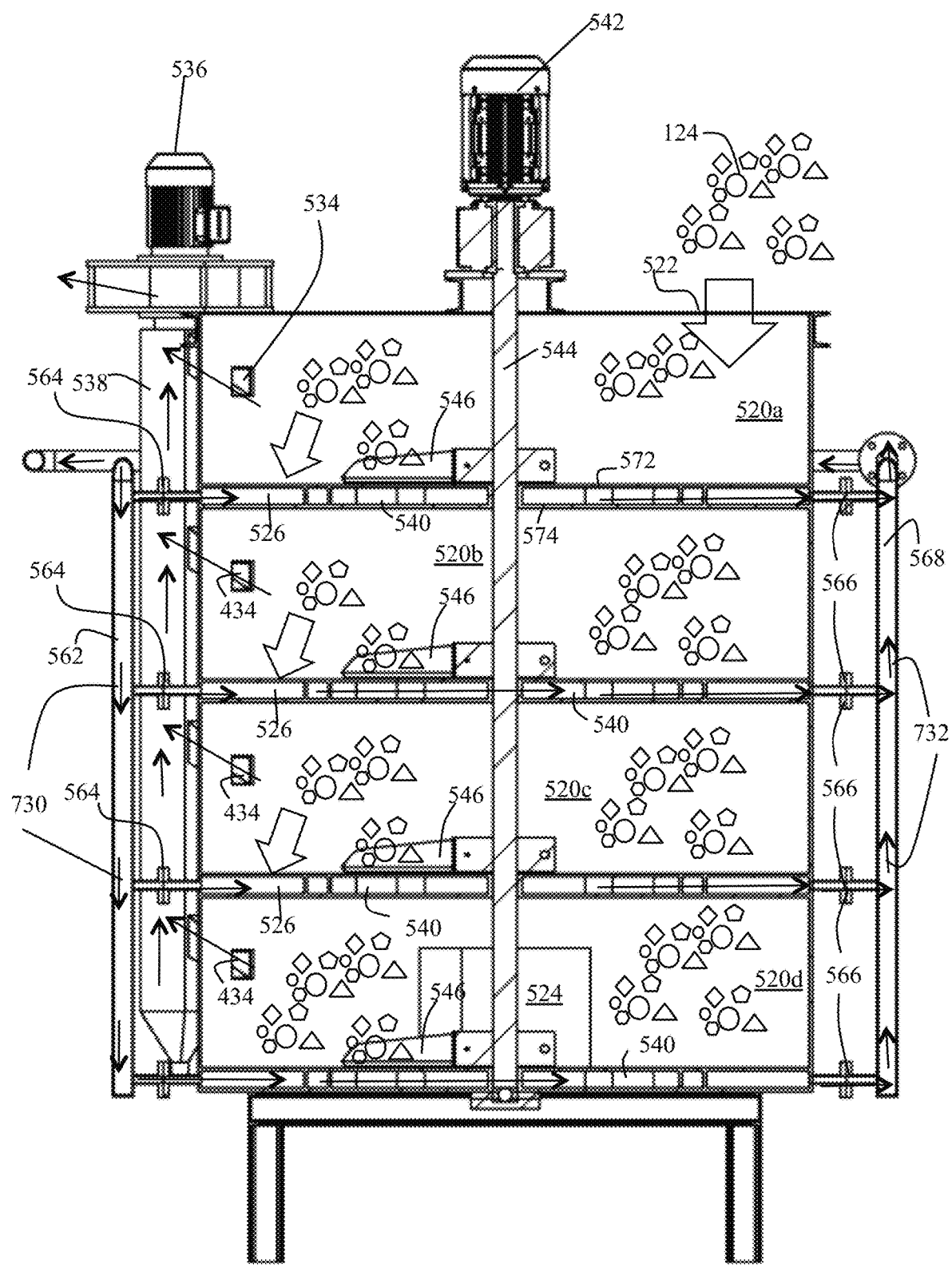
Figures 3, 20G:
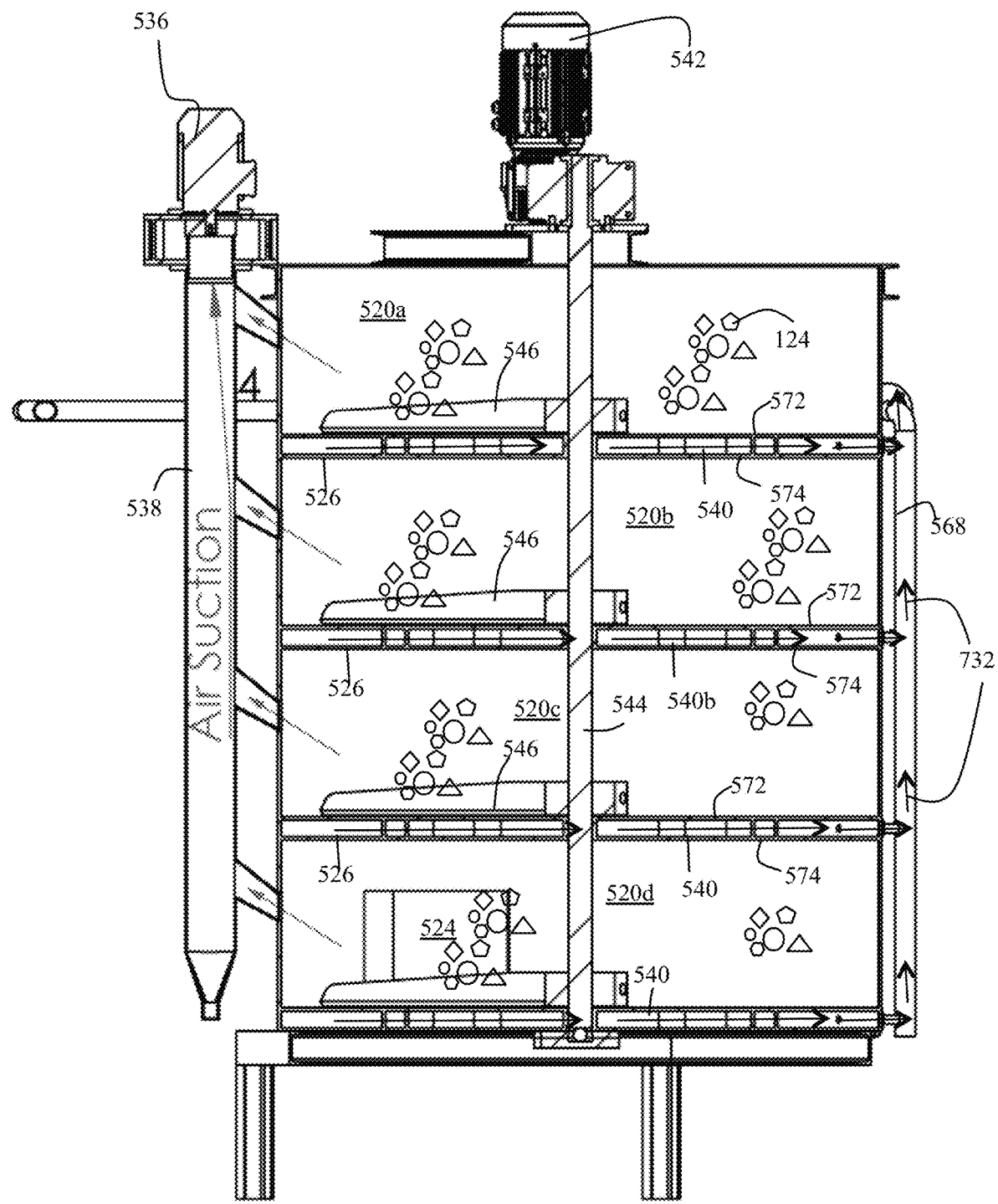
Figure 20H:
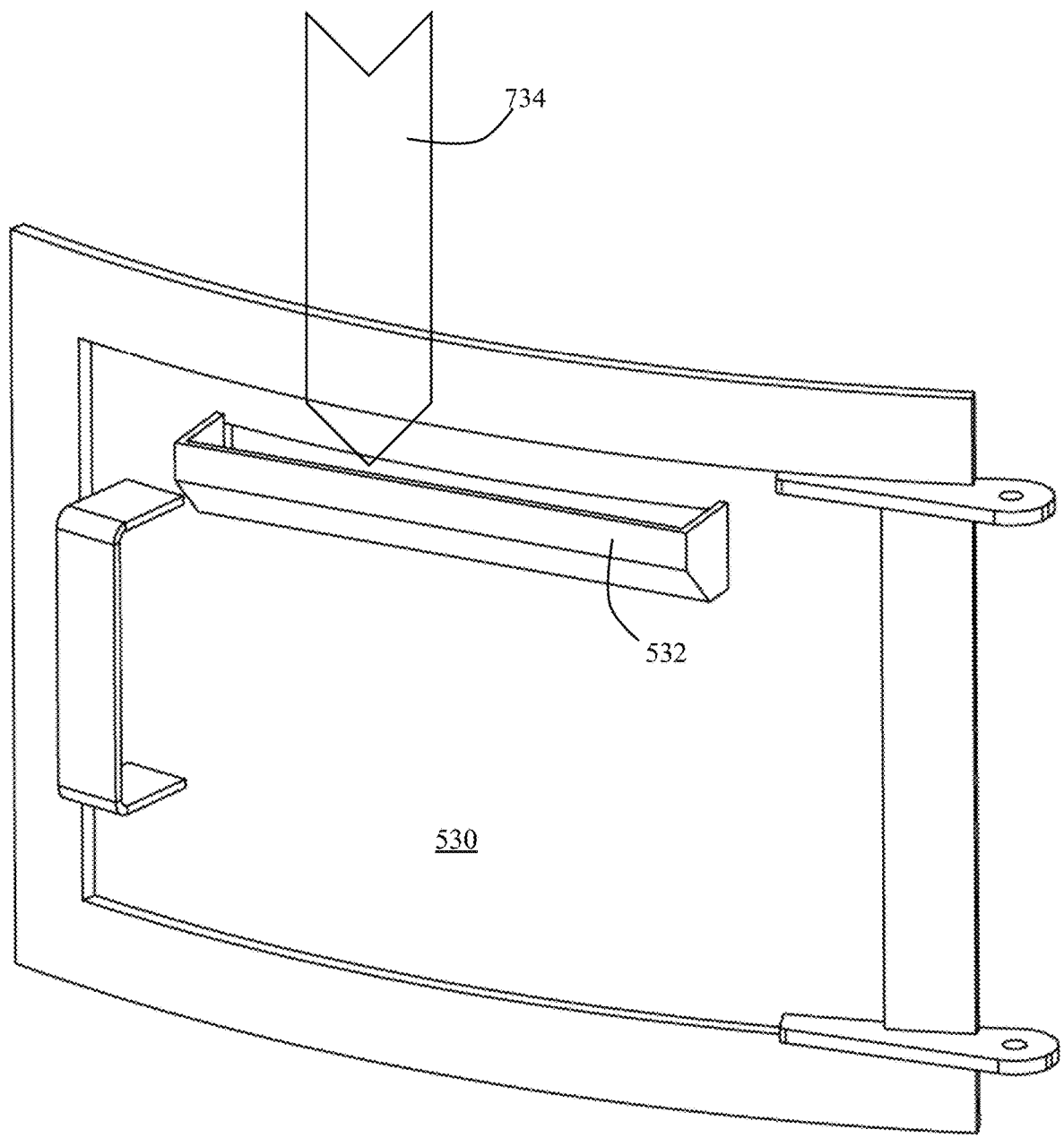
Figure 20I:
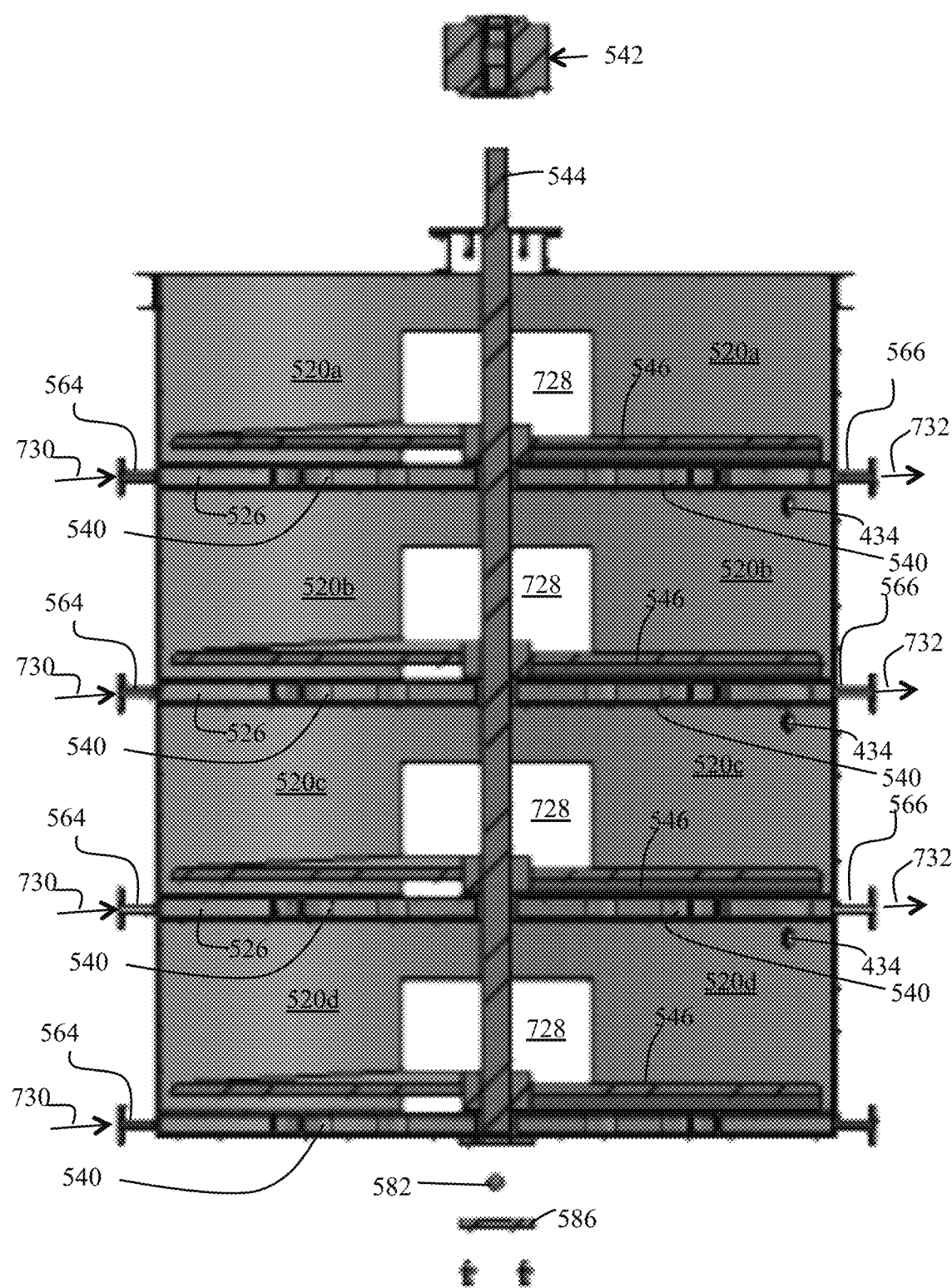
Figure 20J:
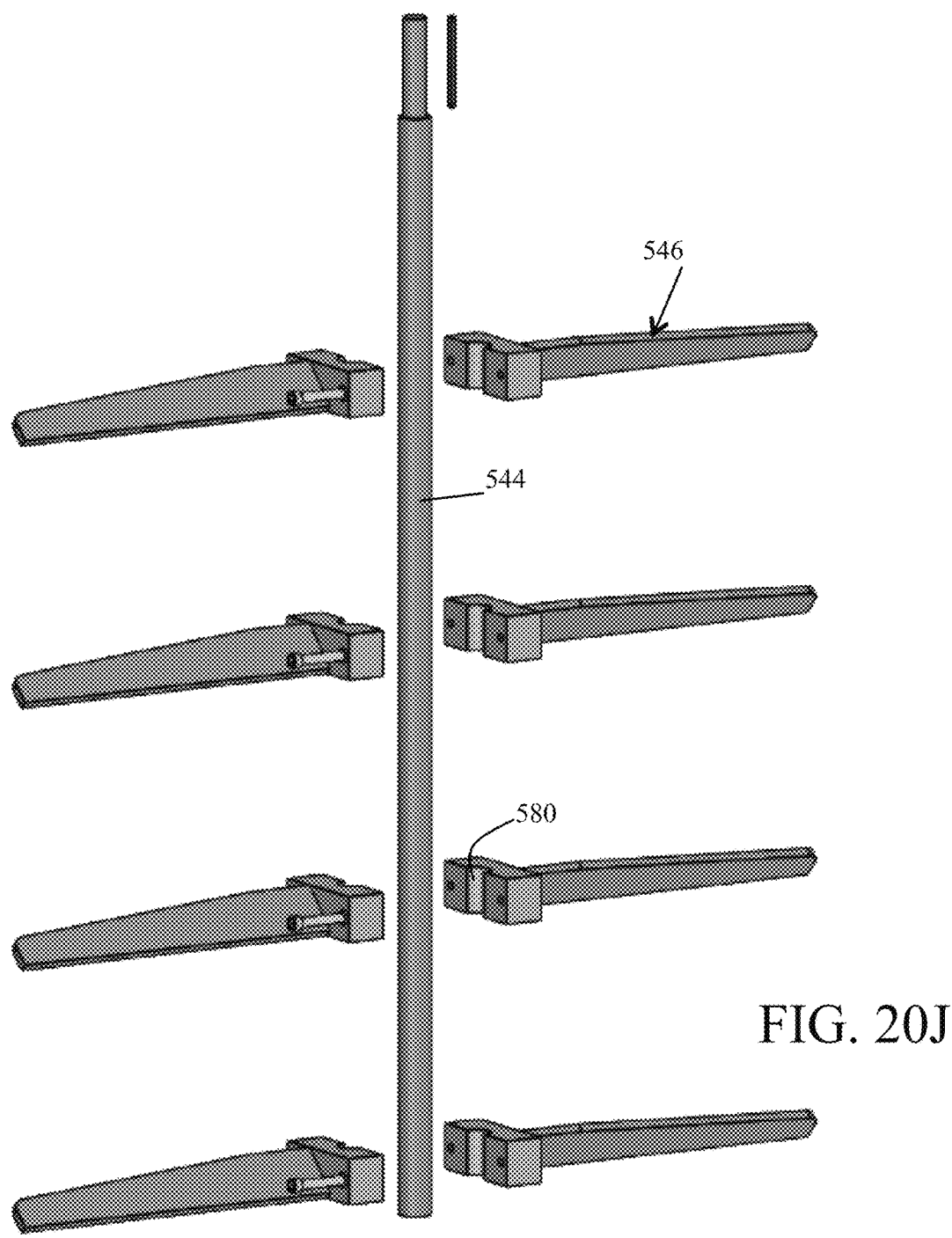
Figure 20K:
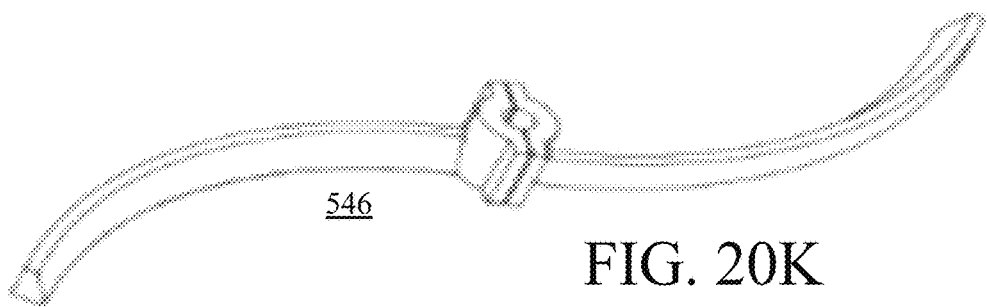
Figures 1, 20L:
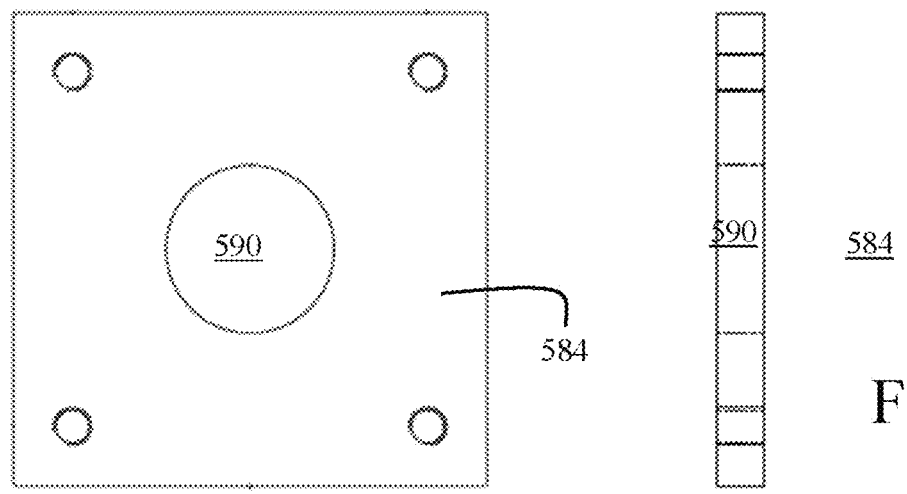
Figures 2, 20L:
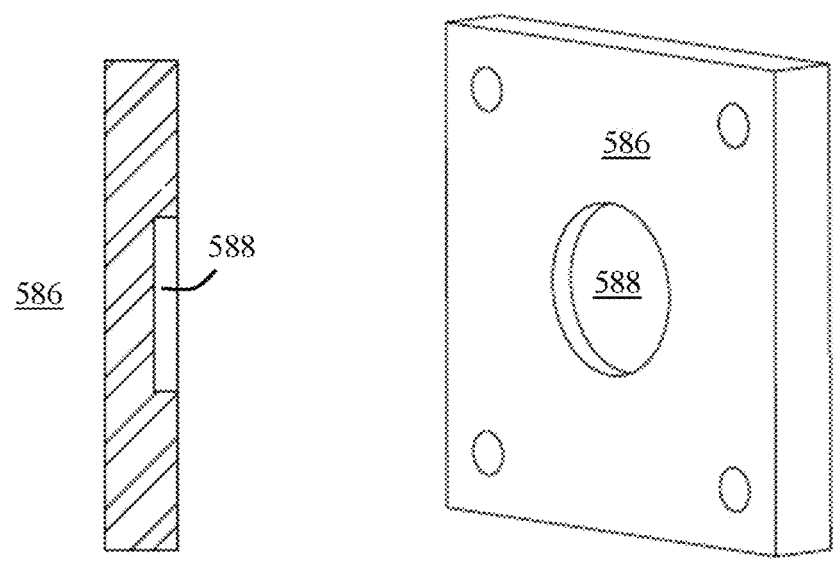
Figures 3, 20L:
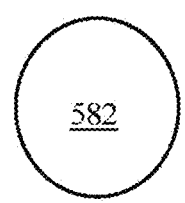
Figure 21A:
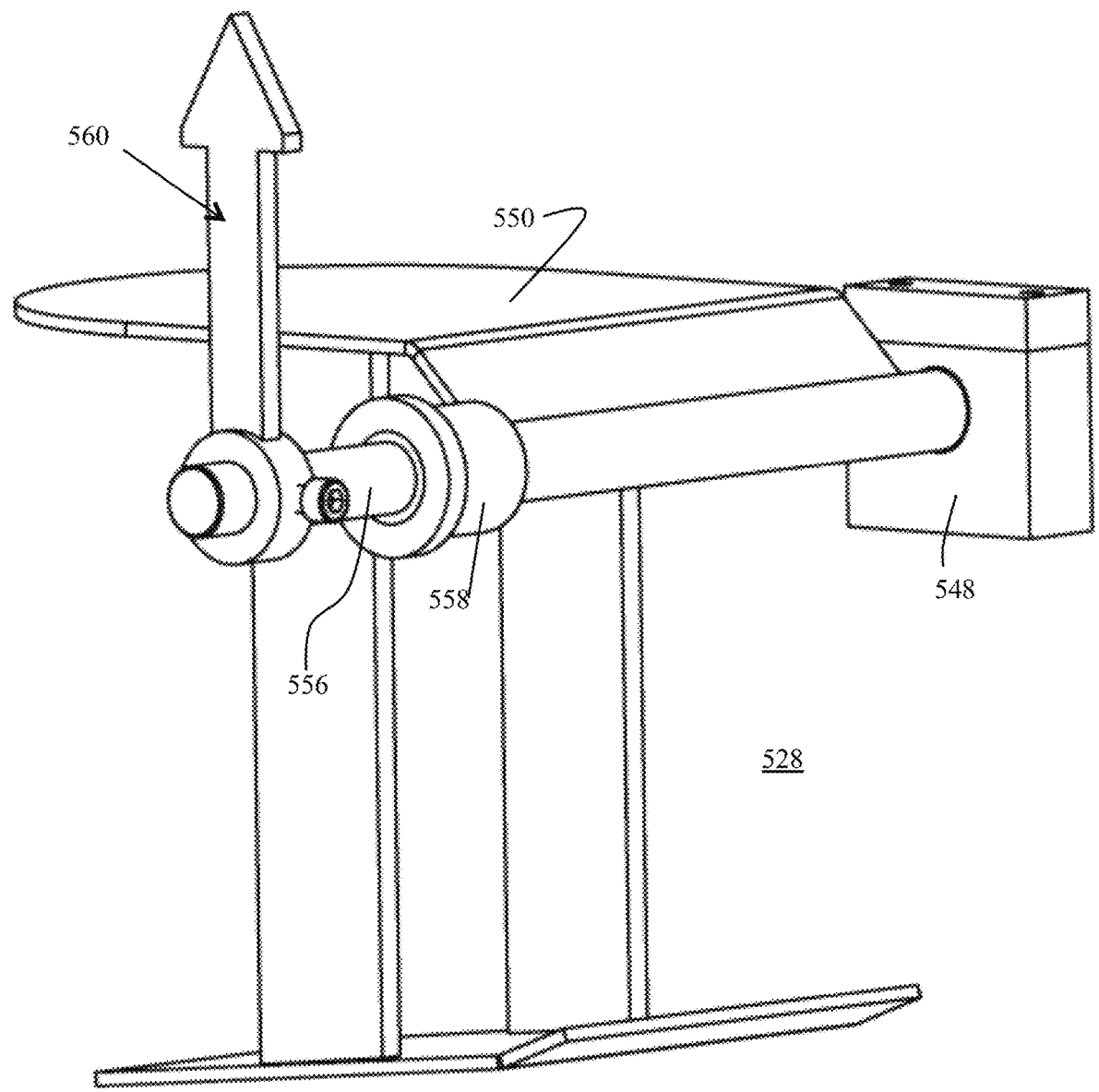
Figure 21B:
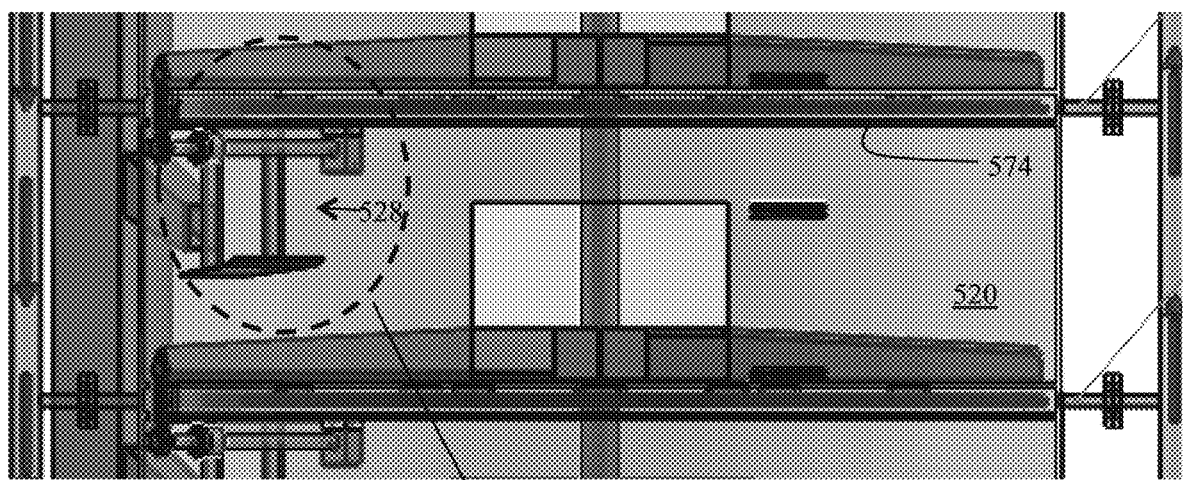
Figure 21C:
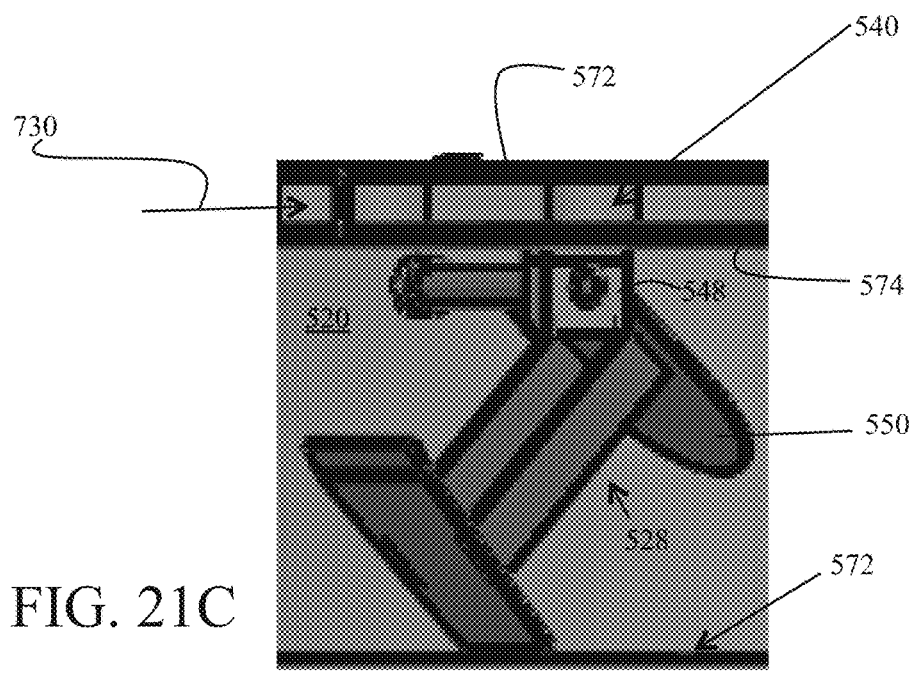
Figure 21D:
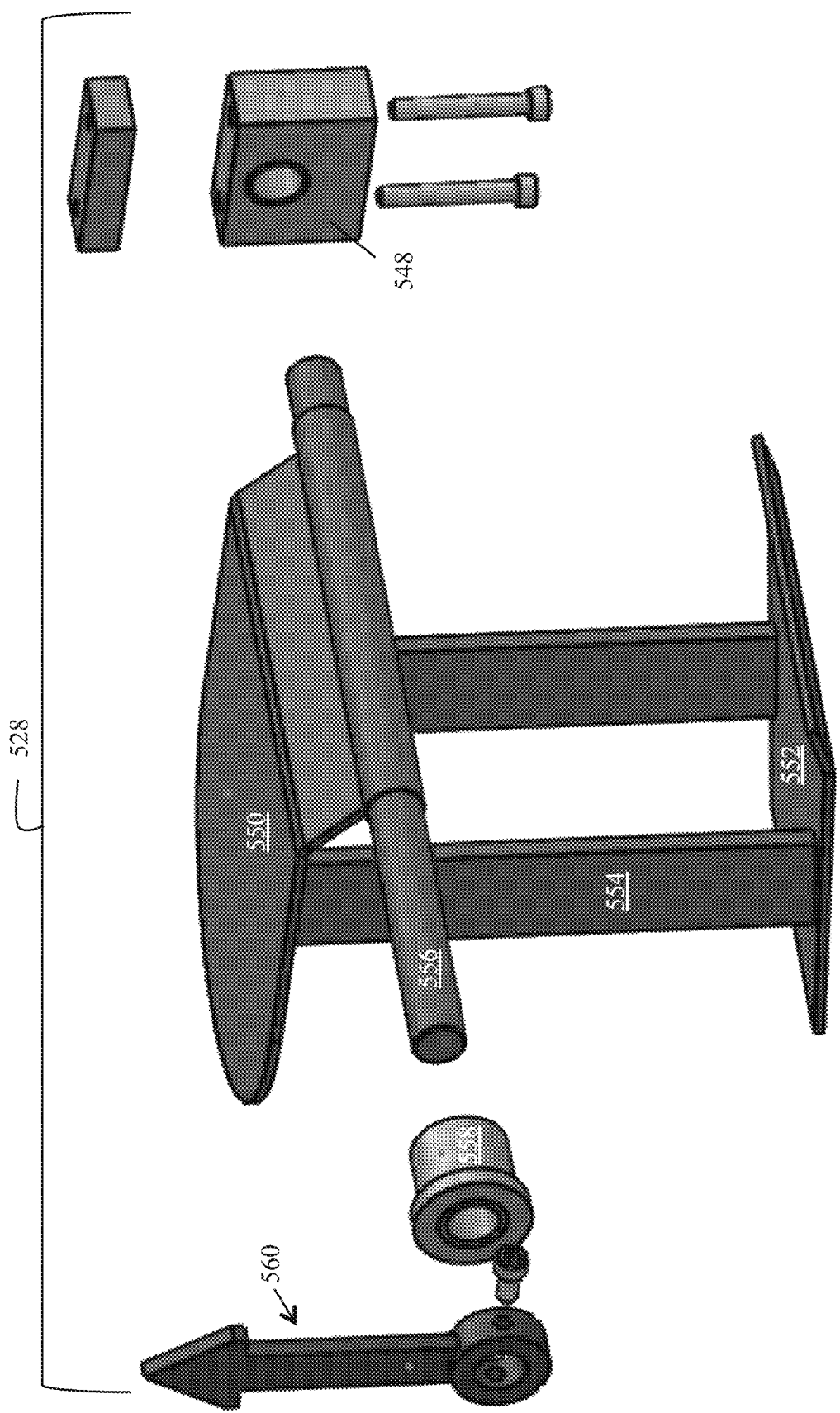
Figures 1, 21E:
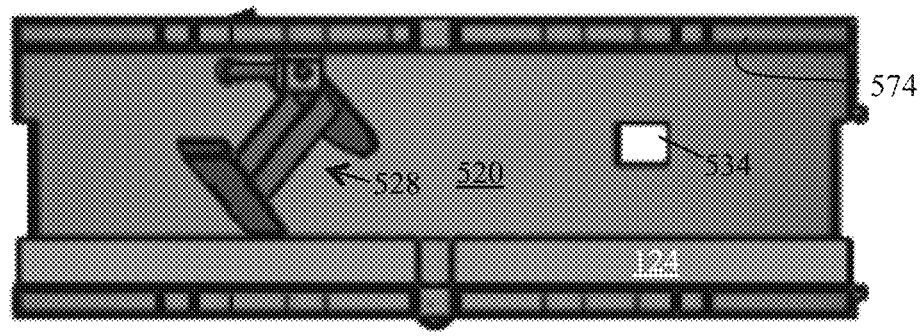
Figures 2, 21E:
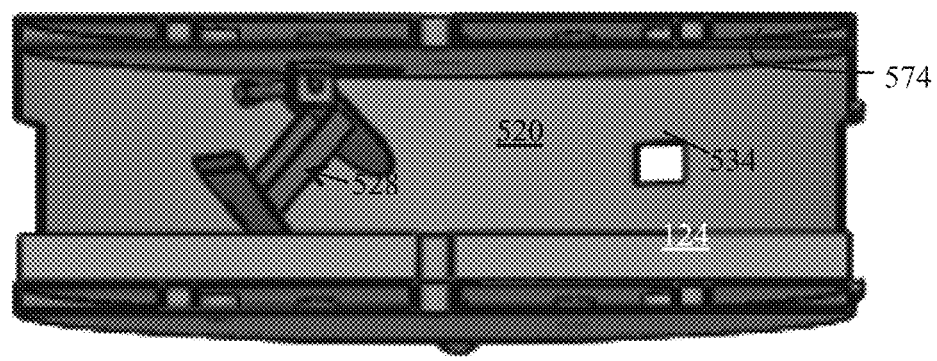
Figures 3, 21E:
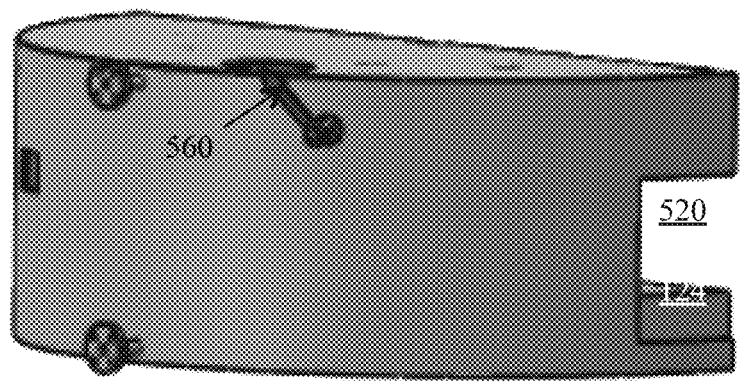
Figures 1, 21F:
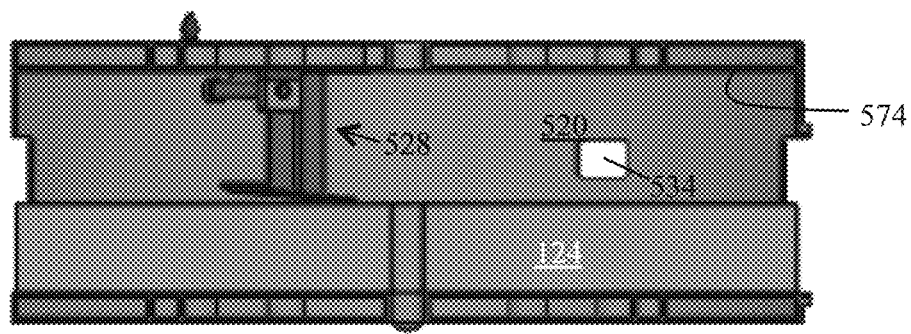
Figures 2, 21F:
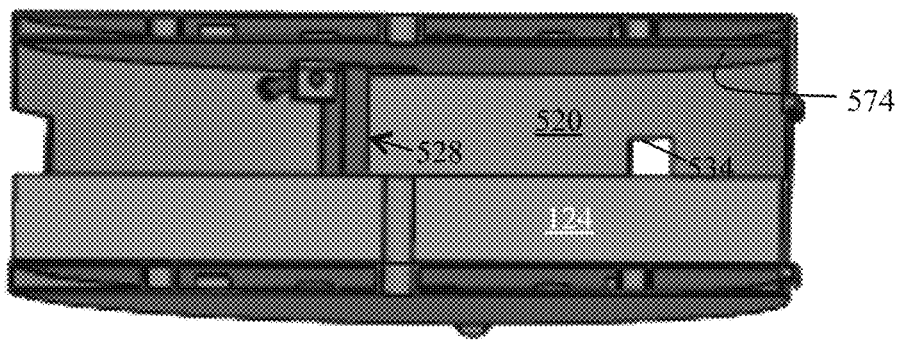
Figures 3, 21F:
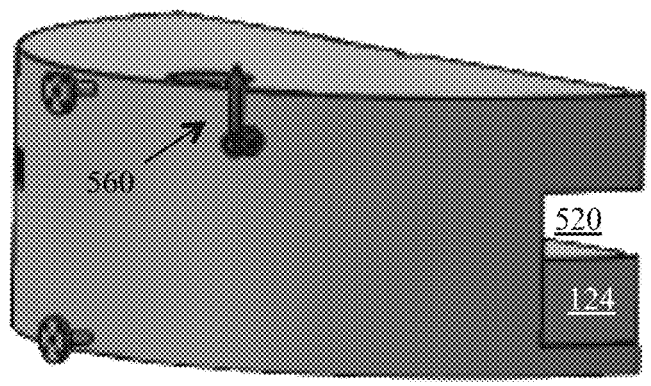
Figure 22A:
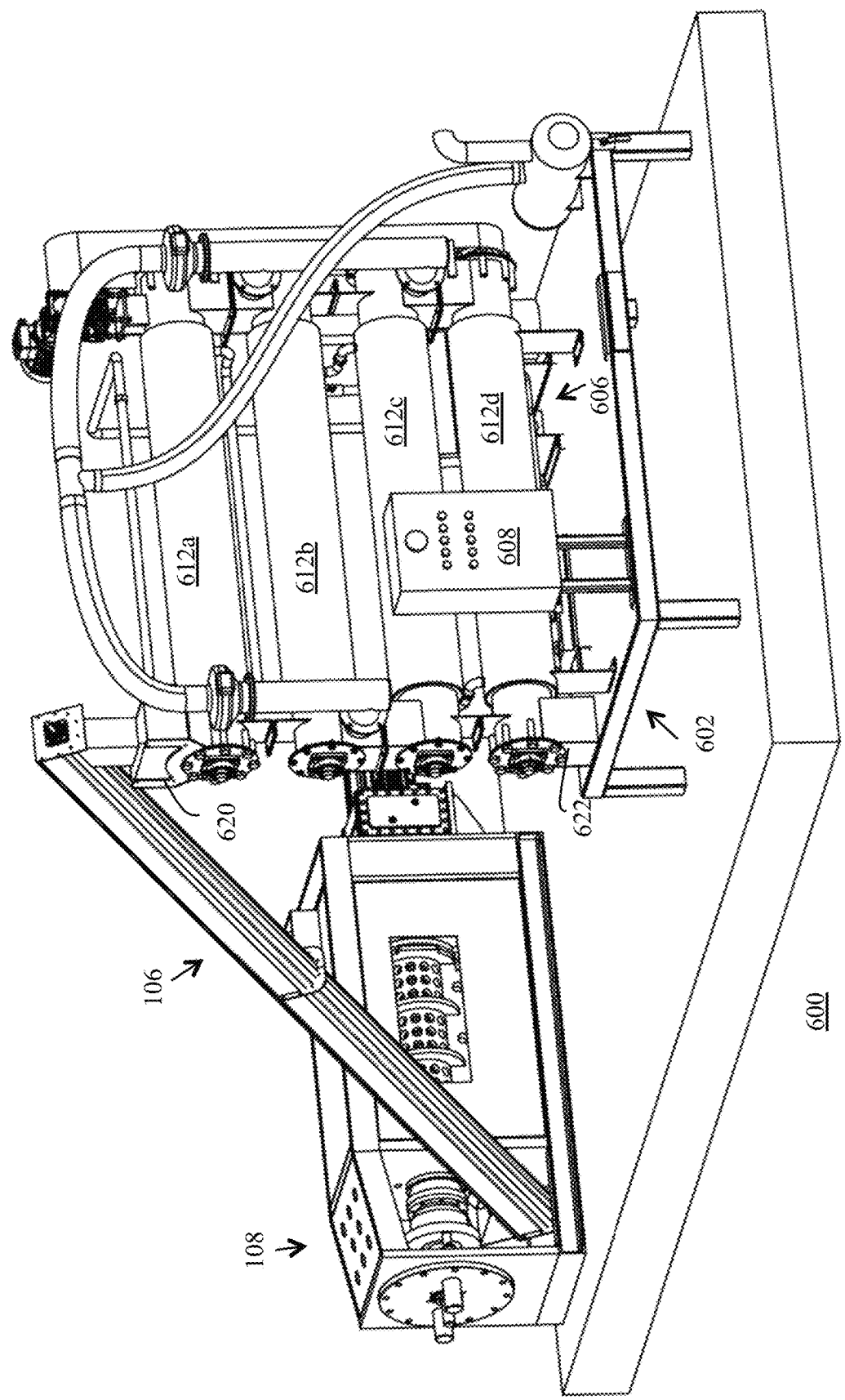
Figure 22C:
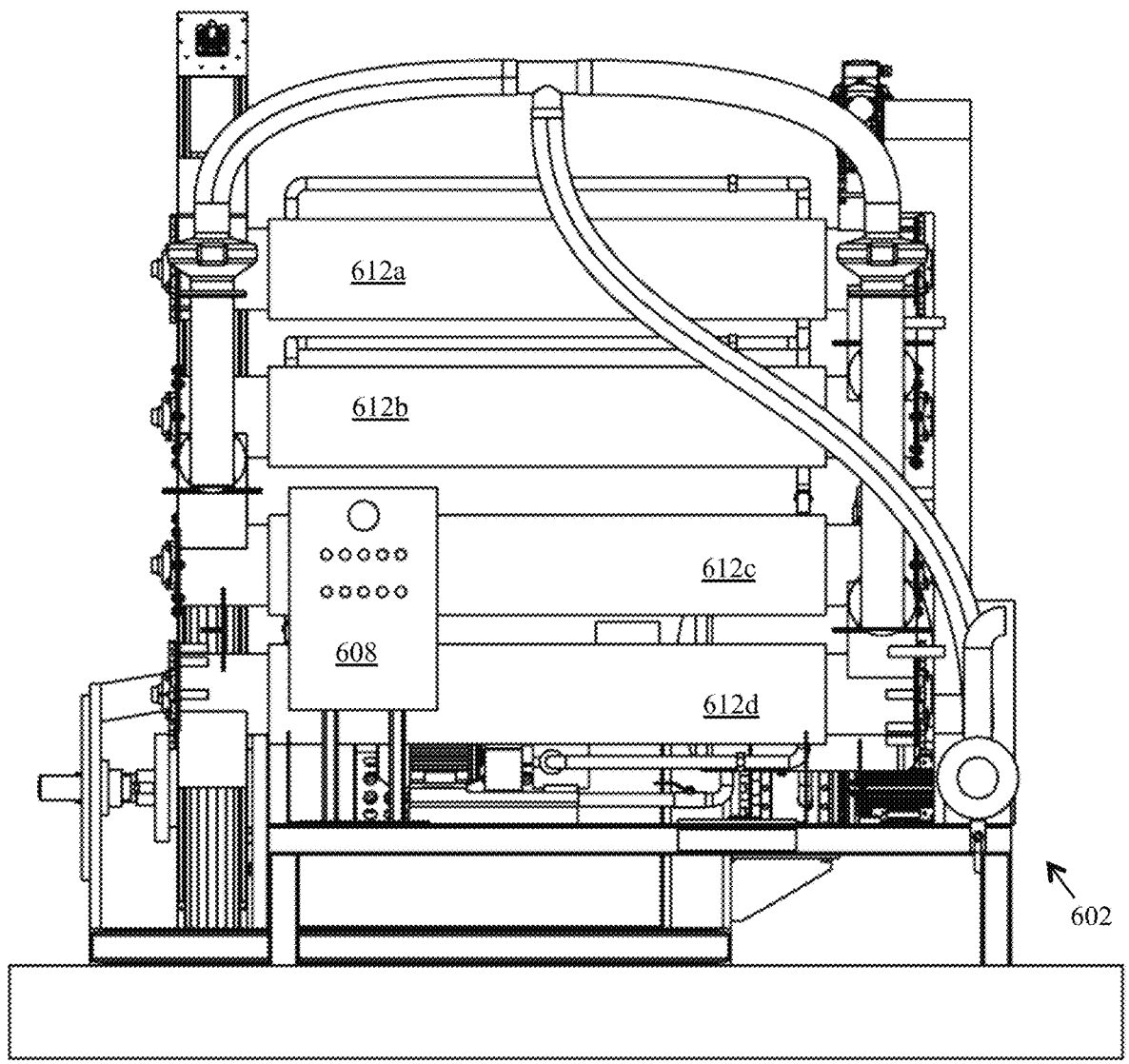
Figure 22D:
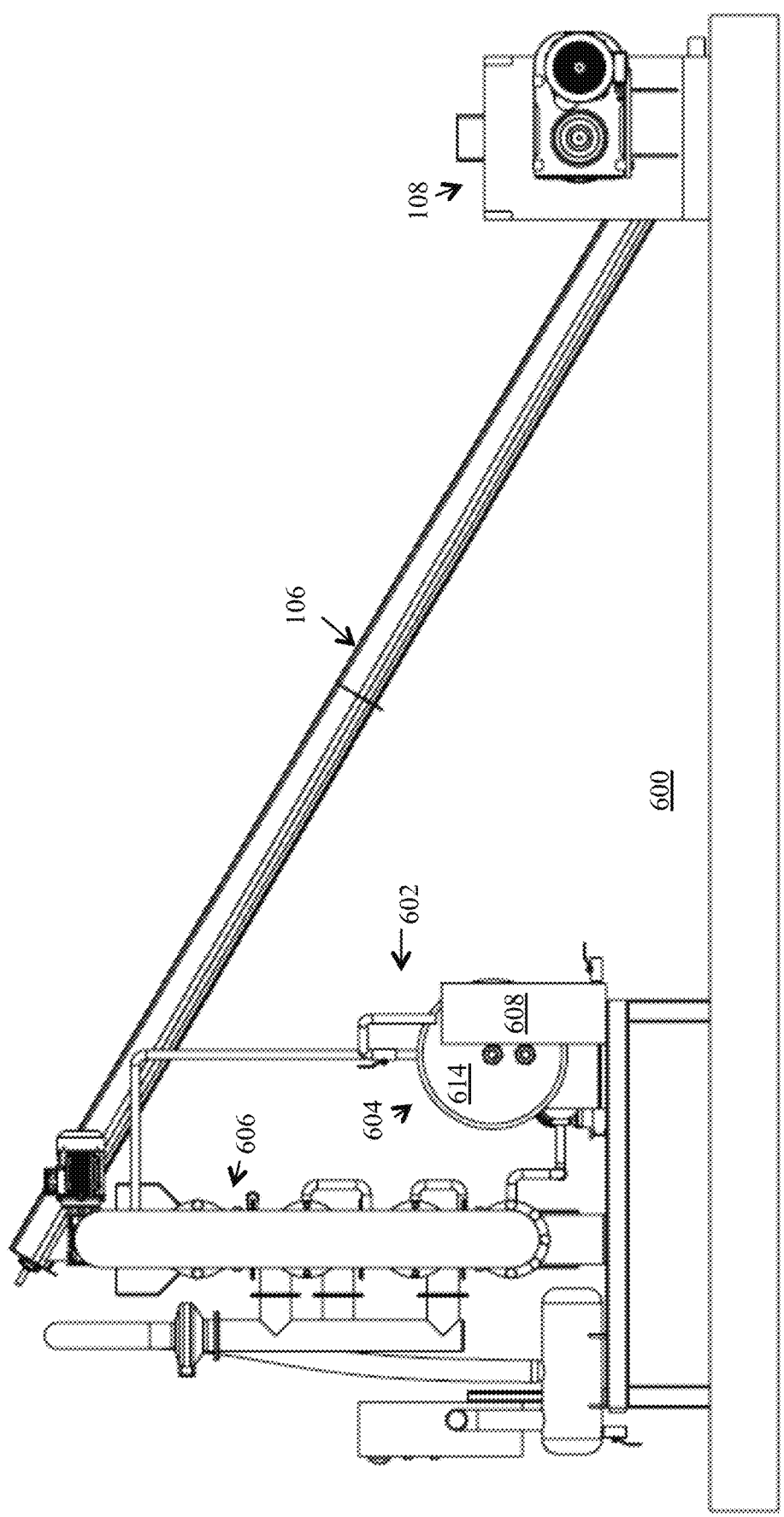
Figure 22E:
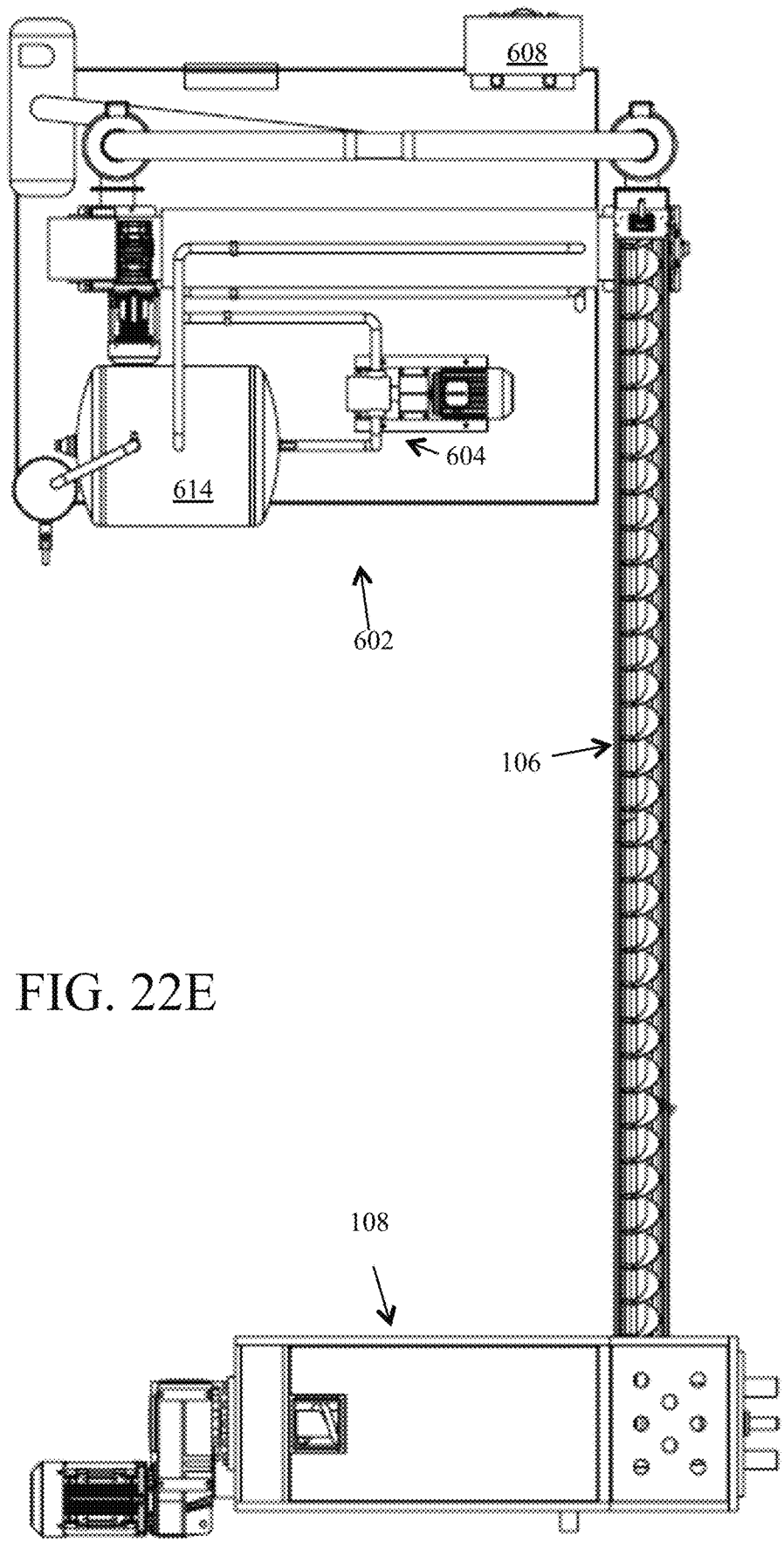

The medium is moved from a lower heater chamber 478a to a next, and subsequent upper heater chambers 478, with increasing gain in heat, and exiting out (via outlet member 516) to radiant heating device 116. One or more heater chamber 478 includes at least one elongated heating element 502 positioned within and along the longitudinal axis 510 of heater chamber 478. The number of heating elements 502 may be varied. Well known ceramic based heating elements (high electrical conductivity ceramics—also known as electroceramics) may be used. In this non-limiting, exemplary instance, each heating element 502 requires 15 kW power to generate required heat. As shown in FIGS. 19A and 19B, each heating element 502 has a set of power taps 518 to receive power. One or more heater chamber 478 includes first and second elongated heating elements 502 positioned within and along the longitudinal axis 510 of heater chamber 478, with first elongated heating element 502a oriented opposite the second elongated heating element 502b.

FIGS. 20A to 21F-3 are non-limiting, exemplary illustrations that detail a radiant heating device in accordance with one or more embodiments of the present invention. As illustrated in FIGS. 1A to 21F-3, fourth mechanism is a radiant heating device 116, comprising an enclosed, heat distribution system that delivers, distributes and collects heat delivery medium. Further included is at least one radiant heat chamber 520 (preferably four or more radiant heat chambers 520 as illustrated) that receives, heats and aerates (e.g., by mixing) the partially dehydrated, dense, and heated material to generate dehydrated, dry material received from compressor 108. The radiant heat further kills remaining bacteria.

Radiant heating device 116 includes a main inlet opening 522 for receiving waste at a first (or upper as illustrated) radiant heat chamber 520a, and a main outlet opening 524 at a final (or bottom as illustrated) radiant heat chamber 520d for removing dehydrated, and mostly bacteria-free dry material. As indicated above, optionally, at this final stage the dried material may be transferred to grinder, pelletizing device, otherwise, it may be stored in a bin and recycled as usable product.

Radiant heating device 116 further includes radiant heat chambers 520 with waste moving from a first radiant heat chamber 520a to a final radiant heat chamber 520d, and accumulating in reverse at the final radiant heat chamber 520d first, then preceding radiant heat chambers 520c, 520b, and 520a. That is, waste is moved into first radiant heat chamber (top radiant heat chamber) 520a, is mixed, aerated and moved, and drops through an opening 526 in the "floor" of first radiant heat chamber 520a (opened/closed by a flap 528, detailed below) and into lower radiant heat chambers 520b, 520c, and 520d until it reaches the lowest or bottom final radiant heat chamber 520d. There, waste is continuously accumulated as more and more waste enters radiant heat device 116 from main inlet opening 522 at first or top radiant heat chamber 520a. As detailed below, as radiant heat chamber 520 (from the final chamber 520d) is filled, the opening 526 into that full filled radiant heat chamber 520 closes to prevent overflow or overfilling of that radiant heat chamber.

A radiant heat chamber 520 includes an access panel 530 to allow access to radiant heat chamber 520 via an access opening 728. Access panel 530 includes an intake vent opening 532 to move exterior ambient air 734 into radiant heat chamber 520. Radiant heat chamber 520 further includes an evacuation opening 534 to remove interior ambient air (moisture and humidity) 736.

A motorized fan 536 is connected to an output end of a plenum 538, which vacuums out accumulated moisture 736 (from openings 534) while facilitating vacuuming in of exterior ambient air 734 through intake vent openings 532 of access panel 530, generating air circulation. It should be noted that this circulation of cooler air (outside ambient air) may pull in particles with much higher moisture content that may be mixed with existing much dryer particles that have a much lower moisture content within the radiant heat chamber 520. The combination of particles with high moisture content (from outside cooler air) and dryer particles with much lower moisture content (within radiant heat chamber 520) may potentially cause electrostatic discharge inside radiant heat chamber 520. In general, in dry air, particles continue to build up imbalanced electric charges (static electricity), with no means to conduct the excess charges until they contact the incoming ambient air with higher moisture content (a "conductive object"). That is, hotter, dryer particles within radiant heat chamber 520 with excess electric charges (static electricity) release (discharged) the excess electric charges when they contact particles with higher moisture content. The higher moisture content of particles pulled in from intake vent openings 532 of access panel 530 act as "conductive objects" or conductors and absorb the excess charges when they contact the dryer particles due to their higher level of moisture, which is water, which is a known conductor. The potentially generated electrostatic discharge may further facilitate in reducing bacteria levels of waste in addition to higher temperatures.

As further illustrated, radiant heat chamber 520 further includes opening 526 for movement of waste from the radiant heat chamber 520 to a next radiant heat chamber. Opening 526 is comprised of a "conduit" like structure having an intake side an outlet side defined by the channel of heat distribution compartment 540 for radiant heat chamber 520 for moving waste from radiant heat chamber to a next radiant heat chamber.

Opening 526 for movement of waste is controlled by a passive enclosure 528. Radiant heat chamber 520 further includes an mixer-aeration system to mix and aerate waste within the radiant heat chamber 520 (which also facilitates in build up of electrical charges). Mixer-aeration system may comprise of any mixer-aeration mechanisms that most efficiently mixes and aerates waste 124 within radiant heat chamber 520. The mixer-aeration system may comprise of a well-known motor 542 that rotates an actuator such as a shaft 544 upon which mixer-aeration mechanisms are mounted in well-known manner. Shaft 544 passes through all radiant heat chambers 520. A non-limiting example of a mixer-aeration mechanism may comprise the illustrated propellers 546 or others (e.g., auger or other devices that mixes and lifts to aerate the material). Aeration is important so that all material within the radiant heat chamber 520 may dry generally equally and also, may facilitate build up of electrically charged particles.

As illustrated in FIGS. 20J to 20L-3, propellers 546 are curved, which continuously move material to center of radiant heat chamber 520 so that they are not moved to lower chambers quickly. Further, propellers 546 are generally made bulkier near the center pieces 580 to provide added strength. Center pieces 580 lock into position (along shaft 544) the propellers 546 so to prevent vertical motion of the blades (propellers) 546. Center pieces 580 may be separate or integral part of propellers 546. As illustrated, shaft 544 is connected to the motor by well known interlock structure that includes a key-seat and key. As illustrated in FIGS. 20D, 20I, and 20L-1 to 20L-3, free (bottom) distal end of shaft 544 rests on a bearing 582 (a ball shown in FIG. 20L-3) that is secured within housing 588 of second shaft caps 586 (FIG. 20L-2) and hole 590 of first shaft cap 584. The ball 582 functions as a support and a guide, with end of shaft 544 help up and rotated on ball 582. This facilitates in maintaining shaft 544 in center and prevents wobbling of shaft.

Passive enclosure 528 closes off access to opening 526 of a next radiant heat chamber 520 as waste is moved and is pushed against passive enclosure 528 by the mixer-aeration mechanism. Passive enclosure 528 is progressively moved from an open position (FIGS. 21C, and 21E-1 to 21E-3) to a closed position (FIGS. 21F-1 to 21F-3) as a progressively greater amount of waste 124 is accumulated within radiant heat chamber 520, generating a progressively greater amount of force as waste 124 is moved and pushed by mixer-aeration mechanism 546 against passive enclosure 528 to closed position.

Passive enclosure 528 includes a set of adjustable weights 548 (detachable to control the rate and timing of opening/closing) that provide minimal counterbalancing force against a force of waste pushed by the mixer-aeration mechanism, with the passive enclosure 528 progressively moving from open position to close position as the force from push of the waste progressively overcomes the counterbalancing force of the weights 548 of passive enclosure 528 as more waste is accumulated. This way, the movement of passive enclosure 528 is controlled from open position to closed position, which controls the amount of waste accumulated in each radiant heat chamber 520. For example, a lighter counterbalancing weight would enable closure of the opening faster.

Passive enclosure 528 hangs from the "roof" 574 (bottom plate 574 of heat distribution compartment 540) of each radiant heat chamber 520, and default-balance to an open position by using weight 548. Passive enclosure 528 include a flap (cover) 550 and an actuator 552 that is contacted by waste and is moved (against the counterbalancing weight 548) to move flap 550 from open to closed position.

Passive enclosure 528 further includes a connection support 554 that connects the actuator section 552 to flap section 550. A set of counterbalancing weights (Bushing weights) 548 positioned on a first end of a pin 556 that connect the passive enclosure 528 to frame (or the "roof") of the radiant heat chamber 520, while entire passive enclosure 528 hangs on pin 556, with pin 556 rotating within bushing 548.

Pin 556 having a second end that extends out of radiant heat chamber 520 (via a bushing 558) with level indicator 560 mounted on second end. Level indicator 560 marks flap 550 position in relation to opening 526 between radiant heat chambers 520. In other words, level indicator 560 associated with flap 550 indicates the position of flap 550 (closed, open, or semi-closed). A full chamber (FIGS. 21F-1 to 21F-3) would have an indicator 560 of a fully closed flap 550. This way, level indicators 560 show if a radiant heat chamber 520 is full.

As indicated above, radiant heating device 116 includes a heat distribution system that delivers, distributes and collects heat delivery medium 730, isolated from radiant heat chambers 520 and waste 124. Heat distribution system is comprised of a main inlet tube 562 through which heated medium is received from heat generator 114.

Further included is one or more ingress tubes 564 associated with one or more heat distribution compartments 540 of one or more radiant heat chamber 520. One or more ingress tubes 564 receive delivered heated medium from main intake tube 562 and distribute the heated medium to one or more heat distribution compartments 540.

Heated medium traversing through one or more heat distribution compartments 540 transfers heat to adjacent radiant heat chambers 520 via conduction and convention, with material within each radiant heat chamber aerated to be heated by radiation. One or more egress tubes 566 are associated with the one or more heat distribution compartments 540. One or more egress tubes 566 receive cooled-off medium 732 from the one or more heat distribution compartments 540, and direct cooled-off medium to a main output collector tube 568, an output of which is associated with heat generator 114 for reheating and re-circulating the cooled-of medium.

Heat distribution compartment 540 is positioned at a chamber output side. That is, heat distribution compartment 540 is positioned between adjacent radiant heat chambers 520, with a final heat distribution compartment 540 defining a final wall or floor or base of a final radiant heat chamber 520d.

Heat distribution compartment 540 includes a set of supporting spacer posts 570 that facilitate in dispersion of heated medium throughout heat distribution compartment 540. The supporting spacer posts 570 support the top compartment plate 572 (the "floor" of the preceding radiant heat chamber and the bottom compartment plate 574 (the "roof" of the next (adjacent)) radiant heat chamber.

The top and bottom plates 572 and 574 of compartment 540 are welded to the top and bottom of supporting spacer posts 570. The supporting spacer posts 570 provide the span or separation distance between plates 572 and 574 that defines the volume of compartments 540 through which heated medium travels. The supporting spacer posts 570 also aid in dispersion of heated medium as it travels around the posts, finding the least resistive path within compartment 540. The supporting spacer posts 570 are obviously not through holes. Heat distribution compartment 540 further include a conduit (connected between top and bottom plates 572 and 574, but obviously closed off to the heat distribution compartment 540) that define the openings 520 for allowing movement of waste from a radiant heat chamber to a next radiant heat chamber.

FIGS. 22A to 30 are non-limiting, exemplary illustration of kitchen waste processing system (KWPS) in accordance with one or more embodiments of the present invention. As further detailed below, KWPS 600 may be used to process a food, plant, and in general, biomass to generate useable products such as energy, fertilizer, or alternative food products as animal feed.

FIGS. 22A to 22E are non-limiting, exemplary illustration of general systems overview processing system (KWPS) in accordance with one or more embodiments of the present invention. KWPS 600 may comprise of a receiver member 102 (e.g., a hopper) to receive waste, and a first stage that includes a first module or unit that comprises a first mechanism such as a shredder 104 that reduces a size of received waste into smaller constituent parts. Hopper 102 and shredder 104 are not shown in FIGS. 22A to 22E for clarity only. As further illustrated, KWPS 600 further includes a second stage that includes second module or unit that comprises a second mechanism comprised of single chamber, longitudinally extending multi-phase adjustable compressor 108 (detailed above).

KWPS 600 also includes a third stage that includes a combination of third module and a fourth module on a single platform 602, with the third module of the third stage including a third mechanism that generates heat (a heat generator 604) for the fourth module. The fourth module includes a fourth mechanism in a form of a radiant heat processor 606 that receives and heats and aerates by mixing the partially dehydrated, dense, and heated material from compressor 108 to generate dehydrated, dry material.

Figure 23A:
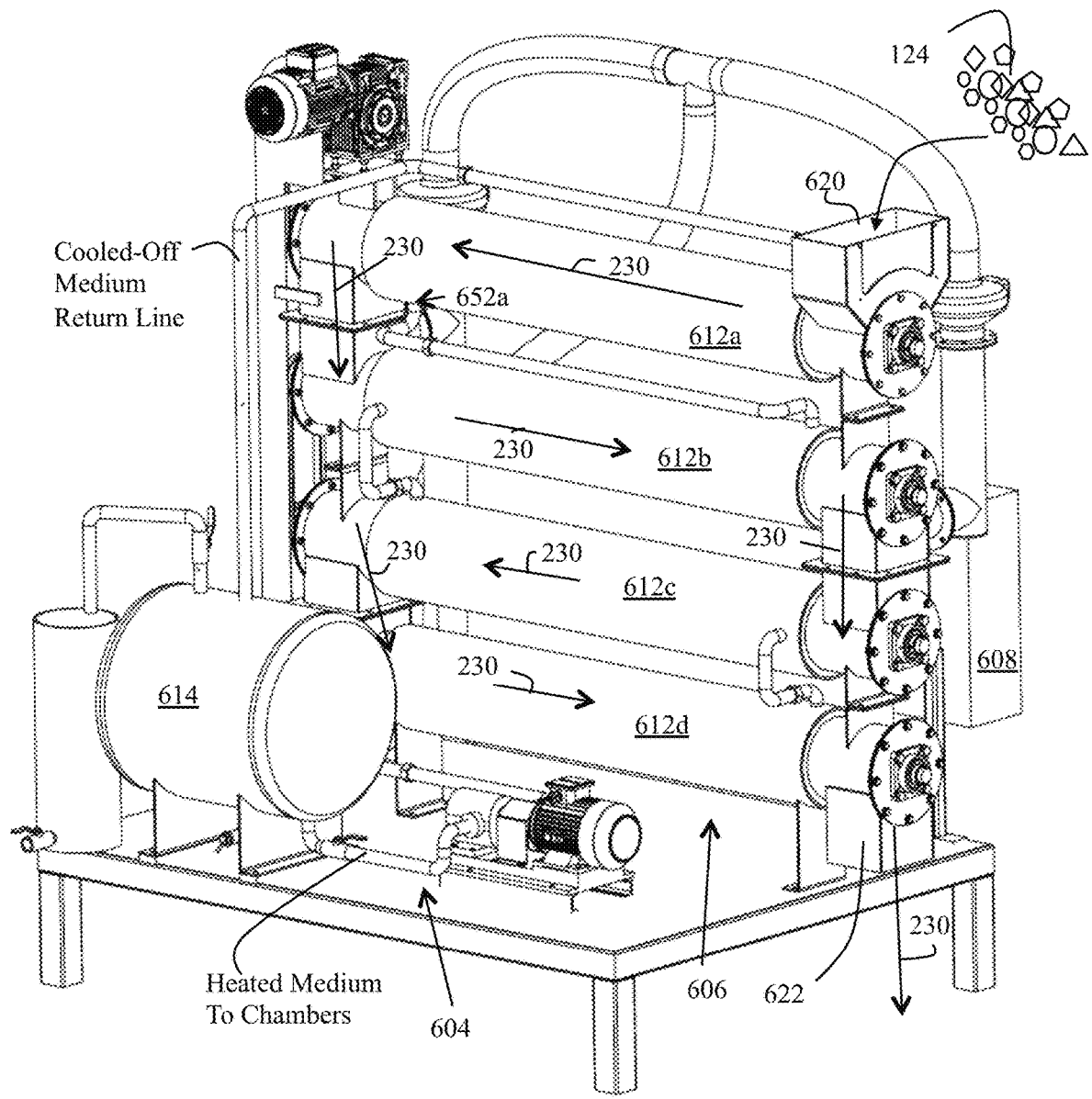
FIGS. 23A to 30 are non-limiting, exemplary illustration of a heat generator and radiant heat processor in accordance with one or more embodiments of the present invention.
Figure 23B:
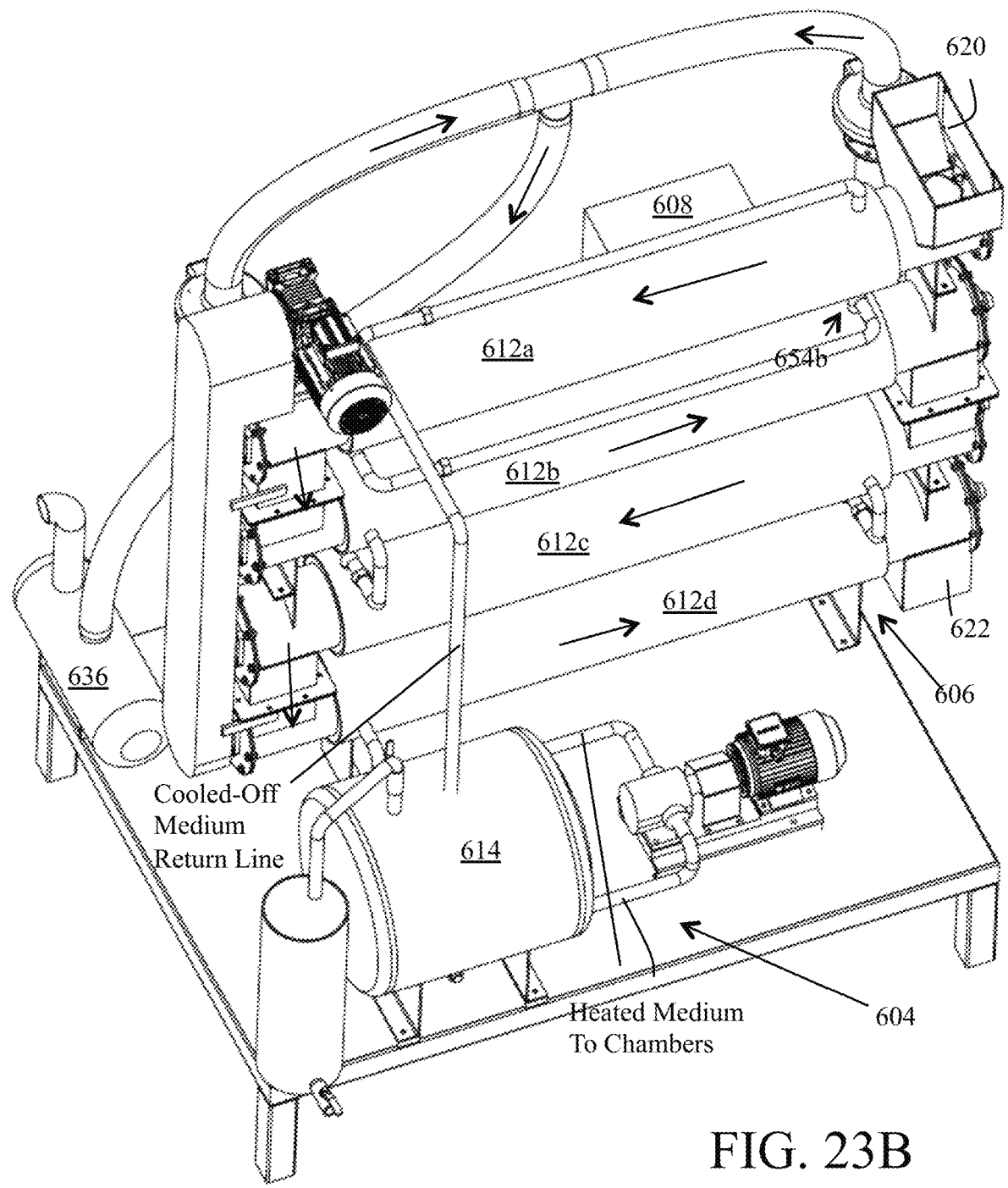
Figure 23C:
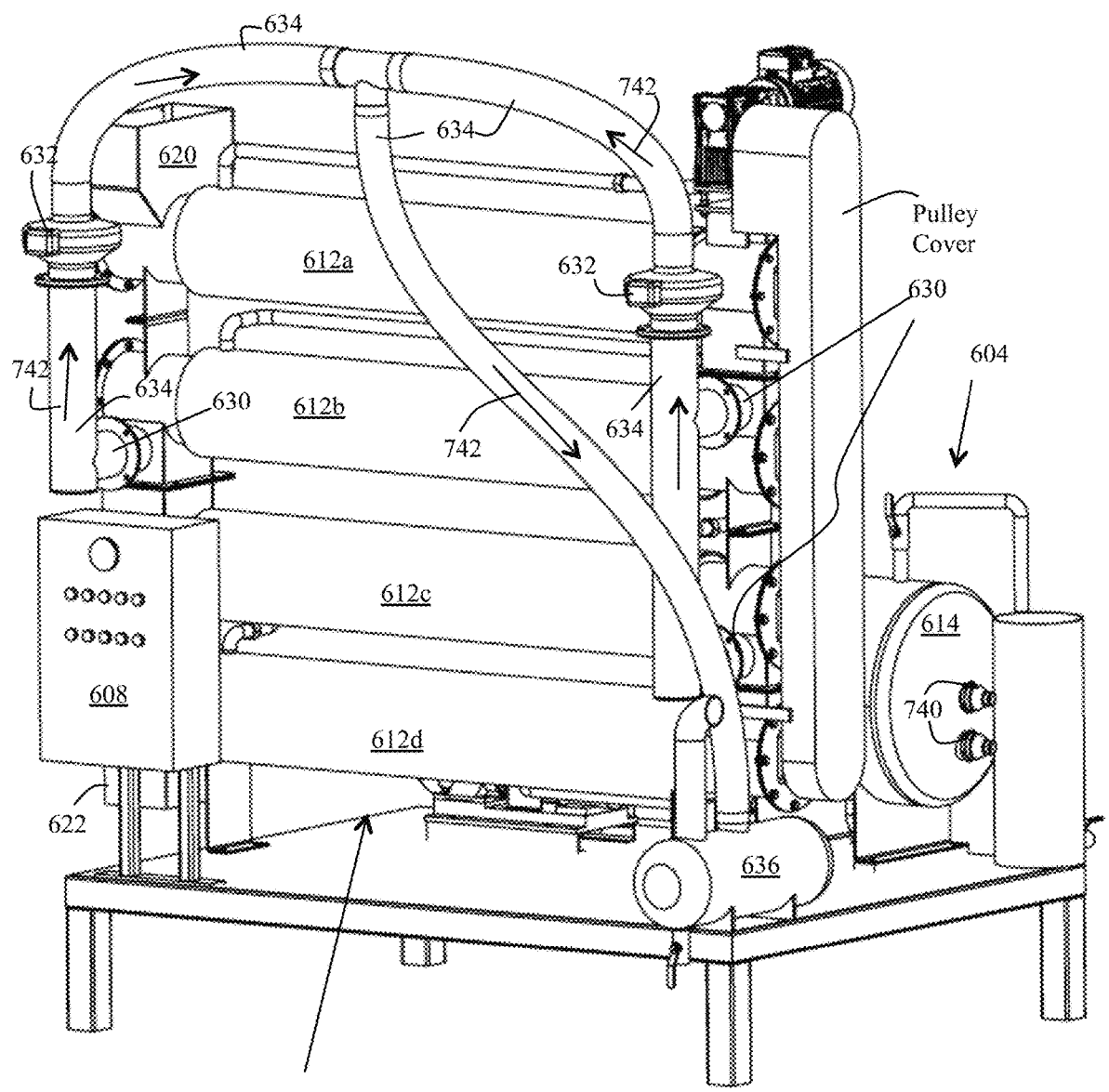
Figure 23D:
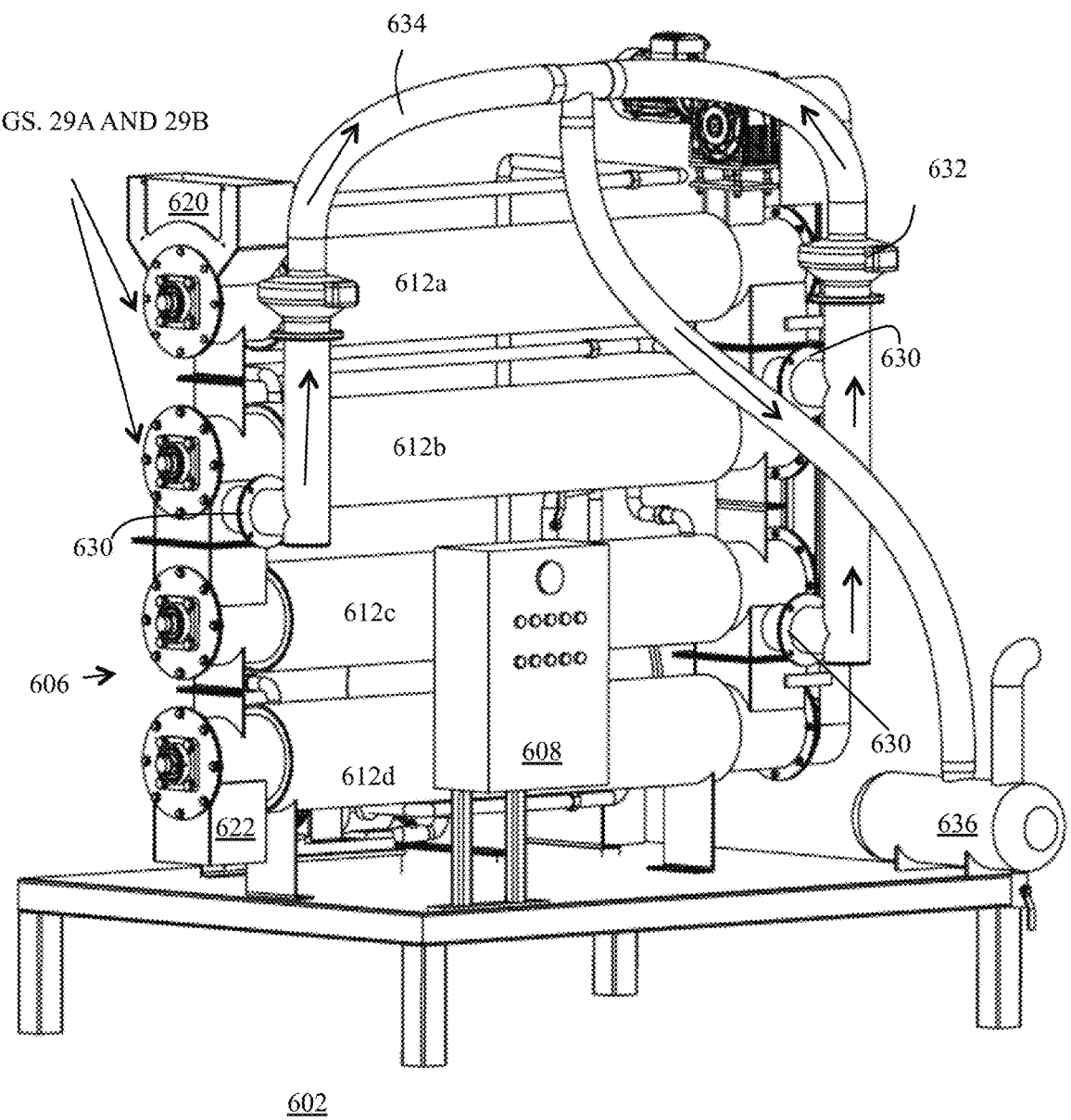
Figure 23E:
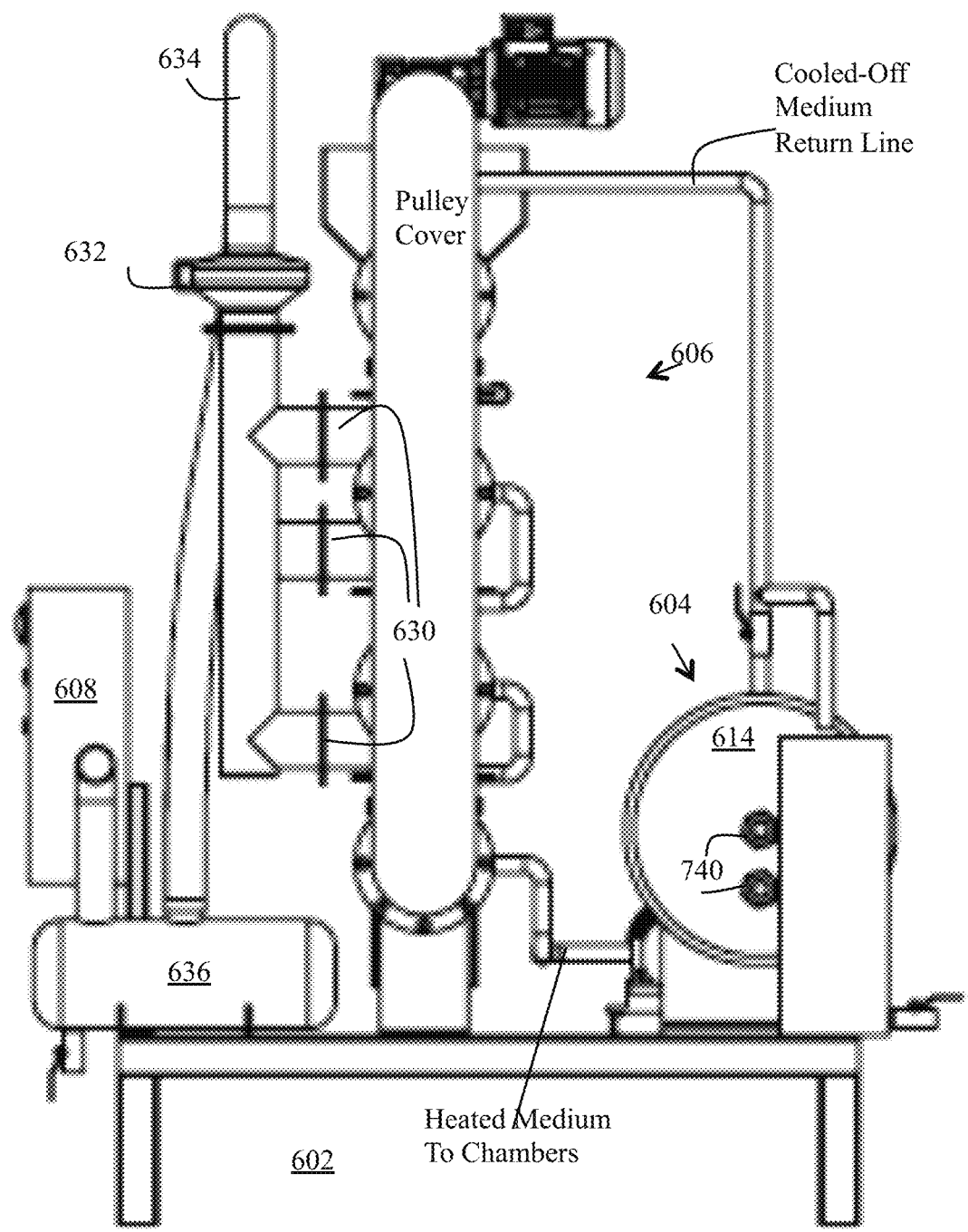
Figure 23F:
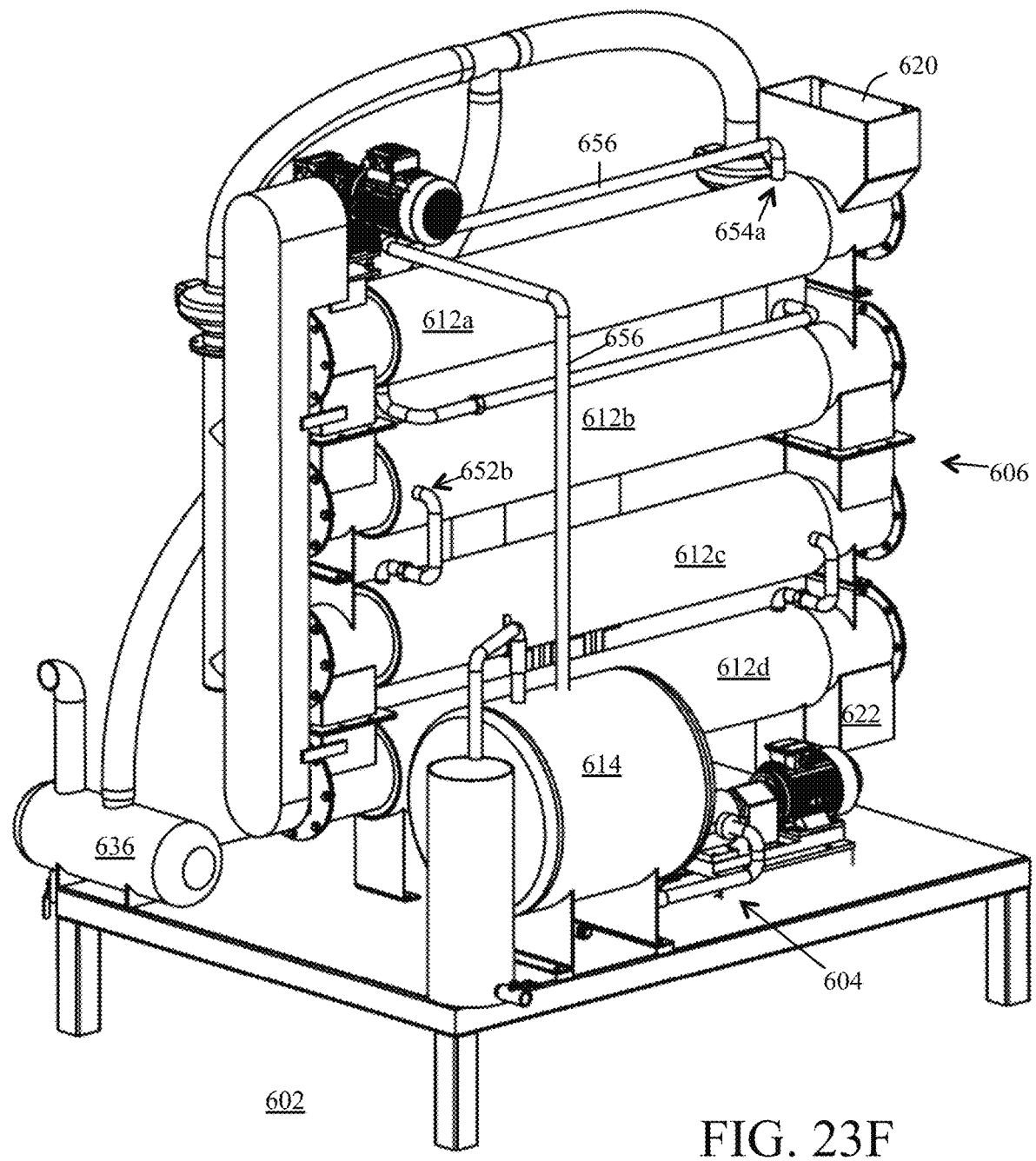
Figure 23G:
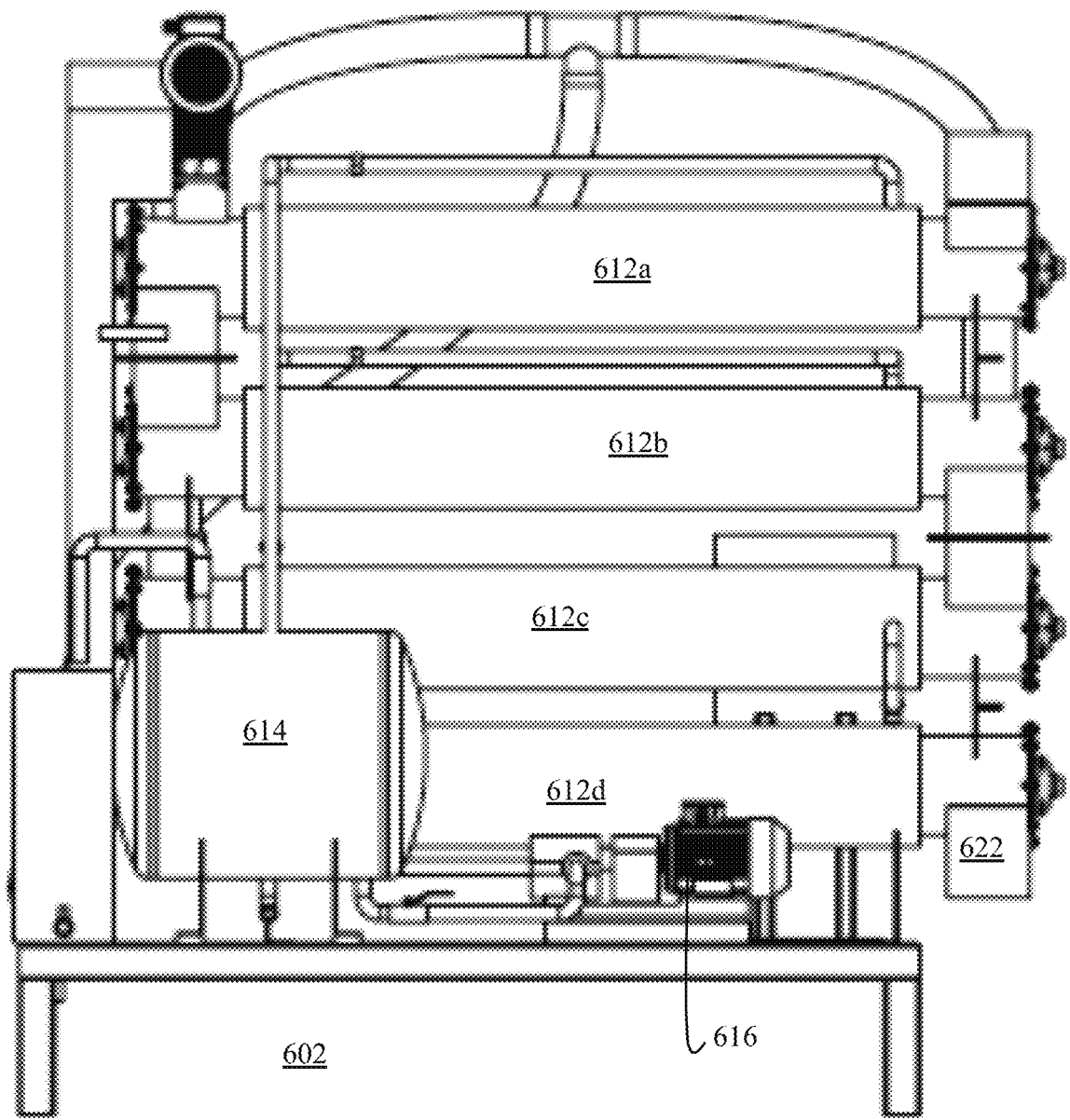
Figure 23H:
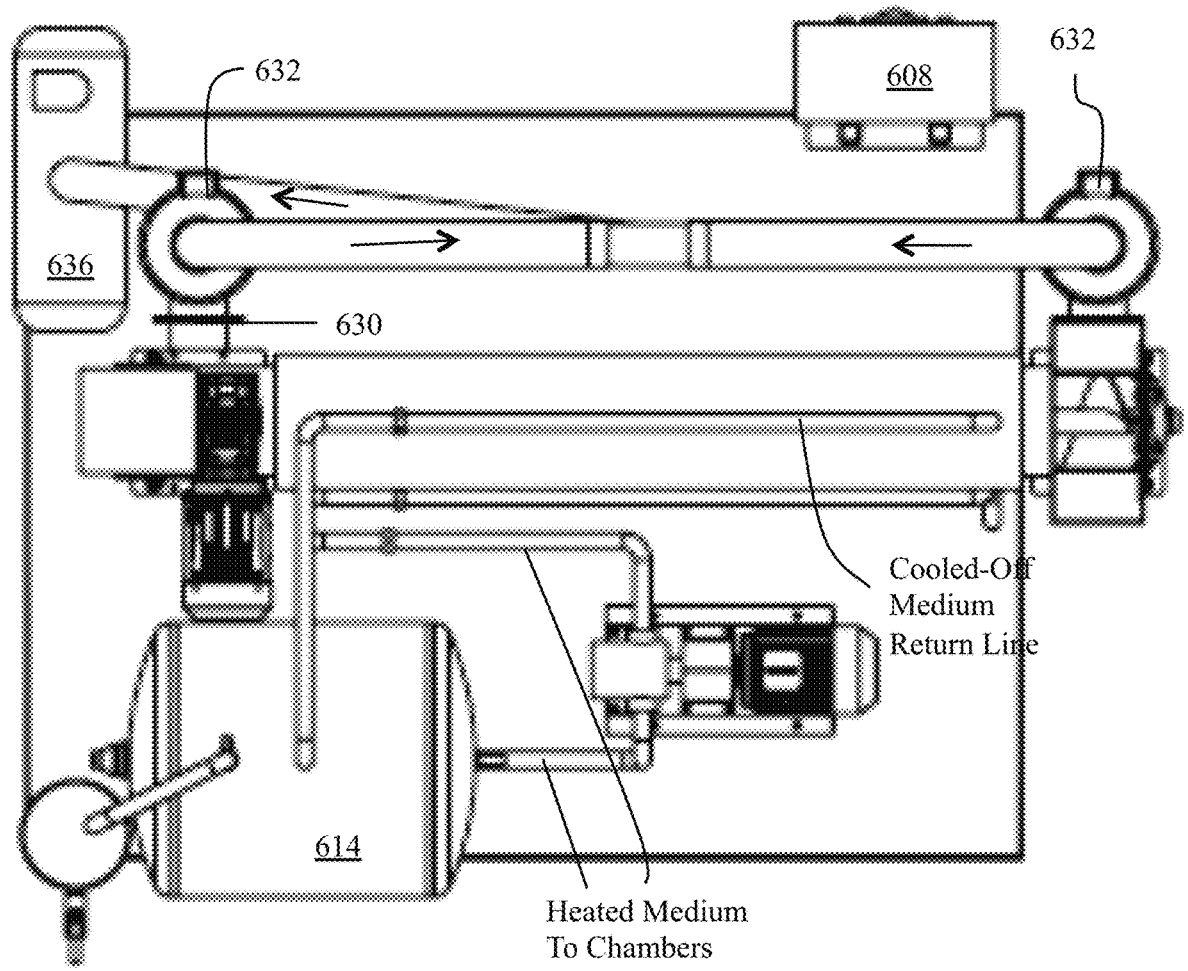
Figure 23I:
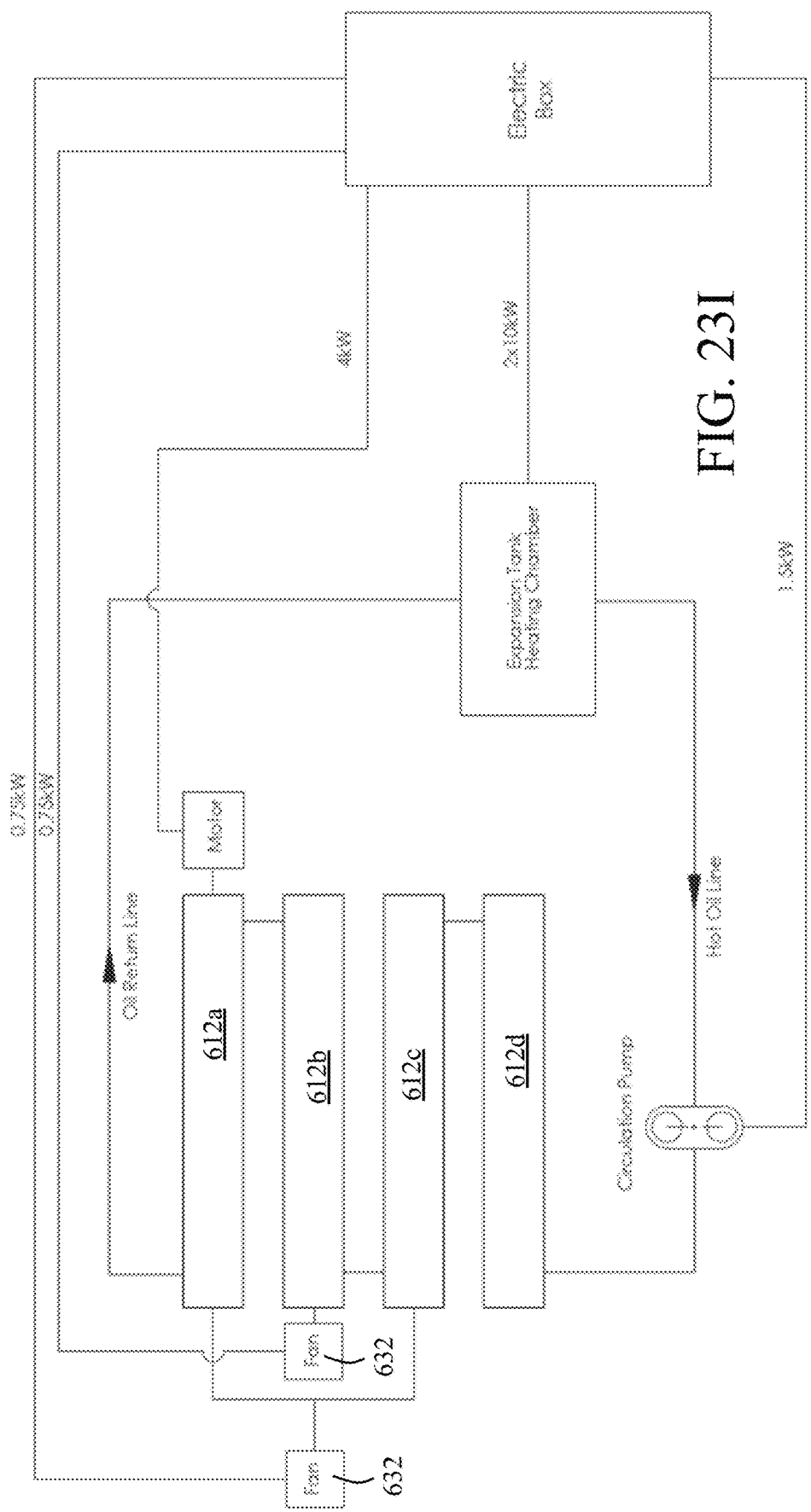

FIGS. 23A to 23I are non-limiting, exemplary illustrations of single platform 602 heat generator 604 and radiant heat processor 606 in accordance with one or more embodiments of the present invention, with FIG. 23I schematically illustrating a circuit diagram of the single platform heat generator and radiant heat processor. As illustrated in FIGS.

Figure 28A:
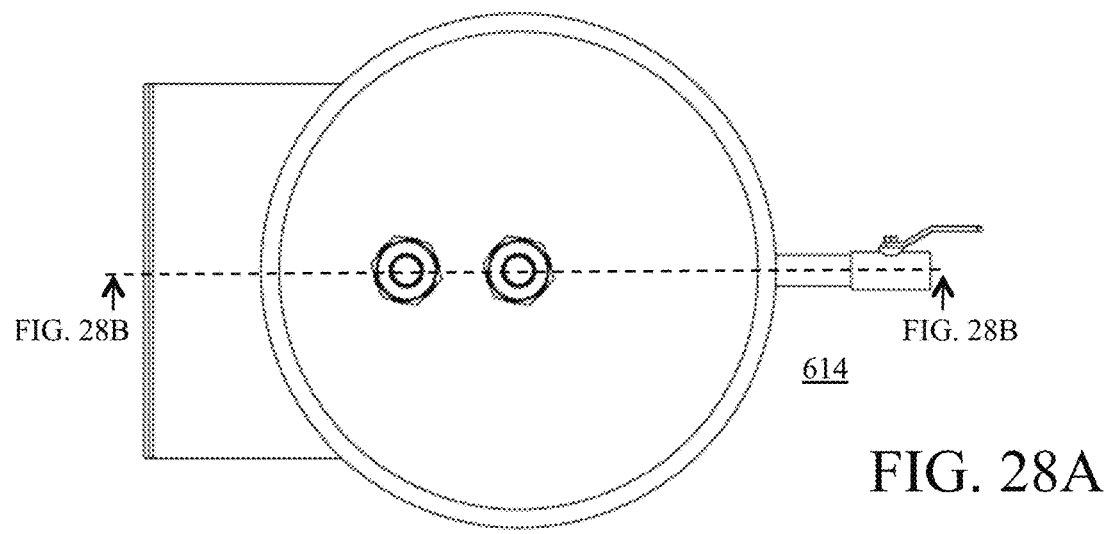
Figure 28B:
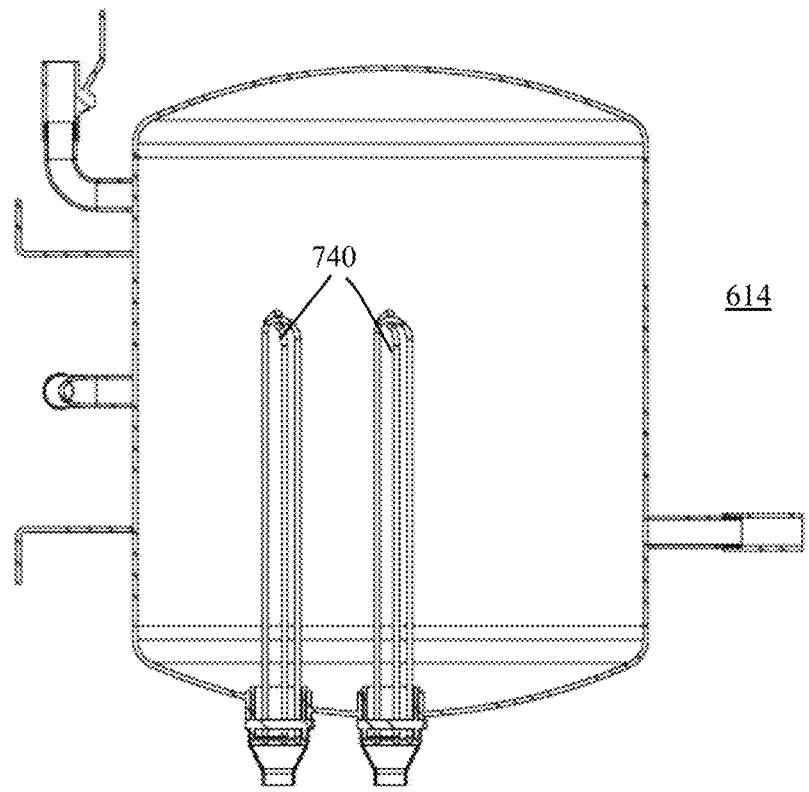

22A to 23I, KWPS 600 single platform 602 with heat generator 604 and radiant heat processor 606, and includes an electronic module (or within cabinet 608) that provides power and control signals to all motors and pumps, including heat elements 606 (FIG. 28B). The electronic module illustrated in the cabinet 608, the pumps, motors, and fans shown are all well known.

Heat generator 604 uses motor-pumps to circulate heated medium through cavity 610 between inner and outer walls 618 and 628 of a radiant heat chamber 612 of radiant heat processor 606. Heat generator 604 includes an expansion heating tank 614 that receives cooled-off medium returned from the radiant heat processor 612. Cooled-off medium is reheated and is re-circulated from expansion heating tank 614 through a motor-pump module (a circulating pump) 616 into the cavity 610 of walls 618 and 628 radiant heat chambers 612 of radiant heat processor 606. Expansion heating tank 614 (best illustrated in detail in FIGS. 28A and 28B) is well known and includes one or more well known heating elements 740.

Medium is moved from within cavity 610 in between walls 618 and 628 of a final, lower radiant heat chamber 612d of radiant heat processor 606 to a next, and subsequent upper chambers 612c, 612b, 612a, and returned back to expansion heating tank 614 to be reheated and re-circulated. Heat generator 604 may also optionally include an excess oil storage. Accordingly, heat generator 604 (as best shown in FIG. 23I) is an enclosed, heat distribution system that delivers, distributes and collects heat deliver medium to each of radiant heat chambers 612 of radiant heat processor 606.

Radiant heat processor 606 is comprised of at least one radiant heat chamber 612 (preferably four or more radiant heat chambers) that receives, heats and aerates by mixing the partially dehydrated, dense, and heated material to generate dehydrated, dry material to thereby kill bacteria. Radiant heat processor 606 includes a main inlet opening 620 for receiving waste at a first (or upper as illustrated) radiant heat chamber 612a, and a main outlet opening 622 at a final (or bottom as illustrated) radiant heat chamber 612d for removing dehydrated, dry material.

There are four radiant heat chambers 612, with first radiant heat chamber 612a being at top and receiving compressed waste from compressor 108 through hopper 620. The waste 124 (shown by arrows 230) travels a first longitudinal axis of first radiant chamber 612a by first auger 624a from an ingress end to egress end. A dryer Waste 124 is dropped by gravity into second radiant heat chamber 612b.

dryer waste travels a second longitudinal axis of second radiant heat chamber 612b by a second auger 624b from an ingress end to egress end. A further dried waste 124 is dropped by gravity into third radiant heat chamber 612c.

Further dried waste 124 travels a third longitudinal axis of third radiant heat chamber 612c by a third auger 624c from an ingress end to egress end. Much dryer waste 124 is dropped by gravity into fourth radiant heat chamber 612d.

Much dryer waste 124 travels a fourth longitudinal axis of fourth radiant heat chamber 612d by a fourth auger 624d from an ingress end to egress end. Dry waste 124 is dropped by gravity out of main outlet opening 622 of fourth radiant heat chamber 612d. Accordingly, waste travels in the opposite direction of a preceding chamber, zigzagging through radiant heat processor 606, and exiting final radiant heat chamber 612d as dry material. It should be noted that a single motor is used to rotate all four augers in all four chambers by a well known gearbox pulley system.

A radiant heat chamber 612 further includes an evacuation opening 630 to remove interior ambient air (moisture and humidity). One or more motorized fans 632 are connected to a plenum assembly 634, which vacuums out interior ambient air 742 to remove moisture into a condensed water storage 636. It should be noted that evacuation outlets 630 are positioned in between chambers 612a and 612b, and in between chambers 612b and 612c, and in between chambers 612c and 612d (alternating between ingress/egress sides thereof as shown in FIGS. 23C, 23D).

Figure 24A:
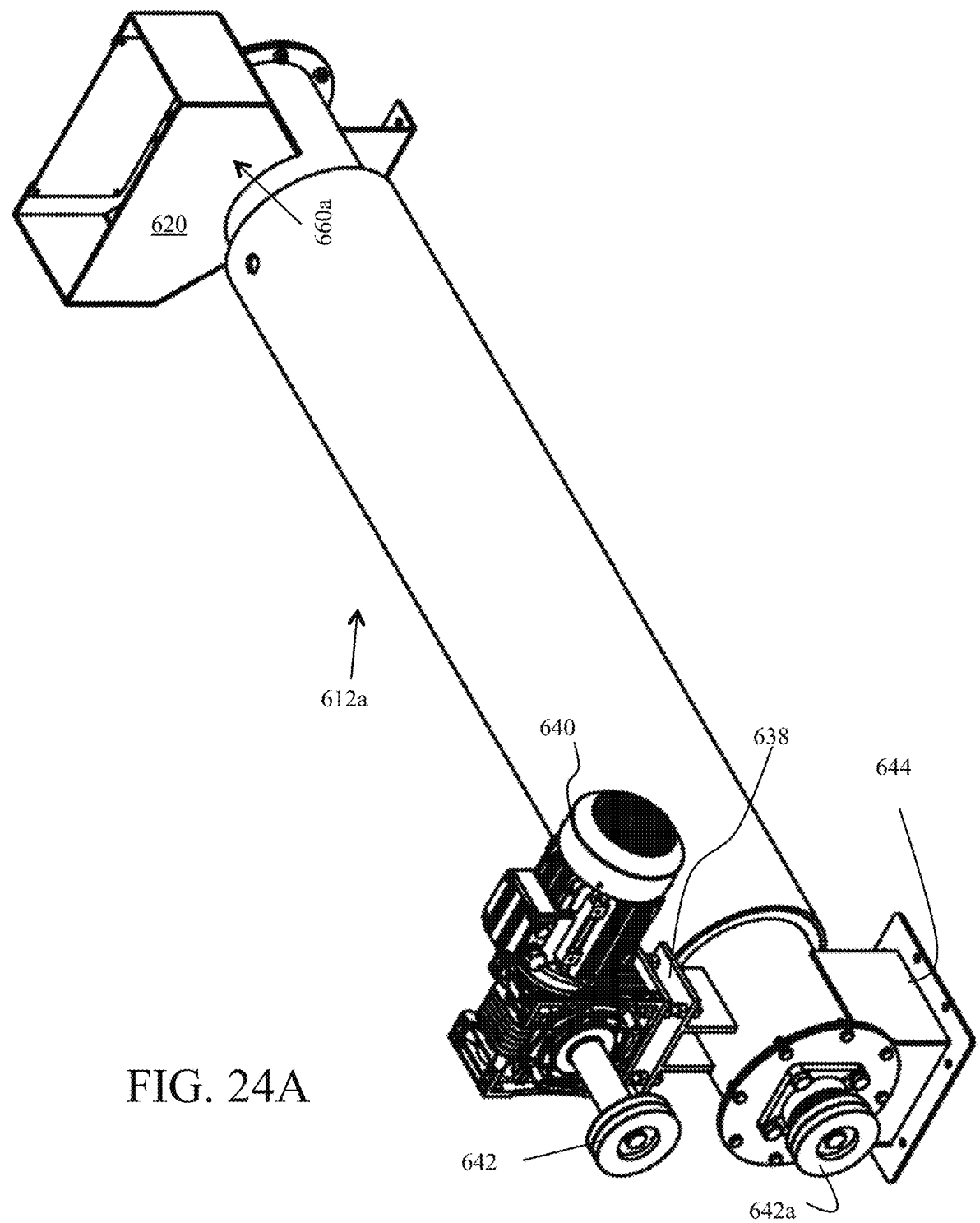
Figure 24B:
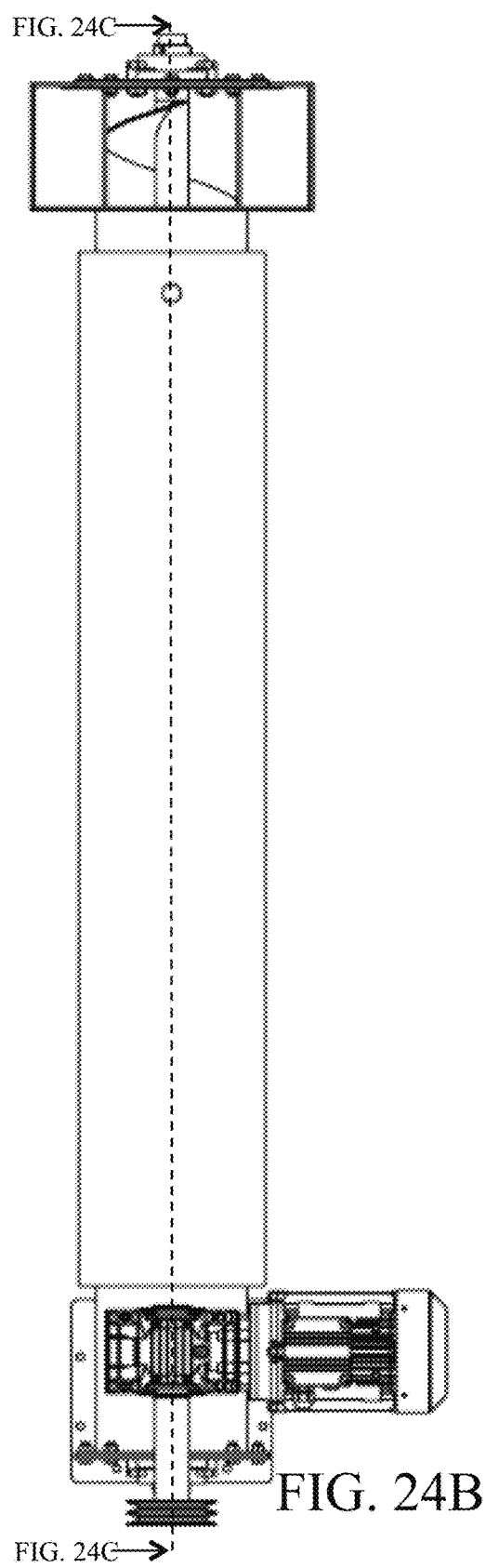
Figure 24C:
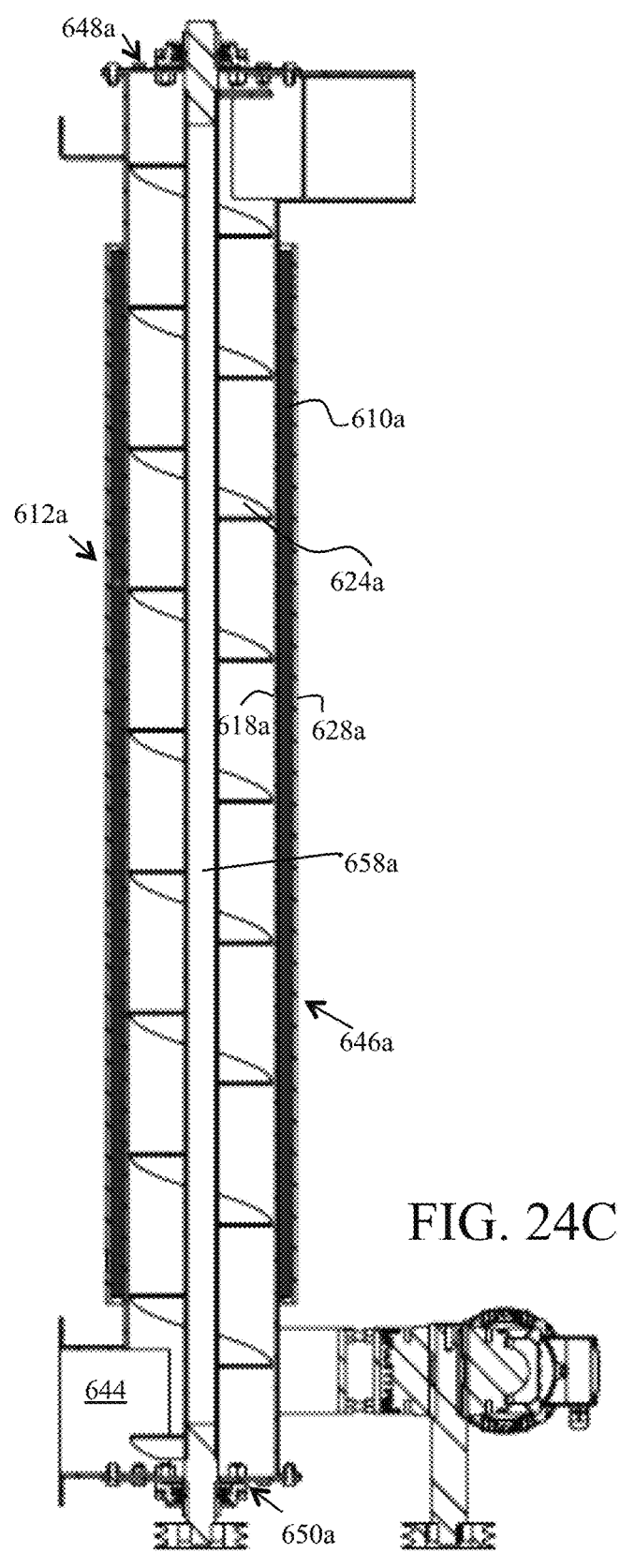
Figure 25A:
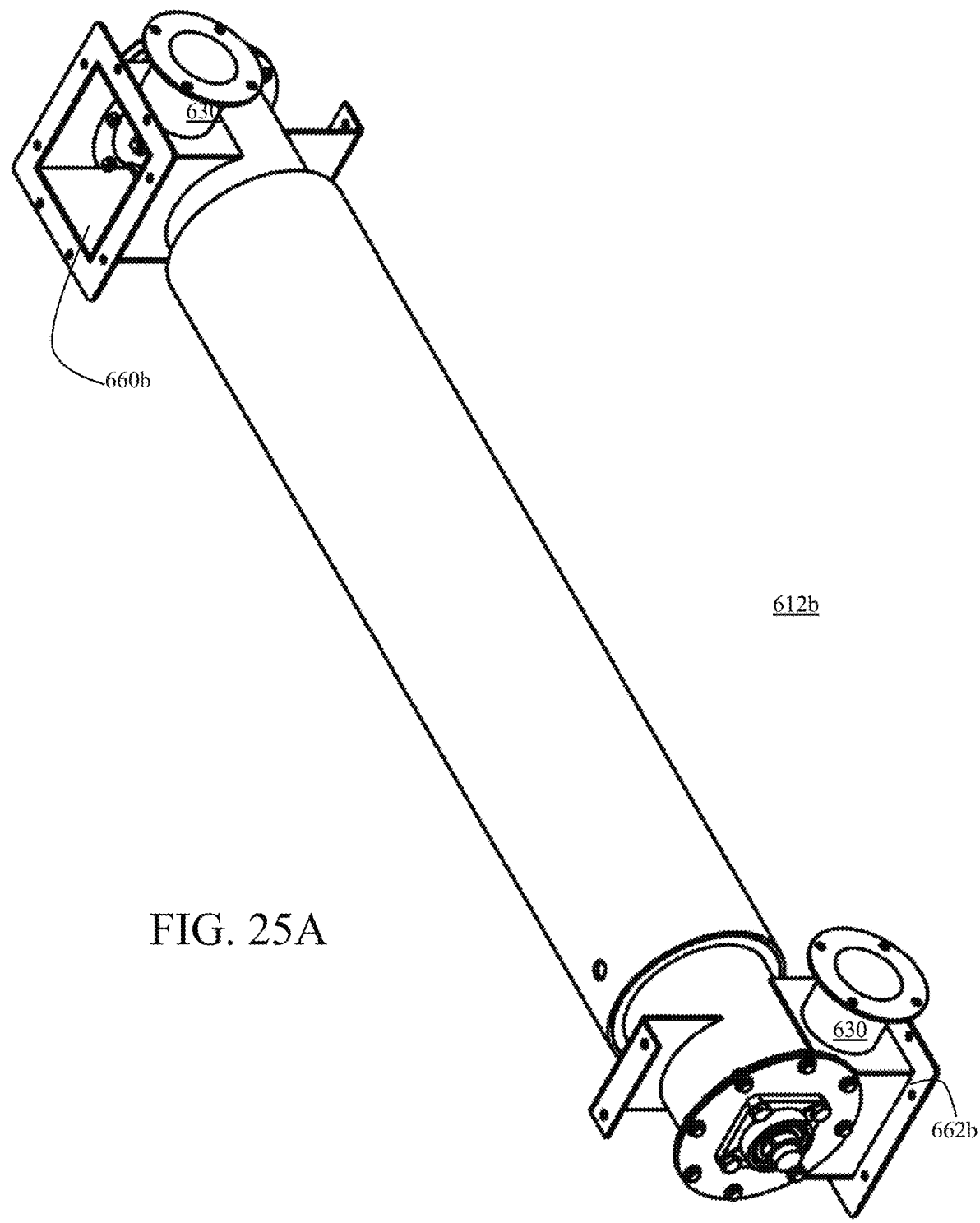
Figure 26A:
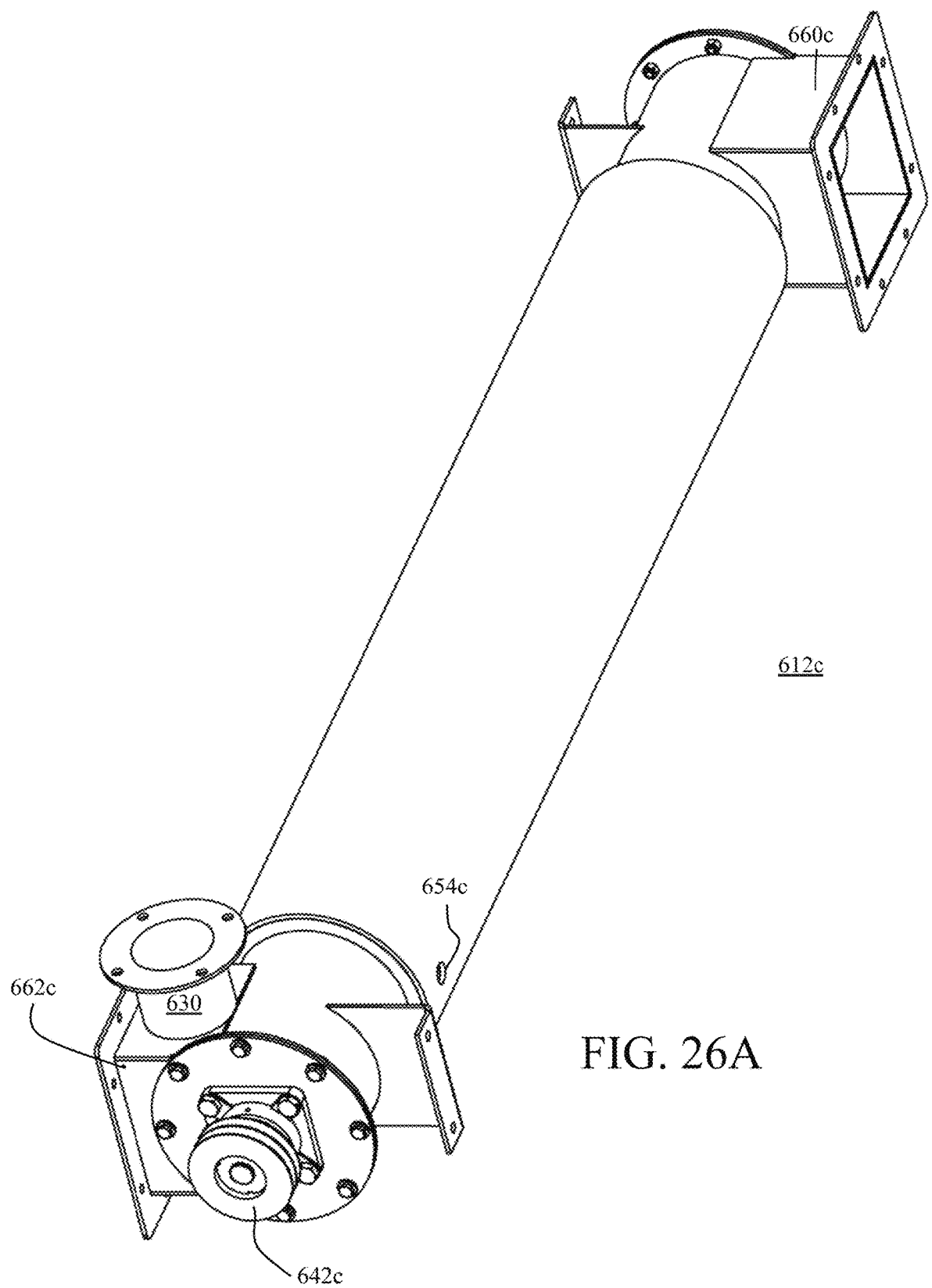
Figure 26D:
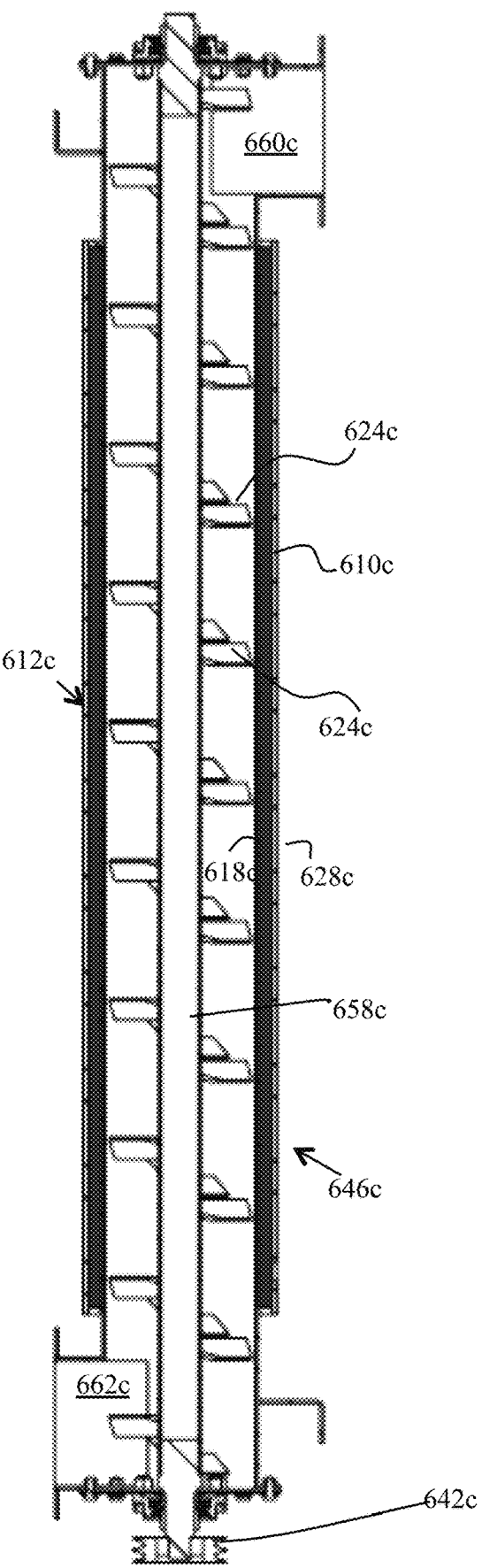
Figure 27A:
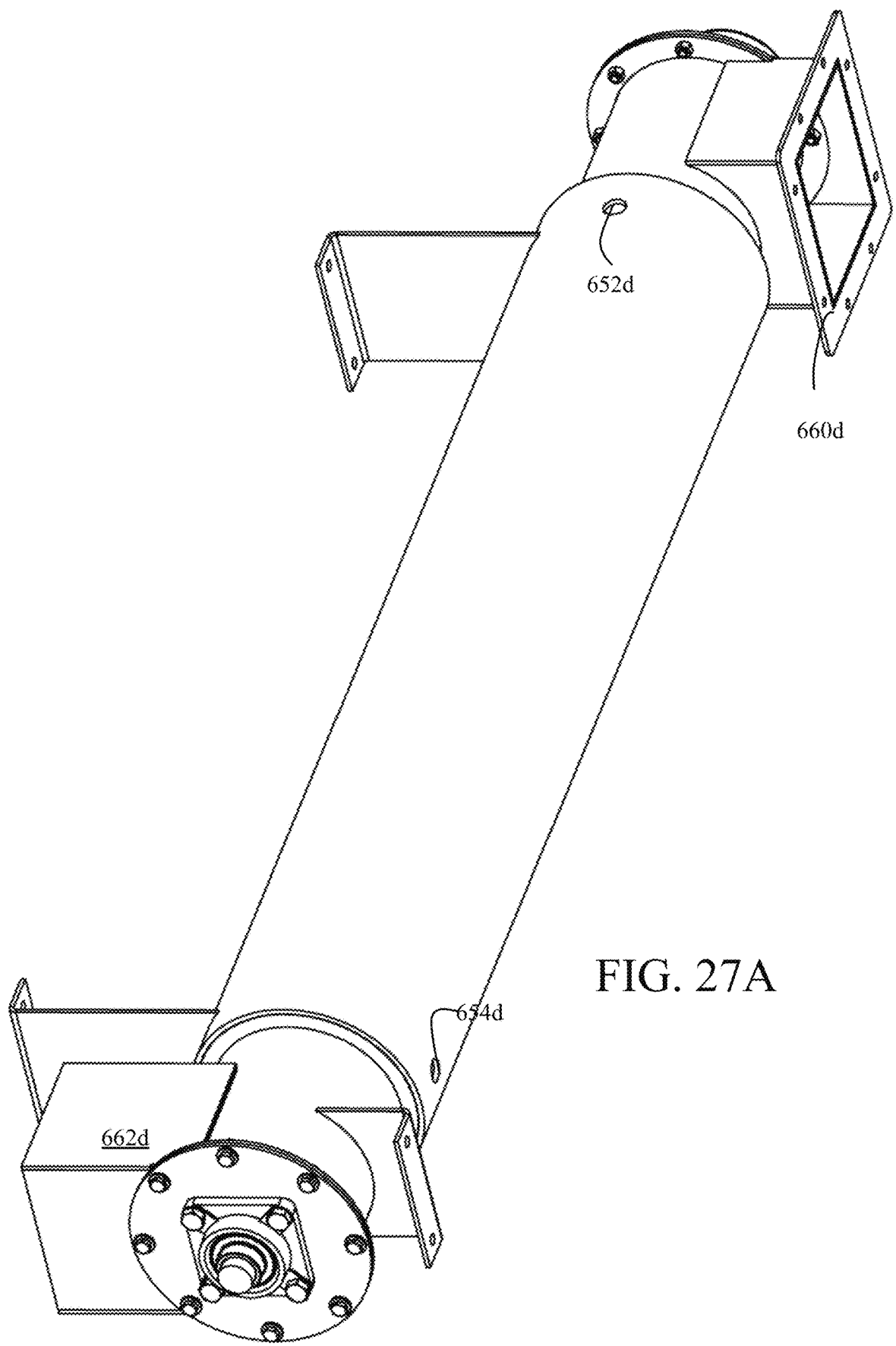
Figure 27D:
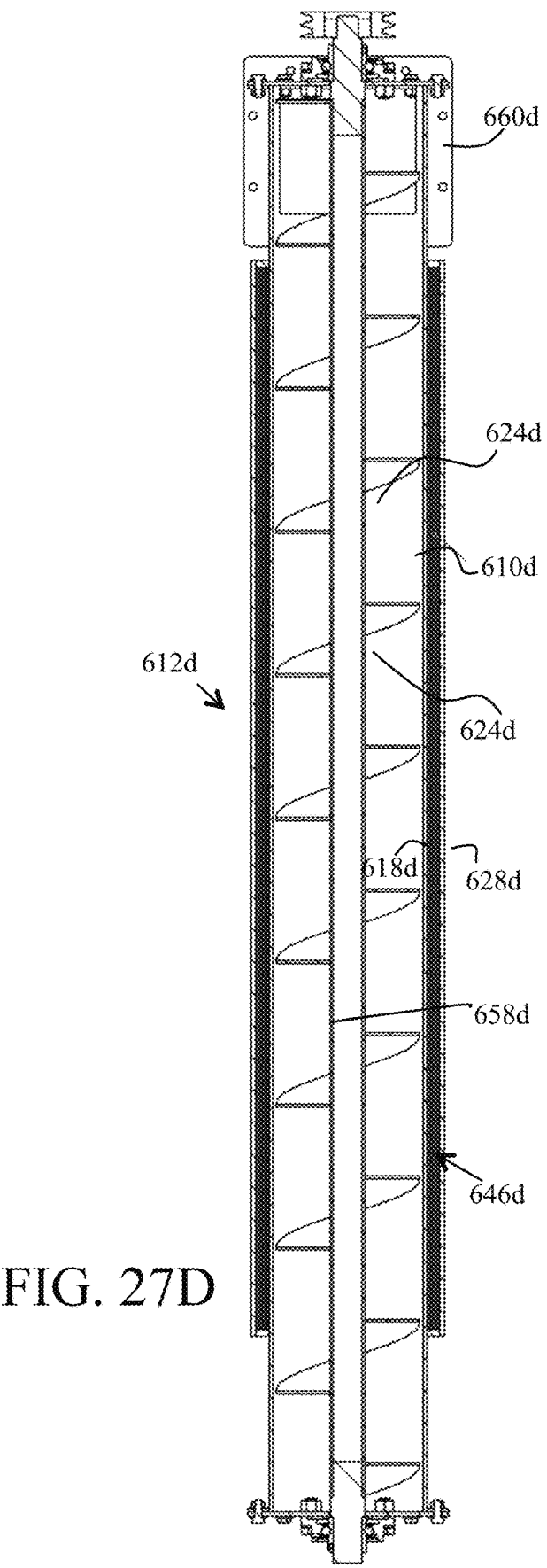

As illustrated in FIGS. 24A to 24C, first heat chamber 612a includes a receiver 660a in a form of hopper 620 at an ingress end to receive waste 124. Further included is a motive force platform 638 at an egress end for mounting the motor 640 that drive a pulley system 642 to rotate all augers of all heat chambers, with first pulley mechanism 642a associated with first heat chamber 612a. First heat chamber 612a also includes an egress opening 644 at a bottom egress side to allow exit of waste to second heat chamber 612b via gravity.

First heat chamber 612a further includes a double-walled cylindrical hollow body 646a with distal end openings 648a and 650a. Doubled-walled cylindrical hollow body 646a includes a compartment 610a in between outer and interior walls 628a and 618a for receiving heated medium through an intake opening 652a at bottom egress side, and an outlet opening 654a at top ingress side recycle cooled off medium back to expansion heating tank 614 via return pipe 656 for reheating.

Figure 29A:
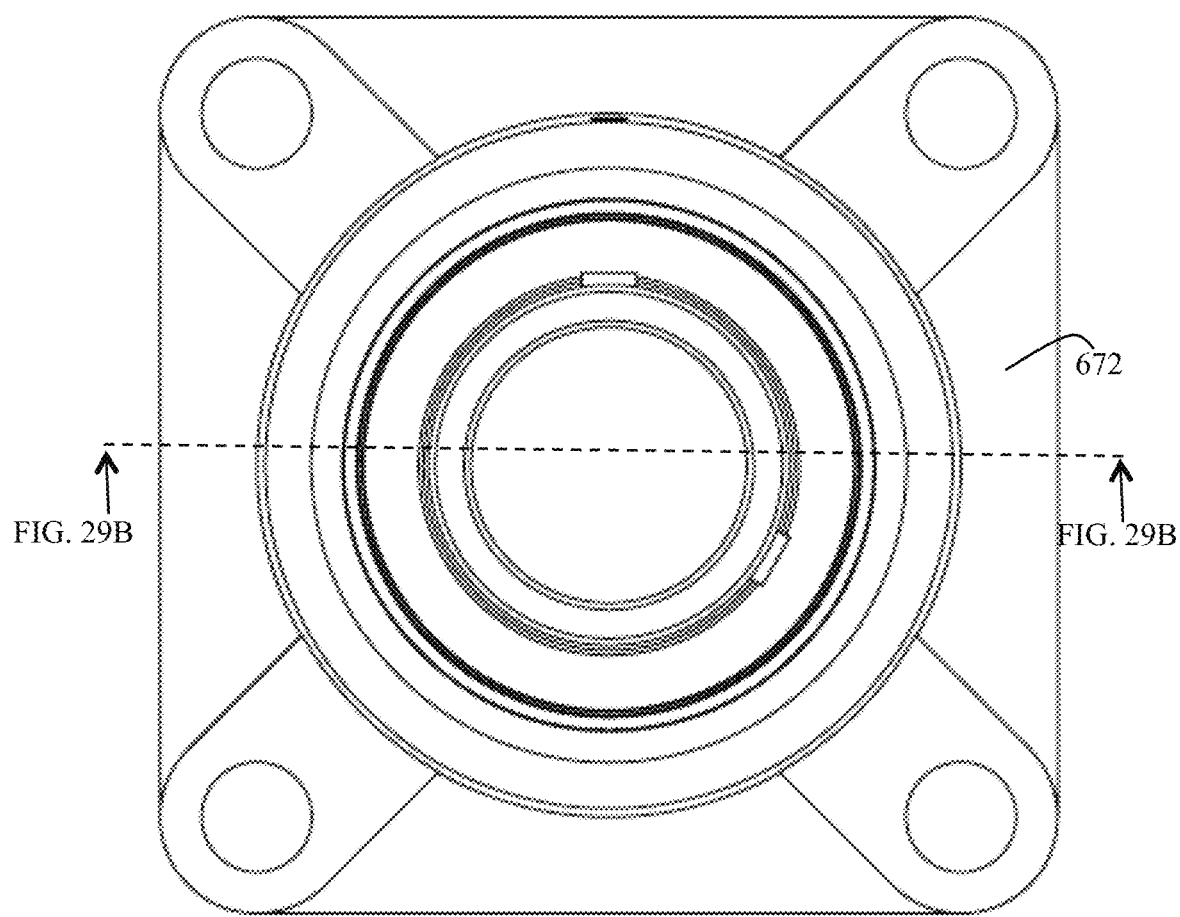
Figure 29B:
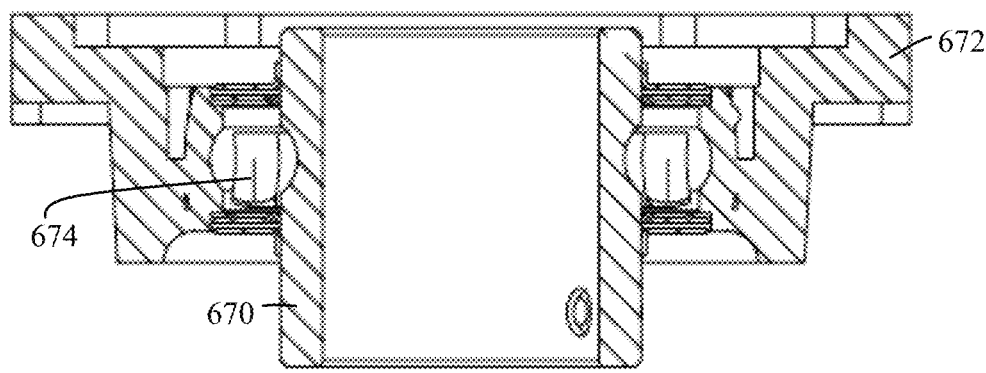
Figure 30:
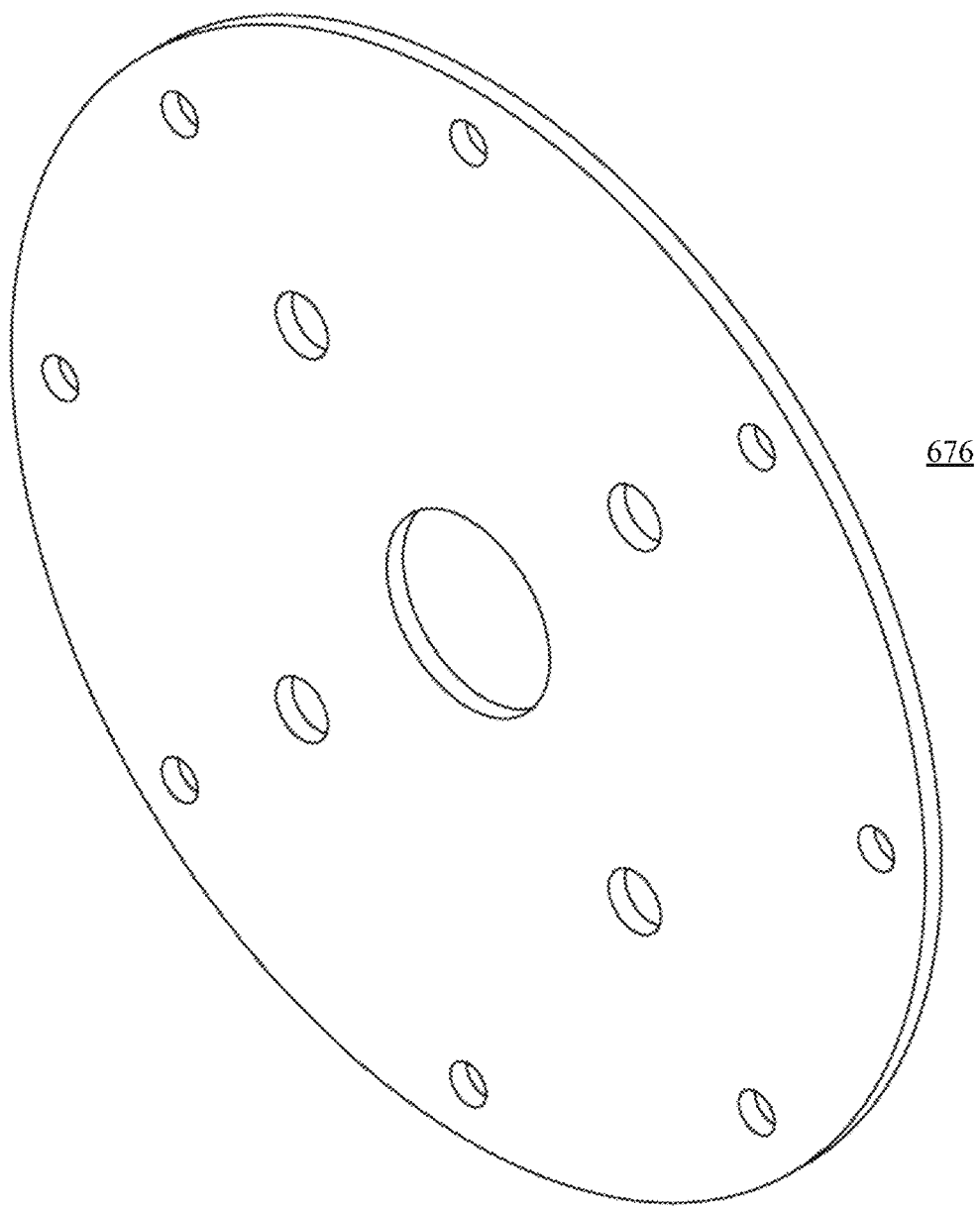

First heat chamber 612a further includes an auger 624a with drive-end connected to first pulley mechanism 642a to rotate a shaft 658a of auger 624a, and an non-drive end that is secured to an ingress side enclosure cover (FIGS. 29A and 29B). The non-drive end of shaft 658a is set within support that includes a set of bearings in a well known manner, details of which are shown in FIGS. 29A and 29B, with the support secured to an end cap.

As illustrated in FIGS. 25A to 25E, second heat chamber 612b includes a receiver 660b at an ingress end to receive waste. Further included is a second pulley mechanism 642b at an ingress end to rotate a first hammer auger 624c. Use of hammer augers provide improved aeration of material. Second heat chamber 612b also includes an egress opening 662b at a bottom egress side to allow exit of waste to third heat chamber 612c via gravity.

Second heat chamber 612b further includes a double-walled cylindrical hollow body 646b with distal end openings 648b and 650b. Doubled-walled cylindrical hollow body 646b includes a compartment 610b in between outer and interior walls 628b and 618a for receiving heated medium through an intake opening 652b, and an outlet opening 654b to recycle cooled off medium back to expansion heating tank 614 for reheating.

Second heat chamber 612b further includes first hammer auger 624b with drive-end connected to a second pulley mechanism 642b to rotate a second shaft 658b of the hammer auger 624b, and an non-drive end that is secured to an ingress side enclosure cover (FIGS. 29A and 29B).

As illustrated in FIGS. 26A to 26D, third heat chamber 612c includes a receiver 660c at an ingress end to receive waste. Further included is a third pulley mechanism 642 at an egress end to rotate a second hammer auger 624c. The third heat chamber 612c also includes an egress opening 662c at a bottom egress side to allow exit of waste to fourth heat chamber 612d via gravity.

Third heat chamber 612c further includes a double-walled cylindrical hollow body 646c with distal end openings 648c and 650c. Doubled-walled cylindrical hollow body 646c includes a compartment 610 in between outer and interior walls 628c and 618c for receiving heated medium through an intake opening 652c, and an outlet opening 654c to recycle cooled off medium back to expansion heating tank 614 for reheating.

Third heat chamber 612c further includes a second hammer auger 624c with drive-end connected to a third pulley mechanism 642c to rotate shaft 658c of second hammer auger 624c, and an non-drive end that is secured to an ingress side enclosure cover (FIGS. 29A and 29B).

As illustrated in FIGS. 27A to 27D, fourth heat chamber 612d includes a receiver 660d at an ingress end to receive waste. Further included is a fourth pulley mechanism 642d at an ingress end to rotate an auger 624d. The fourth heat chamber 612d also includes an egress opening 662d (in a form of ingress end 622) at a bottom egress side to allow exit of waste to fourth heat chamber 612d via gravity.

Fourth heat chamber 612d further includes a double-walled cylindrical hollow body 646d with distal end openings 248d and 250d. Doubled-walled cylindrical hollow body 646d includes a compartment 610d in between outer and interior walls 628d and 618d for receiving heated medium through an intake opening 652d, and an outlet opening 654d to recycle cooled off medium back to expansion heating tank 614 for reheating.

Fourth heat chamber 612d further includes auger 624d with drive-end connected to a fourth pulley mechanism 642d to rotate a fourth shaft 658d of the auger 624d, and an non-drive end that is secured to an ingress side enclosure cover (FIGS. 29A and 29B).

FIGS. 28A and 28B are non-limiting, exemplary illustrations of an expansion heating tank presented accordance with one or more embodiments of the present invention. As illustrated, expansion heating tank 614 includes one or more well known heating elements 740 that heat a medium for generating radiant heat. Expansion heating tank 614 includes well known intake and outlet tubes to enable proper circulation of the medium.

FIGS. 29A to 29C are non-limiting, exemplary illustrations of a support for a non-drive end of an auger in accordance with one or more embodiments of the present invention. As illustrated in FIGS. 22A to 29C, non-drive end 670 of a shaft 658 is set within support 672 that includes a set of bearings 674 in a well known manner, with the support 672 secured to an end cap 676 (FIG. 30) in a well known manner.

Figure 31:
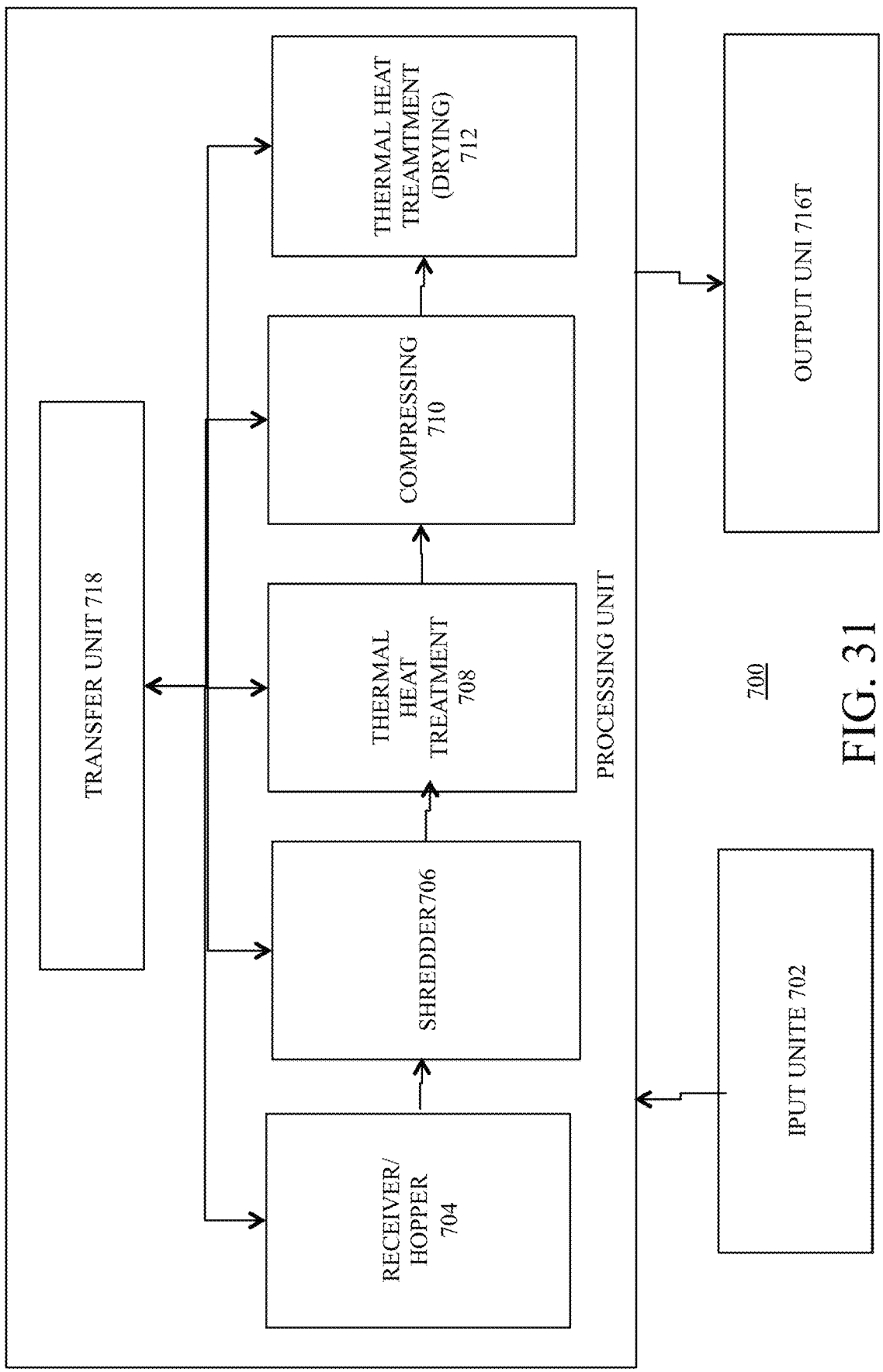
FIG. 31 is a non-limiting, exemplary systems overview of a method of processing wastes into useable products in accordance with one or more embodiments of the present invention.

FIG. 31 is a non-limiting, exemplary systems overview of a method of processing wastes into useable products in accordance with one or more embodiments of the present invention. System 700 illustrated in FIG. 31 includes processing of waste through an input unit, a processing unit and an output unit.

In particular, unlike the TWPS 100 or KWPS 600 described above, the order of processing of waste within system 700 illustrated in FIG. 31 is different. That is, instead of compressing food by a compressor 108 and later application of radiant heat by a radiant heat device 116 or radiant heat processor 606 (as was done for the respective TWPS 100 and KWPS 600 above), with system 700, heat is applied to waste (for thermal treatment of biomass waste for example) at processing operations 708, and later compressed at processing operations 710, with final thermal treatment processing operations 712. Although less efficient, this process ensures that biomass waste is mostly bacteria free due to two separate drying processing operations 708 and 712.

Any one of the one or more equipments detailed in TWPS 100 and KWPS 600 above may be used in any one of the appropriate processing operations of system 700. In particular, collector/shredder processing operations XXX and XXX may be accomplished by use of the shredder disclosed in U.S. Pat. No. 9,423,178 and U.S. patent application Ser. No. 15/001,082, both to Mardikian.

The thermal treatment processing operations 708 and 712 may be accomplished by heat generator 114 and radiant heat device 116 of TWPS 100 or, alternatively, by single platform a heat generator 604 and a radiant heat processor 606 of KWPS 600. The thermal treatment processing operations 708 and 712 may also be accomplished by thermal treatment apparatus disclosed in U.S. patent application Ser. No. 15/001,091 to Mardikian, the entire disclosure of which is incorporated by reference in its entirety herein.

The pressing operations 710 of system 700 may also be accomplished by compressor 108 described above or, alternatively, by pressing apparatus disclosed in U.S. patent application Ser. No. 15/048,513 to Mardikian, the entire disclosure of which is incorporated by reference in its entirety herein.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Further, the specification is not confined to the disclosed embodiments. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, inside, outside, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction, orientation, or position. Instead, they are used to reflect relative locations/positions and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

Further the terms "a" and "an" throughout the disclosure (and in particular, claims) do not denote a limitation of quantity, but rather denote the presence of at least one of the referenced item.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A system for processing waste, comprising:
a receiver member to receive waste;
a first stage that includes a first module that comprises a shredder that reduces a size of received waste into smaller constituent parts;
a second stage that includes second module that comprises a single chamber, longitudinally extending multi-phase adjustable compressor that includes:
a longitudinally extending, multi-stage compression auger assembly, comprising:
an asymmetrical, longitudinally extending shaft;
a plurality of flighting modules detachably mounted and secured along a flighting mount section of the shaft;
a plurality of spacers detachably mounted and secured in between flighting modules along the flighting mount section of the shaft;
the single chamber, longitudinally extending multi-phase adjustable compressor applies continuous, progressively increasing compressive force at each phase to increasingly compress the smaller constituent parts into partially dehydrated, dense, and heated material, with an adjustable egress phase enabling adjustment of compression force that is transferred to preceding phases;
the smaller constituent parts move from a phase to a next phase as greater mass of smaller constituent parts is introduced at an intake end, pushing existing smaller constituent parts to the next phase;
the smaller constituent parts move from the phase to the next phase at a progressively slower and slower rate, enabling the smaller constituent parts to remain at the next phase at a longer duration then at a preceding phase;
the slower rate of movement and longer duration of stay of the smaller constituent parts at the next phase cause accumulation of greater mass of smaller constituent parts at the next and subsequent phases as the smaller constituent parts egress from the preceding, faster moving phase and into the next phase;
the continuously accumulating smaller constituent parts at the next phase increasingly experience higher compressive and higher frictional forces as greater mass of smaller constituent parts are accumulated in a smaller and smaller volume, resulting in generated temperatures that further vaporize moisture, in addition to further compression and condensing of smaller constituent parts;
a third stage that includes a third module and a fourth module:
the third module of the third stage includes a heat generator that generates heat for the fourth module;
the fourth module including a heating device that receives and further heats and aerates the partially dehydrated, dense, and heated material to generate dehydrated, dry material.

2. The system for processing waste as set forth in claim 1, wherein:
the second module further includes a motive force system comprised of a motor associated with a gearbox, a combination of which are associated with the longitudinally extending, multi-stage compression auger assembly of the single chamber, multi-phase adjustable compressor;
the motive force system of the second module generates sufficient torque to rotate the longitudinally extending, multi-stage compression auger assembly.

3. The system for processing waste as set forth in claim 1, wherein:
the asymmetrical, longitudinally extending shaft of the multi-stage compression auger assembly is secured to a frame of the single chamber, multi-phase adjustable compressor at both intake-side and egress-side of the frame by bearings to prevent shaft from wobbling while enabling rotation.

4. The system for processing waste as set forth in claim 1, wherein:
the single chamber, multi-phase adjustable compressor further includes:
a feeder that is connected to a second frame wall of an intake-side bearing compartment and a cage of the single chamber, multi-phase adjustable compressor through a feeder connection section;
the feeder connection section includes a through opening within which a first flighting module of the flighting modules is positioned;
the feeder connection section includes a set of radial positioned holes away from axis center of the through opening for fastening the feeder to the frame;
the feeder includes a hopper section that extends above frame of the single chamber, multi-phase adjustable compressor to receive and direct waste to the first flighting module.

5. The system for processing waste as set forth in claim 1, wherein:
the single chamber, multi-phase compressor further includes:
a cage assembly;
the cage assembly has an interior cylindrical configuration with a first and second opening ends;
the cage assembly has a central longitude axis that defines a length of the cage, and a transverse axis that includes a uniform diameter along the length of the cage;
the cage assembly is comprised of a first cage member and a second cage member that when assembled, form the cage assembly;
first and second cage members are mirror images of one another and each include:
a first connection portion and a second connection portion that extend along a length of the first and the second cage members, with the first and the second connection portions including one or more connection openings that receive fasteners to assemble the first and the second cage members;
a semi-circular portion between the first and the second connection portions with a uniform radius along a length of the first and the second cage members, with uniform radii of the first and the second member forming the uniform diameter of the first and the second openings of the interior cylindrical configuration of the cage assembly;
exterior sides of the first and the second cage members of the cage assembly further include reinforcement flanges that form a set of stiffeners to strengthen the structural integrity of the cage assembly;
the reinforcement flanges have a first and a second ends that are connected to respective the first and the second connection portions;
the reinforcement flanges have a semi-annular, crescent configuration with a generally uniform height, protruding from the exterior side;
the reinforcement flanges function to protect the cage assembly from being bent due to the large compression forces experienced by the cage assembly;

the first and the second members further include small drainage openings that enable any accumulated liquid within the cage assembly to drain out via gravity into a liquid drainage, where it is then directed to a filter mechanism;

the cage assembly further includes screen mesh that cover over the interior walls of the first and the second members, covering over the small drainage openings, functioning as a strainer, to strain solids from liquids.

6. The system for processing waste as set forth in claim 1, wherein:

the asymmetrical, longitudinally extending shaft includes:
a shaft length that extends along, a shaft longitudinal, axis;
a shaft width that extends along a shaft transverse axis, perpendicular to the shaft longitudinal axis;
the shaft is comprised of a plurality of shaft sections with a shaft section having a shaft section length and a shaft section width, with the shaft section width of the shaft section generally decreasing from intake-side of the shaft to the egress side of the shaft.

7. The system for processing waste as set forth in claim 1, wherein:

the plurality of flighting modules are comprised of:
a general length that spans along a flighting module longitudinal axis, and a general width that spans along a flighting module transverse axis, perpendicular the flighting module longitudinal axis;
the plurality of flighting modules include a hollow generally cylindrical body forming a cylinder with a bore;
the cylindrical body includes an inner diameter and an outer diameter, with the difference between inner and outer diameters defining a thickness of the cylindrical body;
the inner diameter generally adapted according to a shaft outer diameter of a fligthing mount position of the flighting module;
interior wall of the bore includes a locking structure, forming a keyway;
the plurality of flighting modules further include flightings that are comprised of:
a semi-helical screw blade that includes a blade body with first and second compression ends;
the blade body protrudes from an outer surface of the cylindrical body at a first angle at a first end and a second angle at a second free end to form the first and second compression ends, and extends at a third angle, wrapping helically along the cylindrical body to define blade pitch and blade height;
blade body includes an outer blade body side, an inner blade body side, and a top blade body side.

8. The system for processing waste as set forth in claim 7, wherein:

the thickness of the cylindrical body a flighting module of the plurality of flighting modules increase from intake side to egress side of the multi-stage compression auger assembly, with the thickness varied due to longer outer diameter.

9. The system for processing waste, as set forth in claim 1, wherein:

a spacer of the plurality of spacers is positioned between a flighting module of the plurality of flighting modules and a next flighting module of the plurality of flighting modules, providing a distance of separation between the second compression end of the flighting module and the first compression end of the next flighting module.

10. The system for processing waste as set forth in claim 1, wherein:

a spacer of the plurality of spacers is comprise of a hollow, annular structure with an inner diameter and an outer diameter;
an interior wall of the spacer includes a locking structure, forming a keyway.

11. The system for processing waste, as set forth in claim 1, wherein:

a first spacer of the plurality of spacers is comprised of:
a hollow, annular frustum of right circular cone with a height and an inner diameter, and an outer diameter that progressively varies from a first base to a second base;
an interior wall of the spacer includes a locking structure, forming a keyway.

12. The system for processing waste as set forth in claim 1, wherein:

the adjustable egress phase is comprised of:
an adjustable discharge module with a linear and angular motion;
an intermediate assembly with a linear and angular motion;
an actuator module with a linear motion; and
an egress-side motive force generator associated with the actuator module that moves the actuator module along a reciprocating linear path;
reciprocating linear motion of the actuator module actuates the intermediate assembly along a commensurately reciprocating linear path, which, in turn, linearly moves adjustable discharge module.

13. The system for processing waste as set forth in claim 12, wherein:

the adjustable discharge module rotates with the shaft and is comprised of:
an outer member of, a generally annular conical configuration; and
an inner member of a generally annular configuration with an interlock structure that couples the adjustable discharge module with the shaft via an elongated bushing.

14. The system for processing waste as set forth in claim 13, wherein:

an interior side of an intake-side base of the outer member is moveably associated with the final flighting module, and
an egress-side base of the outer member, is associated with the inner member.

15. The system for processing waste as set forth in claim 14, wherein:

an outer side surface of the outer member at the intake side has a conical configuration that operates in relation to an annular conically configured compressor discharge member (a stationary component) to adjustably vary discharge rate, compression rate, and friction of processed waste as discharged from the compressor discharge member.

16. The system for processing waste as set forth in claim 15, wherein:

the intake-side base of the outer member includes an opening that moveable receives distal end portion egress-side of the final cylindrical body of the final flighting module.

17. The system for processing waste as set forth in claim 16, wherein:

an egress-side of the outer member the adjustable discharge module include one or more blind-holes that aligned with first set of openings of the inner member to secure outer and inner members via one or more fastener.

18. The system for processing waste as set forth in claim 17, wherein:
the outer and inner member include central openings that are concentrically arranged, with an inner wall of the central opening of the inner member including an interlock structure that enables the adjustable discharge module to rotate with the shaft.

19. The system for processing waste as set forth in claim 18, wherein:
the inner member further includes circularly arranged second set of openings near the inner central opening for, securing an intermediate assembly.

20. The system for processing waste as set forth in claim 19, wherein:
the intermediate assembly is comprised of:
a hollow, cylindrical body with a bore with an annular flange at intake-side thereof that includes openings that align with second set of openings of the inner member of the adjustable discharge module for receiving fasteners to secure the intermediate assembly with the adjustable discharge module;
the annular flange further functions as an enclosure at intake side for intake-side set of bearing positioned between outer surface of the intermediate assembly and the actuator module and also, operates to move with the actuator member.

21. The system for processing waste as set forth in claim 20, wherein:
cylindrical body of the intermediate assembly includes:
an inner wall of cylindrical body including an interlock structure that enables the intermediate assembly to rotate with the shaft.

22. The system for processing waste as set forth in claim 21, wherein:
an outer surface of the cylindrical body at egress-side includes a threaded section that secures a nut to enclose egress-side set of bearings associated with outer surface of the intermediate assembly and the actuator module.

23. The system for processing waste, as set forth in claim 22, wherein:
the actuator module is comprised of:
a central opening that accommodates the cylindrical body of the intermediate assembly, including intake and egress side bearing;
an inner flange that functions as divider wall and support for the intake and egress side bearing; and
an externally extending annular flange with two openings that receive connecting ends of drive pistons of the egress-side motive force generator to move the actuator module along a reciprocating linear path.

24. The system for processing waste as set forth in claim 23, wherein:
the egress-side motive force generator is comprised of:
pistons within cylindrical housing;
the pistons have an intake-side end that connect with the actuator module, and a free egress-side end that resides within cylinder housing, with the piston moving linearly as fluid is pumped or removed from cylinder housing by a hydraulic pump to plush or retract pistons;
the cylinder housing further include an annular flange extending from egress side cylinder housing;
the annular flange of the cylinder housing includes a set of circularly arranged openings for connection with the intake side support cover;
the egress-side distal end of the cylinder housing extend out of the support cover.

25. The system for processing waste as set forth in claim 1, wherein:
the single chamber, multi-phase adjustable compressor further includes an egress-side support cover;
the egress-side support cover includes:
a central opening through which an egress-side distal end of the shaft extends;
a first set of circularly arranged openings near around the central opening that secure a cap to support cover for covering of the egress-side end of the shaft;
a second and a third set of circularly arranged openings positioned laterally in relation to the central opening for securing a stationary part;
a fourth set of circularly arranged opening around the central opening, near periphery edge of the egress-side support cover for securing support cover to a frame by fasteners.

26. The system for processing waste as set forth in claim 1, wherein:
the single chamber, multi-phase adjustable compressor is comprised of a mesh associated with a cage.

27. The system for processing waste as set forth in claim 1, wherein:
the heat generator includes:
an electronic module;
a motor-pump module controlled by the electronic module;
one or more heater chambers through which heated medium is moved by the motor-pump module;
an expansion tank that includes cooled-off medium returned from the heating device;
the cooled-off medium is re-circulated from the expansion tank to a filter to generate a filtered medium;
the filtered medium is pumped via the motor-pump module into the one or more heater chambers and reheated, and returned to the heating device from a final heater chamber of the one or more heater chambers.

28. The system for processing waste, as set forth in claim 27, wherein:
the one or more heater chambers are hollow and cylindrical, allowing free flow of medium therein;
distal ends of the one or more the heater chambers are comprised of an annular flange that extends from outer surface of each chamber and has a central opening that includes a first set of one or more fastener opening arranged in circle around the central opening;
an enclosure that is detachably coupled with the annular flange and includes:
an eccentric opening for receiving a connecting end of a heating element; and
one or more second set of fastener opening arranged in circle near a periphery edge that are used to fasten the enclosure with the annular flange.

29. The system for processing waste as set forth in claim 27, wherein:
a heater chamber of the one or more heater chambers includes a length that extends along the heater chamber longitudinal axis, and width that extends along the heater chamber transverse axis;
the heater chamber is associated with a next heater chamber by a connecting chamber that connects egress opening of the heater chamber to an ingress opening of the next heater chamber.

30. The system for processing waste as set forth in claim 27, wherein:
the one or more heater chambers are comprised of:
a lower heater chamber from which the medium is moved to a next, and subsequent upper heater chambers, with increased gain in heat, and exiting out to radiant heating device.

31. The system for processing waste, as set forth in claim 27, wherein:
the one or more heater chamber includes at least one elongated heating element positioned within and along the longitudinal axis of the heater chamber.

32. The system for processing waste as set forth in claim 27, wherein:
the one or more heater chamber includes first and second elongated heating elements positioned within and along the longitudinal axis of the heater chamber, with the first elongated heating element oriented opposite the second elongated heating element.

33. The system for processing waste as set forth in claim 1, wherein:
the heating device includes:
an enclosed, heat distribution system that delivers, distributes and collects heat deliver medium; and
at least one heat chamber that receives, heats and aerates the partially dehydrated, dense, and heated material to generate dehydrated, dry, material.

34. The system for processing waste as set forth in claim 1, wherein:
the heating device includes:
a main inlet opening for receiving waste at a first heat chamber, and a main outlet opening at a final heat chamber for removing dehydrated, dry material.

35. The system for processing waste as set forth in claim 1, wherein:
the heating device, includes:
heat chambers wherein: waste is moved from a heat chamber to a final heat chamber, and
wherein: waste is accumulated in reverse at the final heat chamber first, then preceding heat chambers.

36. The system for processing waste as set forth in claim 1, wherein:
the heating device includes:
a heat chamber having:
an access panel to allow access to the heat chamber;
the access panel includes an intake vent opening to move exterior ambient air into the heat chamber; and
an evacuation opening to remove interior ambient air.

37. The system for processing waste as set forth in claim 1, wherein:
the heating device includes:
a heat chamber having:
an opening for movement of waste from the heat chamber to a next heat chamber.

38. The system for processing waste as set forth in claim 37, wherein:
the opening is comprised of:
an intake opening that receives waste, and an outlet opening defined by the conduit of heat distribution compartment for the radiant heat chamber for moving waste from the radiant heat chamber to a next radiant heat chamber.

39. The system for processing waste as set forth in claim 37, wherein:
the opening for movement of waste is controlled by a passive enclosure.

40. The system for processing waste as set forth in claim 1, wherein:
the heating device includes:
a heat chamber that has a mixer aeration system to mix and aerate waste within the heat chamber.

41. The system for processing waste as set forth in claim 39, wherein:
the passive enclosure closes off access to intake opening of, a next heat chamber as waste is moved and is pushed against the passive enclosure by a mixer-aeration mechanism.

42. The system for processing waste as set forth in claim 39, wherein:
the passive enclosure is progessively moved from an open position to a closed position as a progressively greater amount of waste is accumulated within the heat chamber, generating a progressively greater amount of force as waste is moved and pushed by a mixer-aeration mechanism against the passive enclosure.

43. The system for processing waste as set forth in claim 39, wherein:
the passive enclosure includes a set of adjustable weights that provide minimal counterbalancing force against a force of waste pushed by a mixer-aeration mechanism, with the passive enclosure progressively, moving from open to close position as the force from push of the waste progressively overcomes the counterbalancing force of the weights of the passive enclosure as more waste is accumulated.

44. The system for processing waste, as set forth in claim 39, wherein:
the passive enclosure includes:
a flap cover section;
an actuator section that is contacted by waste and is moved to move the flap from open to closed position:
a connection support that connects the actuator section to flap section;
a set of counterbalancing weights positioned on a first end of a pin that connect the passive enclosure to a frame of the heating device, while the entire passive enclosure hangs on the pin, with the pin rotating within a bushing; and
the pin having a second end that extends out of the heat chamber with level indicator mounted on the second end.

45. The system for processing waste as set forth in claim 1, wherein:
the heating device includes:
an enclosed, heat distribution system that delivers, distributes and collects heat deliver medium;
the enclosed, heat distribution system is isolated from heat chambers.

46. The system for processing waste as set forth in claim 45, wherein:
the enclosed, heat distribution system is comprised of:
a main inlet tube through which heated medium is received:
one or more egress tubes associated with one or more heat distribution compartments of one or more heat chamber;
one or more egress tubes receive delivered heated medium from main intake tube and distribute the heated medium to one or more heat distribution compartments;
heated medium traversing through one or more heat distribution compartments transfers heat to adjacent heat chambers via conduction and convention, with material within each heat chamber aerated to be heated;
one or more ingress tubes associated with the one or, more heat distribution compartments;
one or more egress tubes receive cooled-off medium from the one or more heat distribution compartments, and direct cooled-off medium to a main output collector tube, an output of which is associated with the heat generator for reheating and re-circulating the cooled-of medium.

47. The system for processing waste as set forth in claim 45, wherein:
the heat distribution compartment is positioned at a chamber output side.

48. The system for processing waste as set forth in claim 45, wherein:
the heat distribution compartment is positioned between adjacent heat chambers, with a final heat distribution compartment defining a final wall of a final heat chamber.

49. The system for processing waste as set forth in claim 45, wherein:
the heat distribution compartment includes a set of supporting spacer posts that facilitate in dispersion heated medium throughout the heat distribution compartment.

50. The system for processing waste as set forth in claim 45, wherein:
the heat distribution compartment further includes a conduit for allowing movement of waste from a heat chamber to a next heat chamber.

51. A system for processing food waste, comprising:
a receiver member to receive waste;
a first stage that includes a first module that comprises a shredder that reduces a size of received waste into smaller constituent parts;
a second stage that includes second module that comprises a single chamber, multi-phase adjustable compressor;
a third stage that includes a third module and a fourth module:
the third module of the third stage includes a heat generator that generates heat for the fourth module;
the fourth module including a heating device that receives and further heats and aerates the partially dehydrated, dense, and heated material to generate dehydrated, dry material;
the heat generator includes a first heat chamber having:
a hopper at an ingress end to receive waste;
a platform at an egress end for mounting a motor that drive a pulley system to rotate augers; and
an egress opening at a bottom egress side to allow exit of waste to a next heat chamber.

52. The system for processing food waste as set forth in claim 51, wherein:
the heat generator includes:
an electronic module;
a motor-pump module controlled by the electronic module to circulate a heated medium through walls of the heading device;
an expansion heating tank that includes cooled-off medium returned from the heating device;
wherein: the cooled-off medium is reheated and is re-circulated from the expansion heating tank through a connection tube and is pumped via the motor-pump module into the walls of the heating device.

53. The system for processing food waste as set forth in claim 52, wherein:
the expansion heating tank includes one or more heating element that reheat cooled-off medium.

54. The system for processing food waste as set forth in claim 52, wherein:
the medium is moved from within walls of a lower chamber of the heating device to a next, and subsequent upper chambers of the heating device.

55. The system for processing food waste as set forth in claim 51, wherein:
the heat generator includes an excess oil storage.

56. The system for processing food waste as set forth in claim 51, wherein:
the heating device, includes:
an enclosed, heat distribution system that delivers, distributes and collects heat deliver medium; and
at least one heat chamber that receives, heats and aerates the partially dehydrated, dense, and heated material to generate dehydrated, dry material.

57. The system for processing food waste as set forth in claim 51, wherein:
the heating device includes:
a main inlet opening for receiving waste at a first heat chamber, and a main outlet opening at a final heat chamber for removing dehydrated, dry material.

58. The system for processing food waste as set forth in claim 51, wherein:
the heating device includes:
heat chambers with waste moving from a first distal end to a second distal end by an auger.

59. The system for processing food waste as set forth in claim 51, wherein:
the first heat chamber further includes
a double-walled cylindrical hollow body with distal end openings;
the doubled-walled cylindrical hollow body includes a compartment in between outer and interior walls for receiving heated medium through an intake opening at bottom egress side, and an outlet opening at top ingress side.

60. The system for processing food waste as set forth in claim 1, wherein:
the first heat chamber further includes
an auger with an egress side connected to a driver mechanism to rotate a shaft of the auger, and an ingress side that is secured to an ingress side enclosure cover.

61. A compression device, comprising:
a single chamber, longitudinally extending multi-phase adjustable compressor that includes:
a longitudinally extending, multi-stage compression auger assembly, comprising:
an asymmetrical, longitudinally extending shaft;
a plurality of flighting modules detachably mounted and secured along a flighting mount section of the shaft;
a plurality of spacers detachably mounted and secured in between flighting modules along the flighting mount section of the shaft;
the single chamber, longitudinally extending multi-phase adjustable compressor applies continuous, progressively increasing compressive force at each phase to increasingly compress the smaller constituent parts into partially dehydrated, dense, and heated material, with an adjustable egress phase enabling adjustment of compression force that is transferred to preceding phases;

the smaller constituent parts move from a phase to a next phase as greater mass of smaller constituent parts is introduced at an intake end, pushing existing smaller constituent parts to the next phase;

the smaller constituent parts move from the phase to the next phase at a progressively slower and slower rate, enabling the smaller constituent parts to remain at the next phase at a longer duration then at a preceding phase;

the slower rate of movement and longer duration of stay of the smaller constituent parts at the next phase cause accumulation of greater mass of smaller constituent parts at the next and subsequent phases as the smaller constituent parts egress from the preceding, faster moving phase and into the next phase;

the continuously accumulating smaller constituent parts at the next phase increasingly experience higher compressive and higher frictional forces as greater mass of smaller constituent parts are accumulated in a smaller and smaller volume, resulting in generated temperatures that further vaporize moisture, in addition to further compression and condensing of smaller constituent parts.

* * * * *